United States Patent
Baym et al.

(10) Patent No.: US 10,181,314 B2
(45) Date of Patent: Jan. 15, 2019

(54) PORTABLE ELECTRONIC DEVICE DIRECTED AUDIO TARGETED MULTIPLE USER SYSTEM AND METHOD

(71) Applicant: Elwha LLC, Bellevue, WA (US)

(72) Inventors: Michael H. Baym, Cambridge, MA (US); William David Duncan, Kirkland, WA (US); Roderick A. Hyde, Redmond, WA (US); Edward K. Y. Jung, Bellevue, WA (US); Richard T. Lord, Tacoma, WA (US); Robert W. Lord, Seattle, WA (US); Nathan P. Myhrvold, Medina, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 358 days.

(21) Appl. No.: 13/920,305

(22) Filed: Jun. 18, 2013

(65) Prior Publication Data

US 2014/0369514 A1  Dec. 18, 2014

Related U.S. Application Data

(63) Continuation-in-part of application No. 13/920,280, filed on Jun. 18, 2013, and a continuation-in-part of
(Continued)

(51) Int. Cl.
*G10K 11/178* (2006.01)
*H04M 1/60* (2006.01)
(Continued)

(52) U.S. Cl.
CPC ......... *G10K 11/178* (2013.01); *H04M 1/6016* (2013.01); *H04R 1/403* (2013.01);
(Continued)

(58) Field of Classification Search
CPC ............ G01K 7/02; G01K 3/005; G01K 3/10; G01K 7/42; G01K 7/22; G01K 13/02;
(Continued)

(56) References Cited

U.S. PATENT DOCUMENTS

| 4,823,908 A | 4/1989 | Tanaka et al. |
| 6,011,470 A | 1/2000 | Schulte et al. |

(Continued)

FOREIGN PATENT DOCUMENTS

| DE | 10004029 A1 | 8/2001 |
| JP | 02253800 A | 10/1990 |

(Continued)

OTHER PUBLICATIONS

PCT International Search Report; International App. No. PCT/US2014/028899; dated Jul. 17, 2014; pp. 1-6.

*Primary Examiner* — Disler Paul

(57) ABSTRACT

A computationally implemented system and method that is designed to, but is not limited to: electronically modulating two or more acoustic ultrasonic signals according to output information to be transmitted as two or more acoustic ultrasonic signals from two or more portable electronic device emitters of a portable electronic device; and electronically projecting said two or more acoustic ultrasonic signals from said portable electronic device emitters to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other method aspects are described in the claims, drawings, and text forming a part of the present disclosure.

42 Claims, 90 Drawing Sheets

Related U.S. Application Data application No. 13/920,296, filed on Jun. 18, 2013, and a continuation-in-part of application No. 13/920,312, filed on Jun. 18, 2013, and a continuation-in-part of application No. 13/844,525, filed on Mar. 15, 2013, now abandoned, and a continuation-in-part of application No. 13/844,615, filed on Mar. 15, 2013, now abandoned, and a continuation of application No. 13/844,678, filed on Mar. 15, 2013, now abandoned, and a continuation-in-part of application No. 13/844,732, filed on Mar. 15, 2013, now abandoned.

(51) Int. Cl.
| | | |
|---|---|---|
| *H04R 1/40* | (2006.01) | |
| *H04R 3/12* | (2006.01) | |
| *H04R 5/02* | (2006.01) | |
| *H04R 5/04* | (2006.01) | |
| H04R 1/00 | (2006.01) | |
| H04M 1/03 | (2006.01) | |

(52) U.S. Cl.
CPC .............. *H04R 3/12* (2013.01); *H04R 5/02* (2013.01); *H04R 5/04* (2013.01); *H04M 1/03* (2013.01); H04R 2201/401 (2013.01); H04R 2203/12 (2013.01); H04R 2217/03 (2013.01); H04R 2499/11 (2013.01); H04R 2499/15 (2013.01)

(58) Field of Classification Search
CPC ........ G01K 2205/04; G01K 7/16; G01K 7/01; G01K 7/10; G01K 11/32; G01K 13/00; G01K 2013/024; B23K 31/02; G01F 1/00; G01F 25/72; H05K 7/2095; F24F 11/0012; F24F 2001/0052; F24F 2011/0093; F24F 11/022; H02M 1/32; H02M 1/38; H02M 1/53806; H01C 7/008; H01C 17/00; H01R 4/023; H01R 4/029; H01R 43/28; G01N 25/72; G01N 25/28; G01N 25/32; G01N 33/225; G01N 31/2642; G01N 31/048; G01N 31/40; G01J 5/004; G01J 5/00; G01J 5/003; G01J 5/043; G01J 5/0821
USPC ............... 381/77, 111–113, 71.1, 71.6–71.7
See application file for complete search history.

(56) References Cited

U.S. PATENT DOCUMENTS

| | | | |
|---|---|---|---|
| 6,044,257 A | 3/2000 | Boling et al. | |
| 6,384,414 B1 | 5/2002 | Fisher et al. | |
| 6,434,239 B1 | 8/2002 | DeLuca | |
| 6,445,804 B1* | 9/2002 | Hirayanagi | H04R 3/00 381/117 |
| 6,766,036 B1* | 7/2004 | Pryor | A63F 13/06 348/169 |
| 6,807,281 B1 | 10/2004 | Sasaki et al. | |
| 6,850,623 B1 | 2/2005 | Norris et al. | |
| 7,424,118 B2 | 9/2008 | Mori et al. | |
| 7,429,935 B1 | 9/2008 | Brenner | |
| 7,801,315 B2 | 9/2010 | Watanabe et al. | |
| 7,907,740 B2 | 3/2011 | Matsuzawa | |
| 8,009,838 B2 | 8/2011 | Lee et al. | |
| 8,199,960 B2* | 6/2012 | Eaton | G06F 1/1601 381/386 |
| 8,208,970 B2 | 6/2012 | Cheung et al. | |
| 8,243,944 B2 | 8/2012 | Almagro | |
| 8,306,244 B2* | 11/2012 | Okamura | H04R 1/005 381/111 |
| 8,311,233 B2 | 11/2012 | Kinghorn | |
| 8,358,321 B1 | 1/2013 | Weidner | |
| 8,582,789 B2 | 11/2013 | Cheung et al. | |
| 8,681,951 B1 | 3/2014 | Lavian et al. | |
| 8,879,766 B1* | 11/2014 | Zhang | H04R 1/028 381/333 |
| 8,891,783 B2 | 11/2014 | Tan et al. | |
| 8,903,104 B2 | 12/2014 | Norris | |
| 8,983,098 B2 | 3/2015 | Norris | |
| 9,078,055 B2 | 7/2015 | Nguyen et al. | |
| 9,129,515 B2 | 9/2015 | Xiang et al. | |
| 9,197,974 B1 | 11/2015 | Clark et al. | |
| 9,197,977 B2 | 11/2015 | Mahabub et al. | |
| 9,226,053 B2 | 12/2015 | Okamura et al. | |
| 9,251,428 B2 | 2/2016 | Rozumyanskiy et al. | |
| 9,354,310 B2 | 5/2016 | Visser et al. | |
| 9,432,785 B2 | 8/2016 | Kappus et al. | |
| 2002/0178390 A1 | 11/2002 | Lee | |
| 2003/0039370 A1 | 2/2003 | Norris | |
| 2003/0091200 A1 | 5/2003 | Pompei | |
| 2003/0215103 A1 | 11/2003 | Norris et al. | |
| 2004/0032399 A1 | 2/2004 | Sekiguchi et al. | |
| 2004/0114770 A1* | 6/2004 | Pompei | H04R 5/02 381/77 |
| 2004/0114772 A1 | 6/2004 | Zlotnick | |
| 2004/0170086 A1 | 9/2004 | Mayer et al. | |
| 2004/0202339 A1 | 10/2004 | O'Brien, Jr. et al. | |
| 2004/0204168 A1 | 10/2004 | Laurila | |
| 2004/0208324 A1 | 10/2004 | Cheung et al. | |
| 2004/0208325 A1 | 10/2004 | Cheung et al. | |
| 2004/0209654 A1 | 10/2004 | Cheung et al. | |
| 2004/0234080 A1* | 11/2004 | Hernandez | G10K 11/178 381/71.11 |
| 2004/0264707 A1* | 12/2004 | Yang | G10K 15/02 381/77 |
| 2005/0009583 A1 | 1/2005 | Cheung et al. | |
| 2005/0089176 A1 | 4/2005 | Norris et al. | |
| 2005/0152562 A1* | 7/2005 | Holmi | H04S 7/307 381/86 |
| 2005/0185800 A1* | 8/2005 | Croft, III | H04R 3/00 381/77 |
| 2005/0195985 A1* | 9/2005 | Croft, III | H04R 17/00 381/77 |
| 2005/0207568 A1 | 9/2005 | Wu | |
| 2005/0244016 A1 | 11/2005 | Norris et al. | |
| 2005/0261589 A1 | 11/2005 | Daft et al. | |
| 2006/0210090 A1 | 9/2006 | Shennib | |
| 2006/0291667 A1* | 12/2006 | Watanabe | H04R 1/323 381/77 |
| 2007/0140505 A1 | 6/2007 | Tribble et al. | |
| 2007/0154036 A1* | 7/2007 | Matsuzawa | H04R 1/403 381/116 |
| 2007/0169555 A1 | 7/2007 | Gao et al. | |
| 2007/0172076 A1 | 7/2007 | Mori et al. | |
| 2007/0183618 A1* | 8/2007 | Ishii et al. | 381/387 |
| 2007/0286433 A1 | 12/2007 | Yoshino | |
| 2007/0287516 A1 | 12/2007 | Cheung et al. | |
| 2008/0063214 A1 | 3/2008 | Spencer et al. | |
| 2008/0159571 A1* | 7/2008 | Hooley | H04R 1/403 381/307 |
| 2008/0226087 A1 | 9/2008 | Kinghorn | |
| 2008/0252595 A1 | 10/2008 | Boillot | |
| 2008/0279410 A1 | 11/2008 | Cheung et al. | |
| 2008/0285777 A1 | 11/2008 | Pompei | |
| 2008/0304677 A1 | 12/2008 | Abolfathi et al. | |
| 2009/0046864 A1* | 2/2009 | Mahabub | H04S 7/30 381/17 |
| 2009/0089717 A1 | 4/2009 | Cho et al. | |
| 2009/0105586 A1 | 4/2009 | Daft et al. | |
| 2009/0214049 A1* | 8/2009 | Lee | H04R 1/40 381/71.1 |
| 2009/0298430 A1* | 12/2009 | Cheung et al. | 455/41.3 |
| 2010/0036926 A1 | 2/2010 | Ahart et al. | |
| 2010/0135504 A1 | 6/2010 | Almagro | |
| 2010/0172511 A1 | 7/2010 | Togawa et al. | |
| 2010/0239101 A1 | 9/2010 | Okamura et al. | |
| 2010/0284525 A1 | 11/2010 | Sander et al. | |
| 2011/0015880 A1 | 1/2011 | Kajitani et al. | |
| 2011/0103614 A1 | 5/2011 | Cheung et al. | |

(56) References Cited

U.S. PATENT DOCUMENTS

| | | | |
|---|---|---|---|
| 2011/0129101 A1* | 6/2011 | Hooley | H04R 3/005 381/92 |
| 2011/0172793 A1 | 7/2011 | Richards et al. | |
| 2011/0182445 A1 | 7/2011 | Atsmon et al. | |
| 2011/0188672 A1 | 8/2011 | Tada et al. | |
| 2011/0202302 A1 | 8/2011 | Park et al. | |
| 2011/0211035 A1 | 9/2011 | Ota et al. | |
| 2011/0279366 A1 | 11/2011 | Lohbihler | |
| 2011/0303014 A1 | 12/2011 | Kajitani | |
| 2012/0120218 A1 | 5/2012 | Flaks et al. | |
| 2012/0128196 A1 | 5/2012 | Watanabe et al. | |
| 2012/0148053 A1* | 6/2012 | Tan | G10K 15/02 381/1 |
| 2012/0224456 A1 | 9/2012 | Visser et al. | |
| 2012/0237037 A1 | 9/2012 | Ninan et al. | |
| 2012/0243708 A1 | 9/2012 | Tsutsui et al. | |
| 2012/0268563 A1* | 10/2012 | Chou et al. | 348/46 |
| 2012/0308056 A1 | 12/2012 | Nakayama | |
| 2012/0321112 A1* | 12/2012 | Schubert | H04R 25/43 381/312 |
| 2013/0035582 A1 | 2/2013 | Radulescu et al. | |
| 2013/0058503 A1 | 3/2013 | Kato et al. | |
| 2013/0066636 A1 | 3/2013 | Singhal | |
| 2013/0077803 A1 | 3/2013 | Konno et al. | |
| 2013/0094331 A1 | 4/2013 | Watanabe et al. | |
| 2013/0094666 A1 | 4/2013 | Haff et al. | |
| 2013/0121516 A1* | 5/2013 | Lamb | H04S 3/00 381/307 |
| 2013/0202130 A1 | 8/2013 | Zurek et al. | |
| 2013/0294637 A1* | 11/2013 | Kitatani | H04S 7/30 381/387 |
| 2013/0321625 A1 | 12/2013 | Yanagihara et al. | |
| 2014/0044286 A1* | 2/2014 | Coles | G06F 1/1688 381/150 |
| 2014/0050325 A1 | 2/2014 | Norris | |
| 2014/0079242 A1* | 3/2014 | Nguyen | H04R 5/00 381/86 |
| 2014/0104988 A1 | 4/2014 | Norris | |
| 2014/0133665 A1 | 5/2014 | Xiang et al. | |
| 2014/0141836 A1 | 5/2014 | Rozumyanskiy et al. | |
| 2014/0205134 A1* | 7/2014 | Yagihashi | H04R 3/04 381/387 |
| 2014/0254820 A1 | 9/2014 | Gardenfors et al. | |
| 2014/0254840 A1 | 9/2014 | Norris | |
| 2014/0269207 A1 | 9/2014 | Baym et al. | |
| 2014/0269208 A1 | 9/2014 | Baym et al. | |
| 2014/0269212 A1 | 9/2014 | Xiang et al. | |
| 2014/0307898 A1* | 10/2014 | Norris | H04R 5/033 381/309 |
| 2014/0369538 A1 | 12/2014 | Norris et al. | |
| 2015/0003624 A1 | 1/2015 | Sato | |
| 2016/0044402 A1 | 2/2016 | Okamura et al. | |
| 2016/0233966 A1 | 8/2016 | Kappus et al. | |
| 2016/0269831 A1 | 9/2016 | Kappus et al. | |
| 2016/0269833 A1 | 9/2016 | Norris et al. | |
| 2016/0373864 A1 | 12/2016 | Hecht et al. | |

FOREIGN PATENT DOCUMENTS

| | | |
|---|---|---|
| JP | 2007-159042 A | 6/2007 |
| JP | 2007-189627 A | 7/2007 |
| JP | 2011-010224 A | 1/2011 |
| JP | 2012-134589 A | 7/2012 |
| WO | WO 2011/007685 A1 | 1/2011 |
| WO | WO 2011/117903 A2 | 9/2011 |
| WO | WO 2012/091185 A1 | 7/2012 |
| WO | WO 2012/105183 A1 | 8/2012 |

* cited by examiner

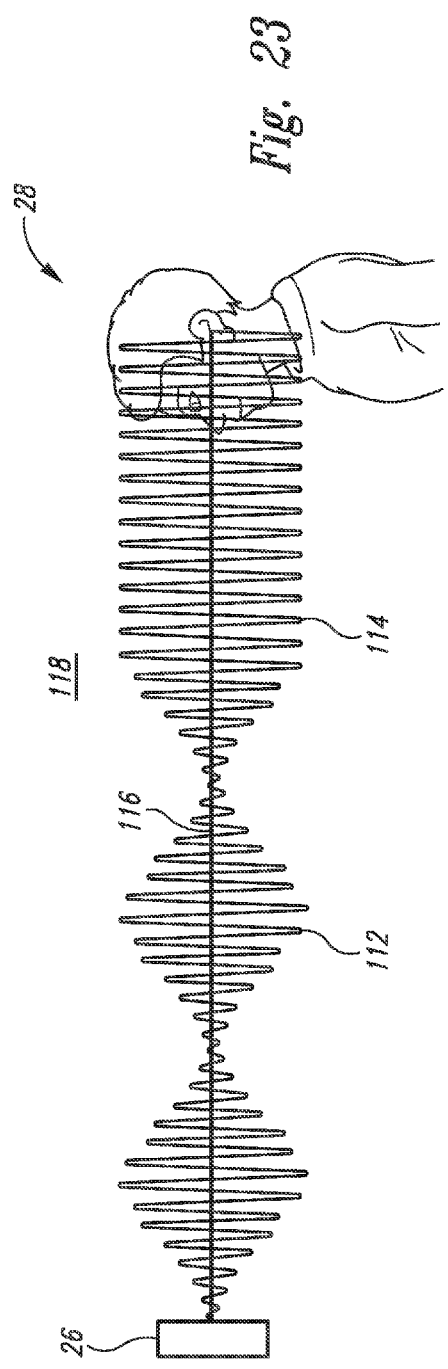
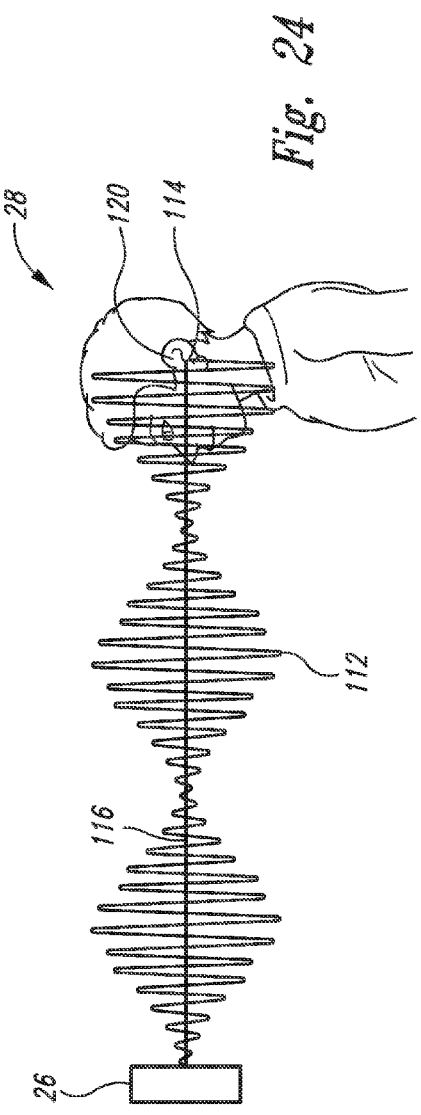

Fig. 26 s100 control and information processing subsystem

| s102 microprocessor component | s104 central processing unit (CPU) component | s106 digital signal processor (DSP) component | s108 application specific integrated circuit (ASIC) component | s110 field programmable gate array (FPGA) component |
| --- | --- | --- | --- | --- |
| s112 multiprocessor component | s114 optical processing component | s116 logic component | s118 remote processor component | s120 multi-core array component |
| s122 server processor component | s124 database engine component | s126 search engine component | s128 image recognition component | s130 audio recognition component |
| s132 spectrum analysis component | s134 lexigraphy engine component | s136 operating system component | s138 voice recognition component | s140 network processor component |

*Fig. 27* s200 information storage subsystem

| s202 random access memory (RAM) component | s204 dynamic random access memory (DRAM) component | s206 other volatile memory component | s208 persistent memory component | s210 read only memory (ROM) component |
| s212 electrically erasable programmable read only memory | s214 compact disk (CD) component | s216 digital versatile disk (DVD) component | s218 flash memory component | s220 other nonvolatile memory component |
| s222 hard drive component | s224 disk farm component | s226 disk cluster component | s228 remote backup component | s230 server component |
| s232 digital tape component | s234 optical storage component | s236 Blu Ray disk component | s238 computer readable signal bearing medium | s240 removable media component |

Fig. 31 s600 power subsystem

| s602 electrical component | s604 hydrocarbon fuel component | s606 hydrogen fuel component | s608 solid fuel component | s610 liquid fuel component |
| s612 gaseous fuel component | s614 battery component | s616 electrical generator component | s618 dry cell battery component | s620 hybrid fuel component |
| s622 rechargeable component | s624 thermoelectric component | s626 piezoelectric component | s628 capacitor component | s630 power cell component |
| s632 steam generation component | s634 solar cell component | s636 solar reflector component | s638 thermonuclear component | s640 co-generation component |

Fig. 32

10 portable electronic device directed audio

| | | | |
|---|---|---|---|
| c11 electronically modulating elec circ arrange | e1101 modulating data storage elec circ arrange | e1102 modulating wireless elec circ arrange | e1103 modulating microphone elec circ arrange | e1104 modulating audio elec circ arrange |
| e1105 modulating internet elec circ arrange | e1106 modulating software elec circ arrange | e1107 modulating disk player elec circ arrange | e1108 modulating media player elec circ arrange | e1109 modulating audio player elec circ arrange |
| e1110 modulating text recognition elec circ arrange | e1111 modulating monitor alarm elec circ arrange | e1112 modulating narrative elec circ arrange | e1113 modulating instrumental elec circ arrange | e1114 modulating signal modulation elec circ arrange |
| e1115 modulating ultrasonic transducer elec circ arrange | e1116 modulating signal processing elec circ arrange | e1117 modulating microprocessor elec circ arrange | e1118 modulating for inserting digital elec circ arrange | e1119 modulating tablet computer elec circ arrange |

Fig. 33

10 portable electronic device directed audio

| e1120 modulating handheld mobile elec circ arrange | e1121 modulating cell phone elec circ arrange | e1122 modulating portable laptop elec circ arrange | e1123 modulating PDA elec circ arrange | e1124 modulating smart phon elec circ arrange |
| --- | --- | --- | --- | --- |
| e1125 modulating security personnel elec circ arrange | e1126 modulating athletic sports elec circ arrange | e1127 modulating wearable media elec circ arrange | e1128 modulating wristwatch elec circ arrange | e1129 modulating two-way radio elec circ arrange |
| e1130 modulating steered beams elec circ arrange | e1131 modulating beams elec circ arrange | e1132 modulating phased array elec circ arrange | e1133 modulating audio elec circ arrange | e1134 modulating absolute position elec circ arrange |
| e1135 modulating relative position elec circ arrange | e1136 modulating quality characterization target locations elec | e1137 modulating ultrasonic transducers elec circ arrange | e1138 modulating reference elec circ arrange | e1139 modulating more acoustic ultrasonic elec circ arrange |

Fig. 35

10 portable electronic device directed audio

| e12 electronically projecting elec circ arrange | e1201 projecting thermal imaging elec circ arrange | e1202 projecting visual imaging elec circ arrange | e1203 projecting acoustic imaging elec circ arrange | e1204 projecting sensed acoustic elec circ arrange |
| --- | --- | --- | --- | --- |
| e1205 projecting adjacent elec circ arrange | e1206 projecting Doppler frequency elec circ arrange | e1207 projecting digitally coded elec circ arrange | e1208 projecting ranging elec circ arrange | e1209 projecting visual tracking elec circ arrange |
| e1210 projecting thermal tracking elec circ arrange | e1211 projecting greatest intensity elec circ arrange | e1212 projecting thermal tracking elec circ arrange | e1213 projecting signal amplitude elec circ arrange | e1214 projecting target location elec circ arrange |
| e1215 projecting audio microphone elec circ arrange | e1216 projecting ultrasonic microphone elec circ arrange | e1217 projecting acoustic digital elec circ arrange | e1218 projecting acoustic noise elec circ arrange | e1219 projecting ultrasonic signals elec circ arrange |

*Fig. 36*

10 portable electronic device directed audio

| e1220 projecting vectoring elec circ arrange | e1221 projecting atmospheric interaction elec circ arrange | e1222 projecting human tissue elec circ arrange | e1223 projecting signals interfering elec circ arrange | e1224 projecting transducers to focus elec circ arrange |
| --- | --- | --- | --- | --- |
| e1225 projecting interference elec circ arrange | e1226 projecting nonlinear atmospheric elec circ arrange | e1227 projecting nonlinear tissue elec circ arrange | e1228 projecting nonlinear non-tissue elec circ arrange | e1229 projecting nonlinear personal elec circ arrange |
| e1230 projecting ears of a target elec circ arrange | e1231 projecting digitally coded elec circ arrange | e1232 projecting signals tailored elec circ arrange | e1233 projecting feedback sensing elec circ arrange | e1234 projecting binaural acoustic elec circ arrange |
| e1235 projecting stereophonic acoustic elec circ arrange | e1236 projecting monophonic acoustic elec circ arrange | e1237 projecting phase cancellation elec circ arrange | e1238 projecting phase-shifting elec circ arrange | e1239 projecting emitted greater elec circ arrange |

*Fig. 37*

10 portable electronic device directed audio

| e1240 projecting information designated elec circ arrange | e1241 projecting information containing elec circ arrange | e1242 projecting psychologically influential elec circ arrange | e1243 projecting verbal oratory elec circ arrange | e1244 projecting music selections elec circ arrange |
| e1245 projecting location away elec circ arrange | e1246 projecting vicinity ears elec circ arrange | e1247 projecting vicinity individual elec circ arrange | e1248 projecting near individuals elec circ arrange | e1249 projecting passive receiver elec circ arrange |
| e1250 projecting moving member elec circ arrange | e1251 projecting listener's head elec circ arrange | e1252 projecting sensed accelerometer elec circ arrange | e1253 projecting six feet elec circ arrange | e1254 projecting twelve feet elec circ arrange |
| e1255 projecting three feet elec circ arrange | e1256 projecting emitter arrangements elec circ arrange | e1257 projecting handheld mobile elec circ arrange | e1258 projecting cell phone elec circ arrange | e1259 projecting laptop computer elec circ arrange |

*Fig. 38*

| 10 portable electronic device directed audio | | | |
|---|---|---|---|
| e1260 projecting PDA elec circ arrange | e1261 projecting smart phone elec circ arrange | e1262 projecting security personnel elec circ arrange | e1263 projecting sports equipment elec circ arrange | e1264 projecting wearable media elec circ arrange |
| e1265 projecting wristwatch elec circ arrange | e1266 projecting two-way radio elec circ arrange | e1267 projecting targeting area elec circ arrange | e1268 projecting transducer placement elec circ arrange | e1269 projecting amplitude size elec circ arrange |
| e1270 projecting ears of a target elec circ arrange | e1271 projecting digitally coded elec circ arrange | e1272 projecting keyboard area elec circ arrange | e1273 projecting dimensional sizing elec circ arrange | e1274 projecting wavelengths of the lowest elec circ arrange |
| e1275 projecting placement in body elec circ arrange | e1276 projecting localized areas elec circ arrange | e1277 projecting collective speakers elec circ arrange | e1278 projecting multiple arrays elec circ arrange | |

Fig. 43 s200 information storage subsystem

| i1220 projecting vectoring instructions | i1221 projecting atmospheric interaction instructions | i1222 projecting human tissue instructions | i1223 projecting signals interfering instructions | i1224 projecting transducers to focus instructions |
| --- | --- | --- | --- | --- |
| i1225 projecting interference instructions | i1226 projecting nonlinear atmospheric instructions | i1227 projecting nonlinear tissue instructions | i1228 projecting nonlinear non-tissue instructions | i1229 projecting nonlinear personal instructions |
| i1230 projecting ears of a target instructions | i1231 projecting digitally coded instructions | i1232 projecting signals tailored instructions | i1233 projecting feedback sensing instructions | i1234 projecting binaural acoustic instructions |
| i1235 projecting stereophonic acoustic instructions | i1236 projecting monophonic acoustic instructions | i1237 projecting phase cancellation instructions | i1238 projecting phase-shifting instructions | i1239 projecting emitted greater instructions |

*Fig. 44* s200 information storage subsystem

| i1240 projecting information designated instructions | i1241 projecting information containing instructions | i1242 projecting psychologically influential instructions | i1243 projecting verbal oratory instructions | i1244 projecting music selections instructions |
| --- | --- | --- | --- | --- |
| i1245 projecting location away instructions | i1246 projecting vicinity ears instructions | i1247 projecting vicinity individual instructions | i1248 projecting near individuals instructions | i1249 projecting passive receiver instructions |
| i1250 projecting moving member instructions | i1251 projecting listener's head instructions | i1252 projecting sensed accelerometer instructions | i1253 projecting six feet instructions | i1254 projecting twelve feet instructions |
| i1255 projecting three feet instructions | i1256 projecting emitter arrangements instructions | i1257 projecting handheld mobile instructions | i1258 projecting cell phone instructions | i1259 projecting laptop computer instructions |

Fig. 45 s200 information storage subsystem

| i1260 projecting PDA instructions | i1261 projecting smart phone instructions | i1262 projecting security personnel instructions | i1263 projecting sports equipment instructions | i1264 projecting wearable media instructions |
| i1265 projecting wristwatch instructions | i1266 projecting two-way radio instructions | i1267 projecting targeting area instructions | i1268 projecting transducer placement instructions | i1269 projecting amplitude size instructions |
| i1270 projecting along vicinity instructions | i1271 projecting display screen instructions | i1272 projecting keyboard area instructions | i1273 projecting dimensional sizing instructions | i1274 projecting wavelengths of the lowest instructions |
| i1275 projecting placement in body instructions | i1276 projecting localized areas instructions | i1277 projecting collective speakers instructions | i1278 projecting multiple arrays instructions | |

Fig. 50

10 portable electronic device directed audio

| m1220 projecting vectoring module | m1221 projecting atmospheric interaction module | m1222 projecting human tissue module | m1223 projecting signals interfering module | m1224 projecting transducers to focus module |
| m1225 projecting interference module | m1226 projecting nonlinear atmospheric module | m1227 projecting nonlinear tissue module | m1228 projecting nonlinear non-tissue module | m1229 projecting nonlinear personal module |
| m1230 projecting ears of a target module | m1231 projecting digitally coded module | m1232 projecting signals tailored module | m1233 projecting feedback sensing module | m1234 projecting binaural acoustic module |
| m1235 projecting stereophonic acoustic module | m1236 projecting monophonic acoustic module | m1237 projecting phase cancellation module | m1238 projecting phase-shifting module | m1239 projecting emitted greater module |

Fig. 51

| 10 portable electronic device directed audio | | | |
|---|---|---|---|
| m1240 projecting information designated module | m1241 projecting information containing module | m1242 projecting psychologically influential module | m1243 projecting verbal oratory module | m1244 projecting music selections module |
| m1245 projecting location away module | m1246 projecting vicinity ears module | m1247 projecting vicinity individual module | m1248 projecting near individuals module | m1249 projecting passive receiver module |
| m1250 projecting moving member module | m1251 projecting listener's head module | m1252 projecting sensed accelerometer module | m1253 projecting six feet module | m1254 projecting twelve feet module |
| m1255 projecting three feet module | m1256 projecting emitter arrangements module | m1257 projecting handheld mobile module | m1258 projecting cell phone module | m1259 projecting laptop computer module |

*Fig. 52*

10 portable electronic device directed audio

| m1260 projecting PDA module | m1261 projecting smart phone module | m1262 projecting security personnel module | m1263 projecting sports equipment module | m1264 projecting wearable media module |
| --- | --- | --- | --- | --- |
| m1265 projecting wristwatch module | m1266 projecting two-way radio module | m1267 projecting targeting area module | m1268 projecting transducer placement module | m1269 projecting amplitude size module |
| m1270 projecting ears of a target module | m1271 projecting digitally coded module | m1272 projecting keyboard area module | m1273 projecting dimensional sizing module | m1274 projecting wavelengths of the lowest module |
| m1275 projecting placement in body module | m1276 projecting localized areas module | m1277 projecting collective speakers module | m1278 projecting multiple arrays module | |

Fig. 60 o11 — electronically modulating two or more acoustic ultrasonic signals according to output information to be transmitted as two or more acoustic ultrasonic signals from two or more portable electronic device emitters of a portable electronic device o1119 electronically modulating two or more acoustic ultrasonic signals according to output information to be transmitted as two or more acoustic ultrasonic signals from two or more portable electronic device emitters the of a portable electronic device as one or more electronic tablet computer systems o1120 electronically modulating two or more acoustic ultrasonic signals according to output information to be transmitted as two or more acoustic ultrasonic signals from two or more portable electronic device emitters the of a portable electronic device as one or more electronic handheld mobile device systems o1121 electronically modulating two or more acoustic ultrasonic signals according to output information factors as two or more acoustic ultrasonic signals from two or more portable electronic device emitters the of a portable electronic device as one or more electronic cell phone systems Start → End

Fig. 63 o11 electronically modulating two or more acoustic ultrasonic signals according to output information to be transmitted as two or more acoustic ultrasonic signals from two or more portable electronic device emitters of a portable electronic device o1128 electronically modulating two or more acoustic ultrasonic signals according to output information to be transmitted as two or more acoustic ultrasonic signals from two or more portable electronic device emitters the of a portable electronic device as one or more electronic wristwatch systems o1129 electronically modulating two or more acoustic ultrasonic signals according to output information to be transmitted as two or more acoustic ultrasonic signals from two or more portable electronic device emitters the of a portable electronic device as one or more electronic two-way radio systems o1130 electronically modulating two or more acoustic ultrasonic signals according to output information the to be transmitted as two or more acoustic ultrasonic signals from two or more portable electronic device emitters of a portable electronic device as through one or more collections of ultrasonic transducers arranged to output one or more beams of acoustic ultrasonic signals

Fig. 67 o11 electronically modulating two or more acoustic ultrasonic signals according to output information to be transmitted as two or more acoustic ultrasonic signals from two or more portable electronic device emitters of a portable electronic device o1140 electronically modulating the two or more acoustic ultrasonic signals according to output information to be transmitted as two or more acoustic ultrasonic signals from two or more portable electronic device emitters of a portable electronic device including vectoring of two or more beams of acoustic ultrasonic signals o1141 electronically modulating the two or more acoustic ultrasonic signals according to output information to be transmitted as two or more acoustic ultrasonic signals from two or more portable electronic device emitters of a portable electronic device including one or more beams of acoustic ultrasonic signals configured to interact non-linearly with air to output desired acoustic audio signals o1142 electronically modulating the two or more acoustic ultrasonic signals according to output information to be transmitted as two or more acoustic ultrasonic signals from two or more portable electronic device emitters of a portable electronic device including one or more beams of acoustic ultrasonic signals outputted to interact with human tissue to down convert to one or more acoustic audio signals

Fig. 68 o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1201 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including steering one or more acoustic ultrasonic signals according to at least in part thermal imaging of one or more target listeners o1202 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including steering one or more acoustic ultrasonic signals according to at least in part visual imaging of one or more target listeners o1203 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more acoustic audio signals from of a second set of said two or more acoustic ultrasonic signals at a second location including steering one or more acoustic ultrasonic signals according to at least in part acoustic imaging of one or more target listeners

*Fig. 70* o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1207 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including embedding one or more digitally coded acoustic audio signals in one or more acoustic ultrasonic signals o1208 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting one or more acoustic ultrasonic signals for ranging one or more target listeners o1209 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting acoustic ultrasonic signal amplitude based on visual tracking of one or more target listeners

*Fig. 71*

o12

(Start)

electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1210 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting acoustic ultrasonic signal amplitude based on thermal tracking of one or more target listeners o1211 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting location of greatest intensity of down converted acoustic audio signals based on visual tracking of one or more target listeners o1212 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting location of greatest intensity of down converted acoustic audio signals based on thermal tracking of one or more target listeners (End)

Fig. 72 o12

Start → o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location o1213 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting acoustic ultrasonic signal amplitude based on two dimensional user interface user input o1214 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting acoustic ultrasonic signal target location based on two dimensional user interface user input o1215 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting based on audio microphone sensing of acoustic audio signals down converted at one or more target locations End

Fig. 73 o12

Start electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location o1216 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting based on ultrasonic microphone sensing of acoustic ultrasonic signals down converted at one or more target locations o1217 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting based on sensing of acoustic digital signals received from one or more target locations o1218 the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location including outputting acoustic ultrasonic signals to be down converted into acoustic anti-noise signals to at least in part cancel acoustic noise signals sensed at one or more target locations End

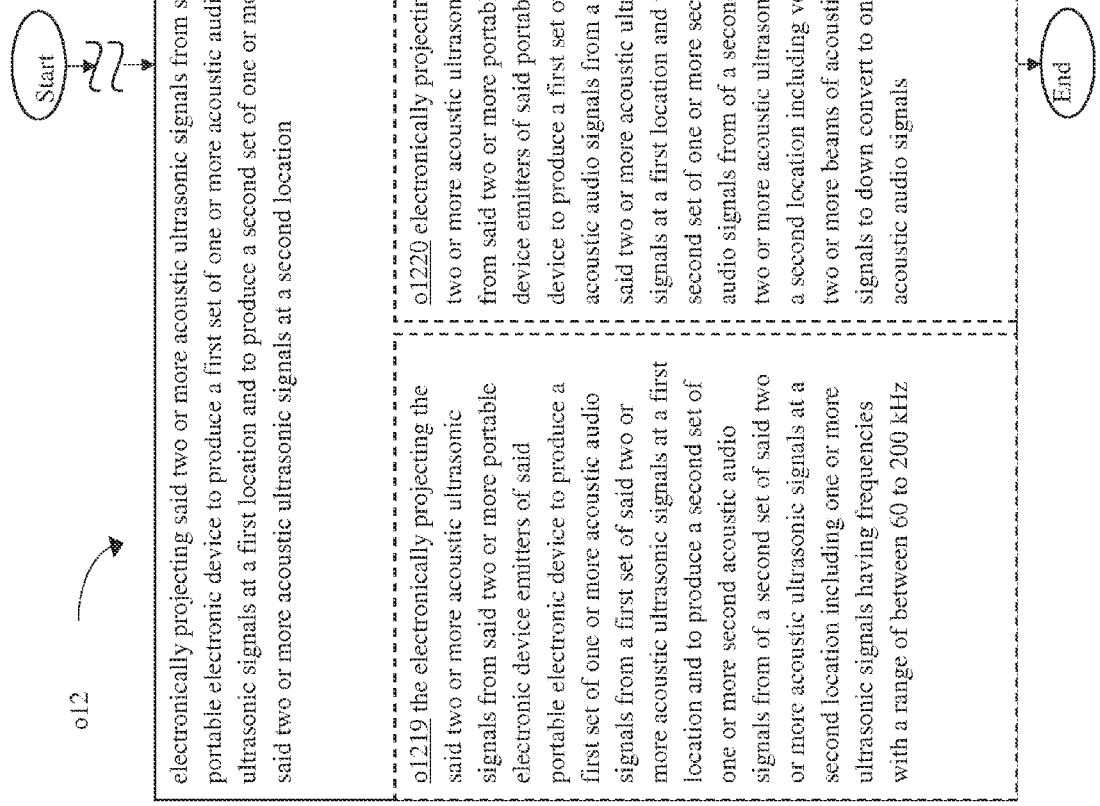

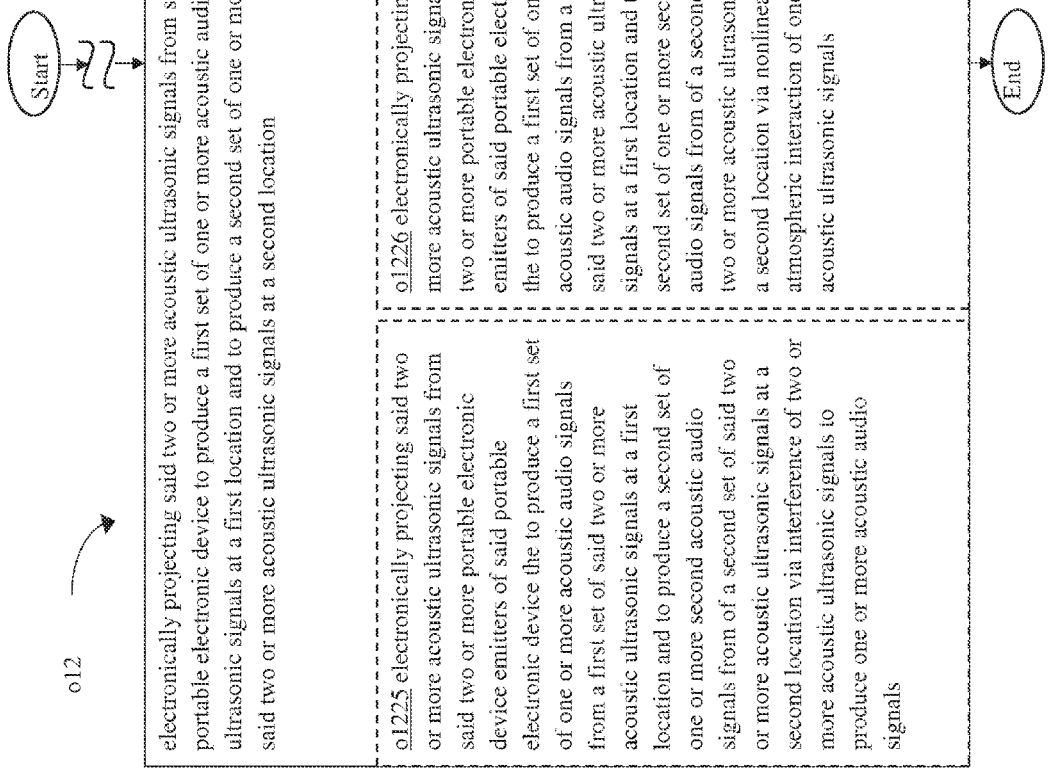

Fig. 77 o12

Start electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1228 electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear non-tissue solid interaction of one or more acoustic ultrasonic signals o1229 electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear personal ornament interaction of one or more acoustic ultrasonic signals o1230 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more audio signals tailored to frequency response information for one or more ears of a target human listener End

*Fig. 78* o12 → electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1231 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals containing one or more digitally coded identifiers o1232 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals tailored according to a sensed acoustic environment o1233 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals tailored according to feedback sensing by portable electronic device

Fig. 79 o12

Start electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1234 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more binaural acoustic audio signals o1235 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more stereophonic acoustic audio signals o1236 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more monophonic acoustic audio signals directed to a location of one ear of a target listener End

*Fig. 80* o12

Start electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location o1237 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals containing out-of-phase cancellation of background sound in a vicinity of a target listener o1238 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals containing phase-shifting of an original speech of a target listener in near real-time to the original speech being uttered o1239 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of said two or more acoustic ultrasonic signals at a second location including one or more acoustic audio signals being emitted at greater than 150 decibels

End

Fig. 81

8120 o1240 electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including audio output information designated to be transmitted to a first location of a first user without acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information containing an entire amount of said audio output information acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information that is psychologically influential

Fig. 82 o12

Start → 77 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1243 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information containing verbal oratory o1244 electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information containing one or more music selections o1245 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location away from a first listener and a second location toward a second listener End

Fig. 83 o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1246 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location in a vicinity of one or more ears of a target listener o1247 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location in a vicinity of a first individual o1248 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location near one or more first individuals but not a second location near one or more second

Fig. 84 o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1249 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location near a passive receiver such as an ear ring o1250 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location receiving said one or more acoustic ultrasonic signals from said portable electronic device being affixed to a moving member o1251 electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location identified through sensor data as being a vicinity of a target listener's head

Fig. 86 oi2 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location oi1255 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals the at a second location including being spaced less than three feet oi1256 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a tablet portable electronic device oi1257 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a handheld mobile portable electronic device

Fig. 87 o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1258 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a cell phone portable electronic device o1259 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a laptop computer portable electronic device o1260 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a personal data assistant (PDA) portable electronic device

Fig. 88 o12

Start electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1261 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a smart phone portable electronic device o1262 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a security personnel device portable electronic device o1263 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a sports equipment portable electronic device End

*Fig. 89* o12

Start → ⁓⁓ electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1264 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a wearable media portable electronic device o1265 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a wristwatch portable electronic device o1266 electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a two-way radio portable electronic device End

Fig. 90 o12

Start → electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1267 electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including determination of targeting area based in part on one or more frequencies of said one or more o1268 electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including transducer placement based in part on one or more frequencies to be used for said one or more acoustic ultrasonic signals o1269 electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including amplitude to be used for said ultrasonic acoustic signals based on size of desired target → End

Fig. 91 o12 electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location o1270 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially along vicinity of said portable electronic device o1271 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially in display screen of said portable electronic device o1272 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially in keyboard area of said portable electronic device

Fig. 92 o12

Start → 77 → electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from a second set of said two or more acoustic ultrasonic signals at a second location o1273 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducers having dimensional sizing of less than 10 millimeters o1274 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducers having dimensional sizing of less than 30 wavelengths of the lowest frequency of said one or more acoustic ultrasonic o1275 electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement in body of said portable electronic device End

PORTABLE ELECTRONIC DEVICE DIRECTED AUDIO TARGETED MULTIPLE USER SYSTEM AND METHOD

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation-in-part of U.S. patent application Ser. No. 13/844,525, entitled PORTABLE ELECTRONIC DEVICE DIRECTED AUDIO SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/844,615, entitled PORTABLE ELECTRONIC DEVICE DIRECTED AUDIO TARGETED USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/844,732, entitled PORTABLE ELECTRONIC DEVICE DIRECTED AUDIO EMITTER ARRANGEMENT SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation of U.S. patent application Ser. No. 13/844,678, entitled PORTABLE ELECTRONIC DEVICE DIRECTED AUDIO TARGETED MULTI-USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 15 Mar. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,280, entitled PORTABLE ELECTRONIC DEVICE DIRECTED AUDIO SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,296, entitled PORTABLE ELECTRONIC DEVICE DIRECTED AUDIO TARGETED USER SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/920,312, entitled PORTABLE ELECTRONIC DEVICE DIRECTED AUDIO EMITTER ARRANGEMENT SYSTEM AND METHOD, naming Michael H. Baym, William David Duncan, Roderick A. Hyde, Edward K. Y. Jung, Richard T. Lord, Robert W. Lord, Nathan P. Myhrvold and Lowell L. Wood, Jr. as inventors, filed 18 Jun. 2013, which is currently co-pending or is an application of which a currently co-pending application is entitled to the benefit of the filing date.

Under the auspices of various alleged "rules" implementing the America Invents Act (AIA), the United States Patent and Trademark Office (USPTO) is purporting to require that an Attorney for a Client make various legal and/or factual statements/commentaries/admissions (e.g. Concerning any "Statement under 37 CFR 1.55 or 1.78 for AIA (First Inventor to File) Transition Application") related to written description/new matter, and/or advise his Client to make such legal and/or factual statements/commentaries/admissions. Attorney expressly points out that the burden of both alleging that an application contains new matter with respect to its parent(s) and establishing a prima facie case of lack of written description under 35 U.S.C. § 112, first paragraph lies firmly on the USPTO. Accordingly, and expressly in view of duties owed his client, Attorney further points out that the AIA legislation, while referencing the first to file, does not appear to constitute enabling legislation that would empower the USPTO to compel an Attorney to either make/advise such legal and/or factual statements/commentaries/admissions. Notwithstanding the foregoing, Attorney/Applicant understand that the USPTO's computer programs/personnel have certain data entry requirements, and hence Attorney/Applicant have provided a designation(s) of a relationship between the present application and its parent application(s) as set forth herein and in any ADS filed in this application, but expressly points out that such designation(s) is not to be construed in any way as any type of commentary and/or admission as to whether or not a claim in the present application is supported by a parent application, or whether or not the present application contains any new matter in addition to the matter of its parent application(s) in general and/or especially as such might relate to an effective filing date before, on, or after 16 Mar. 2013.

The fact that the Attorney/Applicant may have made certain statements in view of practical data entry requirements of the USPTO should NOT be taken as an admission of any sort. Attorney/Applicant hereby reserves any and all rights to contest/contradict/confirm such statements at a later time. Furthermore, no waiver (legal, factual, or otherwise), implicit or explicit, is hereby intended (e.g., with respect to any statements/admissions made by the Attorney/Applicant in response to the purported requirements of the USPTO related to the relationship between the present application and parent application[s], and/or regarding new matter or alleged new matter relative to the parent application[s]). For example, although not expressly stated and possibly despite a designation of the present application as a continuation-in-part of a parent application, Attorney/Applicant may later assert that the present application or one or more of its claims do not contain any new matter in addition to the matter of its parent application[s], or vice versa.

SUMMARY

In one aspect, a computationally-implemented method includes, but is not limited to electronically modulating two or more acoustic ultrasonic signals according to output information to be transmitted as two or more acoustic ultrasonic signals from two or more portable electronic device emitters of a portable electronic device; and electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other method aspects are described in the claims, drawings, and text forming a part of the disclosure set forth herein.

In one or more various aspects, related machines, compositions of matter, or manufactures of systems may include, but are not limited to, circuitry and/or programming for effecting the herein-referenced method aspects; the circuitry and/or programming can be virtually any combination of hardware, software, and/or firmware configured to effect the herein-referenced method aspects depending upon the design choices of the system designer (limited to patentable subject matter under 35 USC 101).

A computationally-implemented system includes, but is not limited to: means for electronically modulating two or more acoustic ultrasonic signals according to output information to be transmitted as two or more acoustic ultrasonic signals from two or more portable electronic device emitters of a portable electronic device; and means for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other system aspects are described in the claims, drawings, and text forming a part of the disclosure set forth herein.

A computationally-implemented system includes, but is not limited to a electronically modulating electrical circuitry arrangement for electronically modulating two or more acoustic ultrasonic signals according to output information to be transmitted as two or more acoustic ultrasonic signals from two or more portable electronic device emitters of a portable electronic device; and an electronically projecting electrical circuitry arrangement for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other system aspects are described in the claims, drawings, and text forming a part of the disclosure set forth herein.

A system includes, but is not limited to a electronically modulating module configured to operate in accordance with electronically modulating two or more acoustic ultrasonic signals according to output information to be transmitted as two or more acoustic ultrasonic signals from two or more portable electronic device emitters of a portable electronic device; and an electronically projecting module configured to operate in accordance with electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other system aspects are described in the claims, drawings, and text forming a part of the disclosure set forth herein.

An article of manufacture including one or more non-transitory signal-bearing storage medium bearing one or more instructions for electronically modulating two or more acoustic ultrasonic signals according to output information to be transmitted as two or more acoustic ultrasonic signals from two or more portable electronic device emitters of a portable electronic device; and one or more instructions for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other computer program product aspects are described in the claims, drawings, and text forming a part of the disclosure set forth herein.

A system including one or more computing devices; and one or more instructions when executed on the one or more computing devices cause the one or more computing devices to perform electronically modulating two or more acoustic ultrasonic signals according to output information to be transmitted as two or more acoustic ultrasonic signals from two or more portable electronic device emitters of a portable electronic device; and electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. In addition to the foregoing, other computer program product aspects are described in the claims, drawings, and text forming a part of the disclosure set forth herein.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise.

With reference now to the figures, shown are one or more examples of portable electronic device directed audio that may provide context, for instance, in introducing one or more processes and/or devices described herein.

FIGS. 19-24 depict various schematic representations of down conversion of one or more acoustic ultrasonic signals into acoustic audio signals.

FIG. 26 is a block diagram depicting a control and information processing subsystem s100 of an exemplary implementation of the portable electronic device directed audio 10 of FIG. 1.

FIG. 27 is a block diagram depicting an information storage subsystem s200 of an exemplary implementation of the portable electronic device directed audio 10 of FIG. 1.

FIG. 31 is a block diagram depicting a power subsystem s600 of an exemplary implementation of the portable electronic device directed audio 10 of FIG. 1.

FIG. 32 is a block diagram depicting one or more exemplary electrical circuitry arrangements of the portable electronic device directed audio 10 of FIG. 1.

FIG. 33 is a block diagram depicting one or more exemplary electrical circuitry arrangements of the portable electronic device directed audio 10 of FIG. 1.

FIG. 35 is a block diagram depicting one or more exemplary electrical circuitry arrangements of the portable electronic device directed audio 10 of FIG. 1.

FIG. 36 is a block diagram depicting one or more exemplary electrical circuitry arrangements of the portable electronic device directed audio 10 of FIG. 1.

FIG. 37 is a block diagram depicting one or more exemplary electrical circuitry arrangements of the portable electronic device directed audio 10 of FIG. 1.

FIG. 38 is a block diagram depicting one or more exemplary electrical circuitry arrangements of the portable electronic device directed audio 10 of FIG. 1.

FIG. 43 is a block diagram depicting one or more exemplary instructions of the information storage subsystem s200 of the portable electronic device directed audio 10 of FIG. 1.

FIG. 44 is a block diagram depicting one or more exemplary instructions of the information storage subsystem s200 of the portable electronic device directed audio 10 of FIG. 1.

FIG. 45 is a block diagram depicting one or more exemplary instructions of the information storage subsystem s200 of the portable electronic device directed audio 10 of FIG. 1.

FIG. 50 is a block diagram depicting one or more exemplary modules of the portable electronic device directed audio 10 of FIG. 1.

FIG. 51 is a block diagram depicting one or more exemplary modules of the portable electronic device directed audio 10 of FIG. 1.

FIG. 52 is a block diagram depicting one or more exemplary modules of the portable electronic device directed audio 10 of FIG. 1.

FIG. 60 is a high-level flowchart including exemplary implementations of operation o11 of FIG. 53.

FIG. 63 is a high-level flowchart including exemplary implementations of operation o11 of FIG. 53.

FIG. 67 is a high-level flowchart including exemplary implementations of operation o11 of FIG. 53.

FIG. 68 is a high-level flowchart including exemplary implementations of operation o12 of FIG. 53.

FIG. 70 is a high-level flowchart including exemplary implementations of operation o12 of FIG. 53.

FIG. 71 is a high-level flowchart including exemplary implementations of operation o12 of FIG. 53.

FIG. 72 is a high-level flowchart including exemplary implementations of operation o12 of FIG. 53.

FIG. 73 is a high-level flowchart including exemplary implementations of operation o12 of FIG. 53.

FIG. 74 is a high-level flowchart including exemplary implementations of operation o12 of FIG. 53.

FIG. 75 is a high-level flowchart including exemplary implementations of operation o12 of FIG. 53.

FIG. 76 is a high-level flowchart including exemplary implementations of operation o12 of FIG. 53.

FIG. 77 is a high-level flowchart including exemplary implementations of operation o12 of FIG. 53.

FIG. 78 is a high-level flowchart including exemplary implementations of operation o12 of FIG. 53.

FIG. 79 is a high-level flowchart including exemplary implementations of operation o12 of FIG. 53.

FIG. 80 is a high-level flowchart including exemplary implementations of operation o12 of FIG. 53.

FIG. 81 is a high-level flowchart including exemplary implementations of operation o12 of FIG. 53.

FIG. 82 is a high-level flowchart including exemplary implementations of operation o12 of FIG. 53.

FIG. 83 is a high-level flowchart including exemplary implementations of operation o12 of FIG. 53.

FIG. 84 is a high-level flowchart including exemplary implementations of operation o12 of FIG. 53.

FIG. 86 is a high-level flowchart including exemplary implementations of operation o12 of FIG. 53.

FIG. 87 is a high-level flowchart including exemplary implementations of operation o12 of FIG. 53.

FIG. 88 is a high-level flowchart including exemplary implementations of operation o12 of FIG. 53.

FIG. 89 is a high-level flowchart including exemplary implementations of operation o12 of FIG. 53.

FIG. 90 is a high-level flowchart including exemplary implementations of operation o12 of FIG. 53.

FIG. 91 is a high-level flowchart including exemplary implementations of operation o12 of FIG. 53.

FIG. 92 is a high-level flowchart including exemplary implementations of operation o12 of FIG. 53.

DETAILED DESCRIPTION

Figure 1:
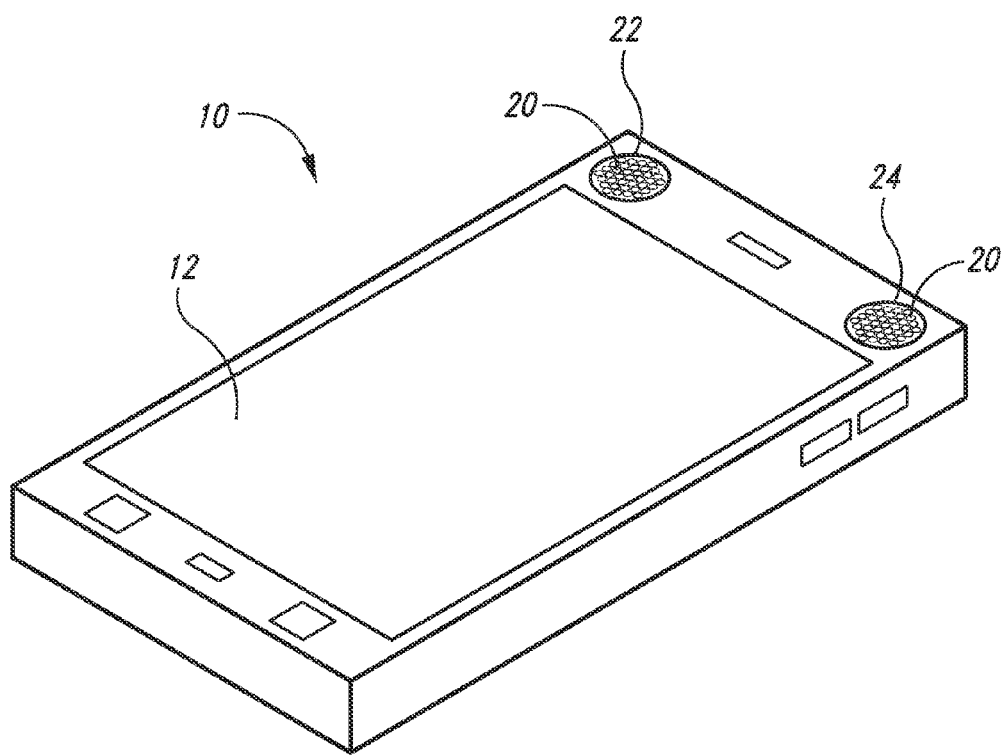
FIG. 1 is a perspective view depicting a smart phone implementation as related with a portable electronic device directed audio.
Figure 2:
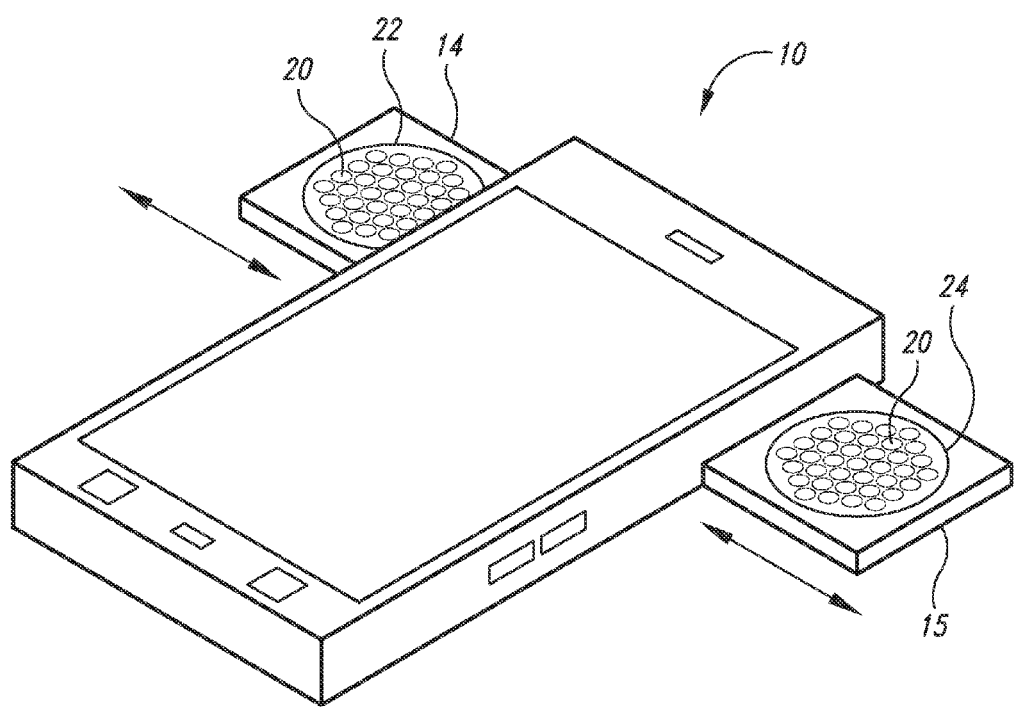
FIG. 2 is a perspective view depicting a smart phone implementation as related with a portable electronic device directed audio.
Figure 3:
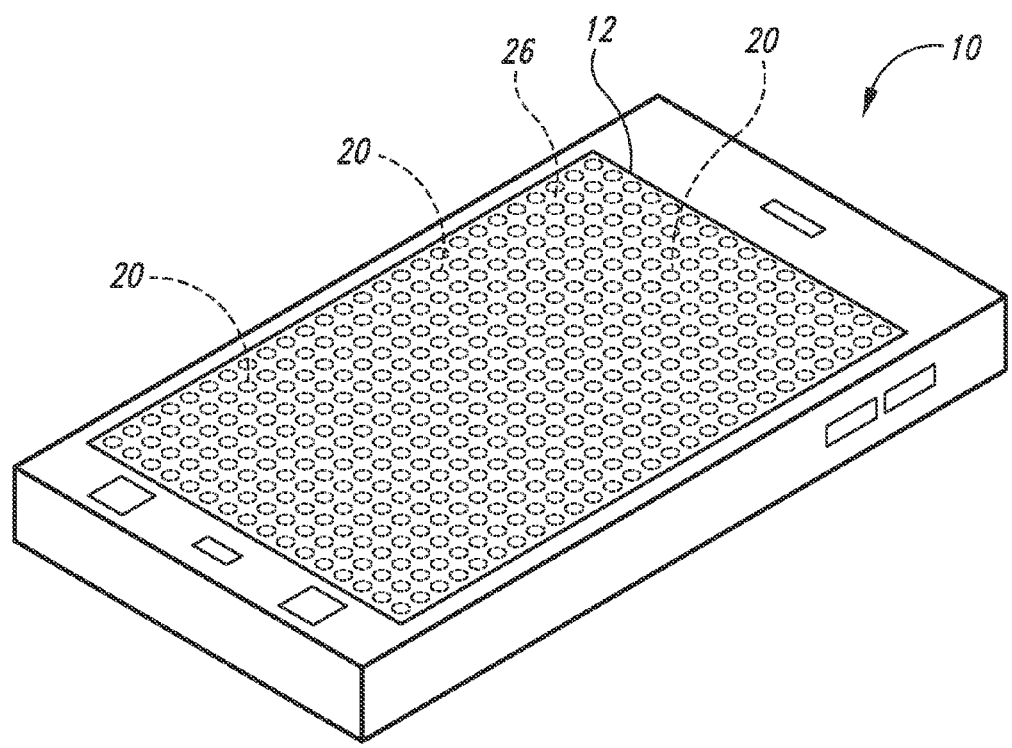
FIG. 3 is a perspective view depicting a smart phone implementation as related with a portable electronic device directed audio.
Figure 4:
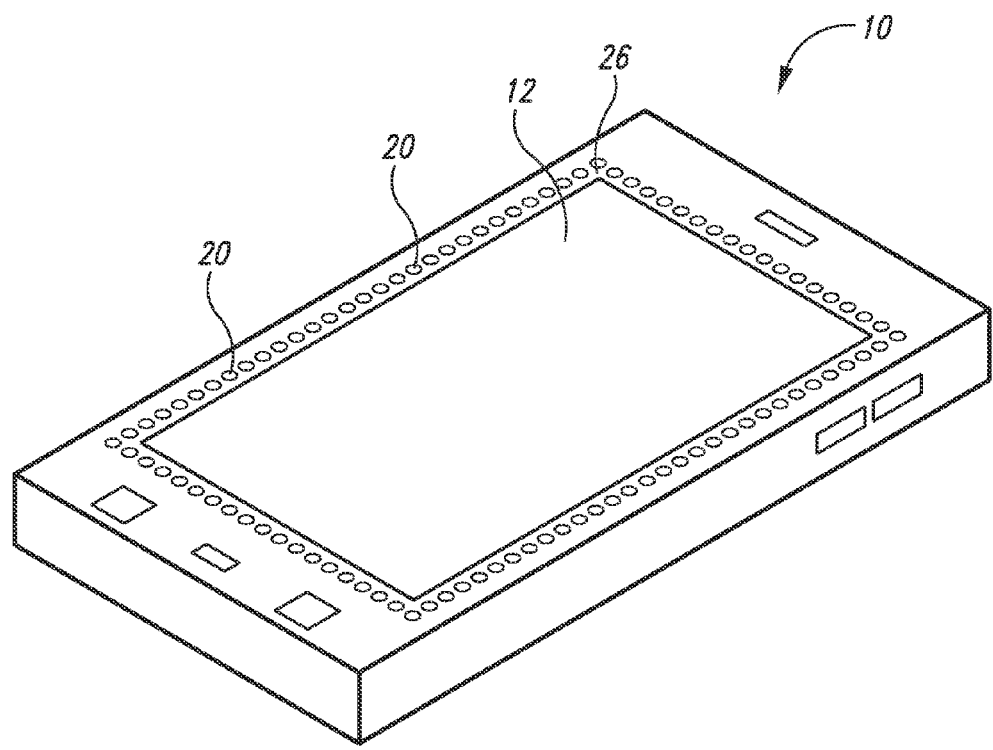
FIG. 4 is a perspective view depicting a smart phone implementation as related with a portable electronic device directed audio.
Figure 5:
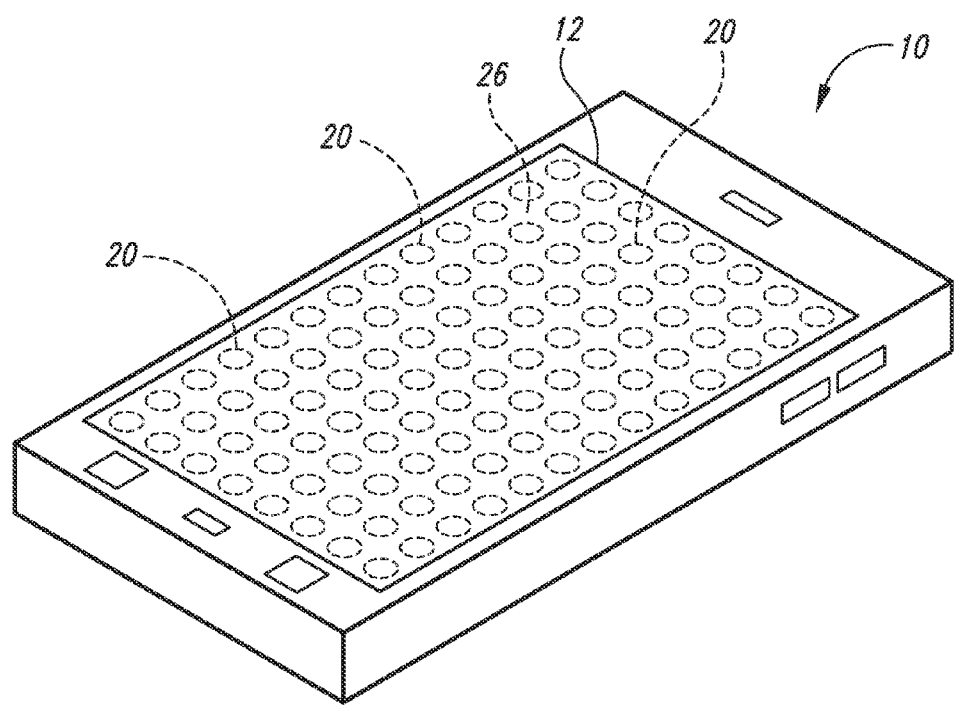
FIG. 5 is a perspective view depicting a smart phone implementation as related with a portable electronic device directed audio.
Figure 6:
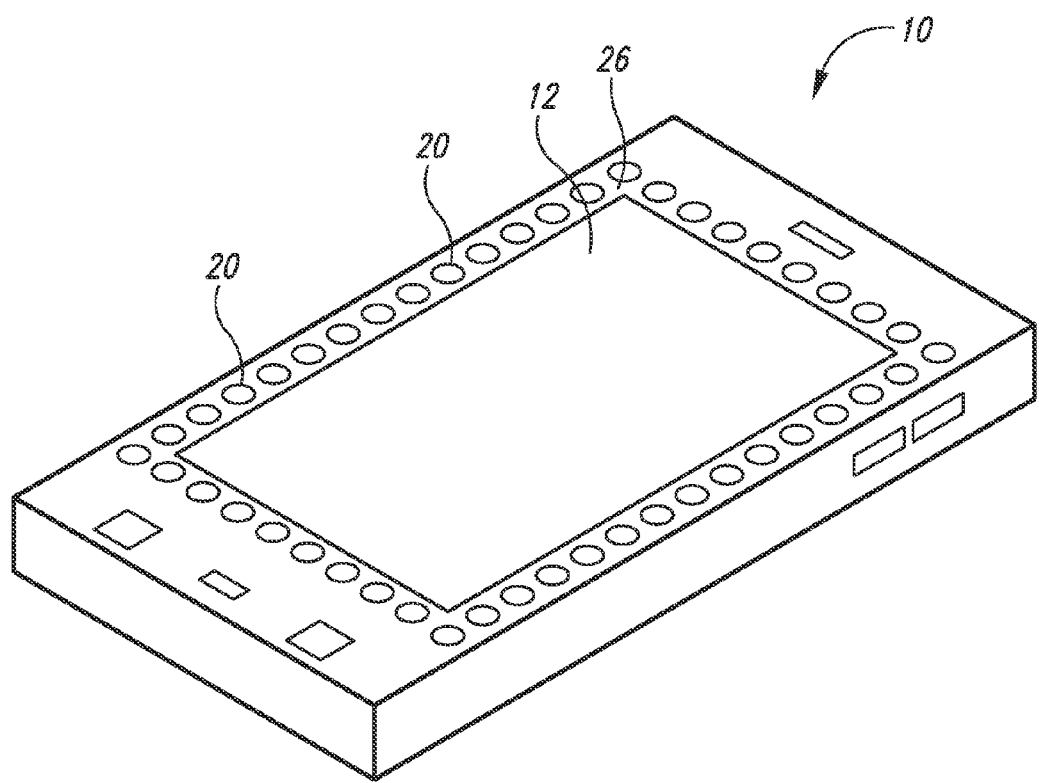
FIG. 6 is a perspective view depicting a smart phone implementation as related with a portable electronic device directed audio.
Figure 7:
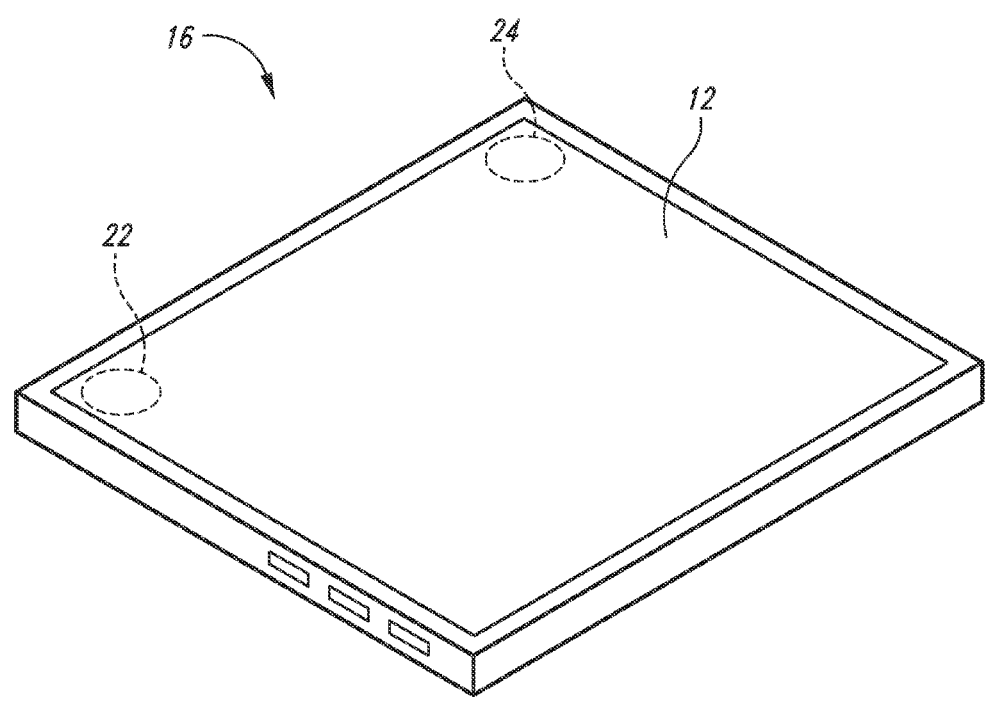
FIG. 7 is a perspective view depicting a tablet computer implementation as related with a portable electronic device directed audio.
Figure 8:
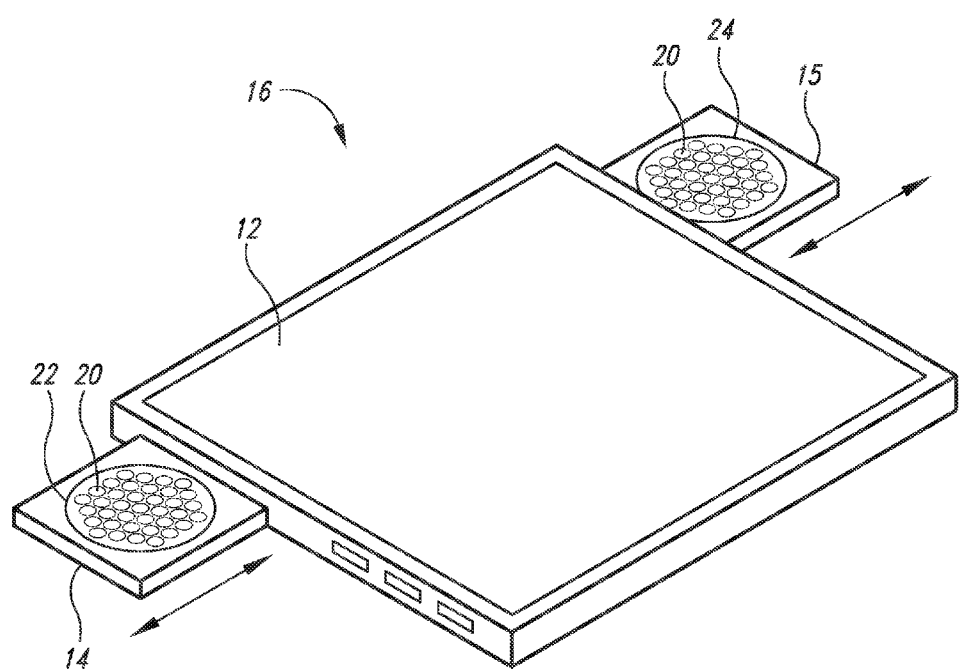
FIG. 8 is a perspective view depicting a tablet computer implementation as related with a portable electronic device directed audio.
Figure 9:
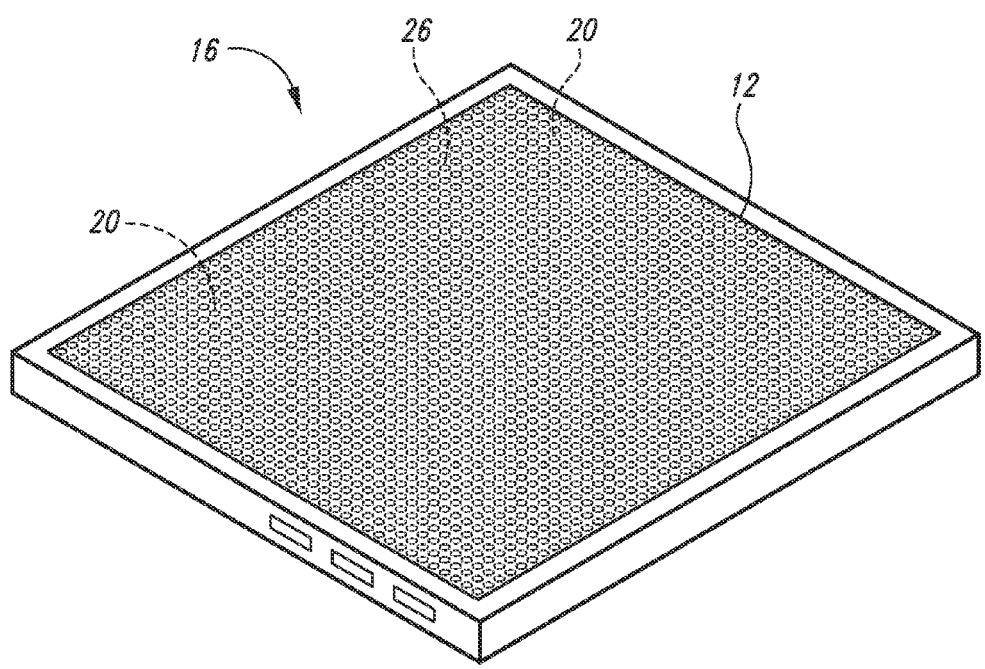
FIG. 9 is a perspective view depicting a tablet computer implementation as related with a portable electronic device directed audio.
Figure 10:
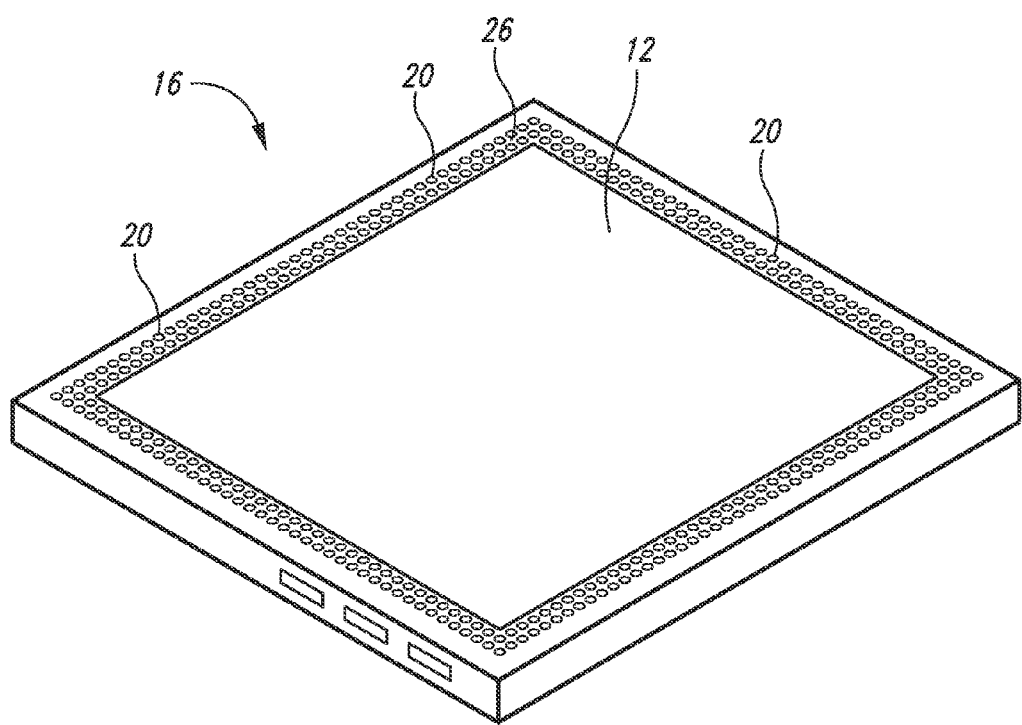
FIG. 10 is a perspective view depicting a tablet computer implementation as related with a portable electronic device directed audio.
Figure 11:
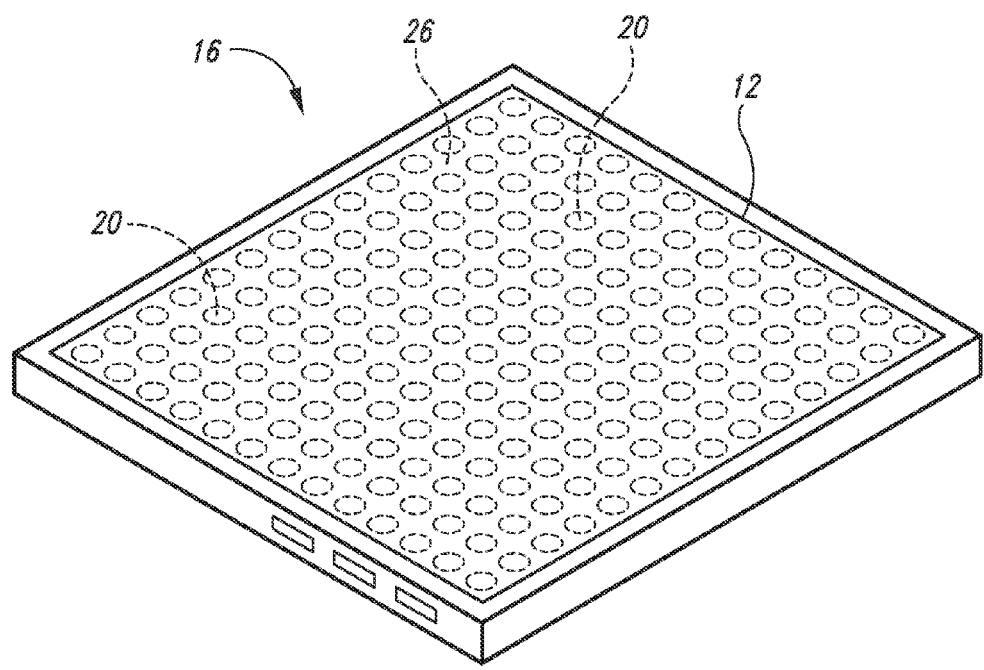
FIG. 11 is a perspective view depicting a tablet computer implementation as related with a portable electronic device directed audio.
Figure 12:
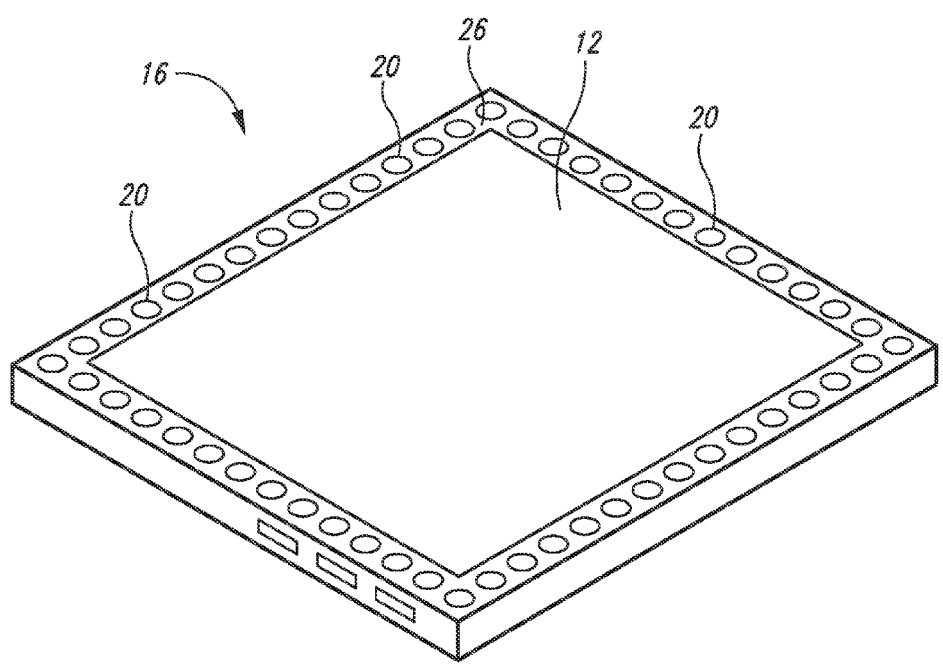
FIG. 12 is a perspective view depicting a tablet computer implementation as related with a portable electronic device directed audio.
Figure 13:
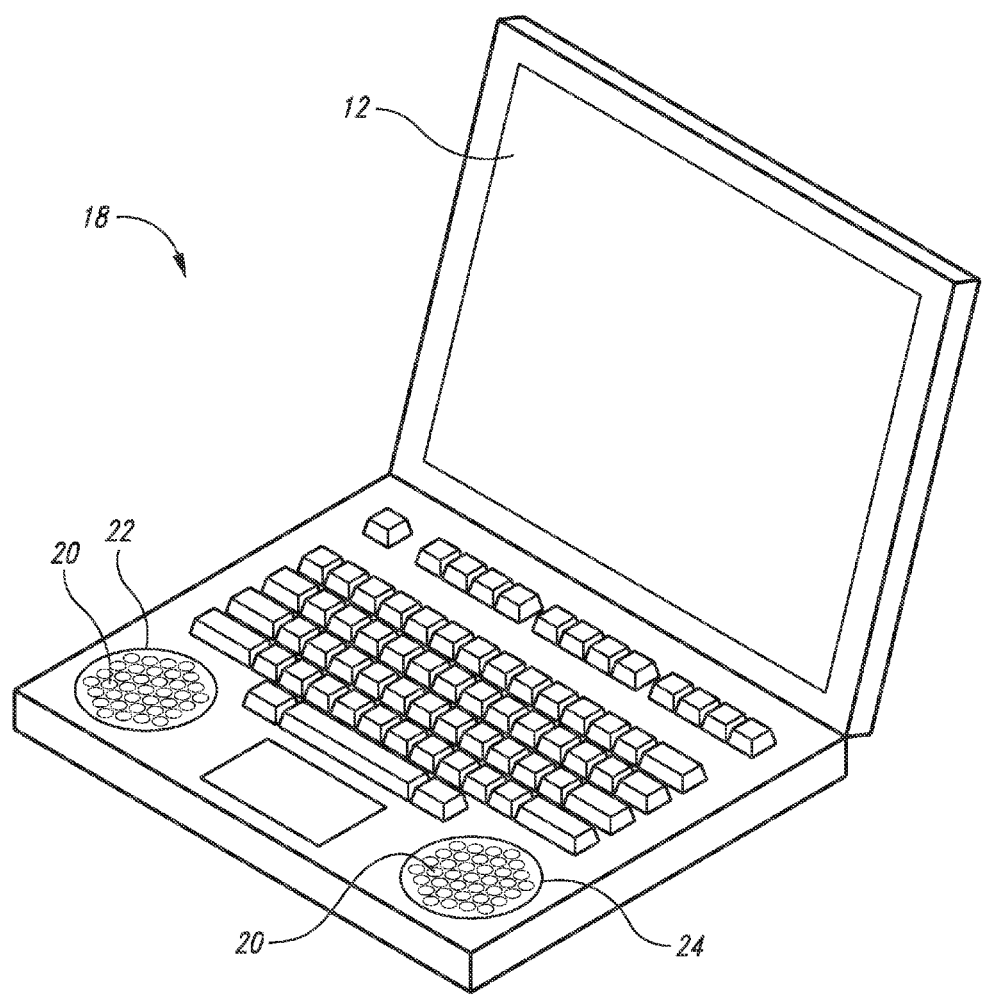
FIG. 13 is a perspective view depicting a laptop computer implementation as related with a portable electronic device directed audio.
Figure 14:
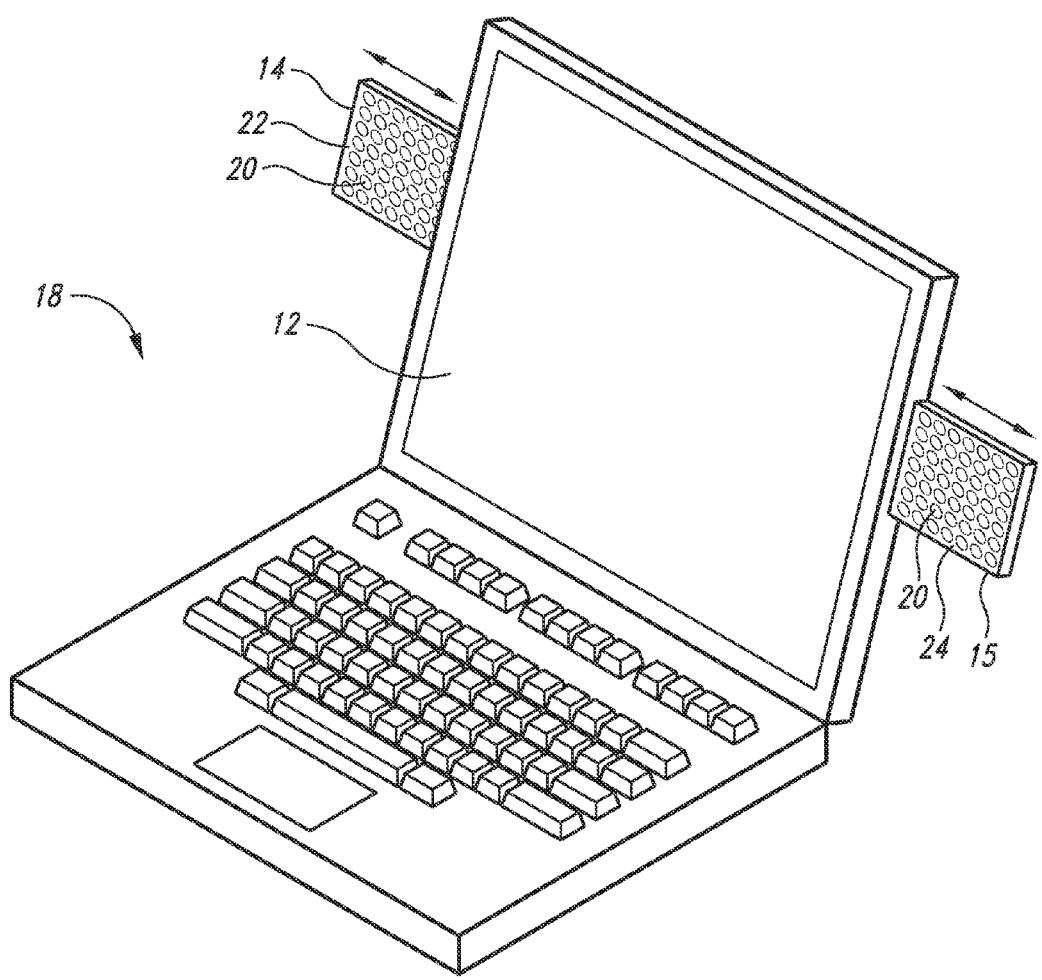
FIG. 14 is a perspective view depicting a laptop computer implementation as related with a portable electronic device directed audio.
Figure 15:
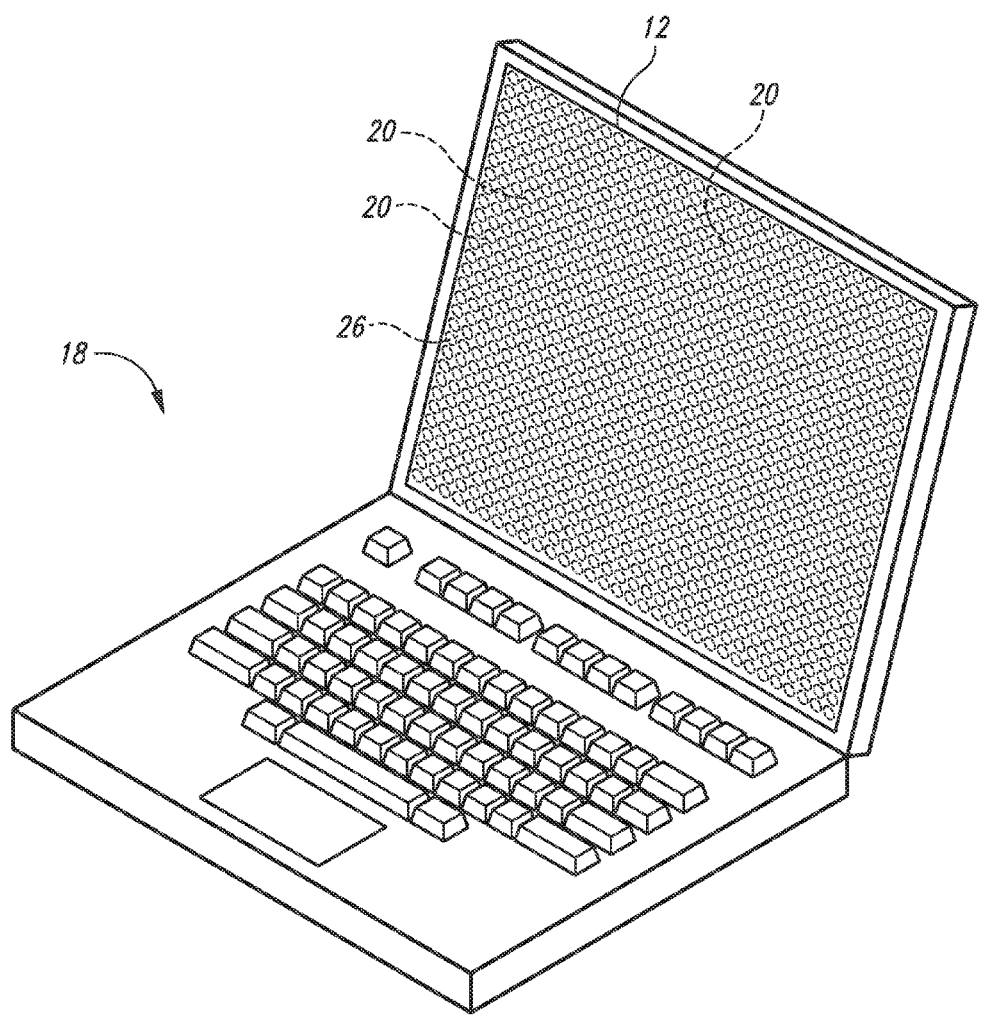
FIG. 15 is a perspective view depicting a laptop computer implementation as related with a portable electronic device directed audio.
Figure 16:
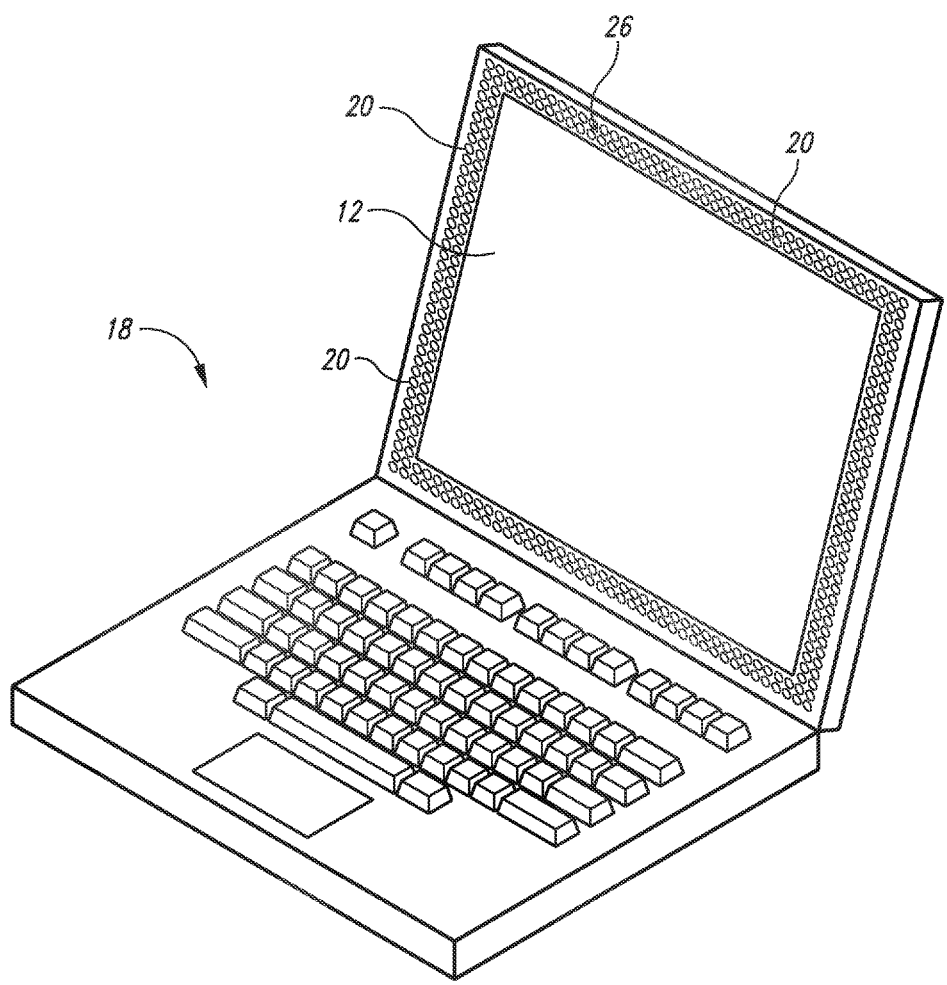
FIG. 16 is a perspective view depicting a laptop computer implementation as related with a portable electronic device directed audio.
Figure 17:
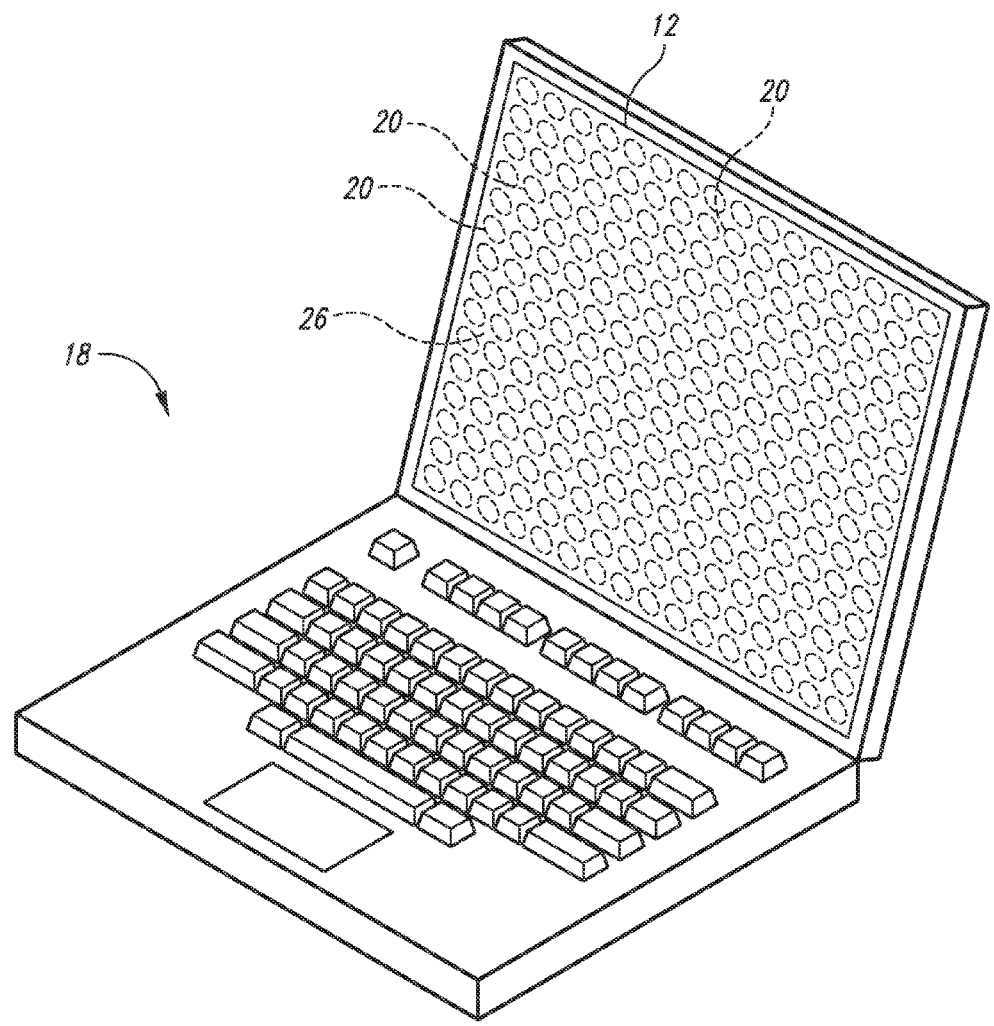
FIG. 17 is a perspective view depicting a laptop computer implementation as related with a portable electronic device directed audio.
Figure 18:
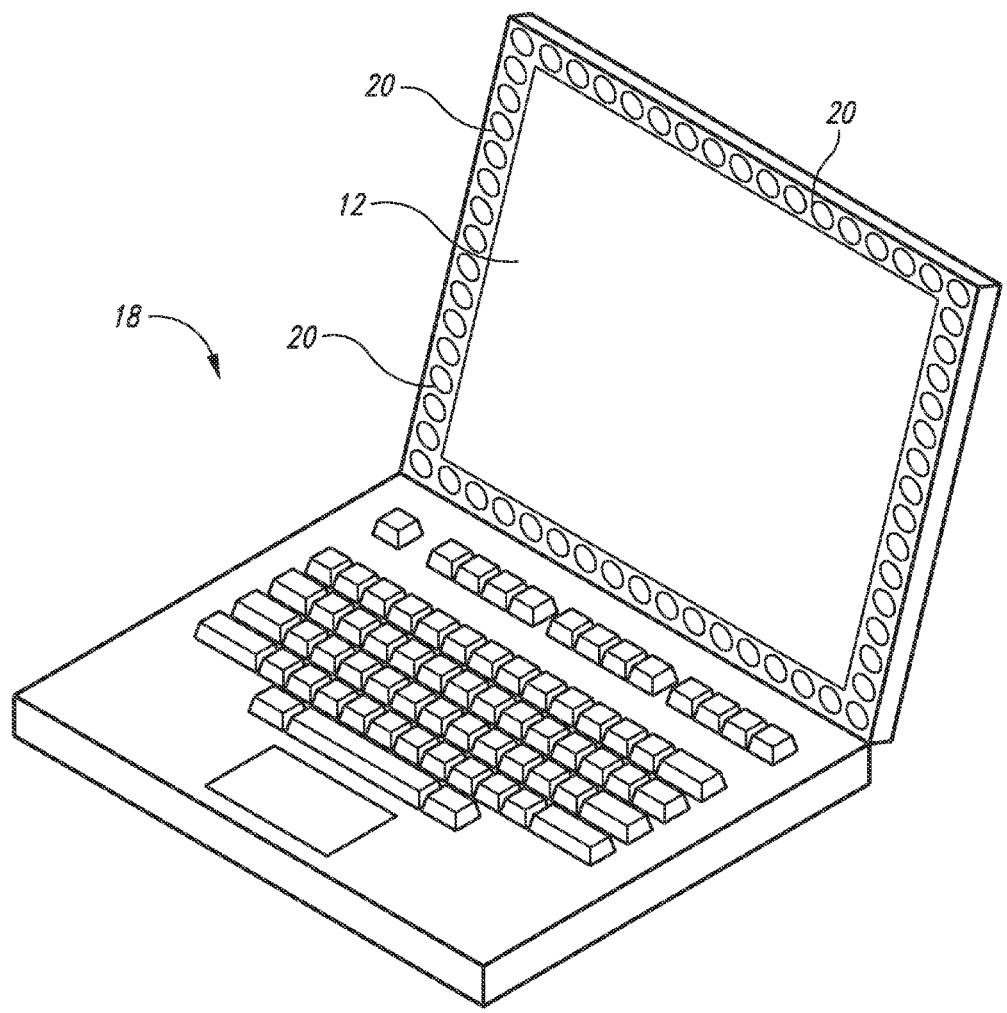
FIG. 18 is a perspective view depicting a laptop computer implementation as related with a portable electronic device directed audio.
Figure 19:
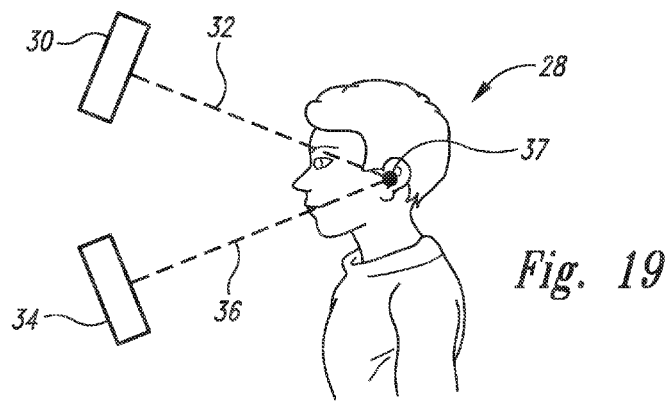
Figure 20:
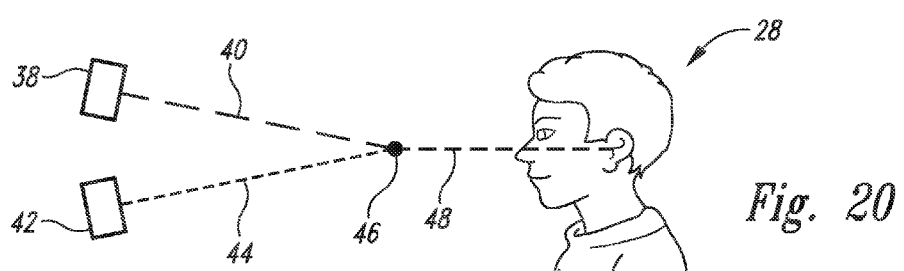
Figure 21:
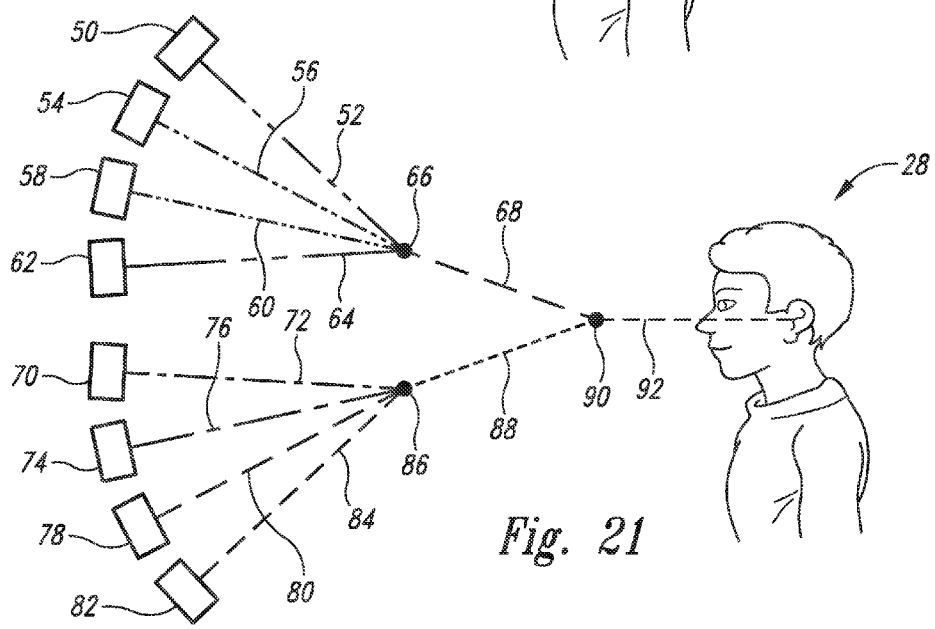
Figure 22:
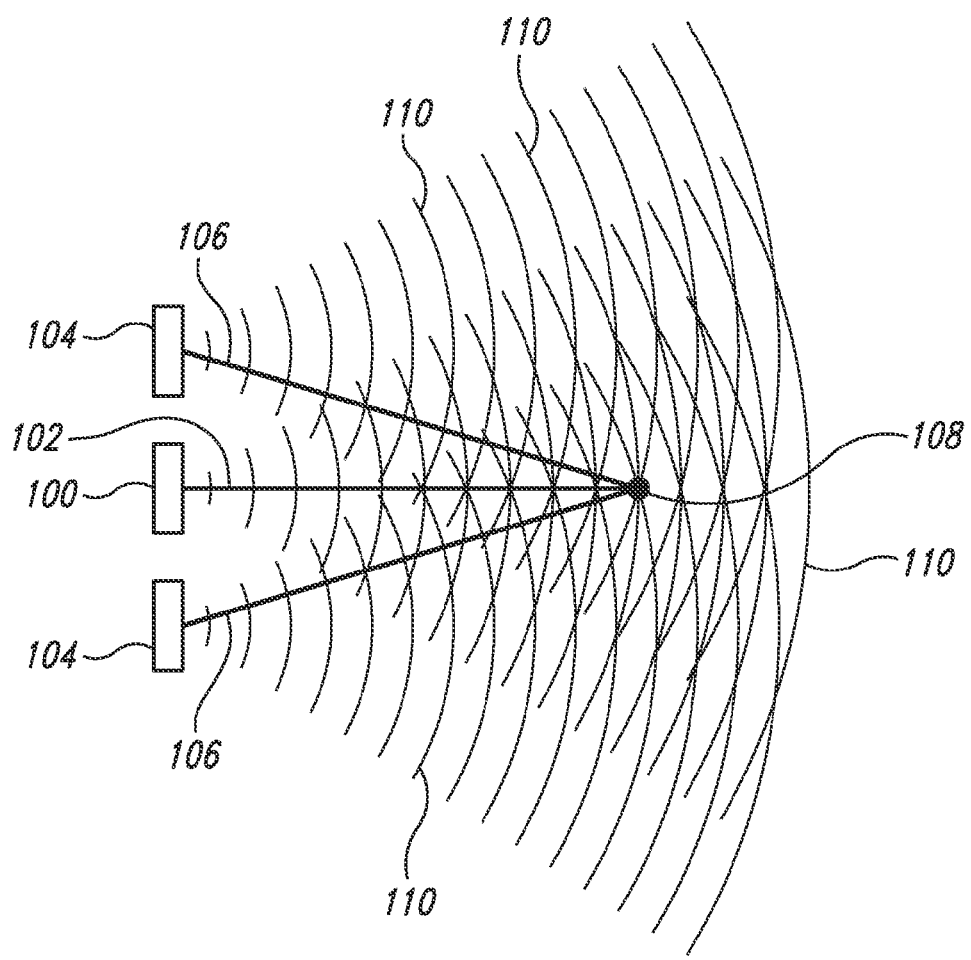

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The present application may use formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

With reference now to the Figures, FIGS. 1-24 depict environment(s) and/or an implementation(s) of technologies described herein. FIGS. 1-5 are perspective views depicting mobile device implementations 10, such as smart phone implementations, as related with a portable electronic device directed audio including display screens 12, arrays or other collections 22, 24, 26 of emitters 20 such as ultrasonic transducers. Various configurations are depicted for ultrasonic transducers or other emitters, including slide trays 14 and 15, such as configured in arrays to transmit acoustic ultrasonic signals modulated with one or more acoustic audio signals. Other depictions include locating the emitters 20 either integral with or around the periphery of the display screen 12. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

FIGS. 7-12 are perspective views depicting tablet computer implementations as related with a portable electronic device directed audio including various configurations for ultrasonic transducers or other emitters such as configured in arrays to transmit acoustic ultrasonic signals modulated with one or more acoustic audio signals. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

FIGS. 13-18 are perspective views depicting laptop computer implementations as related with a portable electronic device directed audio including various configurations for ultrasonic transducers or other emitters such as configured in arrays to transmit acoustic ultrasonic signals modulated with one or more acoustic audio signals. The acoustic audio signals can interact non-linearly with atmosphere, solid objects such as human tissue, or with each other to cause down conversion of part of the ultrasonic signals into acoustic audio signals directed at one or more desired locations such as near one or more target human ears.

Various approaches can be used in sizing emitter collections such as transducer arrays. For instance, approaches can consider an effective transducer size related to wavelengths of associated ultrasonic signals being emitted. Given an aperture area of emitters considered as antenna a dimension related to squaring of a wavelength involved would be related to a percentage of power contained by a beam being emitted. For instance, a given percentage of aperture area would have an equivalent percentage of original power being transmitted through an ultrasonic beam. For example, if a tablet was approximately forty square inches in aperture area with a perimeter of 25 linear inches a 60 GHz signal would have about a 0.2 inch wavelength with 25×0.2 square inches of effective aperture area. With transducers located along such a perimeter there could be about roughly a 10% transmission factor involved with an ultrasonic beam being emitted. In attempts to confine a beam, wavelength divided by aperture dimension could serve as a guide. For instance, 0.2 inches divided by 5 square inches could result in an approximate radius at a two foot range of approximately one or a few tenths of an inch. Such directionality of sound transmission could serve to isolate listener to only desired target listeners to down conversions into acoustic audio signals occurring at or near such listeners. For instance, FIGS. 19-24 depicted in schematic conceptual representations of various ultrasonic signals interacting with atmosphere, each other, or objects such as a target listener to produce a down-conversion of acoustic audio signals to be heard by one or more target listeners.

Figure 25:
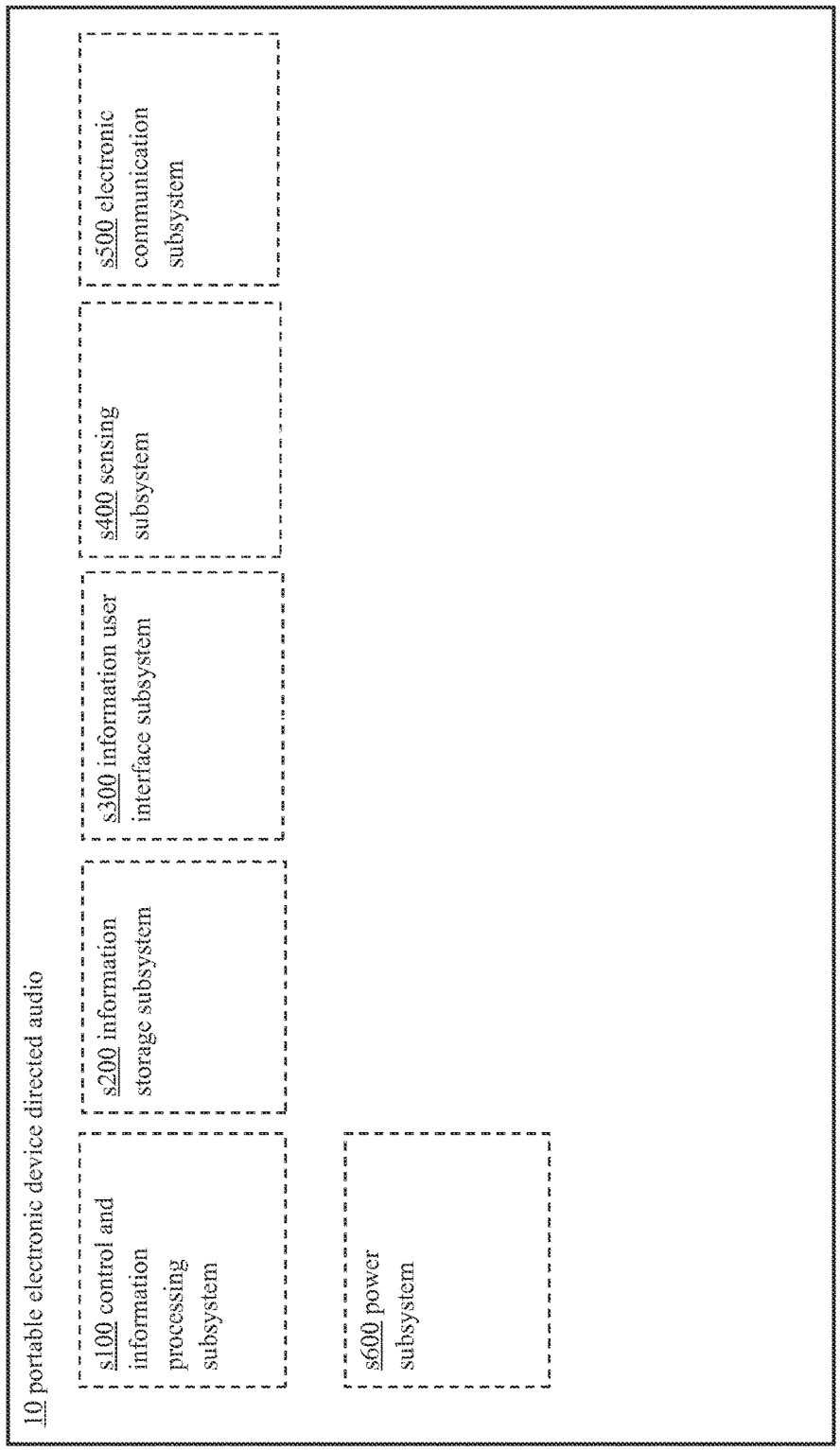
FIG. 25 is a block diagram depicting an exemplary implementation of the portable electronic device directed audio 10 of FIG. 1 including exemplary subsystems.

An exemplary version of the portable electronic device directed audio 10 is shown in FIG. 25 to optionally include various subsystems such as control and information processing subsystem s100, information storage subsystem s200, information user interface subsystem s300, sensing subsystem s400, electronic communication subsystem s500, and power subsystem s600.

An exemplary implementation of the control and information processing subsystem s100 is shown in FIG. 26 to optionally include various components such as microprocessor component s102, central processing unit (CPU) component s104, digital signal processor (DSP) component s106, application specific integrated circuit (ASIC) component s108, field programmable gate array (FPGA) component s110, multiprocessor component s112, optical processing component s114, logic component s116, remote processor component s118, multi-core array component s120, server processor component s122, database engine component s124, search engine component s126, image recognition component s128, audio recognition component s130, spectrum analysis component s132, lexigraphy engine component s134, operating system component s136, voice recognition component s138, and network processor component s140.

An exemplary implementation of the information storage subsystem s200 is shown in FIG. 27 to optionally include various components such as random access memory (RAM) component s202, dynamic random access memory (DRAM) component s204, other volatile memory component s206, persistent memory component s208, read only memory (ROM) component s210, electrically erasable programmable read only memory (EEPROM) component s212, compact disk (CD) component s214, digital versatile disk (DVD) component s216, flash memory component s218, other nonvolatile memory component s220, hard drive component s222, disk farm component s224, disk cluster component s226, remote backup component s228, server component s230, digital tape component s232, optical storage component s234, Blu Ray disk component s236, computer readable signal bearing medium s238, and removable media component s240.

Figure 28:
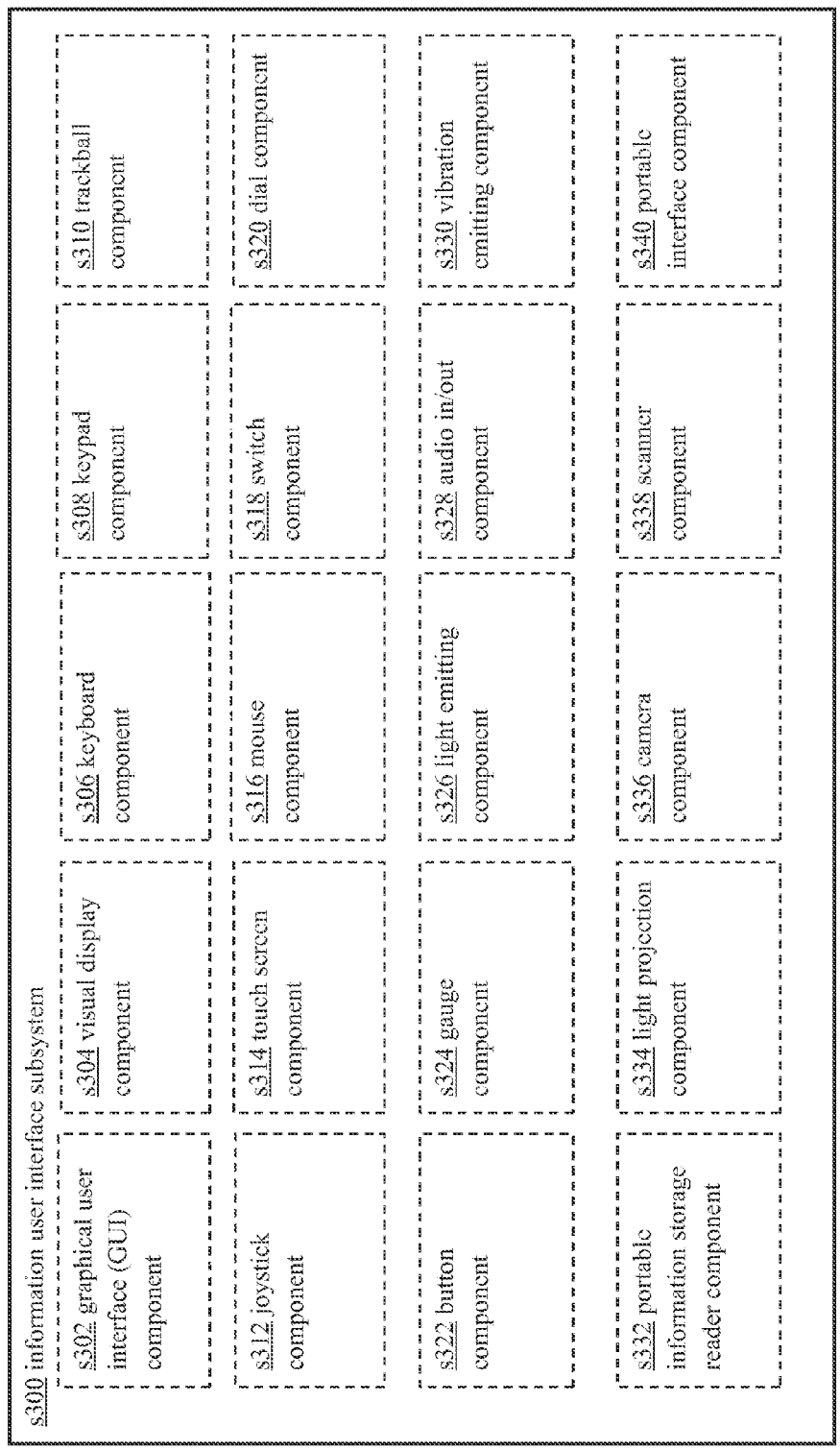
FIG. 28 is a block diagram depicting an information user interface subsystem s300 of an exemplary implementation of the portable electronic device directed audio 10 of FIG. 1.

An exemplary implementation of the information user interface subsystem s300 is shown in FIG. 28 to optionally include various components such as graphical user interface (GUI) component s302, visual display component s304, keyboard component s306, keypad component s308, trackball component s310, joystick component s312, touch screen component s314, mouse component s316, switch component s318, dial component s320, button component s322, gauge component s324, light emitting component s326, audio in/out component s328, vibration emitting component s330, portable information storage reader component s332, light projection component s334, camera component s336, scanner component s338, and portable interface component s340.

Figure 29:
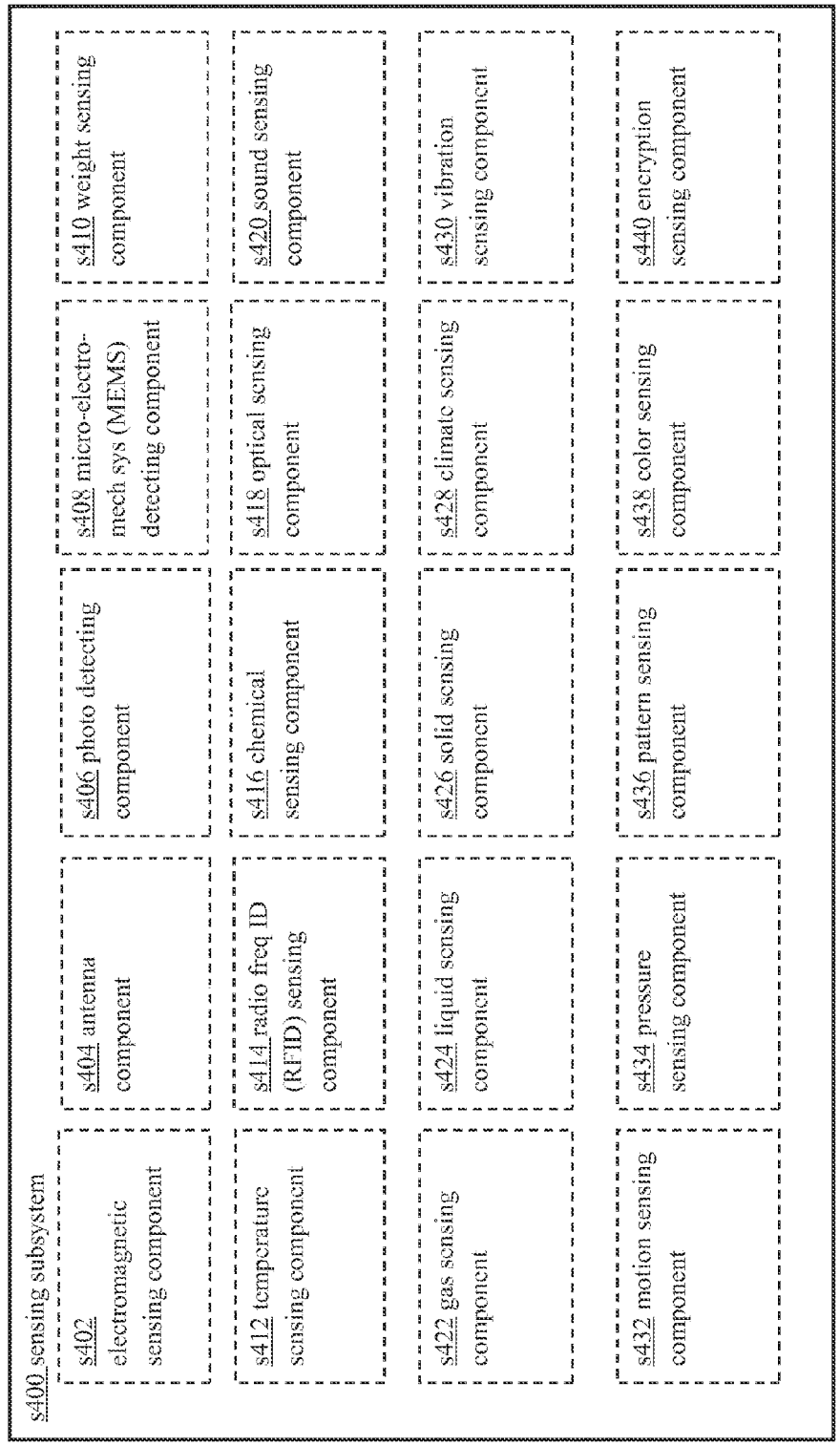
FIG. 29 is a block diagram depicting a sensing subsystem s400 of an exemplary implementation of the portable electronic device directed audio 10 of FIG. 1.

An exemplary implementation of the sensing subsystem s400 is shown in FIG. 29 to optionally include various components such as electromagnetic sensing component s402, antenna component s404, photo detecting component s406, micro-electro-mech sys (MEMS) detecting component s408, weight sensing component s410, temperature sensing component s412, radio freq ID (RFID) sensing component s414, chemical sensing component s416, optical sensing component s418, sound sensing component s420, gas sensing component s422, liquid sensing component s424, solid sensing component s426, climate sensing component s428, vibration sensing component s430, motion sensing component s432, pressure sensing component s434, pattern sensing component s436, color sensing component s438, and encryption sensing component s440.

Figure 30:
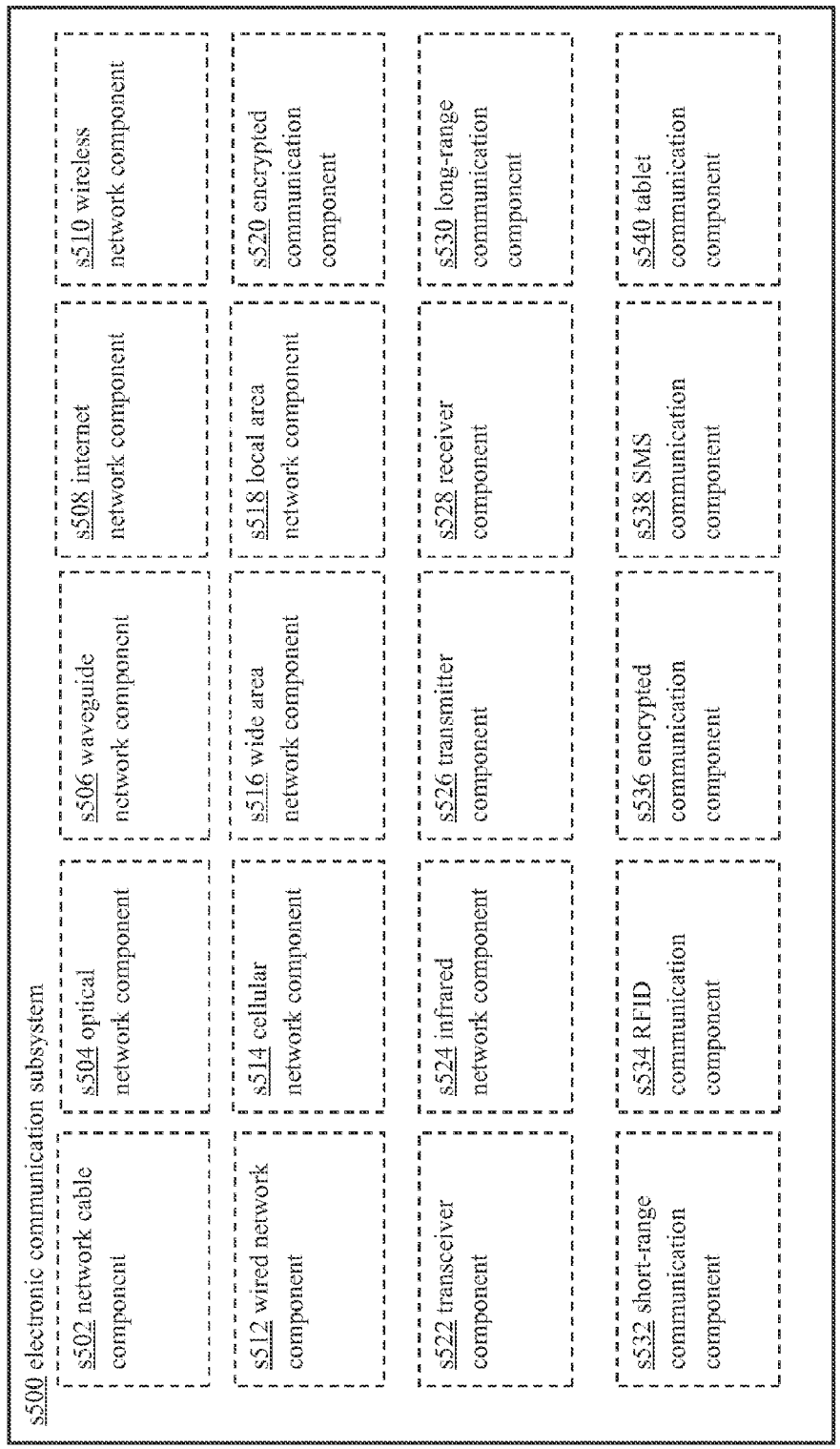
FIG. 30 is a block diagram depicting an electronic communication subsystem s500 of an exemplary implementation of the portable electronic device directed audio 10 of FIG. 1.

An exemplary implementation of the electronic communication subsystem s500 is shown in FIG. 30 to optionally include various components such as network cable component s502, optical network component s504, waveguide network component s506, internet network component s508, wireless network component s510, wired network component s512, cellular network component s514, wide area network component s516, local area network component s518, encrypted communication component s520, transceiver component s522, infrared network component s524, transmitter component s526, receiver component s528, receiver component s528, long-range communication component s530, short-range communication component s532, RFID communication component s534, encrypted communication component s536, SMS communication component s538, and tablet communication component s540.

An exemplary implementation of the power subsystem s600 is shown in FIG. 31 to optionally include various components such as electrical component s602, hydrocarbon fuel component s604, hydrogen fuel component s606, solid fuel component s608, liquid fuel component s610, gaseous fuel component s612, battery component s614, battery component s622, battery component s624, battery component s626, battery component s628, power cell component s630, steam generation component s632, solar cell component s634, solar reflector component s636, thermonuclear component s638, and co-generation component s640.

Implementations involve different combinations (otherwise known as "electrical circuitry arrangements") of components from the subsystems of the portable electronic device directed audio 10. Exemplary depictions of some of these electrical circuitry arrangements are shown in FIG. 32 to include electronically modulating electrical circuitry arrangement e11, modulating data storage electrical circuitry arrangement e1101, modulating wireless electrical circuitry arrangement e1102, modulating microphone electrical circuitry arrangement e1103, modulating audio electrical circuitry arrangement e1104, modulating internet electrical circuitry arrangement e1105, modulating software electrical circuitry arrangement e1106, modulating disk player electrical circuitry arrangement e1107, modulating media player electrical circuitry arrangement e1108, modulating audio player electrical circuitry arrangement e1109, modulating text recognition electrical circuitry arrangement e1110, modulating monitor alarm electrical circuitry arrangement e1111, modulating narrative electrical circuitry arrangement e1112, modulating instrumental electrical circuitry arrangement e1113, modulating signal modulation electrical circuitry arrangement e1114, modulating ultrasonic transducer electrical circuitry arrangement e1115, modulating signal processing electrical circuitry arrangement e1116, modulating microprocessor electrical circuitry arrangement e1117, modulating for inserting digital electrical circuitry arrangement e1118, and modulating tablet computer electrical circuitry arrangement e1119.

Some of these electrical circuitry arrangements are depicted in FIG. 33 to include modulating handheld mobile electrical circuitry arrangement e1120, modulating cell phone electrical circuitry arrangement e1121, modulating portable laptop electrical circuitry arrangement e1122, modulating PDA electrical circuitry arrangement e1123, modulating smart phone electrical circuitry arrangement e1124, modulating security personnel electrical circuitry arrangement e1125, modulating athletic sports electrical circuitry arrangement e1126, modulating wearable media electrical circuitry arrangement e1127, modulating wristwatch electrical circuitry arrangement e1128, modulating two-way radio electrical circuitry arrangement e1129, modulating beams electrical circuitry arrangement e1130, modulating steered beams electrical circuitry arrangement e113, modulating phased array electrical circuitry arrangement e1132, modulating audio electrical circuitry arrangement e1133, modulating absolute position electrical circuitry arrangement e1134, modulating relative position electrical circuitry arrangement e1135, modulating quality characterization target locations electrical circuitry arrangement e1136, modulating ultrasonic transducers electrical circuitry arrangement e1137, modulating reference electrical circuitry arrangement e1138, and modulating more acoustic ultrasonic electrical circuitry arrangement e1139.

Figure 34:
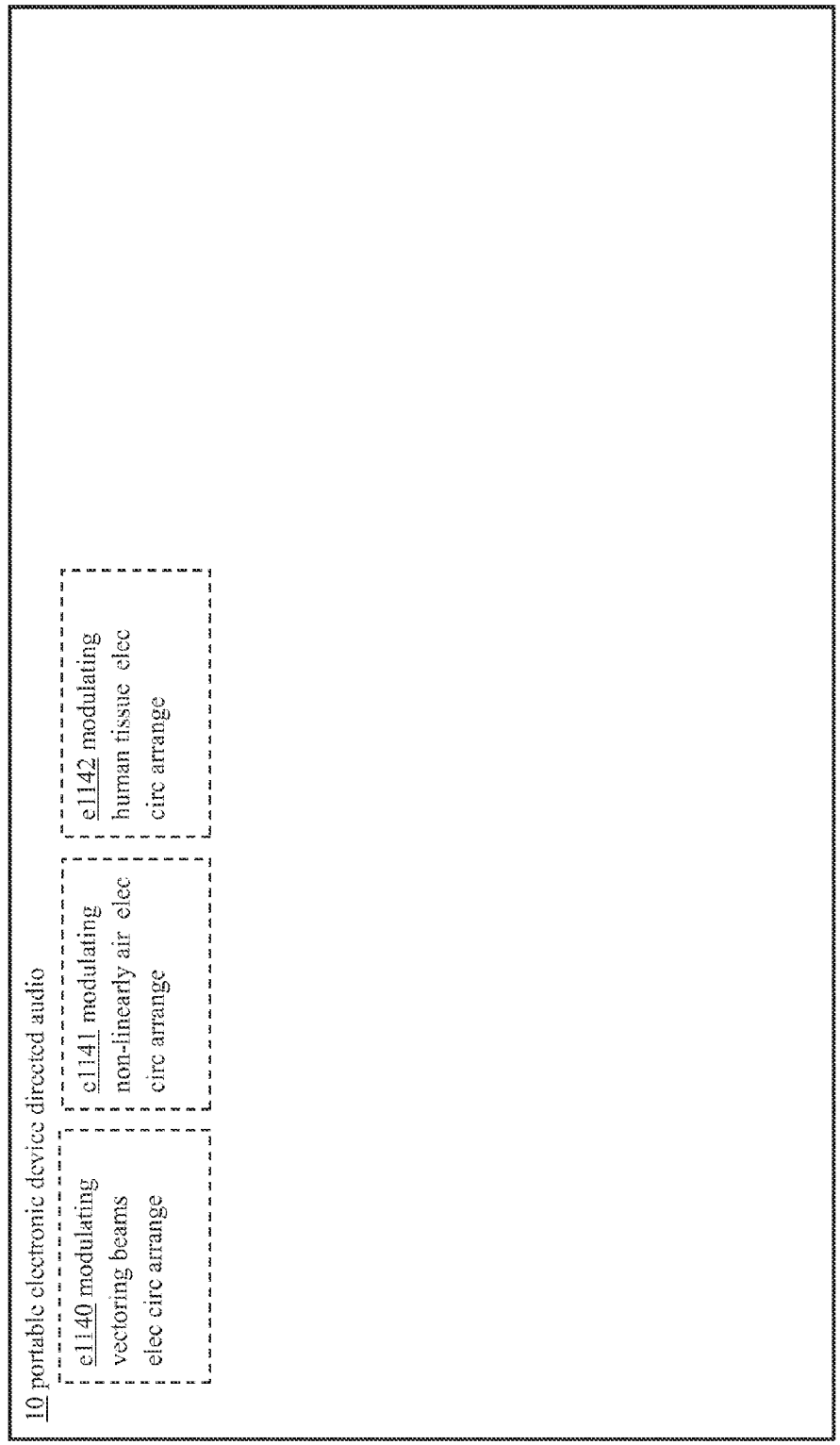
FIG. 34 is a block diagram depicting one or more exemplary electrical circuitry arrangements of the portable electronic device directed audio 10 of FIG. 1.

Some of these electrical circuitry arrangements are depicted in FIG. 34 to include modulating vectoring beams electrical circuitry arrangement e1140, modulating non-linearly air electrical circuitry arrangement e1141, and modulating human tissue electrical circuitry arrangement e1142.

Some of these electrical circuitry arrangements are depicted in FIG. 35 to include electronically projecting electrical circuitry arrangement e12, projecting thermal imaging electrical circuitry arrangement e1201, projecting visual imaging electrical circuitry arrangement e1202, projecting acoustic imaging electrical circuitry arrangement e1203, projecting sensed acoustic electrical circuitry arrangement e1204, projecting adjacent electrical circuitry arrangement e1205, projecting Doppler frequency electrical circuitry arrangement e1206, projecting digitally coded electrical circuitry arrangement e1207, projecting ranging electrical circuitry arrangement e1208, projecting visual tracking electrical circuitry arrangement e1209, projecting thermal tracking electrical circuitry arrangement e1210, projecting greatest intensity electrical circuitry arrangement e1211, and projecting thermal tracking electrical circuitry arrangement e1212, projecting signal amplitude electrical circuitry arrangement e1213, projecting target location electrical circuitry arrangement e1214, projecting audio microphone electrical circuitry arrangement e1215, projecting ultrasonic microphone electrical circuitry arrangement e1216, projecting acoustic digital electrical circuitry arrangement e1217, projecting acoustic noise electrical circuitry arrangement e1218, and projecting ultrasonic signals electrical circuitry arrangement e1219.

Some of these electrical circuitry arrangements are depicted in FIG. 36 to include projecting vectoring electrical circuitry arrangement e1220, projecting atmospheric interaction electrical circuitry arrangement e1221, projecting human tissue electrical circuitry arrangement e1222, projecting signals interfering electrical circuitry arrangement e1223, projecting transducers to focus electrical circuitry arrangement e1224, projecting interference electrical circuitry arrangement e1225, projecting nonlinear atmospheric electrical circuitry arrangement e1226, projecting nonlinear tissue electrical circuitry arrangement e1227, projecting nonlinear non-tissue electrical circuitry arrangement e1228, projecting nonlinear personal electrical circuitry arrangement e1229, projecting binaural acoustic electrical circuitry arrangement e1234, projecting digitally coded electrical circuitry arrangement e1231, projecting signals tailored electrical circuitry arrangement e1232, projecting feedback sensing electrical circuitry arrangement e1233, projecting binaural acoustic electrical circuitry arrangement e1234, projecting stereophonic acoustic electrical circuitry arrangement e1235, projecting monophonic acoustic electrical circuitry arrangement e1236, projecting phase cancellation electrical circuitry arrangement e1237, projecting phase-shifting electrical circuitry arrangement e1238 and projecting emitted greater electrical circuitry arrangement e1239.

Some of these electrical circuitry arrangements are depicted in FIG. 37 to include projecting information designated electrical circuitry arrangement e1240, projecting information containing electrical circuitry arrangement e1241, projecting psychologically influential electrical circuitry arrangement e1242, projecting verbal oratory electrical circuitry arrangement e1243, projecting music selections electrical circuitry arrangement e1244, projecting location away electrical circuitry arrangement e1245, projecting vicinity ears electrical circuitry arrangement e1246, projecting vicinity individual electrical circuitry arrangement e1247, projecting near individuals electrical circuitry arrangement e1248, projecting passive receiver electrical circuitry arrangement e1249, projecting moving member electrical circuitry arrangement e1250, projecting listener's head electrical circuitry arrangement e1251, projecting sensed accelerometer electrical circuitry arrangement e1252, projecting six feet electrical circuitry arrangement e1253, projecting twelve feet electrical circuitry arrangement e1254, projecting three feet electrical circuitry arrangement e1255, projecting emitter arrangements electrical circuitry arrangement e1256, projecting handheld mobile electrical circuitry arrangement e1257, projecting cell phone electrical circuitry arrangement e1258 and projecting laptop computer electrical circuitry arrangement e1259.

Some of these electrical circuitry arrangements are depicted in FIG. 38 to include projecting PDA electrical circuitry arrangement e1260, projecting smart phone electrical circuitry arrangement e1261, projecting security personnel electrical circuitry arrangement e1262, projecting sports equipment electrical circuitry arrangement e1263, projecting wearable media electrical circuitry arrangement e1264, projecting wristwatch electrical circuitry arrangement e1265, projecting two-way radio electrical circuitry arrangement e1266, projecting targeting area electrical circuitry arrangement e1267, projecting transducer placement electrical circuitry arrangement e1268, projecting amplitude size electrical circuitry arrangement e1269, projecting along vicinity electrical circuitry arrangement e1270, projecting display screen electrical circuitry arrangement e1271, projecting keyboard area electrical circuitry arrangement e1272, projecting dimensional sizing electrical circuitry arrangement e1273, projecting wavelengths of the lowest electrical circuitry arrangement e1274, projecting placement in body electrical circuitry arrangement e1275, projecting localized areas electrical circuitry arrangement e1276, projecting collective speakers electrical circuitry arrangement e1277, and projecting multiple arrays electrical circuitry arrangement e1278.

In implementations one or more instructions are stored and/or otherwise borne in various subsystems, components, and/or accessories of the portable electronic device directed audio 10 such as being borne in a non-transitory signal bearing medium of information storage subsystem s200. One or more exemplary instructions depicted in FIG. 39 as being borne in an exemplary version of a non-transitory signal bearing medium of information storage subsystem s200 include one or more electronically modulating instructions i11, one or more modulating data storage instructions i1101, one or more modulating wireless instructions i1102, one or more modulating microphone instructions i1103, one or more modulating audio instructions i1104, one or more modulating internet instructions i1105, one or more modulating software instructions i1106, one or more modulating disk player instructions i1107, one or more modulating media player instructions i1108, one or more modulating audio player instructions i1109, one or more modulating text recognition instructions i1110, one or more modulating monitor alarm instructions i1111, one or more modulating narrative instructions i1112, one or more modulating instrumental instructions i1113, one or more modulating signal modulation instructions i1114, one or more modulating ultrasonic transducer instructions i1115, one or more modulating signal processing instructions i1116, one or more modulating microprocessor instructions i1117, one or more modulating for inserting digital instructions i1118, and one or more modulating tablet computer instructions i1119.

Figure 40:
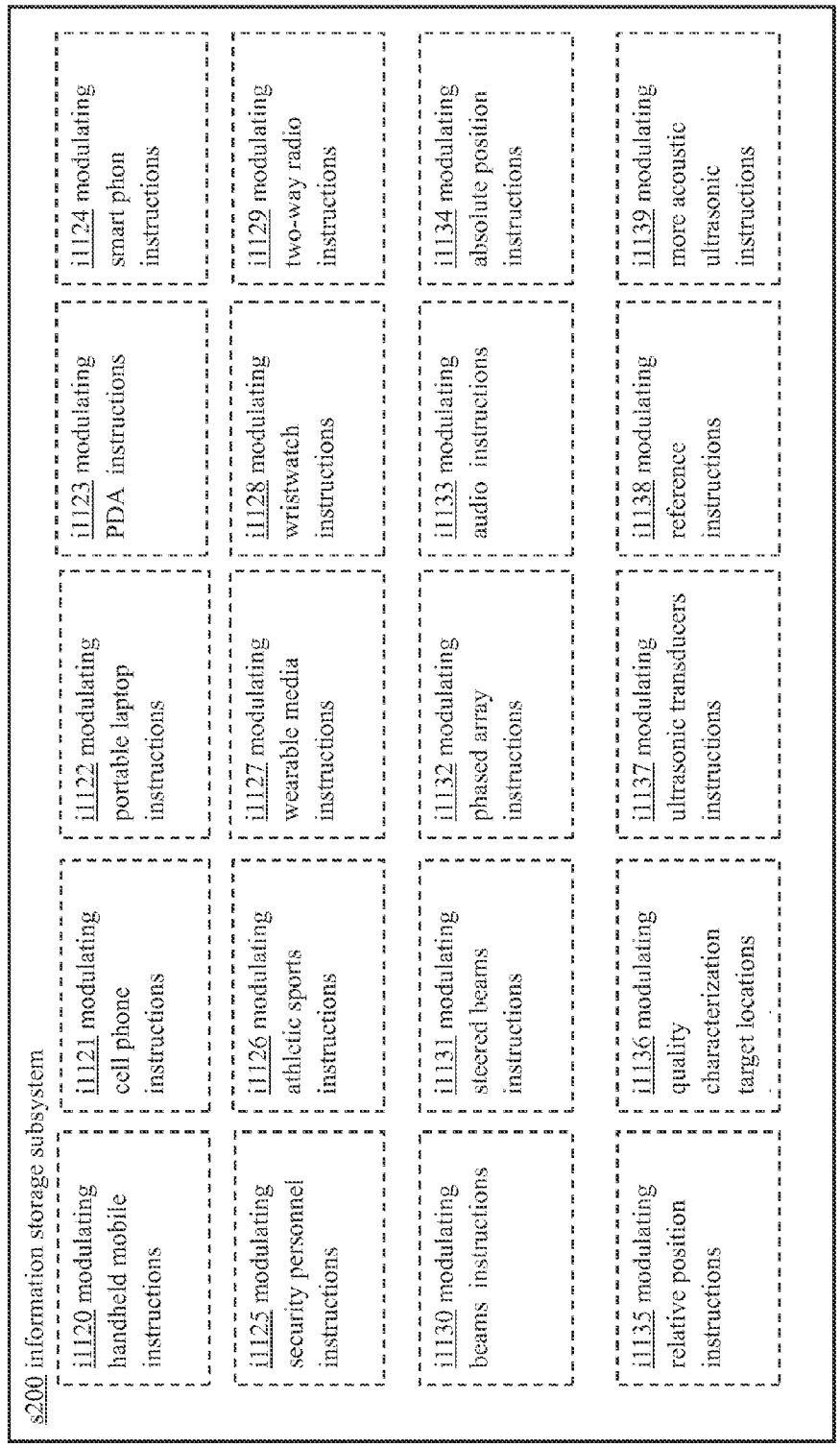
FIG. 40 is a block diagram depicting one or more exemplary instructions of the information storage subsystem s200 of the portable electronic device directed audio 10 of FIG. 1.

One or more exemplary instructions depicted in FIG. 40 as being borne in an exemplary version of a non-transitory signal bearing medium of information storage subsystem s200 include one or more modulating handheld mobile instructions i1120, one or more modulating cell phone instructions i1121, one or more modulating portable laptop instructions i1122, one or more modulating PDA instructions i1123, one or more modulating smart phone instructions i1124, one or more modulating security personnel instructions i1125, one or more modulating athletic sports instructions i1126, one or more modulating wearable media instructions i1127, one or more modulating wristwatch instructions i1128, one or more modulating two-way radio instructions i1129, one or more modulating beams instructions i1130, one or more modulating steered beams instructions i1131, one or more modulating phased array instructions i1132, one or more modulating audio instructions i1133, one or more modulating absolute position instructions i1134, one or more modulating relative position instructions i1135, one or more modulating quality characterization target locations instructions i1136, one or more modulating ultrasonic transducers instructions i1137, one or more modulating reference instructions i1138, and one or more modulating more acoustic ultrasonic instructions i1139.

Figure 41:
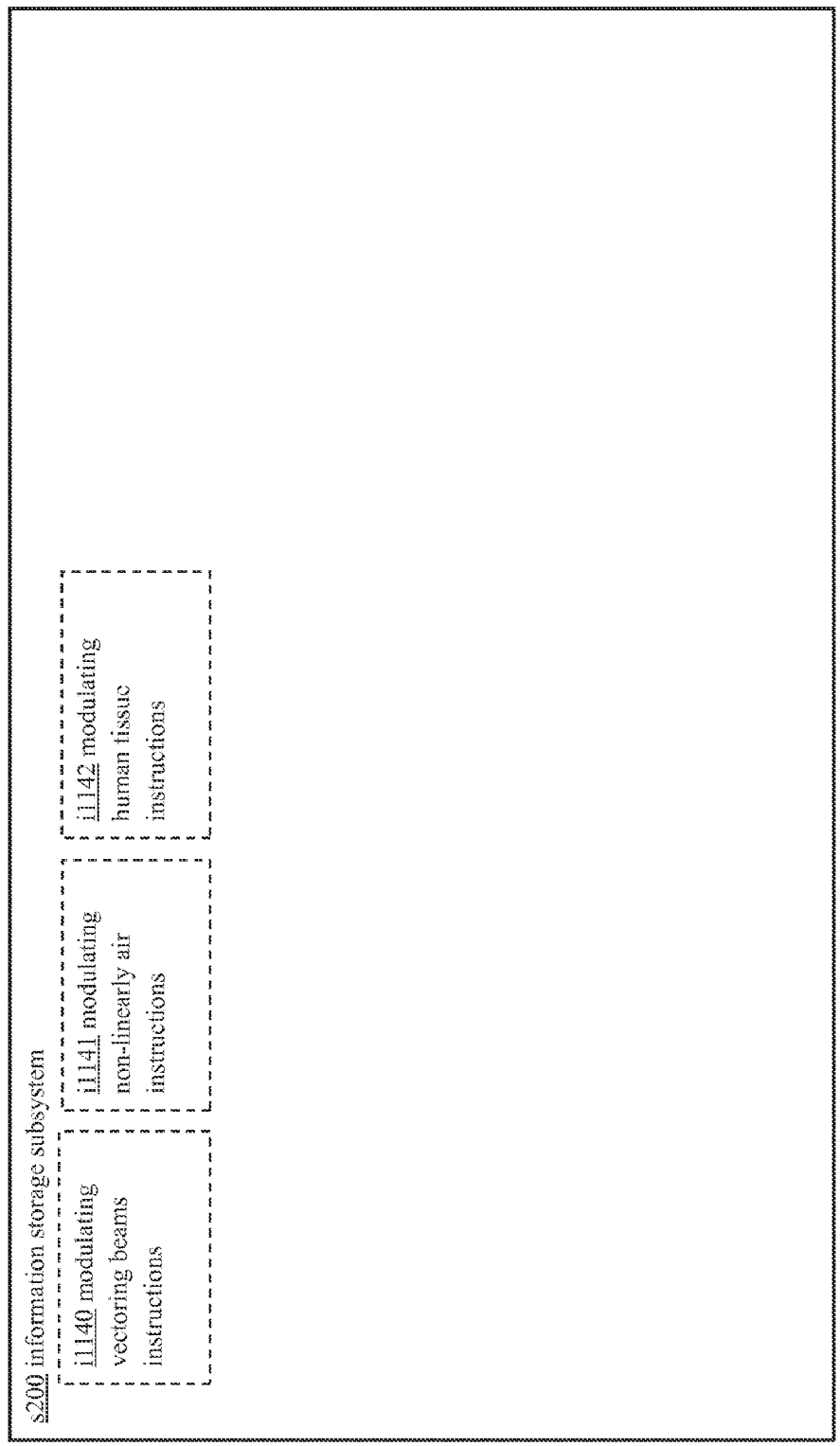
FIG. 41 is a block diagram depicting one or more exemplary instructions of the information storage subsystem s200 of the portable electronic device directed audio 10 of FIG. 1.

One or more exemplary instructions depicted in FIG. 41 as being borne in an exemplary version of a non-transitory signal bearing medium of information storage subsystem s200 include one or more modulating vectoring beams instructions i1140, one or more modulating non-linearly air instructions i1141, and one or more modulating human tissue instructions i1142.

Figure 42:
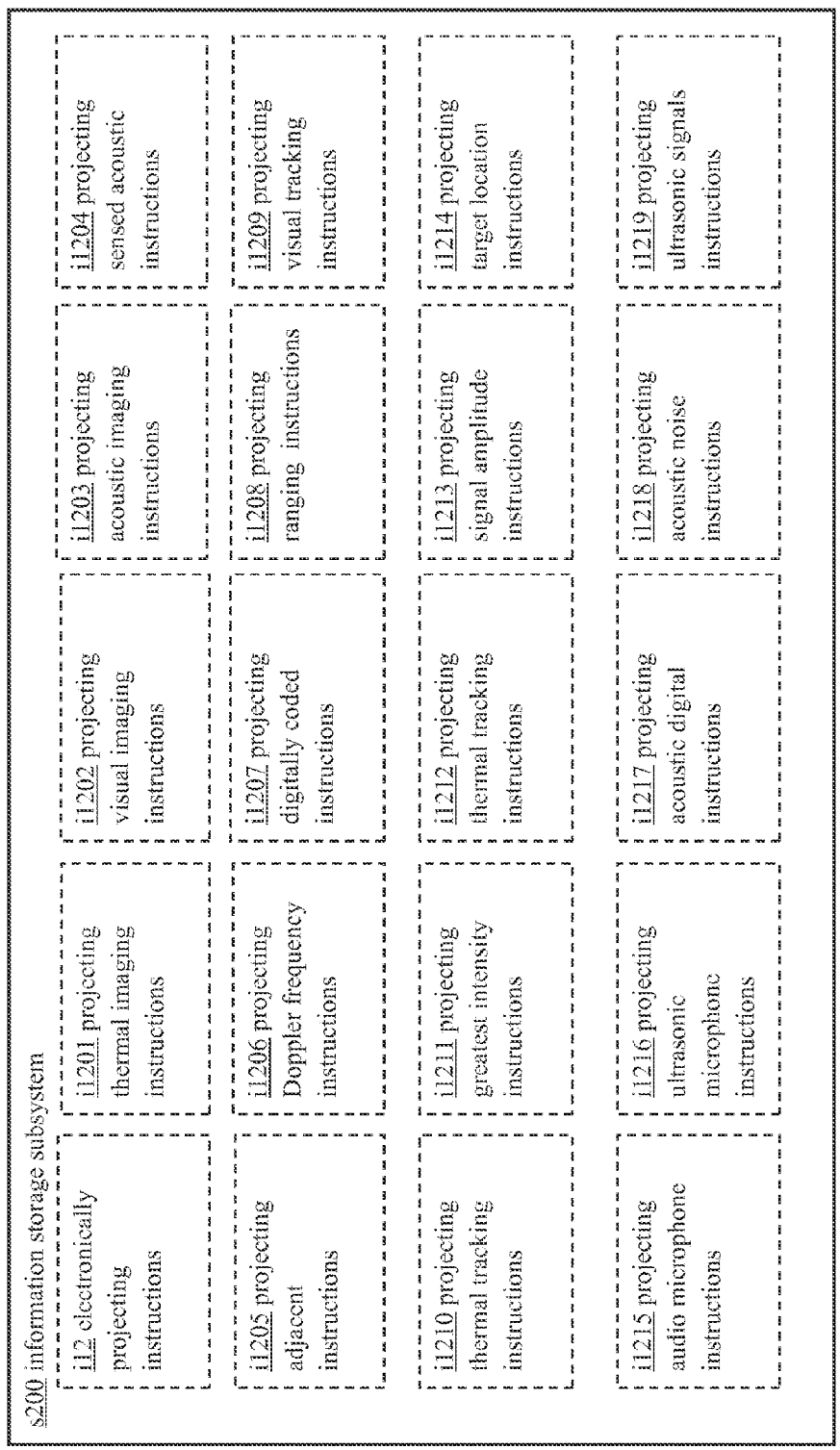
FIG. 42 is a block diagram depicting one or more exemplary instructions of the information storage subsystem s200 of the portable electronic device directed audio 10 of FIG. 1.

One or more exemplary instructions depicted in FIG. 42 as being borne in an exemplary version of a non-transitory signal bearing medium of information storage subsystem s200 include one or more electronically projecting instructions i12, one or more projecting thermal imaging instructions i1201, one or more projecting visual imaging instructions i1202, one or more projecting acoustic imaging instructions i1203, one or more projecting sensed acoustic instructions i1204, one or more projecting adjacent instructions i1205, one or more projecting Doppler frequency instructions i1206, one or more projecting digitally coded instructions i1207, one or more projecting ranging instructions i1208, one or more projecting visual tracking instructions i1209, one or more projecting thermal tracking instructions i1210, one or more projecting greatest intensity instructions i1211, one or more projecting thermal tracking instructions i1212, one or more projecting signal amplitude instructions i1213, one or more projecting target location instructions i1214, one or more projecting audio microphone instructions i1215, one or more projecting ultrasonic microphone instructions i1216, one or more projecting acoustic digital instructions i1217, one or more projecting acoustic noise instructions i1218, and one or more projecting ultrasonic signals instructions i1219.

One or more exemplary instructions depicted in FIG. 43 as being borne in an exemplary version of a non-transitory signal bearing medium of information storage subsystem s200 include one or more projecting vectoring instructions i1220, one or more projecting atmospheric interaction instructions i1221, one or more projecting human tissue instructions i1222, one or more projecting signals interfering instructions i1223, one or more projecting transducers to focus instructions i1224, one or more projecting interference instructions i1225, one or more projecting nonlinear atmospheric instructions i1226, one or more projecting nonlinear tissue instructions i1227, one or more projecting nonlinear non-tissue instructions i1228, one or more projecting nonlinear personal instructions i1229, one or more projecting binaural acoustic instructions i1234, one or more projecting digitally coded instructions i1231, one or more projecting signals tailored instructions i1232, one or more projecting feedback sensing instructions i1233, one or more projecting binaural acoustic instructions i1234, one or more projecting stereophonic acoustic instructions i1235, one or more projecting monophonic acoustic instructions i1236, one or more projecting phase cancellation instructions i1237, one or more projecting phase-shifting instructions i1238 and one or more projecting emitted greater instructions i1239.

One or more exemplary instructions depicted in FIG. 44 as being borne in an exemplary version of a non-transitory signal bearing medium of information storage subsystem s200 include one or more projecting information designated instructions i1240, one or more projecting information containing instructions i1241, one or more projecting psychologically influential instructions i1242, one or more projecting verbal oratory instructions i1243, one or more projecting music selections instructions i1244, one or more projecting location away instructions i1245, one or more projecting vicinity ears instructions i1246, one or more projecting vicinity individual instructions i1247, one or more projecting near individuals instructions i1248, one or more projecting passive receiver instructions i1249, one or more projecting moving member instructions i1250, one or more projecting listener's head instructions i1251, one or more projecting sensed accelerometer instructions i1252, one or more projecting six feet instructions i1253, one or more projecting twelve feet instructions i1254, one or more projecting three feet instructions i1255, one or more projecting emitter arrangements instructions i1256, one or more projecting handheld mobile instructions i1257, one or more projecting cell phone instructions i1258 and one or more projecting laptop computer instructions i1259.

One or more exemplary instructions depicted in FIG. 45 as being borne in an exemplary version of a non-transitory signal bearing medium of information storage subsystem s200 include one or more projecting PDA instructions i1260, one or more projecting smart phone instructions i1261, one or more projecting security personnel instructions i1262, one or more projecting sports equipment instructions i1263, one or more projecting wearable media instructions i1264, one or more projecting wristwatch instructions i1265, one or more projecting two-way radio instructions i1266, one or more projecting targeting area instructions i1267, one or more projecting transducer placement instructions i1268, one or more projecting amplitude size instructions i1269, one or more projecting along vicinity instructions i1270, one or more projecting display screen instructions i1271, one or more projecting keyboard area instructions i1272, one or more projecting dimensional sizing instructions i1273, one or more projecting wavelengths of the lowest instructions i1274, one or more projecting placement in body instructions i1275, one or more projecting localized areas instructions i1276, one or more projecting collective speakers instructions i1277, and one or more projecting multiple arrays instructions i1278.

Figure 46:
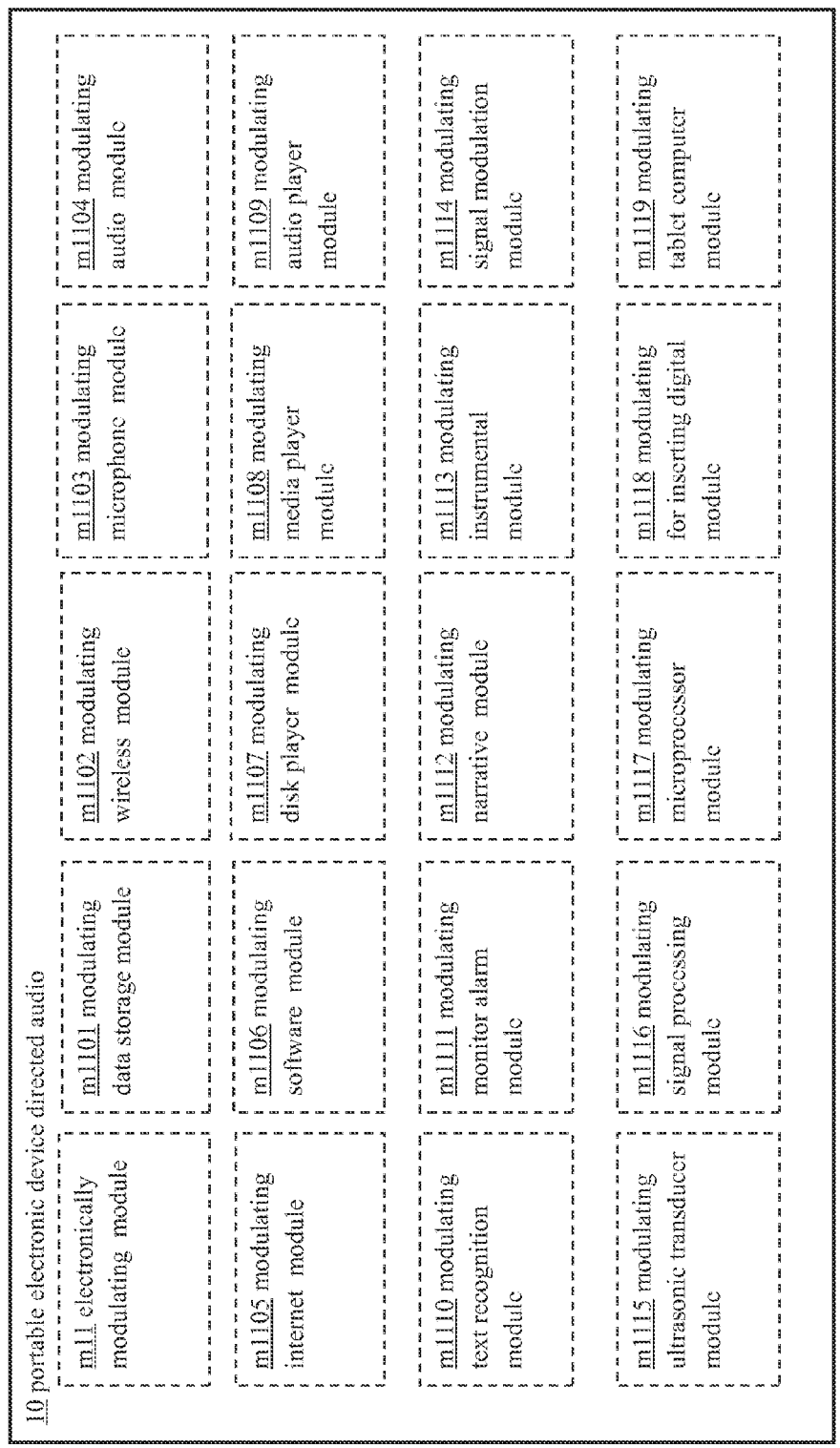
FIG. 46 is a block diagram depicting one or more exemplary modules of the portable electronic device directed audio 10 of FIG. 1.

Implementations of modules involve different combinations (limited to patentable subject matter under 35 U.S.C. 101) of one or more aspects from one or more of the electrical circuitry arrangements and/or one or more aspects from one or more of the instructions of the portable electronic device directed audio 10. Exemplary depictions of some of these modules are shown in FIG. 46 to include electronically modulating module m11, modulating data storage module m1101, modulating wireless module m1102, modulating microphone module m1103, modulating audio module m1104, modulating internet module m1105, modulating software module m1106, modulating disk player module m1107, modulating media player module m1108, modulating audio player module m1109, modulating text recognition module m1110, modulating monitor alarm module m1111, modulating narrative module m1112, modulating instrumental module m1113, modulating signal modulation module m1114, modulating ultrasonic transducer module m1115, modulating signal processing module m1116, modulating microprocessor module m1117, modulating for inserting digital module m1118, and modulating tablet computer module m1119.

Figure 47:
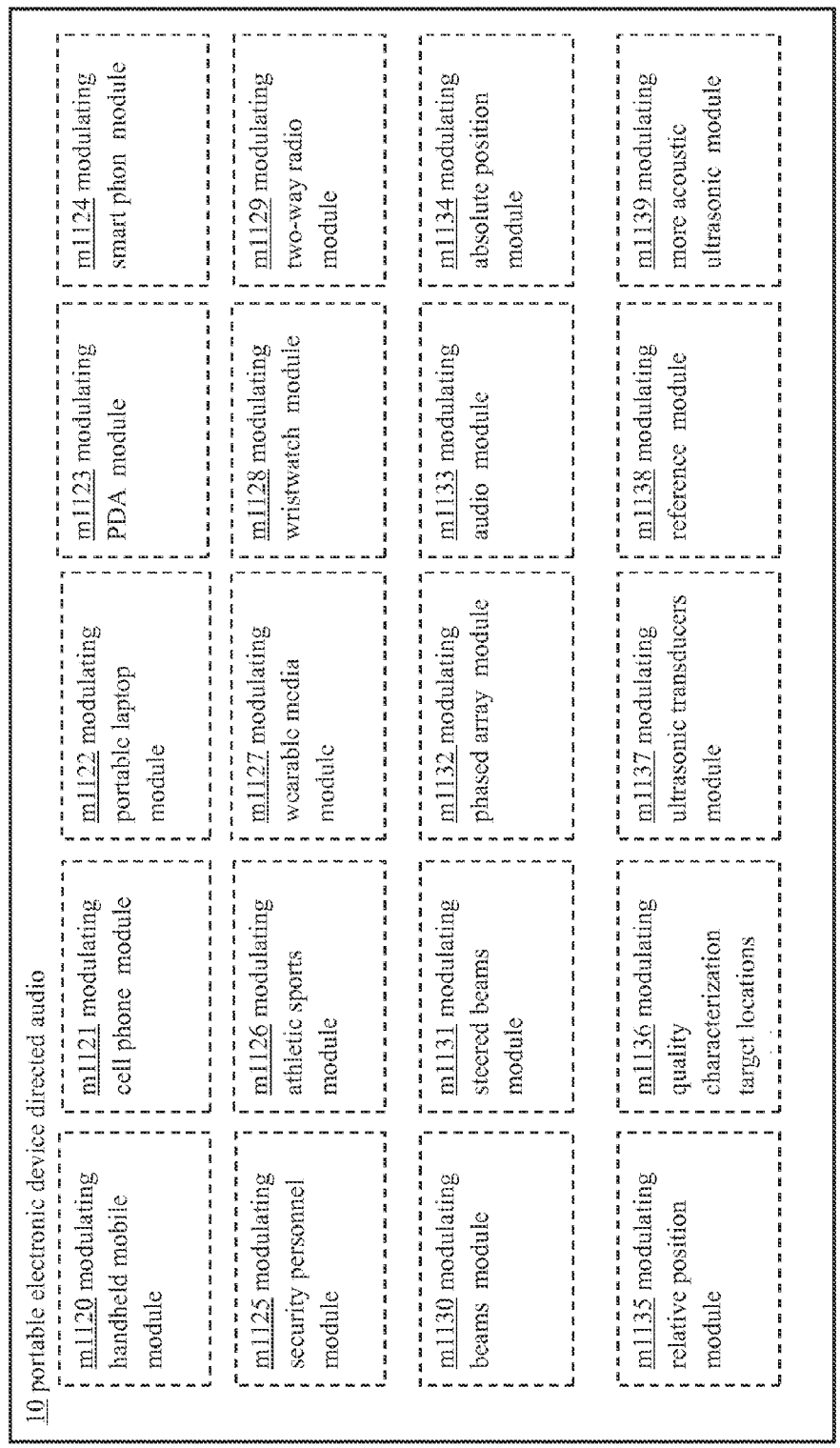
FIG. 47 is a block diagram depicting one or more exemplary modules of the portable electronic device directed audio 10 of FIG. 1.

Some of these modules are depicted in FIG. 47 to include modulating handheld mobile module m1120, modulating cell phone module m1121, modulating portable laptop module m1122, modulating PDA module m1123, modulating smart phone module m1124, modulating security personnel module m1125, modulating athletic sports module m1126, modulating wearable media module m1127, modulating wristwatch module m1128, modulating two-way radio module m1129, modulating beams module m1130, modulating steered beams module m113, modulating phased array module m1132, modulating audio module m1133, modulating absolute position module m1134, modulating relative position module m1135, modulating quality characterization target locations module m1136, modulating ultrasonic transducers module m1137, modulating reference module m1138, and modulating more acoustic ultrasonic module m1139.

Figure 48:
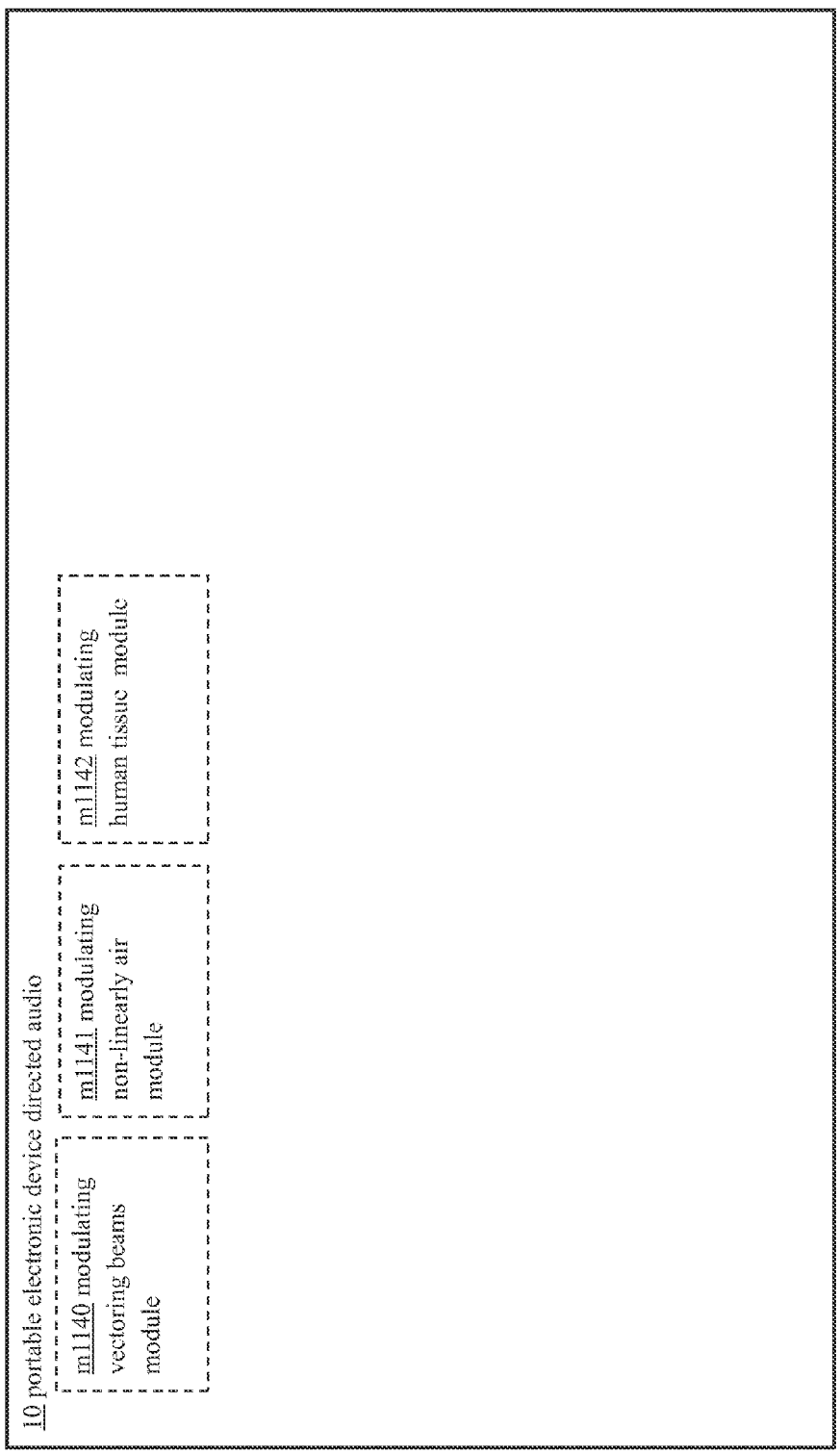
FIG. 48 is a block diagram depicting one or more exemplary modules of the portable electronic device directed audio 10 of FIG. 1.

Some of these modules are depicted in FIG. 48 to include modulating vectoring beams module m1140, modulating non-linearly air module m1141, and modulating human tissue module m1142.

Figure 49:
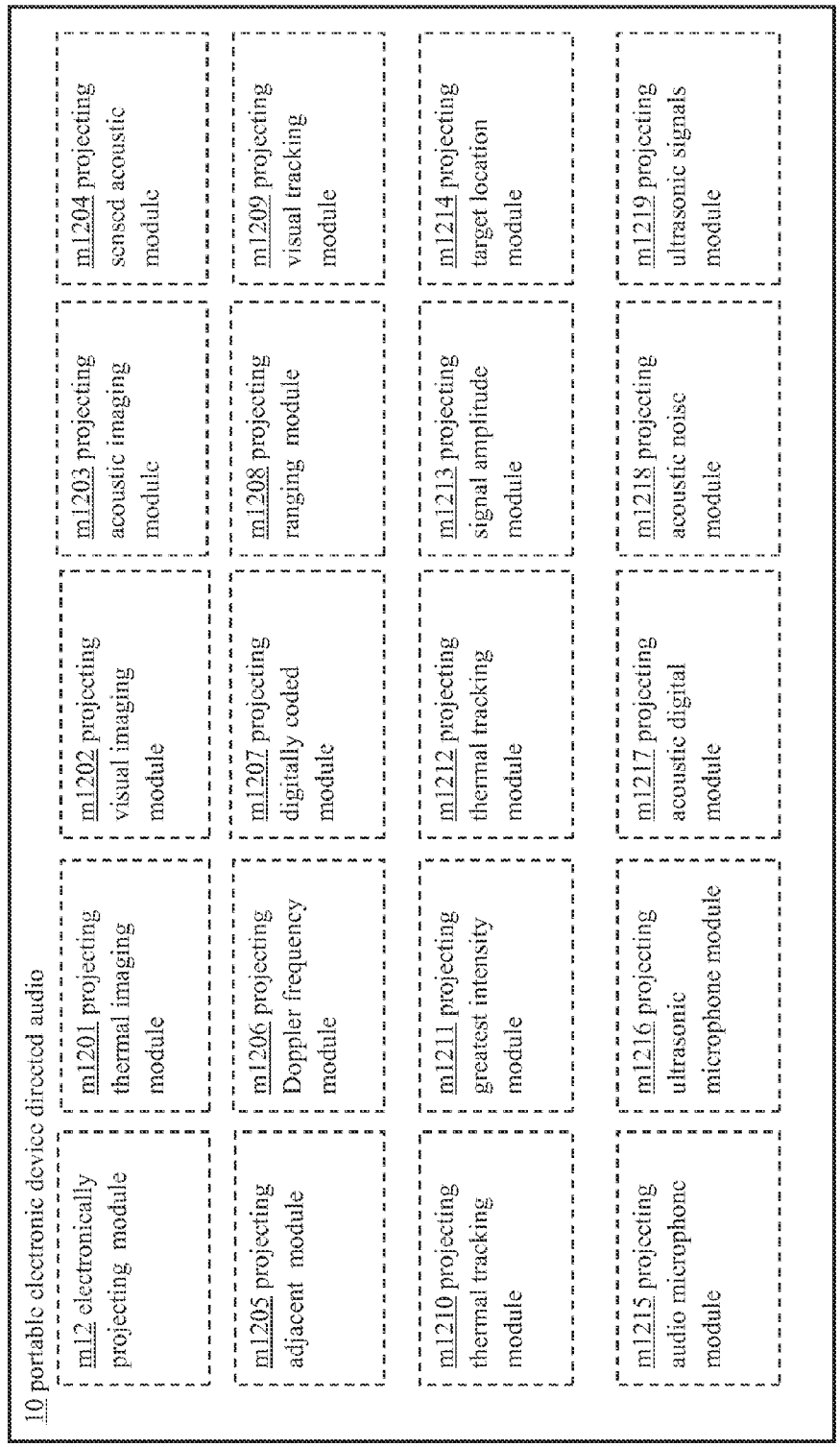
FIG. 49 is a block diagram depicting one or more exemplary modules of the portable electronic device directed audio 10 of FIG. 1.

Some of these modules are depicted in FIG. 49 to include electronically projecting module m12, projecting thermal imaging module m1201, projecting visual imaging module m1202, projecting acoustic imaging module m1203, projecting sensed acoustic module m1204, projecting adjacent module m1205, projecting Doppler frequency module m1206, projecting digitally coded module m1207, projecting ranging module m1208, projecting visual tracking module m1209, projecting thermal tracking module m1210, projecting greatest intensity module m1211, and projecting thermal tracking module m1212, projecting signal amplitude module m1213, projecting target location module m1214, projecting audio microphone module m1215, projecting ultrasonic microphone module m1216, projecting acoustic digital module m1217, projecting acoustic noise module m1218, and projecting ultrasonic signals module m1219.

Some of these modules are depicted in FIG. 50 to include projecting vectoring module m12, projecting atmospheric interaction module m1221, projecting human tissue module m1222, projecting signals interfering module m1223, projecting transducers to focus module m1224, projecting interference module m1225, projecting nonlinear atmospheric module m1226, projecting nonlinear tissue module m1227, projecting nonlinear non-tissue module m1228, projecting nonlinear personal module m1229, projecting binaural acoustic module m1234, projecting digitally coded module m1231, projecting signals tailored module m1232, projecting feedback sensing module m1233, projecting binaural acoustic module m1234, projecting stereophonic acoustic module m1235, projecting monophonic acoustic module m1236, projecting phase cancellation module m1237, projecting phase-shifting module m1238, and projecting emitted greater module m1239.

Some of these modules are depicted in FIG. 51 to include projecting information designated module m12, projecting information containing module m1241, projecting psychologically influential module m1242, projecting verbal oratory module m1243, projecting music selections module m1244, projecting location away module m1245, projecting vicinity ears module m1246, projecting vicinity individual module m1247, projecting near individuals module m1248, projecting passive receiver module m1249, projecting moving member module m1250, projecting listener's head module m1251, projecting sensed accelerometer module m1252, projecting six feet module m1253, projecting twelve feet module m1254, projecting three feet module m1255, projecting emitter arrangements module m1256, projecting handheld mobile module m1257, projecting cell phone module m1258, and projecting laptop computer module m1259.

Some of these modules are depicted in FIG. 52 to include projecting PDA module m12, projecting smart phone module m1261, projecting security personnel module m1262, projecting sports equipment module m1263, projecting wearable media module m1264, projecting wristwatch module m1265, projecting two-way radio module m1266, projecting targeting area module m1267, projecting transducer placement module m1268, projecting amplitude size module m1269, projecting along vicinity module m1270, projecting display screen module m1271, projecting keyboard area module m1272, projecting dimensional sizing module m1273, projecting wavelengths of the lowest module m1274, projecting placement in body module m1275, projecting localized areas module m1276, projecting collective speakers module m1277, and projecting multiple arrays module m1278.

In some implementations, non-transitory signal-bearing medium of information storage subsystem s200 as articles of manufacture may store the one or more exemplary instructions. In some implementations, the non-transitory signal bearing medium may include a computer-readable medium. In some implementations, the non-transitory signal-bearing medium may include a recordable medium. In some implementations, the signal-bearing medium may include a communication medium.

The various subsystems and components of the portable electronic device directed audio s10 such as the control and information processing subsystem s100, the information storage subsystem s200, the information user interface subsystems 300, the sensing subsystem s400 and the electronic communication subsystem s500 and their sub-components and the other exemplary entities depicted may be embodied by hardware, software and/or firmware (limited to patentable subject matter under 35 USC 101). For example, in some implementations of the portable electronic device directed audio s10, aspects may be implemented with a processor (e.g., microprocessor, controller, and so forth) executing computer readable instructions (e.g., computer program product) stored in a storage medium (e.g., volatile or non-volatile memory) such as a signal-bearing medium. Alternatively, hardware such as application specific integrated circuit (ASIC) may be employed in order to implement such modules in some alternative implementations.

Figure 53:
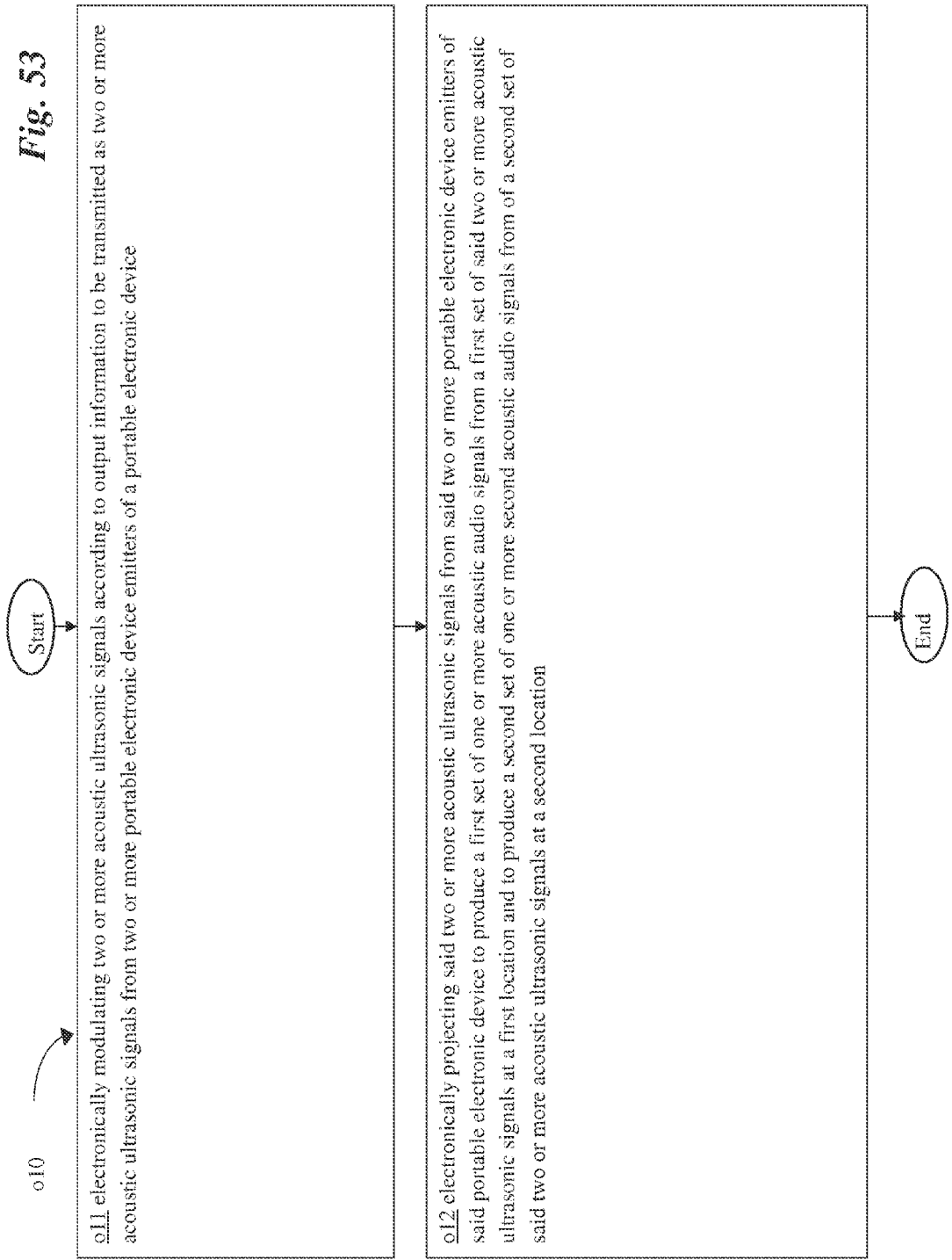
FIG. 53 is a high-level flowchart illustrating an operational flow o10 representing exemplary operations related to electronically modulating two or more acoustic ultrasonic signals according to output information to be transmitted as two or more acoustic ultrasonic signals from two or more portable electronic device emitters of a portable electronic device, and electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location at least associated with the depicted exemplary implementations of the system.

An operational flow o10 as shown in FIG. 53 represents example operations related to electronically modulating two or more acoustic ultrasonic signals according to output information to be transmitted as two or more acoustic ultrasonic signals from two or more portable electronic device emitters of a portable electronic device and electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location.

FIG. 53 and those figures that follow may have various examples of operational flows, and explanation may be provided with respect to the above-described examples of FIGS. 1-12 and/or with respect to other examples and contexts. Nonetheless, it should be understood that the operational flows may be executed in a number of other environments and contexts, and/or in modified versions of FIGS. 1-12. Furthermore, although the various operational flows are presented in the sequence(s) illustrated, it should be understood that the various operations may be performed in other orders than those which are illustrated, or may be performed concurrently.

In FIG. 53 and those figures that follow, various operations may be depicted in a box-within-a-box manner. Such depictions may indicate that an operation in an internal box may comprise an optional exemplary implementation of the operational step illustrated in one or more external boxes. However, it should be understood that internal box operations may be viewed as independent operations separate from any associated external boxes and may be performed in any sequence with respect to all other illustrated operations, or may be performed concurrently.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

As shown in FIG. 53, the operational flow o10 proceeds to operation o11 for electronically modulating two or more acoustic ultrasonic signals according to output information to be transmitted as two or more acoustic ultrasonic signals from two or more portable electronic device emitters of a portable electronic device. An exemplary version of a non-transitory signal bearing medium of information storage subsystem s200 is depicted as bearing one or more electronically modulating instructions i11 that when executed will direct performance of the operation o11. In an implementation, the one or more electronically modulating instructions i11 when executed direct electronically modulating (e.g. through reception of cable communication packets, via Wi-Fi signal reception, by near-field infrared receiver, etc.) two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) according to output information (e.g. including lecture formatted information, including foreign language speech information, including classical music selection information, etc.) to be transmitted (e.g. through one or more cable interface portions, via one or more speaker portions, by one or more transducer portions, etc.) as two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from two or more portable electronic device emitters (e.g. including one or more 3G mobile components, including one or more cellular components, including one or more 4G components, etc.) of a portable electronic device (e.g. including one or more 3G mobile components, including one or more cellular components, including one or more 4G components, etc.). Furthermore, the electronically modulating electrical circuitry arrangement ("elec circ arrange") e11 when activated will perform the operation o1101. Also, the modulating data storage module m1101, when executed and/or activated, will direct performance of and/or performs the operation o11. In an implementation, the electronically modulating electrical circuitry arrangement e11, when activated performs electronically modulating (e.g. through reception of cable communication packets, via Wi-Fi signal reception, by near-field infrared receiver, etc.) two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) according to output information (e.g. including lecture formatted information, including foreign language speech information, including classical music selection information, etc.) to be transmitted (e.g. through one or more cable interface portions, via one or more speaker portions, by one or more transducer portions, etc.) as two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from two or more portable electronic device emitters (e.g. including one or more 3G mobile components, including one or more cellular components, including one or more 4G components, etc.) of a portable electronic device (e.g. including one or more 3G mobile components, including one or more cellular components, including one or more 4G components, etc.). Also, the electronically modulating module m11, when executed and/or activated, will direct performance of and/or perform the operation o11. In an implementation, the electronically modulating two or more acoustic ultrasonic signals according to output information to be transmitted as two or more acoustic ultrasonic signals from two or more portable electronic device emitters of a portable electronic device is carried out by electronically modulating (e.g. through reception of cable communication packets, via Wi-Fi signal reception, by near-field infrared receiver, etc.) two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) according to output information (e.g. including lecture formatted information, including foreign language speech information, including classical music selection information, etc.) to be transmitted (e.g. through one or more cable interface portions, via one or more speaker portions, by one or more transducer portions, etc.) as two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) from two or more portable electronic device emitters (e.g. including one or more 3G mobile components, including one or more cellular components, including one or more 4G components, etc.) of a portable electronic device (e.g. including one or more 3G mobile components, including one or more cellular components, including one or more 4G components, etc.).

Figure 39:
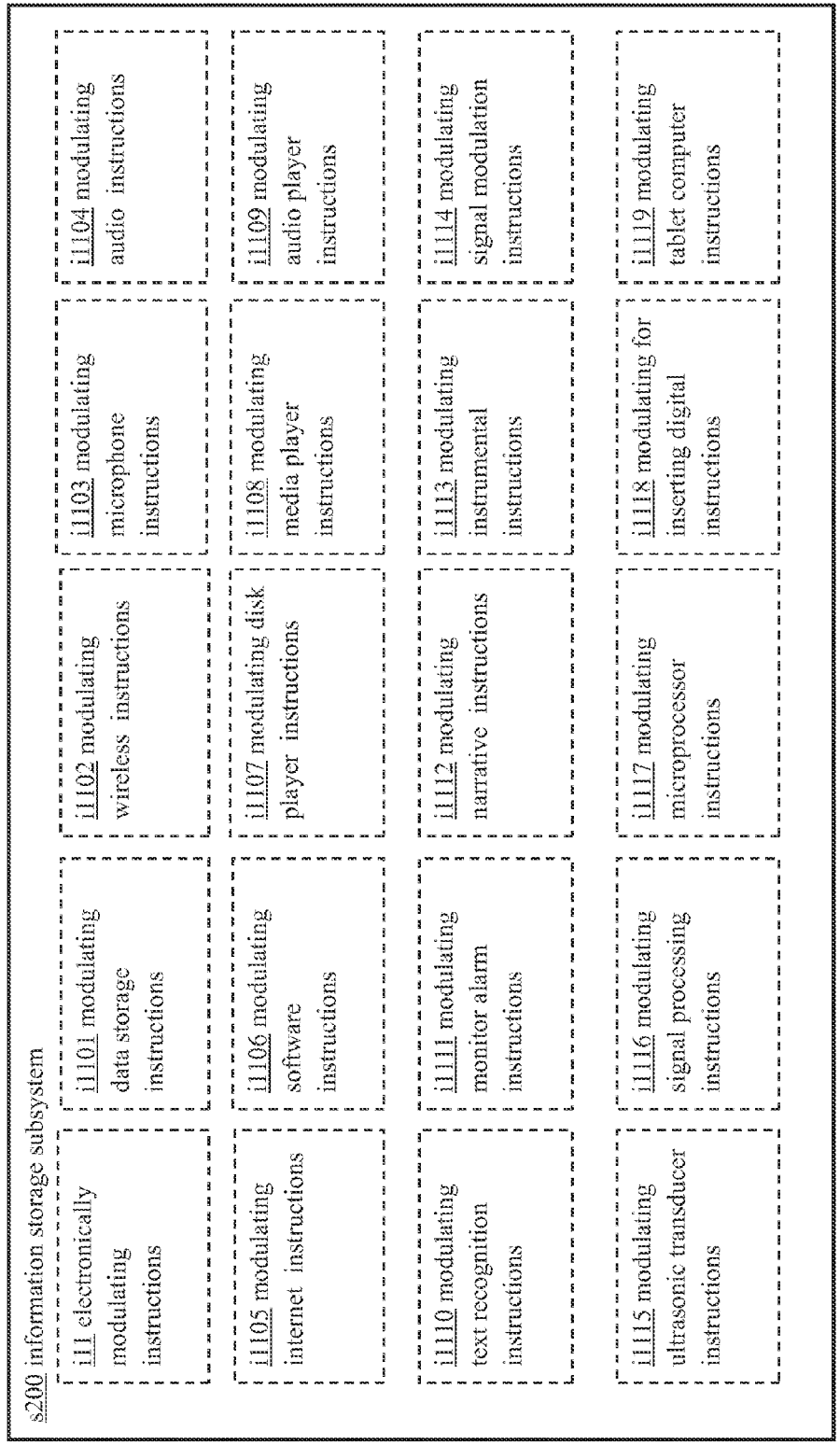
FIG. 39 is a block diagram depicting one or more exemplary instructions of the information storage subsystem s200 of the portable electronic device directed audio 10 of FIG. 1.
Figure 54:
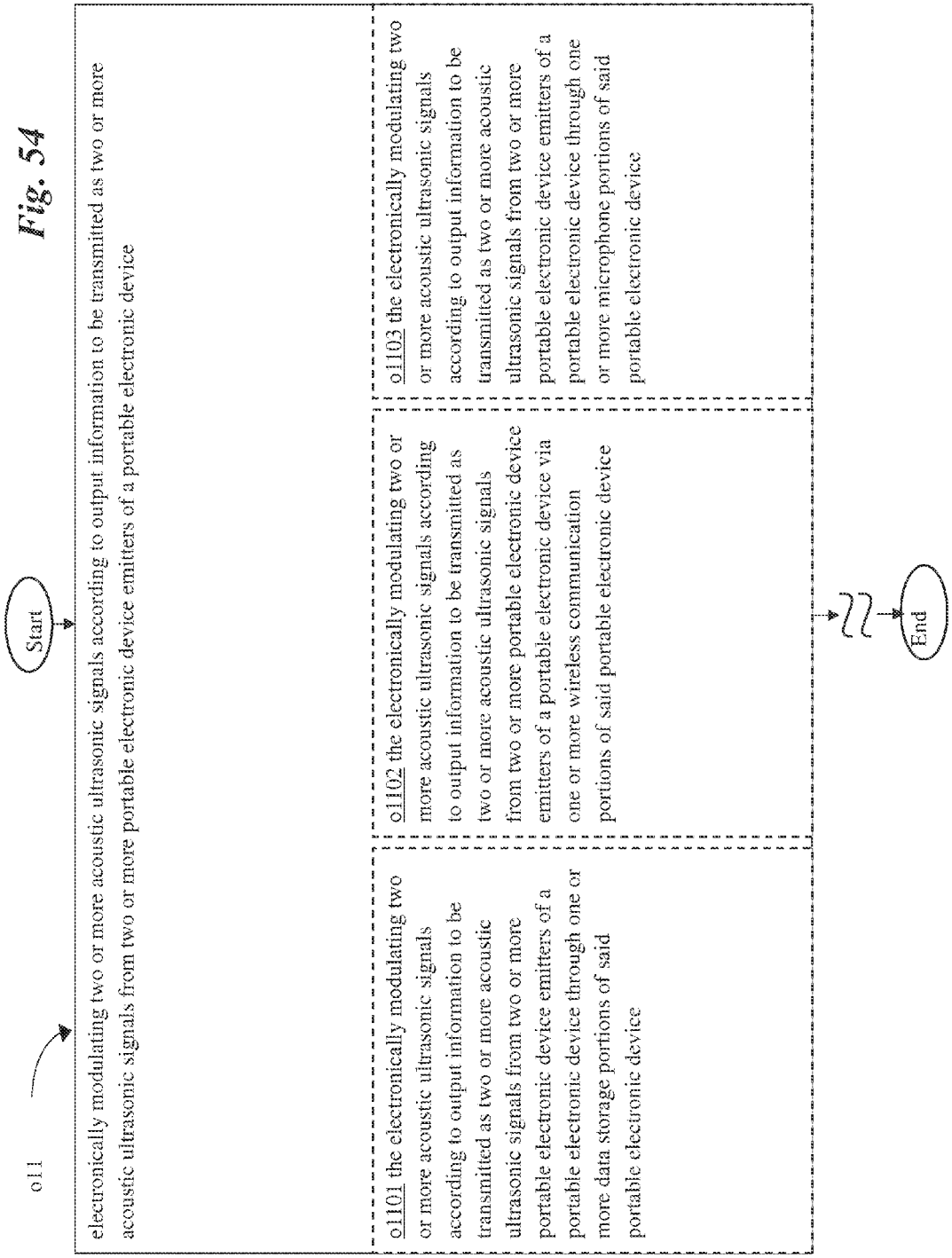
FIG. 54 is a high-level flowchart including exemplary implementations of operation o11 of FIG. 53.

In one or more implementations, as shown in FIG. 54, operation o11 includes an operation o1101 for the electronically modulating two or more acoustic ultrasonic signals according to output information to be transmitted as two or more acoustic ultrasonic signals from two or more portable electronic device emitters of a portable electronic device through one or more data storage portions of said portable electronic device. Origination of an illustratively derived modulating data storage component group can be accomplished through skilled in the art design choice selection of one or more of the above depicted components from one or more of the above depicted subsystems shown in FIG. 25. Components from the modulating data storage component group can be used in implementing execution of the one or more modulating data storage instructions i1101 of FIG. 39, can be used in performance of the modulating data storage electrical circuitry arrangement e1101 of FIG. 32, and/or can be used in otherwise fulfillment of the operation o1101. An exemplary non-transitory signal bearing medium version of the information storage subsystem s200 is depicted in FIG. 39 as bearing the one or more modulating data storage instructions i1101 that when executed will direct performance of the operation o1101. Furthermore, the modulating data storage electrical circuitry arrangement ("elec circ arrange") e1101, when activated, will perform the operation o1101. Also, the modulating data storage module m1101, when executed and/or activated, will direct performance of and/or perform the operation o1101. For instance, in one or more exemplary implementations, the one or more modulating data storage instructions i1101, when executed, direct performance of the operation o1101 in the illustrative depiction as follows, and/or the modulating data storage electrical circuitry arrangement e1101, when activated, performs the operation o1101 in the illustrative depiction as follows, and/or the modulating data storage module m1101, when executed and/or activated, directs performance of and/or performs the operation o1101 in the illustrative depiction as follows, and/or the operation o1101 is otherwise carried out in the illustrative depiction as follows: the electronically modulating (e.g. through reception of cable communication packets, etc.) two or more acoustic ultrasonic signals (e.g. via multiple acoustic ultrasonic signals configured to be demodulated through mutual interference therewith to at least in part result in one or more acoustic audio signals, etc.) according to output information (e.g. including lecture formatted information, etc.) to be transmitted (e.g. through one or more cable interface portions, etc.) as two or more acoustic ultrasonic signals (e.g. via multiple acoustic ultrasonic signals configured to be demodulated through mutual interference therewith to at least in part result in one or more acoustic audio signals, etc.) from two or more portable electronic device emitters (e.g. including one or more 3G mobile components, etc.) of a portable electronic device (e.g. including one or more 3G mobile components, etc.) through one or more data storage portions of said portable electronic device (e.g. including one or more tablet memory portions, etc.).

In one or more implementations, as shown in FIG. 54, operation o11 includes an operation o1102 for the electronically modulating two or more acoustic ultrasonic signals according to output information to be transmitted as two or more acoustic ultrasonic signals from two or more portable electronic device emitters of a portable electronic device via one or more wireless communication portions of said portable electronic device. Origination of an illustratively derived modulating wireless component group can be accomplished through skilled in the art design choice selection of one or more of the above depicted components from one or more of the above depicted subsystems shown in FIG. 25. Components from the modulating wireless component group can be used in implementing execution of the one or more modulating wireless instructions i1102 of FIG. 39, can be used in performance of the modulating wireless electrical circuitry arrangement e1102 of FIG. 32, and/or can be used in otherwise fulfillment of the operation o1102. An exemplary non-transitory signal bearing medium version of the information storage subsystem s200 is depicted in FIG. 39 as bearing the one or more modulating wireless instructions i1102 that when executed will direct performance of the operation o1102. Furthermore, the modulating wireless electrical circuitry arrangement ("elec circ arrange") e1102, when activated, will perform the operation o1102. Also, the modulating wireless module m1102, when executed and/or activated, will direct performance of and/or perform the operation o1102. For instance, in one or more exemplary implementations, the one or more modulating wireless instructions i1102, when executed, direct performance of the operation o1102 in the illustrative depiction as follows, and/or the modulating wireless electrical circuitry arrangement e1102, when activated, performs the operation o1102 in the illustrative depiction as follows, and/or the modulating wireless module m1102, when executed and/or activated, directs performance of and/or performs the operation o1102 in the illustrative depiction as follows, and/or the operation o1102 is otherwise carried out in the illustrative depiction as follows: the electronically modulating (e.g. via Wi-Fi signal reception, etc.) two or more acoustic ultrasonic signals (e.g. via one or more acoustic ultrasonic signals configured to be demodulated through nonlinear atmospheric interaction to at least in part generate one or more acoustic audio signals, etc.) according to output information (e.g. including foreign language speech information, etc.) to be transmitted (e.g. via one or more speaker portions, etc.) as two or more acoustic ultrasonic signals (e.g. via one or more acoustic ultrasonic signals configured to be demodulated through nonlinear atmospheric interaction to at least in part generate one or more acoustic audio signals, etc.) from two or more portable electronic device emitters (e.g. including one or more cellular components, etc.) of a portable electronic device (e.g. including one or more cellular components, etc.) via one or more wireless communication portions of said portable electronic device (e.g. including one or more tablet WiFi, etc.).

In one or more implementations, as shown in FIG. 54, operation o11 includes an operation o1103 for the electronically modulating two or more acoustic ultrasonic signals according to output information to be transmitted as two or more acoustic ultrasonic signals from two or more portable electronic device emitters of a portable electronic device through one or more microphone portions of said portable electronic device. Origination of an illustratively derived modulating microphone component group can be accomplished through skilled in the art design choice selection of one or more of the above depicted components from one or more of the above depicted subsystems shown in FIG. 25. Components from the modulating microphone component group can be used in implementing execution of the one or more modulating microphone instructions i1103 of FIG. 39, can be used in performance of the modulating microphone electrical circuitry arrangement e1103 of FIG. 32, and/or can be used in otherwise fulfillment of the operation o1103. An exemplary non-transitory signal bearing medium version of the information storage subsystem s200 is depicted in FIG. 39 as bearing the one or more modulating microphone instructions i1103 that when executed will direct performance of the operation o1103. Furthermore, the modulating microphone electrical circuitry arrangement ("elec circ arrange") e1103, when activated, will perform the operation o1103. Also, the modulating microphone module m1103, when executed and/or activated, will direct performance of and/or perform the operation o1103. For instance, in one or more exemplary implementations, the one or more modulating microphone instructions i1103, when executed, direct performance of the operation o1103 in the illustrative depiction as follows, and/or the modulating microphone electrical circuitry arrangement e1103, when activated, performs the operation o1103 in the illustrative depiction as follows, and/or the modulating microphone module m1103, when executed and/or activated, directs performance of and/or performs the operation o1103 in the illustrative depiction as follows, and/or the operation o1103 is otherwise carried out in the illustrative depiction as follows: the electronically modulating (e.g. by near-field infrared receiver, etc.) two or more acoustic ultrasonic signals (e.g. via one or more acoustic ultrasonic signals configured to be demodulated through nonlinear human tissue interaction to at least in part produce one or more acoustic audio signals, etc.) according to output information (e.g. including classical music selection information, etc.) to be transmitted (e.g. by one or more transducer portions, etc.) as two or more acoustic ultrasonic signals (e.g. via one or more acoustic ultrasonic signals configured to be demodulated through nonlinear human tissue interaction to at least in part produce one or more acoustic audio signals, etc.) from two or more portable electronic device emitters (e.g. including one or more 4G components, etc.) of a portable electronic device (e.g. including one or more 4G components, etc.) through one or more microphone portions of said portable electronic device (e.g. including one or more smart phone directional microphone portions, etc.).

Figure 55:
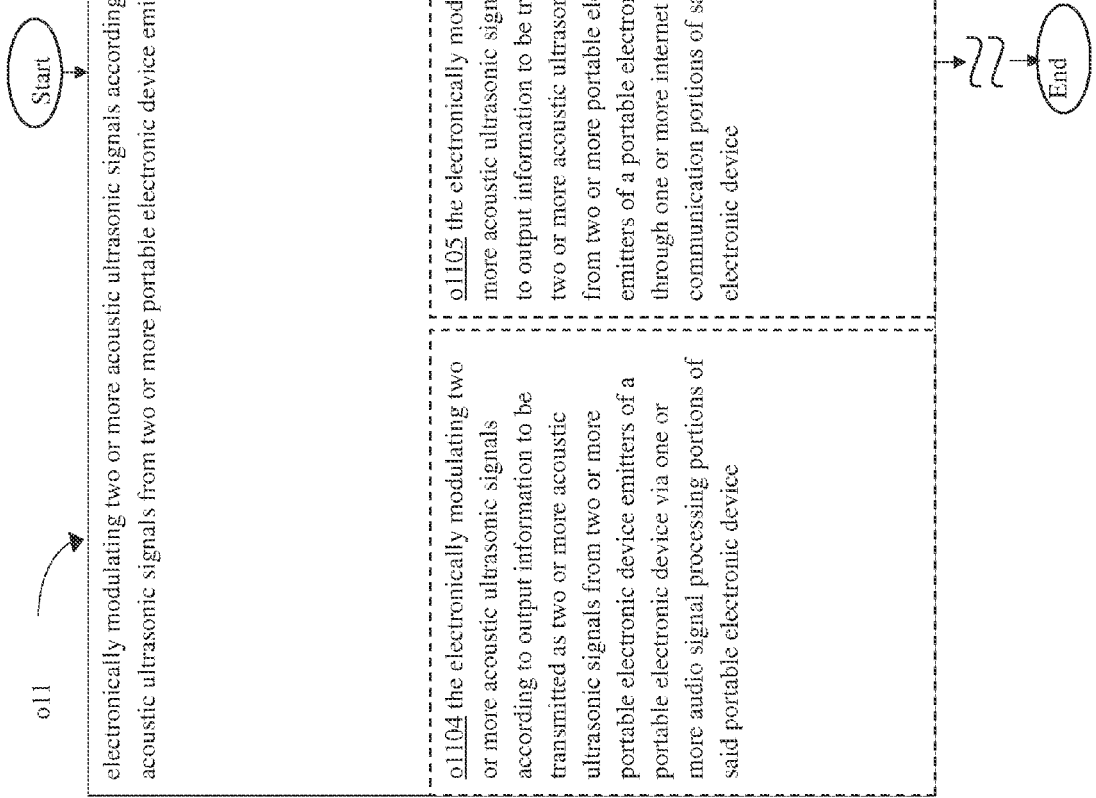
FIG. 55 is a high-level flowchart including exemplary implementations of operation o11 of FIG. 53.

In one or more implementations, as shown in FIG. 55, operation o11 includes an operation o1104 for the electronically modulating two or more acoustic ultrasonic signals according to output information to be transmitted as two or more acoustic ultrasonic signals from two or more portable electronic device emitters of a portable electronic device via one or more audio signal processing portions of said portable electronic device. Origination of an illustratively derived modulating audio component group can be accomplished through skilled in the art design choice selection of one or more of the above depicted components from one or more of the above depicted subsystems shown in FIG. 25. Components from the modulating audio component group can be used in implementing execution of the one or more modulating audio instructions i1104 of FIG. 39, can be used in performance of the modulating audio electrical circuitry arrangement e1104 of FIG. 32, and/or can be used in otherwise fulfillment of the operation o1104. An exemplary non-transitory signal bearing medium version of the information storage subsystem s200 is depicted in FIG. 39 as bearing the one or more modulating audio instructions i1104 that when executed will direct performance of the operation o1104. Furthermore, the modulating audio electrical circuitry arrangement ("elec circ arrange") e1104, when activated, will perform the operation o1104. Also, the modulating audio module m1104, when executed and/or activated, will direct performance of and/or perform the operation o1104. For instance, in one or more exemplary implementations, the one or more modulating audio instructions i1104, when executed, direct performance of the operation o1104 in the illustrative depiction as follows, and/or the modulating audio electrical circuitry arrangement e1104, when activated, performs the operation o1104 in the illustrative depiction as follows, and/or the modulating audio module m1104, when executed and/or activated, directs performance of and/or performs the operation o1104 in the illustrative depiction as follows, and/or the operation o1104 is otherwise carried out in the illustrative depiction as follows: the electronically modulating (e.g. from hard drive access, etc.) two or more acoustic ultrasonic signals (e.g. via one or more acoustic ultrasonic signals configured to be demodulated through nonlinear polymeric interaction to at least in part result in one or more acoustic audio signals, etc.) according to output information (e.g. including instructional lesson material information, etc.) to be transmitted (e.g. from one or more aperture portions, etc.) as two or more acoustic ultrasonic signals (e.g. via one or more acoustic ultrasonic signals configured to be demodulated through nonlinear polymeric interaction to at least in part result in one or more acoustic audio signals, etc.) from two or more portable electronic device emitters (e.g. including one or more WiFi components, etc.) of a portable electronic device (e.g. including one or more WiFi components, etc.) via one or more audio signal processing portions of said portable electronic device (e.g. including one or more smart phone fast fourier transform signal processing portions, etc.).

In one or more implementations, as shown in FIG. 55, operation o11 includes an operation o1105 for the electronically modulating two or more acoustic ultrasonic signals according to output information to be transmitted as two or more acoustic ultrasonic signals from two or more portable electronic device emitters of a portable electronic device through one or more internet communication portions of said portable electronic device. Origination of an illustratively derived modulating internet component group can be accomplished through skilled in the art design choice selection of one or more of the above depicted components from one or more of the above depicted subsystems shown in FIG. 25. Components from the modulating internet component group can be used in implementing execution of the one or more modulating internet instructions i1105 of FIG. 39, can be used in performance of the modulating internet electrical circuitry arrangement e1105 of FIG. 32, and/or can be used in otherwise fulfillment of the operation o1105. An exemplary non-transitory signal bearing medium version of the information storage subsystem s200 is depicted in FIG. 39 as bearing the one or more modulating internet instructions i1105 that when executed will direct performance of the operation o1105. Furthermore, the modulating internet electrical circuitry arrangement ("elec circ arrange") e1105, when activated, will perform the operation o1105. Also, the modulating internet module m1105, when executed and/or activated, will direct performance of and/or perform the operation o1105. For instance, in one or more exemplary implementations, the one or more modulating internet instructions i1105, when executed, direct performance of the operation o1105 in the illustrative depiction as follows, and/or the modulating internet electrical circuitry arrangement e1105, when activated, performs the operation o1105 in the illustrative depiction as follows, and/or the modulating internet module m1105, when executed and/or activated, directs performance of and/or performs the operation o1105 in the illustrative depiction as follows, and/or the operation o1105 is otherwise carried out in the illustrative depiction as follows: the electronically modulating (e.g. using fiber optic communication, etc.) two or more acoustic ultrasonic signals (e.g. via one or more acoustic ultrasonic signals configured to be demodulated through nonlinear apparel interaction to at least in part produce one or more acoustic audio signals, etc.) according to output information (e.g. including warning tone information, etc.) to be transmitted (e.g. using one or more transmitter portions, etc.) as two or more acoustic ultrasonic signals (e.g. via one or more acoustic ultrasonic signals configured to be demodulated through nonlinear apparel interaction to at least in part produce one or more acoustic audio signals, etc.) from two or more portable electronic device emitters (e.g. including one or more infrared components, etc.) of a portable electronic device (e.g. including one or more infrared components, etc.) through one or more internet communication portions of said portable electronic device (e.g. including one or more laptop TCP/IP internet protocol portions, etc.).

In one or more implementations, as shown in FIG. 55, operation o11 includes an operation o1106 for the electronically modulating two or more acoustic ultrasonic signals according to output information to be transmitted as two or more acoustic ultrasonic signals from two or more portable electronic device emitters of a portable electronic device via one or more software portions of said portable electronic device. Origination of an illustratively derived modulating software component group can be accomplished through skilled in the art design choice selection of one or more of the above depicted components from one or more of the above depicted subsystems shown in FIG. 25. Components from the modulating software component group can be used in implementing execution of the one or more modulating software instructions i1106 of FIG. 39, can be used in performance of the modulating software electrical circuitry arrangement e1106 of FIG. 32, and/or can be used in otherwise fulfillment of the operation o1106. An exemplary non-transitory signal bearing medium version of the information storage subsystem s200 is depicted in FIG. 39 as bearing the one or more modulating software instructions i1106 that when executed will direct performance of the operation o1106. Furthermore, the modulating software electrical circuitry arrangement ("elec circ arrange") e1106, when activated, will perform the operation o1106. Also, the modulating software module m1106, when executed and/or activated, will direct performance of and/or perform the operation o1106. For instance, in one or more exemplary implementations, the one or more modulating software instructions i1106, when executed, direct performance of the operation o1106 in the illustrative depiction as follows, and/or the modulating software electrical circuitry arrangement e1106, when activated, performs the operation o1106 in the illustrative depiction as follows, and/or the modulating software module m1106, when executed and/or activated, directs performance of and/or performs the operation o1106 in the illustrative depiction as follows, and/or the operation o1106 is otherwise carried out in the illustrative depiction as follows: the electronically modulating (e.g. through sound wave reception, etc.) two or more acoustic ultrasonic signals (e.g. via one or more acoustic ultrasonic signals configured to be demodulated through nonlinear interaction with one or more solids to at least in part generate one or more acoustic audio signals, etc.) according to output information (e.g. including white noise information, etc.) to be transmitted (e.g. through one or more air-coupled transducer portions, etc.) as two or more acoustic ultrasonic signals (e.g. via one or more acoustic ultrasonic signals configured to be demodulated through nonlinear interaction with one or more solids to at least in part generate one or more acoustic audio signals, etc.) from two or more portable electronic device emitters (e.g. including one or more personal digital assistant components, etc.) of a portable electronic device (e.g. including one or more personal digital assistant components, etc.) via one or more software portions of said portable electronic device (e.g. including one or more internet browser tablet software portions, etc.).

Figure 56:
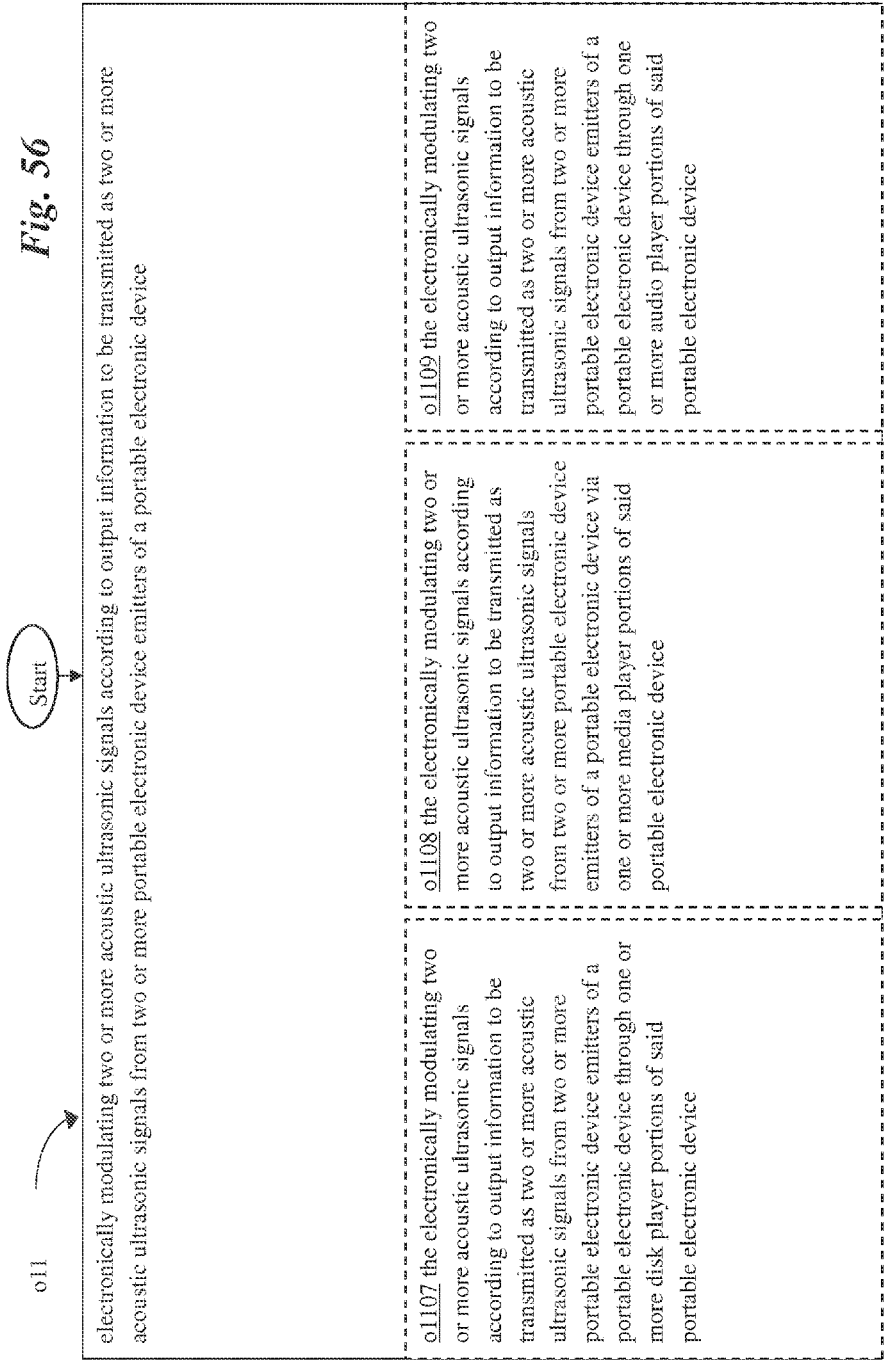
FIG. 56 is a high-level flowchart including exemplary implementations of operation o11 of FIG. 53.

In one or more implementations, as shown in FIG. 56, operation o11 includes an operation o1107 for the electronically modulating two or more acoustic ultrasonic signals according to output information to be transmitted as two or more acoustic ultrasonic signals from two or more portable electronic device emitters of a portable electronic device through one or more disk player portions of said portable electronic device. Origination of an illustratively derived modulating disk player component group can be accomplished through skilled in the art design choice selection of one or more of the above depicted components from one or more of the above depicted subsystems shown in FIG. 25. Components from the modulating disk player component group can be used in implementing execution of the one or more modulating disk player instructions i1107 of FIG. 39, can be used in performance of the modulating disk player electrical circuitry arrangement e1107 of FIG. 32, and/or can be used in otherwise fulfillment of the operation o1107. An exemplary non-transitory signal bearing medium version of the information storage subsystem s200 is depicted in FIG. 39 as bearing the one or more modulating disk player instructions i1107 that when executed will direct performance of the operation o1107. Furthermore, the modulating disk player electrical circuitry arrangement ("elec circ arrange") e1107, when activated, will perform the operation o1107. Also, the modulating disk player module m1107, when executed and/or activated, will direct performance of and/or perform the operation o1107. For instance, in one or more exemplary implementations, the one or more modulating disk player instructions i1107, when executed, direct performance of the operation o1107 in the illustrative depiction as follows, and/or the modulating disk player electrical circuitry arrangement e1107, when activated, performs the operation o1107 in the illustrative depiction as follows, and/or the modulating disk player module m1107, when executed and/or activated, directs performance of and/or performs the operation o1107 in the illustrative depiction as follows, and/or the operation o1107 is otherwise carried out in the illustrative depiction as follows: the electronically modulating (e.g. via radio frequency antenna, etc.) two or more acoustic ultrasonic signals (e.g. via one or more acoustic ultrasonic signals including signals having one or more frequencies above 60 kHz, etc.) according to output information (e.g. including varying pitch information, etc.) to be transmitted (e.g. via one or more thin-film membrane portions, etc.) as two or more acoustic ultrasonic signals (e.g. via one or more acoustic ultrasonic signals including signals having one or more frequencies above 60 kHz, etc.) from two or more portable electronic device emitters (e.g. including one or more smart phone components, etc.) of a portable electronic device (e.g. including one or more smart phone components, etc.) through one or more disk player portions of said portable electronic device (e.g. including one or more laptop Blu-Ray player portions, etc.).

In one or more implementations, as shown in FIG. 56, operation o11 includes an operation o1108 for the electronically modulating two or more acoustic ultrasonic signals according to output information to be transmitted as two or more acoustic ultrasonic signals from two or more portable electronic device emitters of a portable electronic device via one or more media player portions of said portable electronic device. Origination of an illustratively derived modulating media player component group can be accomplished through skilled in the art design choice selection of one or more of the above depicted components from one or more of the above depicted subsystems shown in FIG. 25. Components from the modulating media player component group can be used in implementing execution of the one or more modulating media player instructions i1108 of FIG. 39, can be used in performance of the modulating media player electrical circuitry arrangement e1108 of FIG. 32, and/or can be used in otherwise fulfillment of the operation o1108. An exemplary non-transitory signal bearing medium version of the information storage subsystem s200 is depicted in FIG. 39 as bearing the one or more modulating media player instructions i1108 that when executed will direct performance of the operation o1108. Furthermore, the modulating media player electrical circuitry arrangement ("elec circ arrange") e1108, when activated, will perform the operation o1108. Also, the modulating media player module m1108, when executed and/or activated, will direct performance of and/or perform the operation o1108. For instance, in one or more exemplary implementations, the one or more modulating media player instructions i1108, when executed, direct performance of the operation o1108 in the illustrative depiction as follows, and/or the modulating media player electrical circuitry arrangement e1108, when activated, performs the operation o1108 in the illustrative depiction as follows, and/or the modulating media player module m1108, when executed and/or activated, directs performance of and/or performs the operation o1108 in the illustrative depiction as follows, and/or the operation o1108 is otherwise carried out in the illustrative depiction as follows: the electronically modulating (e.g. by reception of wireless transmission, etc.) two or more acoustic ultrasonic signals (e.g. via one or more acoustic ultrasonic signals including signals having one or more frequencies above 80 kHz, etc.) according to output information (e.g. including note sequence information, etc.) to be transmitted (e.g. by one or more resonant surface portions, etc.) as two or more acoustic ultrasonic signals (e.g. via one or more acoustic ultrasonic signals including signals having one or more frequencies above 80 kHz, etc.) from two or more portable electronic device emitters (e.g. including one or more cell phone components, etc.) of a portable electronic device (e.g. including one or more cell phone components, etc.) via one or more media player portions of said portable electronic device (e.g. including one or more tablet mp4 player portions, etc.).

In one or more implementations, as shown in FIG. 56, operation o11 includes an operation o1109 for the electronically modulating two or more acoustic ultrasonic signals according to output information to be transmitted as two or more acoustic ultrasonic signals from two or more portable electronic device emitters of a portable electronic device through one or more audio player portions of said portable electronic device. Origination of an illustratively derived modulating audio player component group can be accomplished through skilled in the art design choice selection of one or more of the above depicted components from one or more of the above depicted subsystems shown in FIG. 25. Components from the modulating audio player component group can be used in implementing execution of the one or more modulating audio player instructions i1109 of FIG. 39, can be used in performance of the modulating audio player electrical circuitry arrangement e1109 of FIG. 32, and/or can be used in otherwise fulfillment of the operation o1109. An exemplary non-transitory signal bearing medium version of the information storage subsystem s200 is depicted in FIG. 39 as bearing the one or more modulating audio player instructions i1109 that when executed will direct performance of the operation o1109. Furthermore, the modulating audio player electrical circuitry arrangement ("elec circ arrange") e1109, when activated, will perform the operation o1109. Also, the modulating audio player module m1109, when executed and/or activated, will direct performance of and/or perform the operation o1109. For instance, in one or more exemplary implementations, the one or more modulating audio player instructions i1109, when executed, direct performance of the operation o1109 in the illustrative depiction as follows, and/or the modulating audio player electrical circuitry arrangement e1109, when activated, performs the operation o1109 in the illustrative depiction as follows, and/or the modulating audio player module m1109, when executed and/or activated, directs performance of and/or performs the operation o1109 in the illustrative depiction as follows, and/or the operation o1109 is otherwise carried out in the illustrative depiction as follows: the electronically modulating (e.g. from memory stick access, etc.) two or more acoustic ultrasonic signals (e.g. via one or more acoustic ultrasonic signals including signals having one or more frequencies above 100 kHz, etc.) according to output information (e.g. including two-way conversation information, etc.) to be transmitted (e.g. from one or more signal processor portions, etc.) as two or more acoustic ultrasonic signals (e.g. via one or more acoustic ultrasonic signals including signals having one or more frequencies above 100 kHz, etc.) from two or more portable electronic device emitters (e.g. including one or more laptop components, etc.) of a portable electronic device (e.g. including one or more laptop components, etc.) through one or more audio player portions of said portable electronic device (e.g. including one or more mp3 player portions, etc.).

Figure 57:
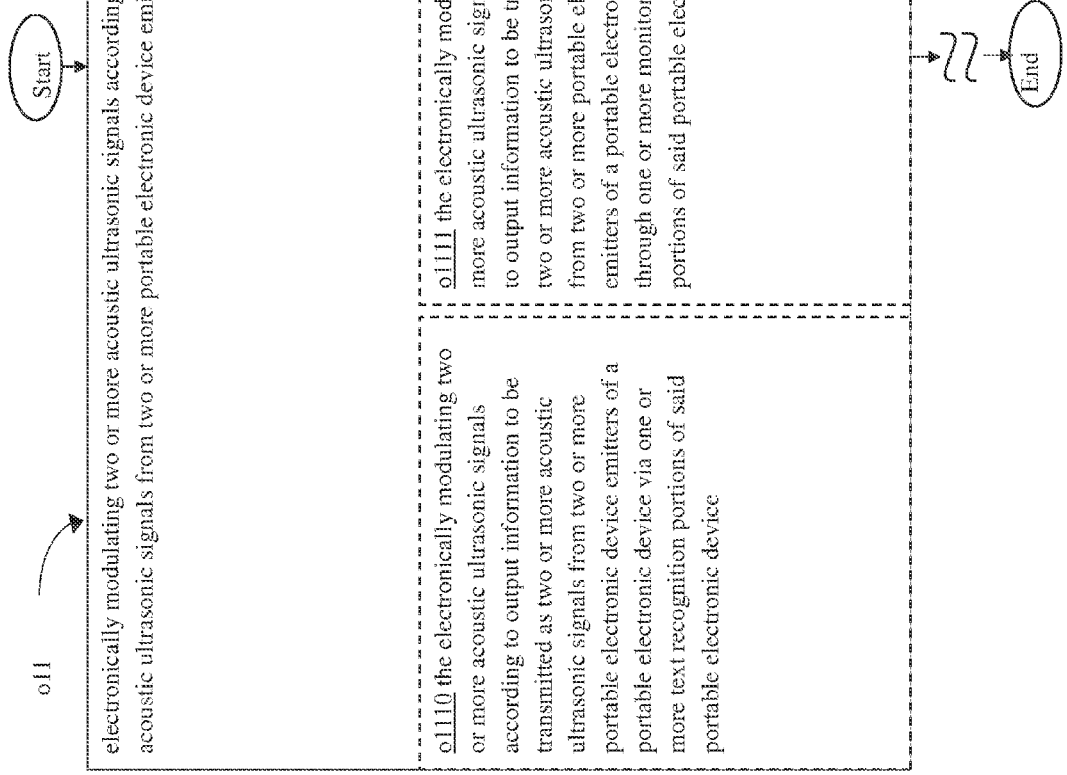
FIG. 57 is a high-level flowchart including exemplary implementations of operation o11 of FIG. 53.

In one or more implementations, as shown in FIG. 57, operation o11 includes an operation o1110 for the electronically modulating two or more acoustic ultrasonic signals according to output information to be transmitted as two or more acoustic ultrasonic signals from two or more portable electronic device emitters of a portable electronic device via one or more text recognition portions of said portable electronic device. Origination of an illustratively derived modulating text recognition component group can be accomplished through skilled in the art design choice selection of one or more of the above depicted components from one or more of the above depicted subsystems shown in FIG. 25. Components from the modulating text recognition component group can be used in implementing execution of the one or more modulating text recognition instructions i1110 of FIG. 39, can be used in performance of the modulating text recognition electrical circuitry arrangement e1110 of FIG. 32, and/or can be used in otherwise fulfillment of the operation o1110. An exemplary non-transitory signal bearing medium version of the information storage subsystem s200 is depicted in FIG. 39 as bearing the one or more modulating text recognition instructions i1110 that when executed will direct performance of the operation o1110. Furthermore, the modulating text recognition electrical circuitry arrangement ("elec circ arrange") e1110, when activated, will perform the operation o1110. Also, the modulating text recognition module m1110, when executed and/or activated, will direct performance of and/or perform the operation o1110. For instance, in one or more exemplary implementations, the one or more modulating text recognition instructions i1110, when executed, direct performance of the operation o1110 in the illustrative depiction as follows, and/or the modulating text recognition electrical circuitry arrangement e1110, when activated, performs the operation o1110 in the illustrative depiction as follows, and/or the modulating text recognition module m1110, when executed and/or activated, directs performance of and/or performs the operation o1110 in the illustrative depiction as follows, and/or the operation o1110 is otherwise carried out in the illustrative depiction as follows: the electronically modulating (e.g. using flash drive stored data, etc.) two or more acoustic ultrasonic signals (e.g. via one or more acoustic ultrasonic signals including signals having one or more frequencies above 120 kHz, etc.) according to output information (e.g. including confidential information, etc.) to be transmitted (e.g. using one or more transmitter portions, etc.) as two or more acoustic ultrasonic signals (e.g. via one or more acoustic ultrasonic signals including signals having one or more frequencies above 120 kHz, etc.) from two or more portable electronic device emitters (e.g. including one or more tablet computer components, etc.) of a portable electronic device (e.g. including one or more tablet computer components, etc.) via one or more text recognition portions of said portable electronic device (e.g. including one or more laptop based text reading software portions, etc.).

In one or more implementations, as shown in FIG. 57, operation o11 includes an operation o1111 for the electronically modulating two or more acoustic ultrasonic signals according to output information to be transmitted as two or more acoustic ultrasonic signals from two or more portable electronic device emitters of a portable electronic device through one or more monitor alarm system portions of said portable electronic device. Origination of an illustratively derived modulating monitor alarm component group can be accomplished through skilled in the art design choice selection of one or more of the above depicted components from one or more of the above depicted subsystems shown in FIG. 25. Components from the modulating monitor alarm component group can be used in implementing execution of the one or more modulating monitor alarm instructions i1111 of FIG. 39, can be used in performance of the modulating monitor alarm electrical circuitry arrangement e1111 of FIG. 32, and/or can be used in otherwise fulfillment of the operation o1111. An exemplary non-transitory signal bearing medium version of the information storage subsystem s200 is depicted in FIG. 39 as bearing the one or more modulating monitor alarm instructions i1111 that when executed will direct performance of the operation o1111. Furthermore, the modulating monitor alarm electrical circuitry arrangement ("elec circ arrange") e1111, when activated, will perform the operation o1111. Also, the modulating monitor alarm module m1111, when executed and/or activated, will direct performance of and/or perform the operation o1111. For instance, in one or more exemplary implementations, the one or more modulating monitor alarm instructions i1111, when executed, direct performance of the operation o1111 in the illustrative depiction as follows, and/or the modulating monitor alarm electrical circuitry arrangement e1111, when activated, performs the operation o1111 in the illustrative depiction as follows, and/or the modulating monitor alarm module m1111, when executed and/or activated, directs performance of and/or performs the operation o1111 in the illustrative depiction as follows, and/or the operation o1111 is otherwise carried out in the illustrative depiction as follows: the electronically modulating (e.g. through processor synthesized information, etc.) two or more acoustic ultrasonic signals (e.g. via one or more acoustic ultrasonic signals including signals having one or more frequencies above 140 kHz, etc.) according to output information (e.g. including eavesdropping information, etc.) to be transmitted (e.g. through one or more transducer membrane portions, etc.) as two or more acoustic ultrasonic signals (e.g. via one or more acoustic ultrasonic signals including signals having one or more frequencies above 140 kHz, etc.) from two or more portable electronic device emitters (e.g. including one or more mp3 player components, etc.) of a portable electronic device (e.g. including one or more mp3 player components, etc.) through one or more monitor alarm system portions of said portable electronic device (e.g. including one or more alarm based motion sensor portions, etc.).

In one or more implementations, as shown in FIG. 57, operation o11 includes an operation o1112 for electronically modulating two or more acoustic ultrasonic signals the according to output information to be transmitted as two or more acoustic ultrasonic signals from two or more portable electronic device emitters of a portable electronic device including narrative speeches. Origination of an illustratively derived modulating narrative component group can be accomplished through skilled in the art design choice selection of one or more of the above depicted components from one or more of the above depicted subsystems shown in FIG. 25. Components from the modulating narrative component group can be used in implementing execution of the one or more modulating narrative instructions i1112 of FIG. 39, can be used in performance of the modulating narrative electrical circuitry arrangement e1112 of FIG. 32, and/or can be used in otherwise fulfillment of the operation o1112. An exemplary non-transitory signal bearing medium version of the information storage subsystem s200 is depicted in FIG. 39 as bearing the one or more modulating narrative instructions i1112 that when executed will direct performance of the operation o1112. Furthermore, the modulating narrative electrical circuitry arrangement ("elec circ arrange") e1112, when activated, will perform the operation o1112. Also, the modulating narrative module m1112, when executed and/or activated, will direct performance of and/or perform the operation o1112. For instance, in one or more exemplary implementations, the one or more modulating narrative instructions i1112, when executed, direct performance of the operation o1112 in the illustrative depiction as follows, and/or the modulating narrative electrical circuitry arrangement e1112, when activated, performs the operation o1112 in the illustrative depiction as follows, and/or the modulating narrative module m1112, when executed and/or activated, directs performance of and/or performs the operation o1112 in the illustrative depiction as follows, and/or the operation o1112 is otherwise carried out in the illustrative depiction as follows: electronically modulating (e.g. via ROM drive reads, etc.) two or more acoustic ultrasonic signals (e.g. via one or more acoustic ultrasonic signals including signals having one or more frequencies above 160 kHz, etc.) the according to output information (e.g. including pre-recorded information, etc.) to be transmitted (e.g. via one or more transducer array portions, etc.) as two or more acoustic ultrasonic signals (e.g. via one or more acoustic ultrasonic signals including signals having one or more frequencies above 160 kHz, etc.) from two or more portable electronic device emitters (e.g. including one or more mobile phone components, etc.) of a portable electronic device (e.g. including one or more mobile phone components, etc.) including narrative speeches (e.g. including one or more online school classroom lectures, etc.).

Figure 58:
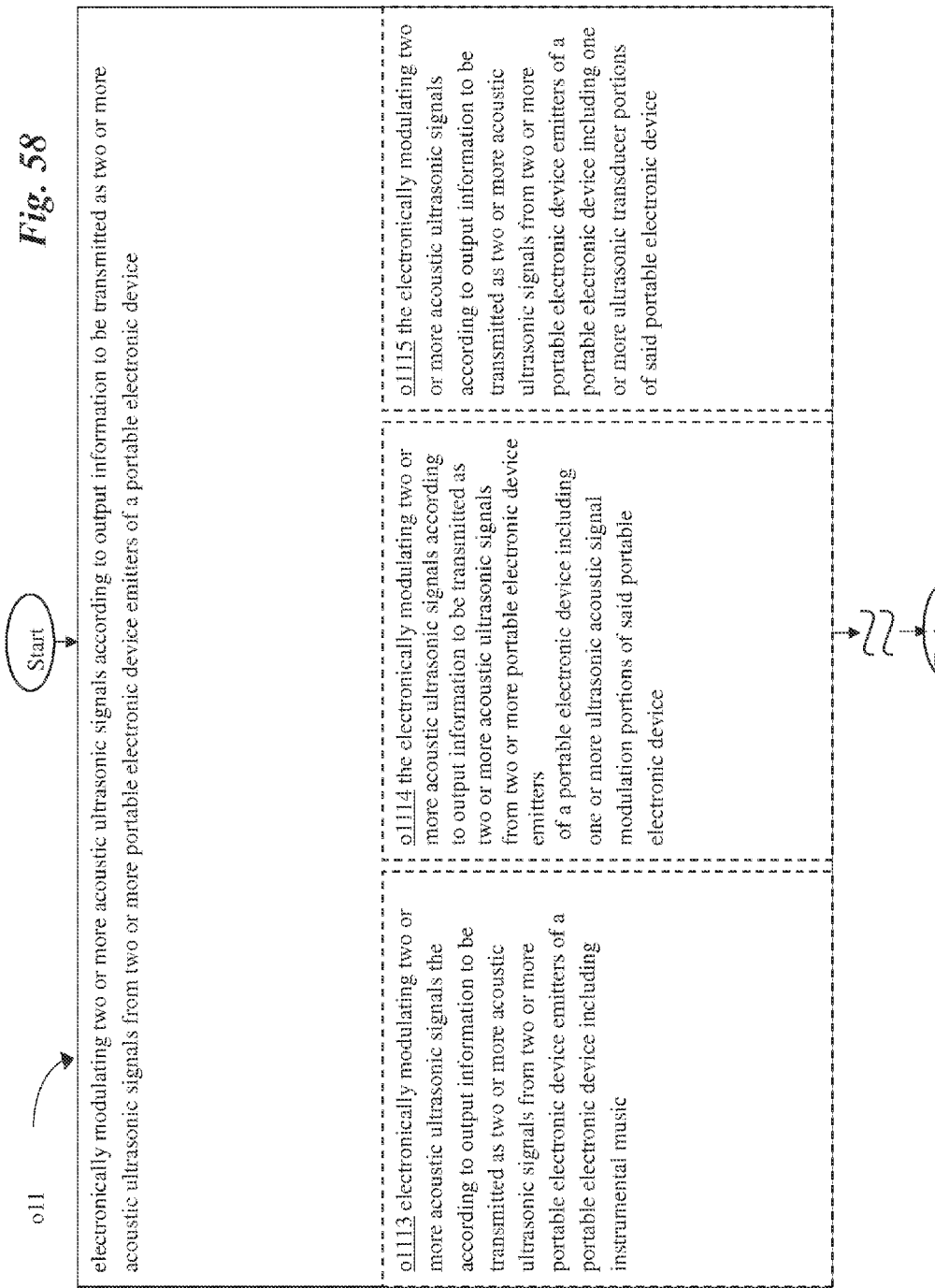
FIG. 58 is a high-level flowchart including exemplary implementations of operation o11 of FIG. 53.

In one or more implementations, as shown in FIG. 58, operation o11 includes an operation o1113 for electronically modulating two or more acoustic ultrasonic signals the according to output information to be transmitted as two or more acoustic ultrasonic signals from two or more portable electronic device emitters of a portable electronic device including instrumental music. Origination of an illustratively derived modulating instrumental component group can be accomplished through skilled in the art design choice selection of one or more of the above depicted components from one or more of the above depicted subsystems shown in FIG. 25. Components from the modulating instrumental component group can be used in implementing execution of the one or more modulating instrumental instructions i1113 of FIG. 39, can be used in performance of the modulating instrumental electrical circuitry arrangement e1113 of FIG. 32, and/or can be used in otherwise fulfillment of the operation o1113. An exemplary non-transitory signal bearing medium version of the information storage subsystem s200 is depicted in FIG. 39 as bearing the one or more modulating instrumental instructions i1113 that when executed will direct performance of the operation o1113. Furthermore, the modulating instrumental electrical circuitry arrangement ("elec circ arrange") e1113, when activated, will perform the operation o1113. Also, the modulating instrumental module m1113, when executed and/or activated, will direct performance of and/or perform the operation o1113. For instance, in one or more exemplary implementations, the one or more modulating instrumental instructions i1113, when executed, direct performance of the operation o1113 in the illustrative depiction as follows, and/or the modulating instrumental electrical circuitry arrangement e1113, when activated, performs the operation o1113 in the illustrative depiction as follows, and/or the modulating instrumental module m1113, when executed and/or activated, directs performance of and/or performs the operation o1113 in the illustrative depiction as follows, and/or the operation o1113 is otherwise carried out in the illustrative depiction as follows: electronically modulating (e.g. by CD-ROM playback, etc.) two or more acoustic ultrasonic signals (e.g. via one or more acoustic ultrasonic signals including signals having one or more frequencies above 180 kHz, etc.) the according to output information (e.g. including processor generated information, etc.) to be transmitted (e.g. by one or more membrane speaker portions, etc.) as two or more acoustic ultrasonic signals (e.g. via one or more acoustic ultrasonic signals including signals having one or more frequencies above 180 kHz, etc.) from two or more portable electronic device emitters (e.g. including one or more two-way radio components, etc.) of a portable electronic device (e.g. including one or more two-way radio components, etc.) including instrumental music (e.g. including one or more WAV file formatted music, etc.).

In one or more implementations, as shown in FIG. 58, operation o11 includes an operation o1114 for the electronically modulating two or more acoustic ultrasonic signals according to output information to be transmitted as two or more acoustic ultrasonic signals from two or more portable electronic device emitters of a portable electronic device including one or more ultrasonic acoustic signal modulation portions of said portable electronic device. Origination of an illustratively derived modulating signal modulation component group can be accomplished through skilled in the art design choice selection of one or more of the above depicted components from one or more of the above depicted subsystems shown in FIG. 25. Components from the modulating signal modulation component group can be used in implementing execution of the one or more modulating signal modulation instructions i1114 of FIG. 39, can be used in performance of the modulating signal modulation electrical circuitry arrangement e1114 of FIG. 32, and/or can be used in otherwise fulfillment of the operation o1114. An exemplary non-transitory signal bearing medium version of the information storage subsystem s200 is depicted in FIG. 39 as bearing the one or more modulating signal modulation instructions i1114 that when executed will direct performance of the operation o1114. Furthermore, the modulating signal modulation electrical circuitry arrangement ("elec circ arrange") e1114, when activated, will perform the operation o1114. Also, the modulating signal modulation module m1114, when executed and/or activated, will direct performance of and/or perform the operation o1114. For instance, in one or more exemplary implementations, the one or more modulating signal modulation instructions i1114, when executed, direct performance of the operation o1114 in the illustrative depiction as follows, and/or the modulating signal modulation electrical circuitry arrangement e1114, when activated, performs the operation o1114 in the illustrative depiction as follows, and/or the modulating signal modulation module m1114, when executed and/or activated, directs performance of and/or performs the operation o1114 in the illustrative depiction as follows, and/or the operation o1114 is otherwise carried out in the illustrative depiction as follows: the electronically modulating (e.g. from DVD player, etc.) two or more acoustic ultrasonic signals (e.g. via one or more acoustic ultrasonic signals including signals having one or more frequencies above 200 kHz, etc.) according to output information (e.g. including internet based information, etc.) to be transmitted (e.g. from one or more ultrasonic transducer portions, etc.) as two or more acoustic ultrasonic signals (e.g. via one or more acoustic ultrasonic signals including signals having one or more frequencies above 200 kHz, etc.) from two or more portable electronic device emitters (e.g. including one or more security network components, etc.) of a portable electronic device (e.g. including one or more security network components, etc.) including one or more ultrasonic acoustic signal modulation portions of said portable electronic device (e.g. including one or more 120 kHz acoustic ultrasonic signals modulated with audio music signals of a tablet device, etc.).

In one or more implementations, as shown in FIG. 58, operation o11 includes an operation o1115 for the electronically modulating two or more acoustic ultrasonic signals according to output information to be transmitted as two or more acoustic ultrasonic signals from two or more portable electronic device emitters of a portable electronic device including one or more ultrasonic transducer portions of said portable electronic device. Origination of an illustratively derived modulating ultrasonic transducer component group can be accomplished through skilled in the art design choice selection of one or more of the above depicted components from one or more of the above depicted subsystems shown in FIG. 25. Components from the modulating ultrasonic transducer component group can be used in implementing execution of the one or more modulating ultrasonic transducer instructions i1115 of FIG. 39, can be used in performance of the modulating ultrasonic transducer electrical circuitry arrangement e1115 of FIG. 32, and/or can be used in otherwise fulfillment of the operation o1115. An exemplary non-transitory signal bearing medium version of the information storage subsystem s200 is depicted in FIG. 39 as bearing the one or more modulating ultrasonic transducer instructions i1115 that when executed will direct performance of the operation o1115. Furthermore, the modulating ultrasonic transducer electrical circuitry arrangement ("elec circ arrange") e1115, when activated, will perform the operation o1115. Also, the modulating ultrasonic transducer module m1115, when executed and/or activated, will direct performance of and/or perform the operation o1115. For instance, in one or more exemplary implementations, the one or more modulating ultrasonic transducer instructions i1115, when executed, direct performance of the operation o1115 in the illustrative depiction as follows, and/or the modulating ultrasonic transducer electrical circuitry arrangement e1115, when activated, performs the operation o1115 in the illustrative depiction as follows, and/or the modulating ultrasonic transducer module m1115, when executed and/or activated, directs performance of and/or performs the operation o1115 in the illustrative depiction as follows, and/or the operation o1115 is otherwise carried out in the illustrative depiction as follows: the electronically modulating (e.g. using mp3 media player, etc.) two or more acoustic ultrasonic signals (e.g. via multiple acoustic ultrasonic signals configured to be demodulated through mutual interference therewith to at least in part result in one or more acoustic audio signals, etc.) according to output information (e.g. including digital audio information, etc.) to be transmitted (e.g. using one or more electrostatic transducer portions, etc.) as two or more acoustic ultrasonic signals (e.g. via multiple acoustic ultrasonic signals configured to be demodulated through mutual interference therewith to at least in part result in one or more acoustic audio signals, etc.) from two or more portable electronic device emitters (e.g. including one or more netbook components, etc.) of a portable electronic device (e.g. including one or more netbook components, etc.) including one or more ultrasonic transducer portions of said portable electronic device (e.g. including one or more thin film transducer portions of a tablet computer, etc.).

Figure 59:
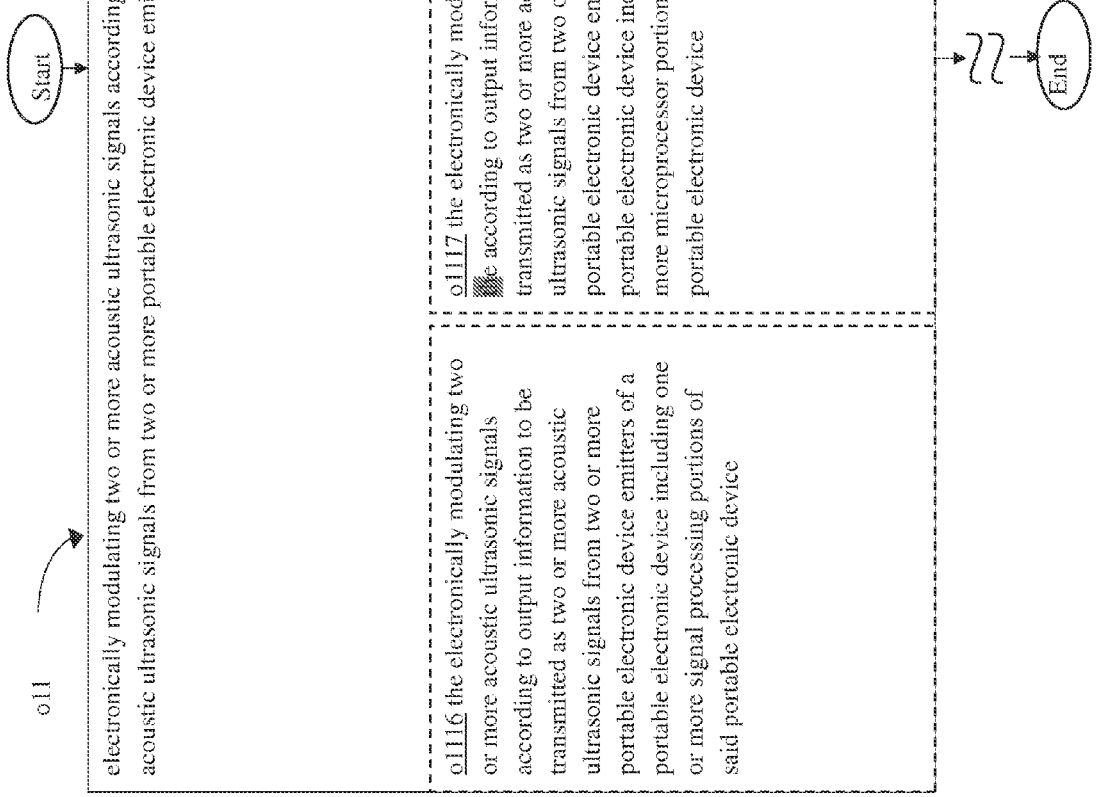
FIG. 59 is a high-level flowchart including exemplary implementations of operation o11 of FIG. 53.

In one or more implementations, as shown in FIG. 59, operation o11 includes an operation o1116 for the electronically modulating two or more acoustic ultrasonic signals according to output information to be transmitted as two or more acoustic ultrasonic signals from two or more portable electronic device emitters of a portable electronic device including one or more signal processing portions of said portable electronic device. Origination of an illustratively derived modulating signal processing component group can be accomplished through skilled in the art design choice selection of one or more of the above depicted components from one or more of the above depicted subsystems shown in FIG. 25. Components from the modulating signal processing component group can be used in implementing execution of the one or more modulating signal processing instructions i1116 of FIG. 39, can be used in performance of the modulating signal processing electrical circuitry arrangement e1116 of FIG. 32, and/or can be used in otherwise fulfillment of the operation o1116. An exemplary non-transitory signal bearing medium version of the information storage subsystem s200 is depicted in FIG. 39 as bearing the one or more modulating signal processing instructions i1116 that when executed will direct performance of the operation o1116. Furthermore, the modulating signal processing electrical circuitry arrangement ("elec circ arrange") e1116, when activated, will perform the operation o1116. Also, the modulating signal processing module m1116, when executed and/or activated, will direct performance of and/or perform the operation o1116. For instance, in one or more exemplary implementations, the one or more modulating signal processing instructions i1116, when executed, direct performance of the operation o1116 in the illustrative depiction as follows, and/or the modulating signal processing electrical circuitry arrangement e1116, when activated, performs the operation o1116 in the illustrative depiction as follows, and/or the modulating signal processing module m1116, when executed and/or activated, directs performance of and/or performs the operation o1116 in the illustrative depiction as follows, and/or the operation o1116 is otherwise carried out in the illustrative depiction as follows: the electronically modulating (e.g. through internet communication protocols, etc.) two or more acoustic ultrasonic signals (e.g. via one or more acoustic ultrasonic signals configured to be demodulated through nonlinear atmospheric interaction to at least in part generate one or more acoustic audio signals, etc.) according to output information (e.g. including analog audio information, etc.) to be transmitted (e.g. through one or more piezoelectric transducer portions, etc.) as two or more acoustic ultrasonic signals (e.g. via one or more acoustic ultrasonic signals configured to be demodulated through nonlinear atmospheric interaction to at least in part generate one or more acoustic audio signals, etc.) from two or more portable electronic device emitters (e.g. including one or more ultrabook components, etc.) of a portable electronic device (e.g. including one or more ultrabook components, etc.) including one or more signal processing portions of said portable electronic device (e.g. including one or more tablet signal compression processor portions, etc.).

In one or more implementations, as shown in FIG. 59, operation o11 includes an operation o1117 for the electronically modulating two or more acoustic ultrasonic signals according to output information to be transmitted as two or more acoustic ultrasonic signals from two or more portable electronic device emitters of a portable electronic device including one or more microprocessor portions of said portable electronic device. Origination of an illustratively derived modulating microprocessor component group can be accomplished through skilled in the art design choice selection of one or more of the above depicted components from one or more of the above depicted subsystems shown in FIG. 25. Components from the modulating microprocessor component group can be used in implementing execution of the one or more modulating microprocessor instructions i1117 of FIG. 39, can be used in performance of the modulating microprocessor electrical circuitry arrangement e1117 of FIG. 32, and/or can be used in otherwise fulfillment of the operation o1117. An exemplary non-transitory signal bearing medium version of the information storage subsystem s200 is depicted in FIG. 39 as bearing the one or more modulating microprocessor instructions i1117 that when executed will direct performance of the operation o1117. Furthermore, the modulating microprocessor electrical circuitry arrangement ("elec circ arrange") e1117, when activated, will perform the operation o1117. Also, the modulating microprocessor module m1117, when executed and/or activated, will direct performance of and/or perform the operation o1117. For instance, in one or more exemplary implementations, the one or more modulating microprocessor instructions i1117, when executed, direct performance of the operation o1117 in the illustrative depiction as follows, and/or the modulating microprocessor electrical circuitry arrangement e1117, when activated, performs the operation o1117 in the illustrative depiction as follows, and/or the modulating microprocessor module m1117, when executed and/or activated, directs performance of and/or performs the operation o1117 in the illustrative depiction as follows, and/or the operation o1117 is otherwise carried out in the illustrative depiction as follows: the electronically modulating (e.g. including one or more preamplifier portions, etc.) two or more acoustic ultrasonic signals (e.g. via one or more acoustic ultrasonic signals configured to be demodulated through nonlinear human tissue interaction to at least in part produce one or more acoustic audio signals, etc.) according to output information (e.g. including high frequency audio information, etc.) to be transmitted (e.g. via one or more electrostrictive transducer portions, etc.) as two or more acoustic ultrasonic signals (e.g. via one or more acoustic ultrasonic signals configured to be demodulated through nonlinear human tissue interaction to at least in part produce one or more acoustic audio signals, etc.) from two or more portable electronic device emitters (e.g. including one or more flip-phone components, etc.) of a portable electronic device (e.g. including one or more flip-phone components, etc.) including one or more microprocessor portions of said portable electronic device (e.g. including one or more smart phone microprocessor portions, etc.).

In one or more implementations, as shown in FIG. 59, operation o11 includes an operation o1118 for the electronically modulating two or more acoustic ultrasonic signals according to output information to be transmitted as two or more acoustic ultrasonic signals from two or more portable electronic device emitters of a portable electronic device including one or more digital processor portions of said portable electronic device for inserting digital information into said audio output information. Origination of an illustratively derived modulating for inserting digital component group can be accomplished through skilled in the art design choice selection of one or more of the above depicted components from one or more of the above depicted subsystems shown in FIG. 25. Components from the modulating for inserting digital component group can be used in implementing execution of the one or more modulating for inserting digital instructions i1118 of FIG. 39, can be used in performance of the modulating for inserting digital electrical circuitry arrangement e1118 of FIG. 32, and/or can be used in otherwise fulfillment of the operation o1118. An exemplary non-transitory signal bearing medium version of the information storage subsystem s200 is depicted in FIG. 39 as bearing the one or more modulating for inserting digital instructions i1118 that when executed will direct performance of the operation o1118. Furthermore, the modulating for inserting digital electrical circuitry arrangement ("elec circ arrange") e1118, when activated, will perform the operation o1118. Also, the modulating for inserting digital module m1118, when executed and/or activated, will direct performance of and/or perform the operation o1118. For instance, in one or more exemplary implementations, the one or more modulating for inserting digital instructions i1118, when executed, direct performance of the operation o1118 in the illustrative depiction as follows, and/or the modulating for inserting digital electrical circuitry arrangement e1118, when activated, performs the operation o1118 in the illustrative depiction as follows, and/or the modulating for inserting digital module m1118, when executed and/or activated, directs performance of and/or performs the operation o1118 in the illustrative depiction as follows, and/or the operation o1118 is otherwise carried out in the illustrative depiction as follows: the electronically modulating (e.g. including one or more transceiver portions, etc.) two or more acoustic ultrasonic signals (e.g. via one or more acoustic ultrasonic signals configured to be demodulated through nonlinear polymeric interaction to at least in part result in one or more acoustic audio signals, etc.) according to output information (e.g. including low frequency audio information, etc.) to be transmitted (e.g. by one or more electro-thermo-mechanical film transducer portions, etc.) as two or more acoustic ultrasonic signals (e.g. via one or more acoustic ultrasonic signals configured to be demodulated through nonlinear polymeric interaction to at least in part result in one or more acoustic audio signals, etc.) from two or more portable electronic device emitters (e.g. including one or more portable computer components, etc.) of a portable electronic device (e.g. including one or more portable computer components, etc.) including one or more digital processor portions of said portable electronic device for inserting digital information into said audio output information (e.g. including one or more tablet processor portions to insert one or more digital signatures to track acoustic audio reception quality from a notebook computer, etc.).

In one or more implementations, as shown in FIG. 60, operation o11 includes an operation o1119 for electronically modulating two or more acoustic ultrasonic signals according to output information to be transmitted as two or more acoustic ultrasonic signals from two or more portable electronic device emitters the of a portable electronic device as one or more electronic tablet computer systems. Origination of an illustratively derived modulating tablet computer component group can be accomplished through skilled in the art design choice selection of one or more of the above depicted components from one or more of the above depicted subsystems shown in FIG. 25. Components from the modulating tablet computer component group can be used in implementing execution of the one or more modulating tablet computer instructions i1119 of FIG. 39, can be used in performance of the modulating tablet computer electrical circuitry arrangement e1119 of FIG. 32, and/or can be used in otherwise fulfillment of the operation o1119. An exemplary non-transitory signal bearing medium version of the information storage subsystem s200 is depicted in FIG. 39 as bearing the one or more modulating tablet computer instructions i1119 that when executed will direct performance of the operation o1119. Furthermore, the modulating tablet computer electrical circuitry arrangement ("elec circ arrange") e1119, when activated, will perform the operation o1119. Also, the modulating tablet computer module m1119, when executed and/or activated, will direct performance of and/or perform the operation o1119. For instance, in one or more exemplary implementations, the one or more modulating tablet computer instructions i1119, when executed, direct performance of the operation o1119 in the illustrative depiction as follows, and/or the modulating tablet computer electrical circuitry arrangement e1119, when activated, performs the operation o1119 in the illustrative depiction as follows, and/or the modulating tablet computer module m1119, when executed and/or activated, directs performance of and/or performs the operation o1119 in the illustrative depiction as follows, and/or the operation o1119 is otherwise carried out in the illustrative depiction as follows: electronically modulating (e.g. including one or more digital amplifier portions, etc.) two or more acoustic ultrasonic signals (e.g. via one or more acoustic ultrasonic signals configured to be demodulated through nonlinear apparel interaction to at least in part produce one or more acoustic audio signals, etc.) according to output information (e.g. including lecture formatted information, etc.) to be transmitted (e.g. from one or more polyvinylidene fluoride film transducer portions, etc.) as two or more acoustic ultrasonic signals (e.g. via one or more acoustic ultrasonic signals configured to be demodulated through nonlinear apparel interaction to at least in part produce one or more acoustic audio signals, etc.) from two or more portable electronic device emitters (e.g. including one or more boombox components, etc.) the of a portable electronic device (e.g. including one or more boombox components, etc.) as one or more electronic tablet computer systems (e.g. including one or more 4G capable tablet computer portions, etc.).

In one or more implementations, as shown in FIG. 60, operation o11 includes an operation o1120 for electronically modulating two or more acoustic ultrasonic signals according to output information to be transmitted as two or more acoustic ultrasonic signals from two or more portable electronic device emitters the of a portable electronic device as one or more electronic handheld mobile device systems. Origination of an illustratively derived modulating handheld mobile component group can be accomplished through skilled in the art design choice selection of one or more of the above depicted components from one or more of the above depicted subsystems shown in FIG. 25. Components from the modulating handheld mobile component group can be used in implementing execution of the one or more modulating handheld mobile instructions i1120 of FIG. 40, can be used in performance of the modulating handheld mobile electrical circuitry arrangement e1120 of FIG. 33, and/or can be used in otherwise fulfillment of the operation o1120. An exemplary non-transitory signal bearing medium version of the information storage subsystem s200 is depicted in FIG. 40 as bearing the one or more modulating handheld mobile instructions i1120 that when executed will direct performance of the operation o1120. Furthermore, the modulating handheld mobile electrical circuitry arrangement ("elec circ arrange") e1120, when activated, will perform the operation o1120. Also, the modulating handheld mobile module m1120, when executed and/or activated, will direct performance of and/or perform the operation o1120. For instance, in one or more exemplary implementations, the one or more modulating handheld mobile instructions i1120, when executed, direct performance of the operation o1120 in the illustrative depiction as follows, and/or the modulating handheld mobile electrical circuitry arrangement e1120, when activated, performs the operation o1120 in the illustrative depiction as follows, and/or the modulating handheld mobile module m1120, when executed and/or activated, directs performance of and/or performs the operation o1120 in the illustrative depiction as follows, and/or the operation o1120 is otherwise carried out in the illustrative depiction as follows: electronically modulating (e.g. including one or more digital compression portions, etc.) two or more acoustic ultrasonic signals (e.g. via one or more acoustic ultrasonic signals configured to be demodulated through nonlinear interaction with one or more solids to at least in part generate one or more acoustic audio signals, etc.) according to output information (e.g. including foreign language speech information, etc.) to be transmitted (e.g. using one or more deposition transducer portions, etc.) as two or more acoustic ultrasonic signals (e.g. via one or more acoustic ultrasonic signals configured to be demodulated through nonlinear interaction with one or more solids to at least in part generate one or more acoustic audio signals, etc.) from two or more portable electronic device emitters (e.g. including one or more digital audio output components, etc.) the of a portable electronic device (e.g. including one or more digital audio output components, etc.) as one or more electronic handheld mobile device systems (e.g. including one or more smart phone portions, etc.).

In one or more implementations, as shown in FIG. 60, operation o11 includes an operation o1121 for electronically modulating two or more acoustic ultrasonic signals according to output information to be transmitted as two or more acoustic ultrasonic signals from two or more portable electronic device emitters the of a portable electronic device as one or more electronic cell phone systems. Origination of an illustratively derived modulating cell phone component group can be accomplished through skilled in the art design choice selection of one or more of the above depicted components from one or more of the above depicted subsystems shown in FIG. 25. Components from the modulating cell phone component group can be used in implementing execution of the one or more modulating cell phone instructions i1121 of FIG. 40, can be used in performance of the modulating cell phone electrical circuitry arrangement e1121 of FIG. 33, and/or can be used in otherwise fulfillment of the operation o1121. An exemplary non-transitory signal bearing medium version of the information storage subsystem s200 is depicted in FIG. 40 as bearing the one or more modulating cell phone instructions i1121 that when executed will direct performance of the operation o1121. Furthermore, the modulating cell phone electrical circuitry arrangement ("elec circ arrange") e1121, when activated, will perform the operation o1121. Also, the modulating cell phone module m1121, when executed and/or activated, will direct performance of and/or perform the operation o1121. For instance, in one or more exemplary implementations, the one or more modulating cell phone instructions i1121, when executed, direct performance of the operation o1121 in the illustrative depiction as follows, and/or the modulating cell phone electrical circuitry arrangement e1121, when activated, performs the operation o1121 in the illustrative depiction as follows, and/or the modulating cell phone module m1121, when executed and/or activated, directs performance of and/or performs the operation o1121 in the illustrative depiction as follows, and/or the operation o1121 is otherwise carried out in the illustrative depiction as follows: electronically modulating (e.g. including one or more signal limiter portions, etc.) two or more acoustic ultrasonic signals (e.g. via one or more acoustic ultrasonic signals including signals having one or more frequencies above 60 kHz, etc.) according to output information (e.g. including classical music selection information, etc.) to be transmitted (e.g. through one or more emitter array portions, etc.) as two or more acoustic ultrasonic signals (e.g. via one or more acoustic ultrasonic signals including signals having one or more frequencies above 60 kHz, etc.) from two or more portable electronic device emitters (e.g. including one or more CD player components, etc.) the of a portable electronic device (e.g. including one or more CD player components, etc.) as one or more electronic cell phone systems (e.g. including one or more cellular flip-phone portions, etc.).

Figure 61:
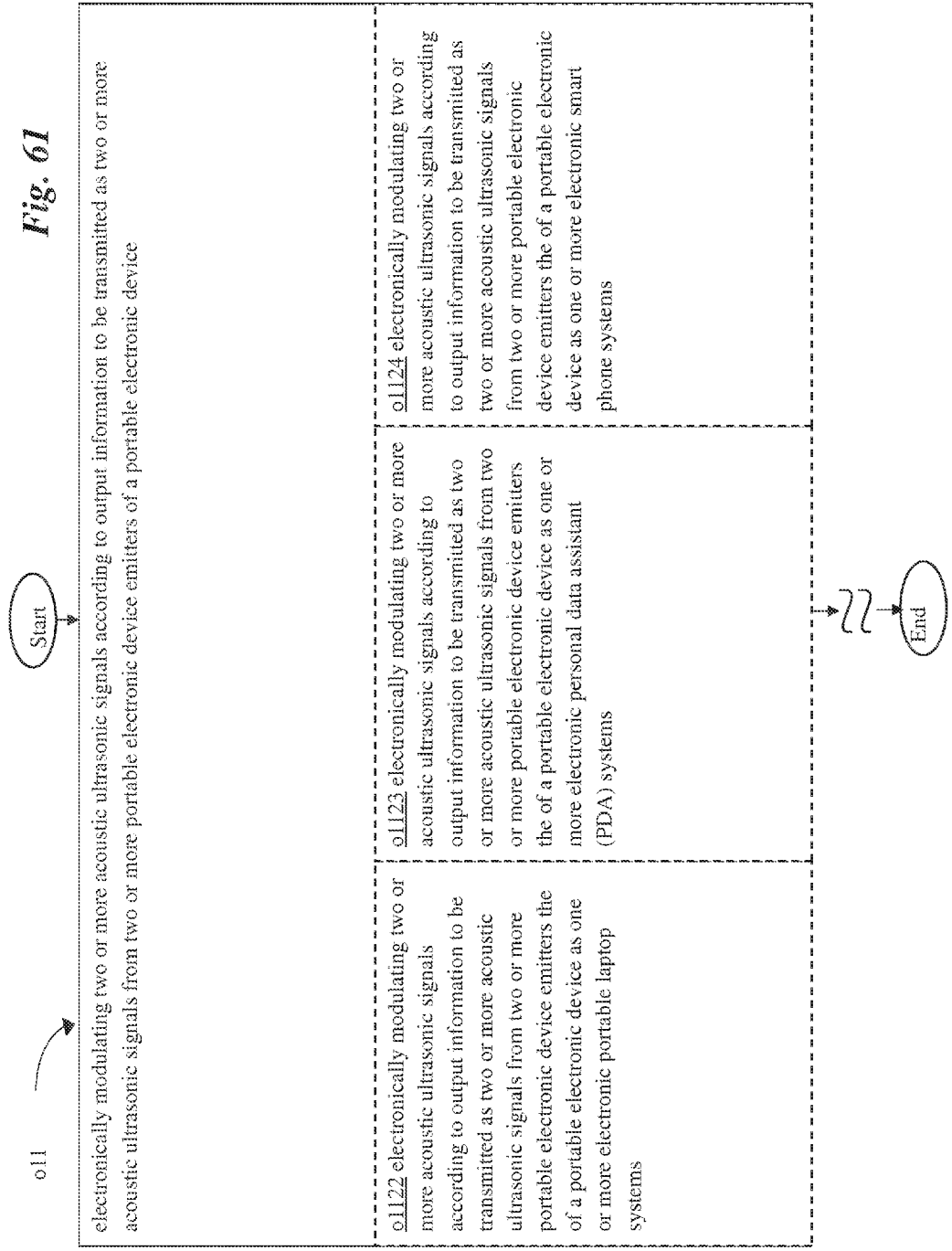
FIG. 61 is a high-level flowchart including exemplary implementations of operation o11 of FIG. 53.

In one or more implementations, as shown in FIG. 61, operation o11 includes an operation o1122 for electronically modulating two or more acoustic ultrasonic signals according to output information to be transmitted as two or more acoustic ultrasonic signals from two or more portable electronic device emitters the of a portable electronic device as one or more electronic portable laptop systems. Origination of an illustratively derived modulating portable laptop component group can be accomplished through skilled in the art design choice selection of one or more of the above depicted components from one or more of the above depicted subsystems shown in FIG. 25. Components from the modulating portable laptop component group can be used in implementing execution of the one or more modulating portable laptop instructions i1122 of FIG. 40, can be used in performance of the modulating portable laptop electrical circuitry arrangement e1122 of FIG. 33, and/or can be used in otherwise fulfillment of the operation o1122. An exemplary non-transitory signal bearing medium version of the information storage subsystem s200 is depicted in FIG. 40 as bearing the one or more modulating portable laptop instructions i1122 that when executed will direct performance of the operation o1122. Furthermore, the modulating portable laptop electrical circuitry arrangement ("elec circ arrange") e1122, when activated, will perform the operation o1122. Also, the modulating portable laptop module m1122, when executed and/or activated, will direct performance of and/or perform the operation o1122. For instance, in one or more exemplary implementations, the one or more modulating portable laptop instructions i1122, when executed, direct performance of the operation o1122 in the illustrative depiction as follows, and/or the modulating portable laptop electrical circuitry arrangement e1122, when activated, performs the operation o1122 in the illustrative depiction as follows, and/or the modulating portable laptop module m1122, when executed and/or activated, directs performance of and/or performs the operation o1122 in the illustrative depiction as follows, and/or the operation o1122 is otherwise carried out in the illustrative depiction as follows: electronically modulating (e.g. including one or more auxiliary signal output portions, etc.) two or more acoustic ultrasonic signals (e.g. via one or more acoustic ultrasonic signals including signals having one or more frequencies above 80 kHz, etc.) according to output information (e.g. including instructional lesson material information, etc.) to be transmitted (e.g. via one or more dispersed transducer portions, etc.) as two or more acoustic ultrasonic signals (e.g. via one or more acoustic ultrasonic signals including signals having one or more frequencies above 80 kHz, etc.) from two or more portable electronic device emitters (e.g. including one or more digital music player components, etc.) the of a portable electronic device (e.g. including one or more digital music player components, etc.) as one or more electronic portable laptop systems (e.g. including one or more business laptop portions, etc.).

In one or more implementations, as shown in FIG. 61, operation o11 includes an operation o1123 for electronically modulating two or more acoustic ultrasonic signals according to output information to be transmitted as two or more acoustic ultrasonic signals from two or more portable electronic device emitters the of a portable electronic device as one or more electronic personal data assistant (PDA) systems. Origination of an illustratively derived modulating PDA component group can be accomplished through skilled in the art design choice selection of one or more of the above depicted components from one or more of the above depicted subsystems shown in FIG. 25. Components from the modulating PDA component group can be used in implementing execution of the one or more modulating PDA instructions i1123 of FIG. 40, can be used in performance of the modulating PDA electrical circuitry arrangement e1123 of FIG. 33, and/or can be used in otherwise fulfillment of the operation o1123. An exemplary non-transitory signal bearing medium version of the information storage subsystem s200 is depicted in FIG. 40 as bearing the one or more modulating PDA instructions i1123 that when executed will direct performance of the operation o1123. Furthermore, the modulating PDA electrical circuitry arrangement ("elec circ arrange") e1123, when activated, will perform the operation o1123. Also, the modulating PDA module m1123, when executed and/or activated, will direct performance of and/or perform the operation o1123. For instance, in one or more exemplary implementations, the one or more modulating PDA instructions i1123, when executed, direct performance of the operation o1123 in the illustrative depiction as follows, and/or the modulating PDA electrical circuitry arrangement e1123, when activated, performs the operation o1123 in the illustrative depiction as follows, and/or the modulating PDA module m1123, when executed and/or activated, directs performance of and/or performs the operation o1123 in the illustrative depiction as follows, and/or the operation o1123 is otherwise carried out in the illustrative depiction as follows: electronically modulating (e.g. including one or more auxiliary signal input portions, etc.) two or more acoustic ultrasonic signals (e.g. via one or more acoustic ultrasonic signals including signals having one or more frequencies above 100 kHz, etc.) according to output information (e.g. including warning tone information, etc.) to be transmitted (e.g. by one or more monitor embedded transducer portions, etc.) as two or more acoustic ultrasonic signals (e.g. via one or more acoustic ultrasonic signals including signals having one or more frequencies above 100 kHz, etc.) from two or more portable electronic device emitters (e.g. including one or more handheld radio components, etc.) the of a portable electronic device (e.g. including one or more handheld radio components, etc.) as one or more electronic personal data assistant (PDA) systems (e.g. including one or more credit card sized electronic managers, etc.).

In one or more implementations, as shown in FIG. 61, operation o11 includes an operation o1124 for electronically modulating two or more acoustic ultrasonic signals according to output information to be transmitted as two or more acoustic ultrasonic signals from two or more portable electronic device emitters the of a portable electronic device as one or more electronic smart phone systems. Origination of an illustratively derived modulating smart phone component group can be accomplished through skilled in the art design choice selection of one or more of the above depicted components from one or more of the above depicted subsystems shown in FIG. 25. Components from the modulating smart phone component group can be used in implementing execution of the one or more modulating smart phone instructions i1124 of FIG. 40, can be used in performance of the modulating smart phone electrical circuitry arrangement e1124 of FIG. 33, and/or can be used in otherwise fulfillment of the operation o1124. An exemplary non-transitory signal bearing medium version of the information storage subsystem s200 is depicted in FIG. 40 as bearing the one or more modulating smart phone instructions i1124 that when executed will direct performance of the operation o1124. Furthermore, the modulating smart phone electrical circuitry arrangement ("elec circ arrange") e1124, when activated, will perform the operation o1124. Also, the modulating smart phone module m1124, when executed and/or activated, will direct performance of and/or perform the operation o1124. For instance, in one or more exemplary implementations, the one or more modulating smart phone instructions i1124, when executed, direct performance of the operation o1124 in the illustrative depiction as follows, and/or the modulating smart phone electrical circuitry arrangement e1124, when activated, performs the operation o1124 in the illustrative depiction as follows, and/or the modulating smart phone module m1124, when executed and/or activated, directs performance of and/or performs the operation o1124 in the illustrative depiction as follows, and/or the operation o1124 is otherwise carried out in the illustrative depiction as follows: electronically modulating (e.g. including one or more equalizer portions, etc.) two or more acoustic ultrasonic signals (e.g. via one or more acoustic ultrasonic signals including signals having one or more frequencies above 120 kHz, etc.) according to output information (e.g. including white noise information, etc.) to be transmitted (e.g. from one or more keyboard embedded transducer portions etc.) as two or more acoustic ultrasonic signals (e.g. via one or more acoustic ultrasonic signals including signals having one or more frequencies above 120 kHz, etc.) from two or more portable electronic device emitters (e.g. including one or more spread spectrum components, etc.) the of a portable electronic device (e.g. including one or more spread spectrum components, etc.) as one or more electronic smart phone systems (e.g. including one or more 4G smart phone systems, etc.).

Figure 62:
FIG. 62 is a high-level flowchart including exemplary implementations of operation o11 of FIG. 53.

In one or more implementations, as shown in FIG. 62, operation o11 includes an operation o1125 for electronically modulating two or more acoustic ultrasonic signals according to output information to be transmitted as two or more acoustic ultrasonic signals from two or more portable electronic device emitters the of a portable electronic device as one or more electronic security personnel systems. Origination of an illustratively derived modulating security personnel component group can be accomplished through skilled in the art design choice selection of one or more of the above depicted components from one or more of the above depicted subsystems shown in FIG. 25. Components from the modulating security personnel component group can be used in implementing execution of the one or more modulating security personnel instructions i1125 of FIG. 40, can be used in performance of the modulating security personnel electrical circuitry arrangement e1125 of FIG. 33, and/or can be used in otherwise fulfillment of the operation o1125. An exemplary non-transitory signal bearing medium version of the information storage subsystem s200 is depicted in FIG. 40 as bearing the one or more modulating security personnel instructions i1125 that when executed will direct performance of the operation o1125. Furthermore, the modulating security personnel electrical circuitry arrangement ("elec circ arrange") e1125, when activated, will perform the operation o1125. Also, the modulating security personnel module m1125, when executed and/or activated, will direct performance of and/or perform the operation o1125. For instance, in one or more exemplary implementations, the one or more modulating security personnel instructions i1125, when executed, direct performance of the operation o1125 in the illustrative depiction as follows, and/or the modulating security personnel electrical circuitry arrangement e1125, when activated, performs the operation o1125 in the illustrative depiction as follows, and/or the modulating security personnel module m1125, when executed and/or activated, directs performance of and/or performs the operation o1125 in the illustrative depiction as follows, and/or the operation o1125 is otherwise carried out in the illustrative depiction as follows: electronically modulating (e.g. including one or more modulation portions, etc.) two or more acoustic ultrasonic signals (e.g. via one or more acoustic ultrasonic signals including signals having one or more frequencies above 140 kHz, etc.) according to output information (e.g. including varying pitch information, etc.) to be transmitted (e.g. using one or more device body embedded transducer portions, etc.) as two or more acoustic ultrasonic signals (e.g. via one or more acoustic ultrasonic signals including signals having one or more frequencies above 140 kHz, etc.) from two or more portable electronic device emitters (e.g. including one or more wireless components, etc.) the of a portable electronic device (e.g. including one or more wireless components, etc.) as one or more electronic security personnel systems (e.g. including one or more two-way radio portions, etc.).

In one or more implementations, as shown in FIG. 62, operation o11 includes an operation o1126 for electronically modulating two or more acoustic ultrasonic signals according to output information to be transmitted as two or more acoustic ultrasonic signals from two or more portable electronic device emitters the of a portable electronic device as one or more electronic athletic sports equipment systems. Origination of an illustratively derived modulating athletic sports component group can be accomplished through skilled in the art design choice selection of one or more of the above depicted components from one or more of the above depicted subsystems shown in FIG. 25. Components from the modulating athletic sports component group can be used in implementing execution of the one or more modulating athletic sports instructions i1126 of FIG. 40, can be used in performance of the modulating athletic sports electrical circuitry arrangement e1126 of FIG. 33, and/or can be used in otherwise fulfillment of the operation o1126. An exemplary non-transitory signal bearing medium version of the information storage subsystem s200 is depicted in FIG. 40 as bearing the one or more modulating athletic sports instructions i1126 that when executed will direct performance of the operation o1126. Furthermore, the modulating athletic sports electrical circuitry arrangement ("elec circ arrange") e1126, when activated, will perform the operation o1126. Also, the modulating athletic sports module m1126, when executed and/or activated, will direct performance of and/or perform the operation o1126. For instance, in one or more exemplary implementations, the one or more modulating athletic sports instructions i1126, when executed, direct performance of the operation o1126 in the illustrative depiction as follows, and/or the modulating athletic sports electrical circuitry arrangement e1126, when activated, performs the operation o1126 in the illustrative depiction as follows, and/or the modulating athletic sports module m1126, when executed and/or activated, directs performance of and/or performs the operation o1126 in the illustrative depiction as follows, and/or the operation o1126 is otherwise carried out in the illustrative depiction as follows: electronically modulating (e.g. including one or more signal mixing portions, etc.) two or more acoustic ultrasonic signals (e.g. via one or more acoustic ultrasonic signals including signals having one or more frequencies above 160 kHz, etc.) according to output information (e.g. including note sequence information, etc.) to be transmitted (e.g. through one or more device perimeter embedded transducer portions, etc.) as two or more acoustic ultrasonic signals (e.g. via one or more acoustic ultrasonic signals including signals having one or more frequencies above 160 kHz, etc.) from two or more portable electronic device emitters (e.g. including one or more frequency division multiplexing components, etc.) the of a portable electronic device (e.g. including one or more frequency division multiplexing components, etc.) as one or more electronic athletic sports equipment systems (e.g. including one or more integrated sports helmet communication portions, etc.).

In one or more implementations, as shown in FIG. 62, operation o11 includes an operation o1127 for electronically modulating two or more acoustic ultrasonic signals according to output information to be transmitted as two or more acoustic ultrasonic signals from two or more portable electronic device emitters the of a portable electronic device as one or more electronic wearable media systems. Origination of an illustratively derived modulating wearable media component group can be accomplished through skilled in the art design choice selection of one or more of the above depicted components from one or more of the above depicted subsystems shown in FIG. 25. Components from the modulating wearable media component group can be used in implementing execution of the one or more modulating wearable media instructions i1127 of FIG. 40, can be used in performance of the modulating wearable media electrical circuitry arrangement e1127 of FIG. 33, and/or can be used in otherwise fulfillment of the operation o1127. An exemplary non-transitory signal bearing medium version of the information storage subsystem s200 is depicted in FIG. 40 as bearing the one or more modulating wearable media instructions i1127 that when executed will direct performance of the operation o1127. Furthermore, the modulating wearable media electrical circuitry arrangement ("elec circ arrange") e1127, when activated, will perform the operation o1127. Also, the modulating wearable media module m1127, when executed and/or activated, will direct performance of and/or perform the operation o1127. For instance, in one or more exemplary implementations, the one or more modulating wearable media instructions i1127, when executed, direct performance of the operation o1127 in the illustrative depiction as follows, and/or the modulating wearable media electrical circuitry arrangement e1127, when activated, performs the operation o1127 in the illustrative depiction as follows, and/or the modulating wearable media module m1127, when executed and/or activated, directs performance of and/or performs the operation o1127 in the illustrative depiction as follows, and/or the operation o1127 is otherwise carried out in the illustrative depiction as follows: electronically modulating (e.g. including one or more ultrasonic generator portions, etc.) two or more acoustic ultrasonic signals (e.g. via one or more acoustic ultrasonic signals including signals having one or more frequencies above 180 kHz, etc.) according to output information (e.g. including two-way conversation information, etc.) to be transmitted (e.g. via one or more multiple emitter array portions, etc.) as two or more acoustic ultrasonic signals (e.g. via one or more acoustic ultrasonic signals including signals having one or more frequencies above 180 kHz, etc.) from two or more portable electronic device emitters (e.g. including one or more time division multiplexing components, etc.) the of a portable electronic device (e.g. including one or more time division multiplexing components, etc.) as one or more electronic wearable media systems (e.g. including one or more coat based computer based portions, etc.).

In one or more implementations, as shown in FIG. 63, operation o11 includes an operation o1128 for electronically modulating two or more acoustic ultrasonic signals according to output information to be transmitted as two or more acoustic ultrasonic signals from two or more portable electronic device emitters the of a portable electronic device as one or more electronic wristwatch systems. Origination of an illustratively derived modulating wristwatch component group can be accomplished through skilled in the art design choice selection of one or more of the above depicted components from one or more of the above depicted subsystems shown in FIG. 25. Components from the modulating wristwatch component group can be used in implementing execution of the one or more modulating wristwatch instructions i1128 of FIG. 40, can be used in performance of the modulating wristwatch electrical circuitry arrangement e1128 of FIG. 33, and/or can be used in otherwise fulfillment of the operation o1128. An exemplary non-transitory signal bearing medium version of the information storage subsystem s200 is depicted in FIG. 40 as bearing the one or more modulating wristwatch instructions i1128 that when executed will direct performance of the operation o1128. Furthermore, the modulating wristwatch electrical circuitry arrangement ("elec circ arrange") e1128, when activated, will perform the operation o1128. Also, the modulating wristwatch module m1128, when executed and/or activated, will direct performance of and/or perform the operation o1128. For instance, in one or more exemplary implementations, the one or more modulating wristwatch instructions i1128, when executed, direct performance of the operation o1128 in the illustrative depiction as follows, and/or the modulating wristwatch electrical circuitry arrangement e1128, when activated, performs the operation o1128 in the illustrative depiction as follows, and/or the modulating wristwatch module m1128, when executed and/or activated, directs performance of and/or performs the operation o1128 in the illustrative depiction as follows, and/or the operation o1128 is otherwise carried out in the illustrative depiction as follows: electronically modulating (e.g. including one or more parametric modulation portions, etc.) two or more acoustic ultrasonic signals (e.g. via one or more acoustic ultrasonic signals including signals having one or more frequencies above 200 kHz, etc.) according to output information (e.g. including confidential information, etc.) to be transmitted (e.g. through one or more cable interface portions, etc.) as two or more acoustic ultrasonic signals (e.g. via one or more acoustic ultrasonic signals including signals having one or more frequencies above 200 kHz, etc.) from two or more portable electronic device emitters (e.g. including one or more clamshell phone components, etc.) the of a portable electronic device (e.g. including one or more clamshell phone components, etc.) as one or more electronic wristwatch systems (e.g. including one or more phone watch portions, etc.).

In one or more implementations, as shown in FIG. 63, operation o11 includes an operation o1129 for electronically modulating two or more acoustic ultrasonic signals according to output information to be transmitted as two or more acoustic ultrasonic signals from two or more portable electronic device emitters the of a portable electronic device as one or more electronic two-way radio systems. Origination of an illustratively derived modulating two-way radio component group can be accomplished through skilled in the art design choice selection of one or more of the above depicted components from one or more of the above depicted subsystems shown in FIG. 25. Components from the modulating two-way radio component group can be used in implementing execution of the one or more modulating two-way radio instructions i1129 of FIG. 40, can be used in performance of the modulating two-way radio electrical circuitry arrangement e1129 of FIG. 33, and/or can be used in otherwise fulfillment of the operation o1129. An exemplary non-transitory signal bearing medium version of the information storage subsystem s200 is depicted in FIG. 40 as bearing the one or more modulating two-way radio instructions i1129 that when executed will direct performance of the operation o1129. Furthermore, the modulating two-way radio electrical circuitry arrangement ("elec circ arrange") e1129, when activated, will perform the operation o1129. Also, the modulating two-way radio module m1129, when executed and/or activated, will direct performance of and/or perform the operation o1129. For instance, in one or more exemplary implementations, the one or more modulating two-way radio instructions i1129, when executed, direct performance of the operation o1129 in the illustrative depiction as follows, and/or the modulating two-way radio electrical circuitry arrangement e1129, when activated, performs the operation o1129 in the illustrative depiction as follows, and/or the modulating two-way radio module m1129, when executed and/or activated, directs performance of and/or performs the operation o1129 in the illustrative depiction as follows, and/or the operation o1129 is otherwise carried out in the illustrative depiction as follows: electronically modulating (e.g. including one or more nonlinear modulation portions, etc.) two or more acoustic ultrasonic signals (e.g. via multiple acoustic ultrasonic signals configured to be demodulated through mutual interference therewith to at least in part result in one or more acoustic audio signals, etc.) according to output information (e.g. including eavesdropping information, etc.) to be transmitted (e.g. via one or more speaker portions, etc.) as two or more acoustic ultrasonic signals (e.g. via multiple acoustic ultrasonic signals configured to be demodulated through mutual interference therewith to at least in part result in one or more acoustic audio signals, etc.) from two or more portable electronic device emitters (e.g. including one or more media player components, etc.) the of a portable electronic device (e.g. including one or more media player component, etc.) as one or more electronic two-way radio systems (e.g. including one or more walkie-talkie portions, etc.).

In one or more implementations, as shown in FIG. 63, operation o11 includes an operation o1130 for electronically modulating two or more acoustic ultrasonic signals according to output information the to be transmitted as two or more acoustic ultrasonic signals from two or more portable electronic device emitters of a portable electronic device as through one or more collections of ultrasonic transducers arranged to output one or more beams of acoustic ultrasonic signals. Origination of an illustratively derived modulating beams component group can be accomplished through skilled in the art design choice selection of one or more of the above depicted components from one or more of the above depicted subsystems shown in FIG. 25. Components from the modulating beams component group can be used in implementing execution of the one or more modulating beams instructions i1130 of FIG. 40, can be used in performance of the modulating beams electrical circuitry arrangement e1130 of FIG. 33, and/or can be used in otherwise fulfillment of the operation o1130. An exemplary non-transitory signal bearing medium version of the information storage subsystem s200 is depicted in FIG. 40 as bearing the one or more modulating beams instructions i1130 that when executed will direct performance of the operation o1130. Furthermore, the modulating beams electrical circuitry arrangement ("elec circ arrange") e1130, when activated, will perform the operation o1130. Also, the modulating beams module m1130, when executed and/or activated, will direct performance of and/or perform the operation o1130. For instance, in one or more exemplary implementations, the one or more modulating beams instructions i1130, when executed, direct performance of the operation o1130 in the illustrative depiction as follows, and/or the modulating beams electrical circuitry arrangement e1130, when activated, performs the operation o1130 in the illustrative depiction as follows, and/or the modulating beams module m1130, when executed and/or activated, directs performance of and/or performs the operation o1130 in the illustrative depiction as follows, and/or the operation o1130 is otherwise carried out in the illustrative depiction as follows: electronically modulating (e.g. including one or more digital signal processing portions, etc.) two or more acoustic ultrasonic signals (e.g. via one or more acoustic ultrasonic signals configured to be demodulated through nonlinear atmospheric interaction to at least in part generate one or more acoustic audio signals, etc.) according to output information (e.g. including pre-recorded information, etc.) the to be transmitted (e.g. by one or more transducer portions, etc.) as two or more acoustic ultrasonic signals (e.g. via one or more acoustic ultrasonic signals configured to be demodulated through nonlinear atmospheric interaction to at least in part generate one or more acoustic audio signals, etc.) from two or more portable electronic device emitters (e.g. including one or more perimeter arrays, etc.) of a portable electronic device (e.g. including one or more 3G mobile components, etc.) as through one or more collections of ultrasonic transducers arranged to output one or more beams of acoustic ultrasonic signals (e.g. including one or more transducer arrays configured to output two interfering ultrasonic beams, etc.).

Figure 64:
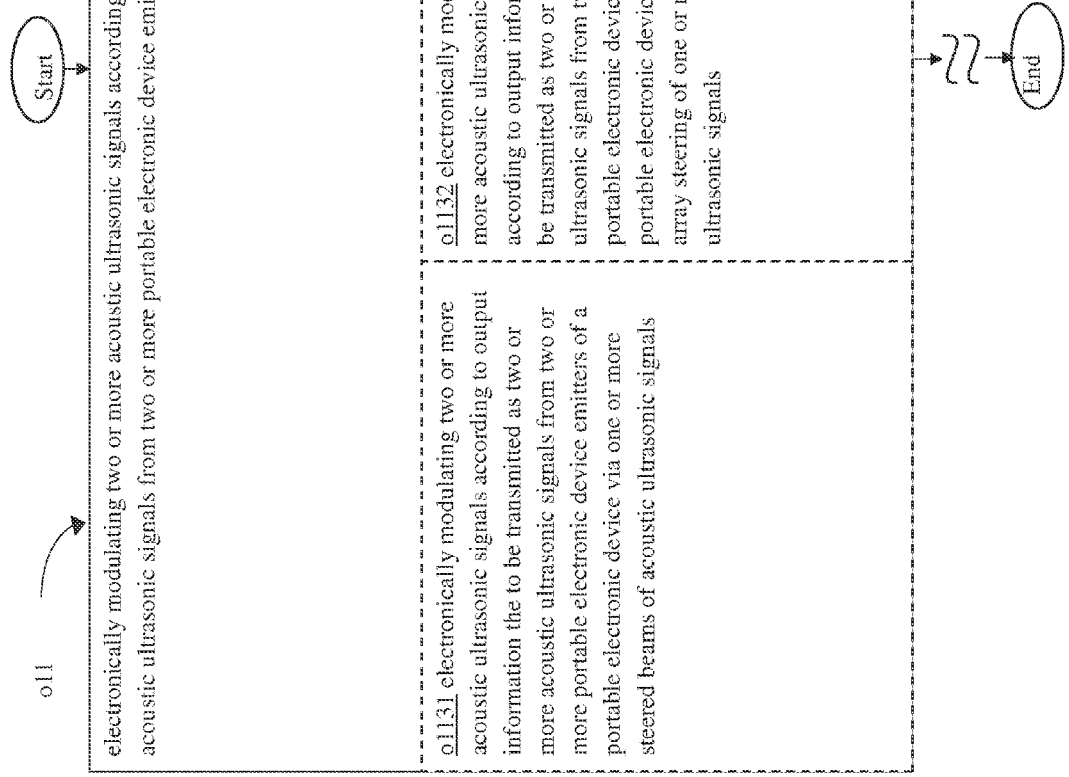
FIG. 64 is a high-level flowchart including exemplary implementations of operation o11 of FIG. 53.

In one or more implementations, as shown in FIG. 64, operation o11 includes an operation o1131 for electronically modulating two or more acoustic ultrasonic signals according to output information the to be transmitted as two or more acoustic ultrasonic signals from two or more portable electronic device emitters of a portable electronic device via one or more steered beams of acoustic ultrasonic signals. Origination of an illustratively derived modulating steered beams component group can be accomplished through skilled in the art design choice selection of one or more of the above depicted components from one or more of the above depicted subsystems shown in FIG. 25. Components from the modulating steered beams component group can be used in implementing execution of the one or more modulating steered beams instructions i1131 of FIG. 40, can be used in performance of the modulating steered beams electrical circuitry arrangement e1131 of FIG. 33, and/or can be used in otherwise fulfillment of the operation o1131. An exemplary non-transitory signal bearing medium version of the information storage subsystem s200 is depicted in FIG. 40 as bearing the one or more modulating steered beams instructions i1131 that when executed will direct performance of the operation o1131. Furthermore, the modulating steered beams electrical circuitry arrangement ("elec circ arrange") e1131, when activated, will perform the operation o1131. Also, the modulating steered beams module m1131, when executed and/or activated, will direct performance of and/or perform the operation o1131. For instance, in one or more exemplary implementations, the one or more modulating steered beams instructions i1131, when executed, direct performance of the operation o1131 in the illustrative depiction as follows, and/or the modulating steered beams electrical circuitry arrangement e1131, when activated, performs the operation o1131 in the illustrative depiction as follows, and/or the modulating steered beams module m1131, when executed and/or activated, directs performance of and/or performs the operation o1131 in the illustrative depiction as follows, and/or the operation o1131 is otherwise carried out in the illustrative depiction as follows: electronically modulating (e.g. including one or more central processing unit portions, etc.) two or more acoustic ultrasonic signals (e.g. via one or more acoustic ultrasonic signals configured to be demodulated through nonlinear human tissue interaction to at least in part produce one or more acoustic audio signals, etc.) according to output information (e.g. including processor generated information, etc.) the to be transmitted (e.g. from one or more aperture portions, etc.) as two or more acoustic ultrasonic signals (e.g. via one or more acoustic ultrasonic signals configured to be demodulated through nonlinear human tissue interaction to at least in part produce one or more acoustic audio signals, etc.) from two or more portable electronic device emitters (e.g. including one or more polar arrays, etc.) of a portable electronic device (e.g. including one or more cellular components, etc.) via one or more steered beams of acoustic ultrasonic signals (e.g. including one or more phased based beam steering portions, etc.).

In one or more implementations, as shown in FIG. 64, operation o11 includes an operation o1132 for electronically modulating two or more acoustic ultrasonic signals according to output information the to be transmitted as two or more acoustic ultrasonic signals from two or more portable electronic device emitters of a portable electronic device by phased array steering of one or more acoustic ultrasonic signals. Origination of an illustratively derived modulating phased array component group can be accomplished through skilled in the art design choice selection of one or more of the above depicted components from one or more of the above depicted subsystems shown in FIG. 25. Components from the modulating phased array component group can be used in implementing execution of the one or more modulating phased array instructions i1132 of FIG. 40, can be used in performance of the modulating phased array electrical circuitry arrangement e1132 of FIG. 33, and/or can be used in otherwise fulfillment of the operation o1132. An exemplary non-transitory signal bearing medium version of the information storage subsystem s200 is depicted in FIG. 40 as bearing the one or more modulating phased array instructions i1132 that when executed will direct performance of the operation o1132. Furthermore, the modulating phased array electrical circuitry arrangement ("elec circ arrange") e1132, when activated, will perform the operation o1132. Also, the modulating phased array module m1132, when executed and/or activated, will direct performance of and/or perform the operation o1132. For instance, in one or more exemplary implementations, the one or more modulating phased array instructions i1132, when executed, direct performance of the operation o1132 in the illustrative depiction as follows, and/or the modulating phased array electrical circuitry arrangement e1132, when activated, performs the operation o1132 in the illustrative depiction as follows, and/or the modulating phased array module m1132, when executed and/or activated, directs performance of and/or performs the operation o1132 in the illustrative depiction as follows, and/or the operation o1132 is otherwise carried out in the illustrative depiction as follows: electronically modulating (e.g. including one or more analog processor portions, etc.) two or more acoustic ultrasonic signals (e.g. via one or more acoustic ultrasonic signals configured to be demodulated through nonlinear polymeric interaction to at least in part result in one or more acoustic audio signals, etc.) according to output information (e.g. including internet based information, etc.) the to be transmitted (e.g. using one or more transmitter portions, etc.) as two or more acoustic ultrasonic signals (e.g. via one or more acoustic ultrasonic signals configured to be demodulated through nonlinear polymeric interaction to at least in part result in one or more acoustic audio signals, etc.) from two or more portable electronic device emitters (e.g. including one or more orthographic arrays, etc.) of a portable electronic device (e.g. including one or more 4G components, etc.) by phased array steering of one or more acoustic ultrasonic signals (e.g. including steering to a designated location, etc.).

In one or more implementations, as shown in FIG. 64, operation o11 includes an operation o1133 for electronically modulating two or more acoustic ultrasonic signals according to output information the to be transmitted as two or more acoustic ultrasonic signals from two or more portable electronic device emitters of a portable electronic device as one or more acoustic ultrasonic signals modulated via one or more audio signals. Origination of an illustratively derived modulating audio component group can be accomplished through skilled in the art design choice selection of one or more of the above depicted components from one or more of the above depicted subsystems shown in FIG. 25. Components from the modulating audio component group can be used in implementing execution of the one or more modulating audio instructions i1133 of FIG. 40, can be used in performance of the modulating audio electrical circuitry arrangement e1133 of FIG. 33, and/or can be used in otherwise fulfillment of the operation o1133. An exemplary non-transitory signal bearing medium version of the information storage subsystem s200 is depicted in FIG. 40 as bearing the one or more modulating audio instructions i1133 that when executed will direct performance of the operation o1133. Furthermore, the modulating audio electrical circuitry arrangement ("elec circ arrange") e1133, when activated, will perform the operation o1133. Also, the modulating audio module m1133, when executed and/or activated, will direct performance of and/or perform the operation o1133. For instance, in one or more exemplary implementations, the one or more modulating audio instructions i1133, when executed, direct performance of the operation o1133 in the illustrative depiction as follows, and/or the modulating audio electrical circuitry arrangement e1133, when activated, performs the operation o1133 in the illustrative depiction as follows, and/or the modulating audio module m1133, when executed and/or activated, directs performance of and/or performs the operation o1133 in the illustrative depiction as follows, and/or the operation o1133 is otherwise carried out in the illustrative depiction as follows: electronically modulating (e.g. including one or more digital decompression portions, etc.) two or more acoustic ultrasonic signals (e.g. via one or more acoustic ultrasonic signals configured to be demodulated through nonlinear apparel interaction to at least in part produce one or more acoustic audio signals, etc.) according to output information (e.g. including digital audio information, etc.) the to be transmitted (e.g. through one or more air-coupled transducer portions, etc.) as two or more acoustic ultrasonic signals (e.g. via one or more acoustic ultrasonic signals configured to be demodulated through nonlinear apparel interaction to at least in part produce one or more acoustic audio signals, etc.) from two or more portable electronic device emitters (e.g. including one or more three-dimensional arrays, etc.) of a portable electronic device (e.g. including one or more WiFi components, etc.) as one or more acoustic ultrasonic signals modulated via one or more audio signals (e.g. including one or more 120 kHz signals being modulated by human speech based signals, etc.).

Figure 65:
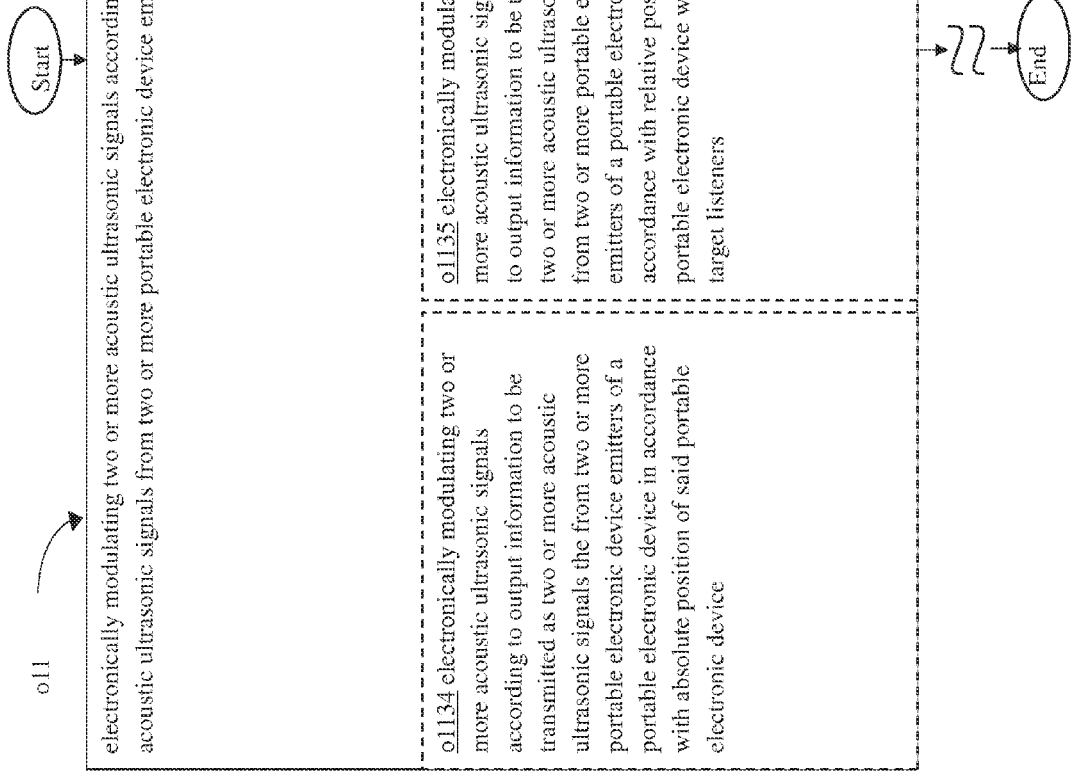
FIG. 65 is a high-level flowchart including exemplary implementations of operation o11 of FIG. 53.

In one or more implementations, as shown in FIG. 65, operation o11 includes an operation o1134 for electronically modulating two or more acoustic ultrasonic signals according to output information to be transmitted as two or more acoustic ultrasonic signals the from two or more portable electronic device emitters of a portable electronic device in accordance with absolute position of said portable electronic device. Origination of an illustratively derived modulating absolute position component group can be accomplished through skilled in the art design choice selection of one or more of the above depicted components from one or more of the above depicted subsystems shown in FIG. 25. Components from the modulating absolute position component group can be used in implementing execution of the one or more modulating absolute position instructions i1134 of FIG. 40, can be used in performance of the modulating absolute position electrical circuitry arrangement e1134 of FIG. 33, and/or can be used in otherwise fulfillment of the operation o1134. An exemplary non-transitory signal bearing medium version of the information storage subsystem s200 is depicted in FIG. 40 as bearing the one or more modulating absolute position instructions i1134 that when executed will direct performance of the operation o1134. Furthermore, the modulating absolute position electrical circuitry arrangement ("elec circ arrange") e1134, when activated, will perform the operation o1134. Also, the modulating absolute position module m1134, when executed and/or activated, will direct performance of and/or perform the operation o1134. For instance, in one or more exemplary implementations, the one or more modulating absolute position instructions i1134, when executed, direct performance of the operation o1134 in the illustrative depiction as follows, and/or the modulating absolute position electrical circuitry arrangement e1134, when activated, performs the operation o1134 in the illustrative depiction as follows, and/or the modulating absolute position module m1134, when executed and/or activated, directs performance of and/or performs the operation o1134 in the illustrative depiction as follows, and/or the operation o1134 is otherwise carried out in the illustrative depiction as follows: electronically modulating (e.g. including one or more ultrasonic signal modulation portions, etc.) two or more acoustic ultrasonic signals (e.g. via one or more acoustic ultrasonic signals configured to be demodulated through nonlinear interaction with one or more solids to at least in part generate one or more acoustic audio signals, etc.) according to output information (e.g. including analog audio information, etc.) to be transmitted (e.g. via one or more thin-film membrane portions, etc.) as two or more acoustic ultrasonic signals (e.g. via one or more acoustic ultrasonic signals configured to be demodulated through nonlinear interaction with one or more solids to at least in part generate one or more acoustic audio signals, etc.) the from two or more portable electronic device emitters (e.g. including one or more scattered arrangements, etc.) of a portable electronic device (e.g. including one or more infrared components, etc.) in accordance with absolute position of said portable electronic device (e.g. based on GPS coordinates, etc.).

In one or more implementations, as shown in FIG. 65, operation o11 includes an operation o1135 for electronically modulating two or more acoustic ultrasonic signals according to output information to be transmitted as two or more acoustic ultrasonic signals the from two or more portable electronic device emitters of a portable electronic device in accordance with relative position of said portable electronic device with one or more target listeners. Origination of an illustratively derived modulating relative position component group can be accomplished through skilled in the art design choice selection of one or more of the above depicted components from one or more of the above depicted subsystems shown in FIG. 25. Components from the modulating relative position component group can be used in implementing execution of the one or more modulating relative position instructions i1135 of FIG. 40, can be used in performance of the modulating relative position electrical circuitry arrangement e1135 of FIG. 33, and/or can be used in otherwise fulfillment of the operation o1135. An exemplary non-transitory signal bearing medium version of the information storage subsystem s200 is depicted in FIG. 40 as bearing the one or more modulating relative position instructions i1135 that when executed will direct performance of the operation o1135. Furthermore, the modulating relative position electrical circuitry arrangement ("elec circ arrange") e1135, when activated, will perform the operation o1135. Also, the modulating relative position module m1135, when executed and/or activated, will direct performance of and/or perform the operation o1135. For instance, in one or more exemplary implementations, the one or more modulating relative position instructions i1135, when executed, direct performance of the operation o1135 in the illustrative depiction as follows, and/or the modulating relative position electrical circuitry arrangement e1135, when activated, performs the operation o1135 in the illustrative depiction as follows, and/or the modulating relative position module m1135, when executed and/or activated, directs performance of and/or performs the operation o1135 in the illustrative depiction as follows, and/or the operation o1135 is otherwise carried out in the illustrative depiction as follows: electronically modulating (e.g. including one or more electronic storage portions, etc.) two or more acoustic ultrasonic signals (e.g. via one or more acoustic ultrasonic signals including signals having one or more frequencies above 60 kHz, etc.) according to output information (e.g. including high frequency audio information, etc.) to be transmitted (e.g. by one or more resonant surface portions, etc.) as two or more acoustic ultrasonic signals (e.g. via one or more acoustic ultrasonic signals including signals having one or more frequencies above 60 kHz, etc.) the from two or more portable electronic device emitters (e.g. including one or more staggered arrays, etc.) of a portable electronic device (e.g. including one or more personal digital assistant components, etc.) in accordance with relative position of said portable electronic device with one or more target listeners (e.g. based on distance from a tablet to a group of listeners ranged through ultrasonic signals, etc.).

In one or more implementations, as shown in FIG. 65, operation o11 includes an operation o1136 for electronically modulating two or more acoustic ultrasonic signals according to output information to be transmitted as two or more acoustic ultrasonic signals the from two or more portable electronic device emitters of a portable electronic device in accordance with quality characterization information sensed at said portable electronic device regarding acoustic audio signals down converted at one or more target locations. Origination of an illustratively derived modulating quality characterization target locations component group can be accomplished through skilled in the art design choice selection of one or more of the above depicted components from one or more of the above depicted subsystems shown in FIG. 25. Components from the modulating quality characterization target locations component group can be used in implementing execution of the one or more modulating quality characterization target locations instructions i1136 of FIG. 40, can be used in performance of the modulating quality characterization target locations electrical circuitry arrangement e1136 of FIG. 33, and/or can be used in otherwise fulfillment of the operation o1136. An exemplary non-transitory signal bearing medium version of the information storage subsystem s200 is depicted in FIG. 40 as bearing the one or more modulating quality characterization target locations instructions i1136 that when executed will direct performance of the operation o1136. Furthermore, the modulating quality characterization target locations electrical circuitry arrangement ("elec circ arrange") e1136, when activated, will perform the operation o1136. Also, the modulating quality characterization target locations module m1136, when executed and/or activated, will direct performance of and/or perform the operation o1136. For instance, in one or more exemplary implementations, the one or more modulating quality characterization target locations instructions i1136, when executed, direct performance of the operation o1136 in the illustrative depiction as follows, and/or the modulating quality characterization target locations electrical circuitry arrangement e1136, when activated, performs the operation o1136 in the illustrative depiction as follows, and/or the modulating quality characterization target locations module m1136, when executed and/or activated, directs performance of and/or performs the operation o1136 in the illustrative depiction as follows, and/or the operation o1136 is otherwise carried out in the illustrative depiction as follows: electronically modulating (e.g. including one or more random access memory portions, etc.) two or more acoustic ultrasonic signals (e.g. via one or more acoustic ultrasonic signals including signals having one or more frequencies above 80 kHz, etc.) according to output information (e.g. including low frequency audio information, etc.) to be transmitted (e.g. from one or more signal processor portions, etc.) as two or more acoustic ultrasonic signals (e.g. via one or more acoustic ultrasonic signals including signals having one or more frequencies above 80 kHz, etc.) the from two or more portable electronic device emitters (e.g. including one or more linear arrangements, etc.) of a portable electronic device (e.g. including one or more smart phone components, etc.) in accordance with quality characterization information sensed at said portable electronic device regarding acoustic audio signals down converted at one or more target locations (e.g. based on sensing down-converted audio quality through one or more microphone sensing portions of a tablet computer, etc.).

Figure 66:
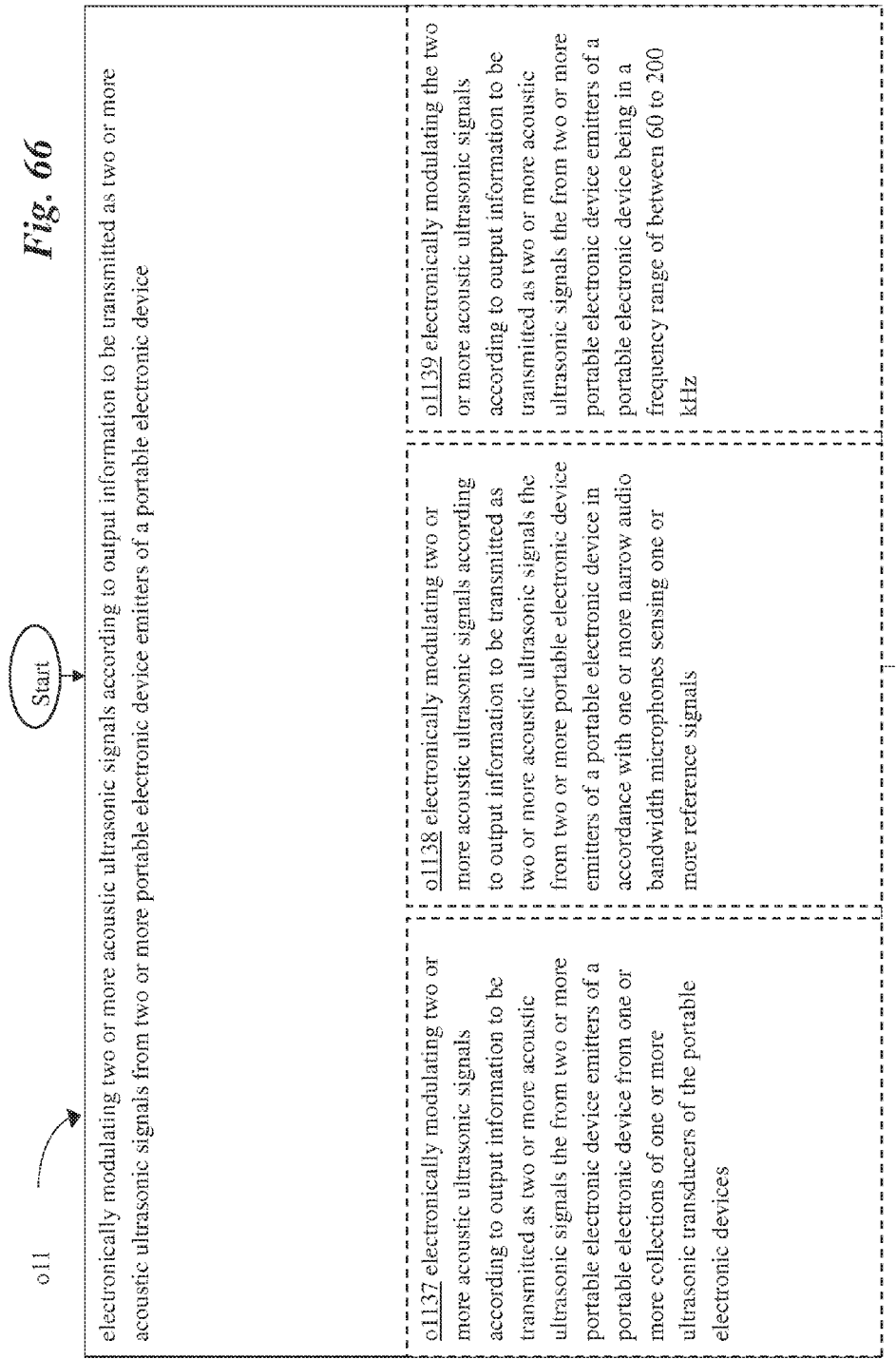
FIG. 66 is a high-level flowchart including exemplary implementations of operation o11 of FIG. 53.

In one or more implementations, as shown in FIG. 66, operation o11 includes an operation o1137 for electronically modulating two or more acoustic ultrasonic signals according to output information to be transmitted as two or more acoustic ultrasonic signals the from two or more portable electronic device emitters of a portable electronic device from one or more collections of one or more ultrasonic transducers of the portable electronic devices. Origination of an illustratively derived modulating ultrasonic transducers component group can be accomplished through skilled in the art design choice selection of one or more of the above depicted components from one or more of the above depicted subsystems shown in FIG. 25. Components from the modulating ultrasonic transducers component group can be used in implementing execution of the one or more modulating ultrasonic transducers instructions i1137 of FIG. 40, can be used in performance of the modulating ultrasonic transducers electrical circuitry arrangement e1137 of FIG. 33, and/or can be used in otherwise fulfillment of the operation o1137. An exemplary non-transitory signal bearing medium version of the information storage subsystem s200 is depicted in FIG. 40 as bearing the one or more modulating ultrasonic transducers instructions i1137 that when executed will direct performance of the operation o1137. Furthermore, the modulating ultrasonic transducers electrical circuitry arrangement ("elec circ arrange") e1137, when activated, will perform the operation o1137. Also, the modulating ultrasonic transducers module m1137, when executed and/or activated, will direct performance of and/or perform the operation o1137. For instance, in one or more exemplary implementations, the one or more modulating ultrasonic transducers instructions i1137, when executed, direct performance of the operation o1137 in the illustrative depiction as follows, and/or the modulating ultrasonic transducers electrical circuitry arrangement e1137, when activated, performs the operation o1137 in the illustrative depiction as follows, and/or the modulating ultrasonic transducers module m1137, when executed and/or activated, directs performance of and/or performs the operation o1137 in the illustrative depiction as follows, and/or the operation o1137 is otherwise carried out in the illustrative depiction as follows: electronically modulating (e.g. including one or more flash drive portions etc.) two or more acoustic ultrasonic signals (e.g. via one or more acoustic ultrasonic signals including signals having one or more frequencies above 100 kHz, etc.) according to output information (e.g. including lecture formatted information, etc.) to be transmitted (e.g. using one or more transmitter portions, etc.) as two or more acoustic ultrasonic signals (e.g. via one or more acoustic ultrasonic signals including signals having one or more frequencies above 100 kHz, etc.) the from two or more portable electronic device emitters (e.g. including one or more parabolic arrangements, etc.) of a portable electronic device (e.g. including one or more cell phone components, etc.) from one or more collections of one or more ultrasonic transducers of the portable electronic devices (e.g. including one or more arrays of transducers located around a perimeter of a tablet computer, etc.).

In one or more implementations, as shown in FIG. 66, operation o11 includes an operation o1138 for electronically modulating two or more acoustic ultrasonic signals according to output information to be transmitted as two or more acoustic ultrasonic signals the from two or more portable electronic device emitters of a portable electronic device in accordance with one or more narrow audio bandwidth microphones sensing one or more reference signals. Origination of an illustratively derived modulating reference component group can be accomplished through skilled in the art design choice selection of one or more of the above depicted components from one or more of the above depicted subsystems shown in FIG. 25. Components from the modulating reference component group can be used in implementing execution of the one or more modulating reference instructions i1138 of FIG. 40, can be used in performance of the modulating reference electrical circuitry arrangement e1138 of FIG. 33, and/or can be used in otherwise fulfillment of the operation o1138. An exemplary non-transitory signal bearing medium version of the information storage subsystem s200 is depicted in FIG. 40 as bearing the one or more modulating reference instructions i1138 that when executed will direct performance of the operation o1138. Furthermore, the modulating reference electrical circuitry arrangement ("elec circ arrange") e1138, when activated, will perform the operation o1138. Also, the modulating reference module m1138, when executed and/or activated, will direct performance of and/or perform the operation o1138. For instance, in one or more exemplary implementations, the one or more modulating reference instructions i1138, when executed, direct performance of the operation o1138 in the illustrative depiction as follows, and/or the modulating reference electrical circuitry arrangement e1138, when activated, performs the operation o1138 in the illustrative depiction as follows, and/or the modulating reference module m1138, when executed and/or activated, directs performance of and/or performs the operation o1138 in the illustrative depiction as follows, and/or the operation o1138 is otherwise carried out in the illustrative depiction as follows: electronically modulating (e.g. including one or more portable memory portions, etc.) two or more acoustic ultrasonic signals (e.g. via one or more acoustic ultrasonic signals including signals having one or more frequencies above 120 kHz, etc.) according to output information (e.g. including foreign language speech information, etc.) to be transmitted (e.g. through one or more transducer membrane portions, etc.) as two or more acoustic ultrasonic signals (e.g. via one or more acoustic ultrasonic signals including signals having one or more frequencies above 120 kHz, etc.) the from two or more portable electronic device emitters (e.g. including one or more hyperbolic arrangements, etc.) of a portable electronic device (e.g. including one or more laptop components, etc.) in accordance with one or more narrow audio bandwidth microphones sensing one or more reference signals (e.g. including one or more microphones located in a smart phone to sense digitally coded audio signals modulated into an ultrasonic carrier signal, etc.).

In one or more implementations, as shown in FIG. 66, operation o11 includes an operation o1139 for electronically modulating the two or more acoustic ultrasonic signals according to output information to be transmitted as two or more acoustic ultrasonic signals the from two or more portable electronic device emitters of a portable electronic device being in a frequency range of between 60 to 200 kHz. Origination of an illustratively derived modulating more acoustic ultrasonic component group can be accomplished through skilled in the art design choice selection of one or more of the above depicted components from one or more of the above depicted subsystems shown in FIG. 25. Components from the modulating more acoustic ultrasonic component group can be used in implementing execution of the one or more modulating more acoustic ultrasonic instructions i1139 of FIG. 40, can be used in performance of the modulating more acoustic ultrasonic electrical circuitry arrangement e1139 of FIG. 33, and/or can be used in otherwise fulfillment of the operation o1139. An exemplary non-transitory signal bearing medium version of the information storage subsystem s200 is depicted in FIG. 40 as bearing the one or more modulating more acoustic ultrasonic instructions i1139 that when executed will direct performance of the operation o1139. Furthermore, the modulating more acoustic ultrasonic electrical circuitry arrangement ("elec circ arrange") e1139, when activated, will perform the operation o1139. Also, the modulating more acoustic ultrasonic module m1139, when executed and/or activated, will direct performance of and/or perform the operation o1139. For instance, in one or more exemplary implementations, the one or more modulating more acoustic ultrasonic instructions i1139, when executed, direct performance of the operation o1139 in the illustrative depiction as follows, and/or the modulating more acoustic ultrasonic electrical circuitry arrangement e1139, when activated, performs the operation o1139 in the illustrative depiction as follows, and/or the modulating more acoustic ultrasonic module m1139, when executed and/or activated, directs performance of and/or performs the operation o1139 in the illustrative depiction as follows, and/or the operation o1139 is otherwise carried out in the illustrative depiction as follows: electronically modulating (e.g. including one or more backup storage portions, etc.) the two or more acoustic ultrasonic signals (e.g. via one or more acoustic ultrasonic signals including signals having one or more frequencies above 140 kHz, etc.) according to output information (e.g. including classical music selection information, etc.) to be transmitted (e.g. via one or more transducer array portions, etc.) as two or more acoustic ultrasonic signals (e.g. via one or more acoustic ultrasonic signals including signals having one or more frequencies above 140 kHz, etc.) the from two or more portable electronic device emitters (e.g. including one or more enclosed arrangements, etc.) of a portable electronic device (e.g. including one or more tablet computer components, etc.) being in a frequency range of between 60 to 200 kHz (e.g. including an acoustic ultrasonic based carrier signal of 120 kHz, etc.).

In one or more implementations, as shown in FIG. 67, operation o11 includes an operation o1140 for electronically modulating the two or more acoustic ultrasonic signals according to output information to be transmitted as two or more acoustic ultrasonic signals from two or more portable electronic device emitters of a portable electronic device including vectoring of two or more beams of acoustic ultrasonic signals. Origination of an illustratively derived modulating vectoring beams component group can be accomplished through skilled in the art design choice selection of one or more of the above depicted components from one or more of the above depicted subsystems shown in FIG. 25. Components from the modulating vectoring beams component group can be used in implementing execution of the one or more modulating vectoring beams instructions i1140 of FIG. 41, can be used in performance of the modulating vectoring beams electrical circuitry arrangement e1140 of FIG. 34, and/or can be used in otherwise fulfillment of the operation o1140. An exemplary non-transitory signal bearing medium version of the information storage subsystem s200 is depicted in FIG. 41 as bearing the one or more modulating vectoring beams instructions i1140 that when executed will direct performance of the operation o1140. Furthermore, the modulating vectoring beams electrical circuitry arrangement ("elec circ arrange") e1140, when activated, will perform the operation o1140. Also, the modulating vectoring beams module m1140, when executed and/or activated, will direct performance of and/or perform the operation o1140. For instance, in one or more exemplary implementations, the one or more modulating vectoring beams instructions i1140, when executed, direct performance of the operation o1140 in the illustrative depiction as follows, and/or the modulating vectoring beams electrical circuitry arrangement e1140, when activated, performs the operation o1140 in the illustrative depiction as follows, and/or the modulating vectoring beams module m1140, when executed and/or activated, directs performance of and/or performs the operation o1140 in the illustrative depiction as follows, and/or the operation o1140 is otherwise carried out in the illustrative depiction as follows: electronically modulating (e.g. including one or more network interface portions, etc.) the two or more acoustic ultrasonic signals (e.g. via one or more acoustic ultrasonic signals including signals having one or more frequencies above 160 kHz, etc.) according to output information (e.g. including instructional lesson material information, etc.) to be transmitted (e.g. by one or more membrane speaker portions, etc.) as two or more acoustic ultrasonic signals (e.g. via one or more acoustic ultrasonic signals including signals having one or more frequencies above 160 kHz, etc.) from two or more portable electronic device emitters (e.g. including one or more transducer arrangements, etc.) of a portable electronic device (e.g. including one or more mp3 player components, etc.) including vectoring of two or more beams of acoustic ultrasonic signals (e.g. including transmitting two ultrasonic beams from transducer arrays of a smart phone, etc.).

In one or more implementations, as shown in FIG. 67, operation o11 includes an operation o1141 for electronically modulating the two or more acoustic ultrasonic signals according to output information to be transmitted as two or more acoustic ultrasonic signals from two or more portable electronic device emitters of a portable electronic device including one or more beams of acoustic ultrasonic signals configured to interact non-linearly with air to output desired acoustic audio signals. Origination of an illustratively derived modulating non-linearly air component group can be accomplished through skilled in the art design choice selection of one or more of the above depicted components from one or more of the above depicted subsystems shown in FIG. 25. Components from the modulating non-linearly air component group can be used in implementing execution of the one or more modulating non-linearly air instructions i1141 of FIG. 41, can be used in performance of the modulating non-linearly air electrical circuitry arrangement e1141 of FIG. 34, and/or can be used in otherwise fulfillment of the operation o1141. An exemplary non-transitory signal bearing medium version of the information storage subsystem s200 is depicted in FIG. 41 as bearing the one or more modulating non-linearly air instructions i1141 that when executed will direct performance of the operation o1141. Furthermore, the modulating non-linearly air electrical circuitry arrangement ("elec circ arrange") e1141, when activated, will perform the operation o1141. Also, the modulating non-linearly air module m1141, when executed and/or activated, will direct performance of and/or perform the operation o1141. For instance, in one or more exemplary implementations, the one or more modulating non-linearly air instructions i1141, when executed, direct performance of the operation o1141 in the illustrative depiction as follows, and/or the modulating non-linearly air electrical circuitry arrangement e1141, when activated, performs the operation o1141 in the illustrative depiction as follows, and/or the modulating non-linearly air module m1141, when executed and/or activated, directs performance of and/or performs the operation o1141 in the illustrative depiction as follows, and/or the operation o1141 is otherwise carried out in the illustrative depiction as follows: electronically modulating (e.g. through reception of cable communication packets, etc.) the two or more acoustic ultrasonic signals (e.g. via one or more acoustic ultrasonic signals including signals having one or more frequencies above 180 kHz, etc.) according to output information (e.g. including warning tone information, etc.) to be transmitted (e.g. from one or more ultrasonic transducer portions, etc.) as two or more acoustic ultrasonic signals (e.g. via one or more acoustic ultrasonic signals including signals having one or more frequencies above 180 kHz, etc.) from two or more portable electronic device emitters (e.g. including one or more aperture arrangements, etc.) of a portable electronic device (e.g. including one or more mobile phone components, etc.) including one or more beams of acoustic ultrasonic signals configured to interact non-linearly with air to output desired acoustic audio signals (e.g. including a beam of acoustic ultrasonic signals transmitted from a tablet to interact with air to produce audio near an ear of a target listener, etc.).

In one or more implementations, as shown in FIG. 67, operation o11 includes an operation o1142 for electronically modulating the two or more acoustic ultrasonic signals according to output information to be transmitted as two or more acoustic ultrasonic signals from two or more portable electronic device emitters of a portable electronic device including one or more beams of acoustic ultrasonic signals outputted to interact non-linearly with human tissue to down convert to one or more acoustic audio signals. Origination of an illustratively derived modulating human tissue component group can be accomplished through skilled in the art design choice selection of one or more of the above depicted components from one or more of the above depicted subsystems shown in FIG. 25. Components from the modulating human tissue component group can be used in implementing execution of the one or more modulating human tissue instructions i1142 of FIG. 41, can be used in performance of the modulating human tissue electrical circuitry arrangement e1142 of FIG. 34, and/or can be used in otherwise fulfillment of the operation o1142. An exemplary non-transitory signal bearing medium version of the information storage subsystem s200 is depicted in FIG. 41 as bearing the one or more modulating human tissue instructions i1142 that when executed will direct performance of the operation o1142. Furthermore, the modulating human tissue electrical circuitry arrangement ("elec circ arrange") e1142, when activated, will perform the operation o1142. Also, the modulating human tissue module m1142, when executed and/or activated, will direct performance of and/or perform the operation o1142. For instance, in one or more exemplary implementations, the one or more modulating human tissue instructions i1142, when executed, direct performance of the operation o1142 in the illustrative depiction as follows, and/or the modulating human tissue electrical circuitry arrangement e1142, when activated, performs the operation o1142 in the illustrative depiction as follows, and/or the modulating human tissue module m1142, when executed and/or activated, directs performance of and/or performs the operation o1142 in the illustrative depiction as follows, and/or the operation o1142 is otherwise carried out in the illustrative depiction as follows: electronically modulating (e.g. via Wi-Fi signal reception, etc.) the two or more acoustic ultrasonic signals (e.g. via one or more acoustic ultrasonic signals including signals having one or more frequencies above 200 kHz, etc.) according to output information (e.g. including white noise information, etc.) to be transmitted (e.g. using one or more electrostatic transducer portions, etc.) as two or more acoustic ultrasonic signals (e.g. via one or more acoustic ultrasonic signals including signals having one or more frequencies above 200 kHz, etc.) from two or more portable electronic device emitters (e.g. including one or more transmitter arrangements, etc.) of a portable electronic device (e.g. including one or more two-way radio components, etc.) including one or more beams of acoustic ultrasonic signals outputted to interact non-linearly with human tissue to down convert to one or more acoustic audio signals (e.g. including a beam of acoustic ultrasonic signals transmitted from a laptop to interact with human tissue near an ear of a target listener, etc.).

As shown in FIG. 53, the operational flow o10 proceeds to operation o12 for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location. An exemplary version of a non-transitory signal bearing medium of information storage subsystem s200 is depicted as bearing one or more electronically projecting instructions i12 that when executed will direct performance of the operation o12. In an implementation, the one or more electronically projecting instructions i12 when executed direct electronically projecting (e.g. via one or more multiple emitter array portions, through one or more device perimeter embedded transducer portions, using one or more device body embedded transducer portions, etc.) said two or more acoustic ultrasonic signals (e.g. via one or more acoustic ultrasonic signals including signals having one or more frequencies above 200 kHz, via one or more acoustic ultrasonic signals including signals having one or more frequencies above 180 kHz, via one or more acoustic ultrasonic signals including signals having one or more frequencies above 160 kHz, etc.) from said two or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) to produce (e.g. including at least in part demodulation by signal down conversion, including at least in part demodulation through signal amplitude demodulation, including at least in part demodulation via signal frequency demodulation portions, etc.) a first set of one or more acoustic audio signals (e.g. including one or more low frequency acoustic audio signals, including one or more high frequency acoustic audio signals, including one or more full spectrum acoustic audio signals, etc.) from a first set of said two or more acoustic ultrasonic signals (e.g. including containing beginning portions, including containing middle portions, including containing end portions, etc.) at a first location (e.g. exclusive to one or more designated ears, exclusive to one or more identified persons, exclusive to one or more predetermined ears, etc.) and to produce (e.g. including at least in part demodulation by signal down conversion, including at least in part demodulation through signal amplitude demodulation, including at least in part demodulation via signal frequency demodulation portions, etc.) a second set of one or more second acoustic audio signals (e.g. including one or more low frequency acoustic audio signals, including one or more high frequency acoustic audio signals, including one or more full spectrum acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) at a second location (e.g. within a confines of a room, within an arm's length, within a three-foot radius, etc. e.g. including one or more perimeter arrays, including one or more polar arrays, including one or more orthographic arrays etc.). Furthermore, the electronically projecting electrical circuitry arrangement e12 when activated will perform the operation o12. Also, the electronically projecting module m12, when executed and/or activated, will direct performance of and/or perform the operation o12. In an implementation, the electronically projecting electrical circuitry arrangement e12, when activated performs the operation o12 in the illustrative depiction as follows, and/or the electronically projecting module m12, when executed and/or activated, directs performance of and/or performs electronically projecting (e.g. via one or more multiple emitter array portions, through one or more device perimeter embedded transducer portions, using one or more device body embedded transducer portions, etc.) said two or more acoustic ultrasonic signals (e.g. via one or more acoustic ultrasonic signals including signals having one or more frequencies above 200 kHz, via one or more acoustic ultrasonic signals including signals having one or more frequencies above 180 kHz, via one or more acoustic ultrasonic signals including signals having one or more frequencies above 160 kHz, etc.) from said two or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) to produce (e.g. including at least in part demodulation by signal down conversion, including at least in part demodulation through signal amplitude demodulation, including at least in part demodulation via signal frequency demodulation portions, etc.) a first set of one or more acoustic audio signals (e.g. including one or more low frequency acoustic audio signals, including one or more high frequency acoustic audio signals, including one or more full spectrum acoustic audio signals, etc.) from a first set of said two or more acoustic ultrasonic signals (e.g. including containing beginning portions, including containing middle portions, including containing end portions, etc.) at a first location (e.g. exclusive to one or more designated ears, exclusive to one or more identified persons, exclusive to one or more predetermined ears, etc.) and to produce (e.g. including at least in part demodulation by signal down conversion, including at least in part demodulation through signal amplitude demodulation, including at least in part demodulation via signal frequency demodulation portions, etc.) a second set of one or more second acoustic audio signals (e.g. including one or more low frequency acoustic audio signals, including one or more high frequency acoustic audio signals, including one or more full spectrum acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) at a second location (e.g. within a confines of a room, within an arm's length, within a three-foot radius, etc. e.g. including one or more perimeter arrays, including one or more polar arrays, including one or more orthographic arrays etc.). In an implementation, the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location is carried out by electronically projecting (e.g. via one or more multiple emitter array portions, through one or more device perimeter embedded transducer portions, using one or more device body embedded transducer portions, etc.) said two or more acoustic ultrasonic signals (e.g. via one or more acoustic ultrasonic signals including signals having one or more frequencies above 200 kHz, via one or more acoustic ultrasonic signals including signals having one or more frequencies above 180 kHz, via one or more acoustic ultrasonic signals including signals having one or more frequencies above 160 kHz, etc.) from said two or more portable electronic device emitters (e.g. including one or more perimeter arrays, including one or more polar arrays, including one or more orthographic arrays, etc.) of said portable electronic device (e.g. including one or more 3G mobile components, including one or more cellular components, including one or more 4G components, etc.) to produce (e.g. including at least in part demodulation by signal down conversion, including at least in part demodulation through signal amplitude demodulation, including at least in part demodulation via signal frequency demodulation portions, etc.) a first set of one or more acoustic audio signals (e.g. including one or more low frequency acoustic audio signals, including one or more high frequency acoustic audio signals, including one or more full spectrum acoustic audio signals, etc.) from a first set of said two or more acoustic ultrasonic signals (e.g. including containing beginning portions, including containing middle portions, including containing end portions, etc.) at a first location (e.g. exclusive to one or more designated ears, exclusive to one or more identified persons, exclusive to one or more predetermined ears, etc.) and to produce (e.g. including at least in part demodulation by signal down conversion, including at least in part demodulation through signal amplitude demodulation, including at least in part demodulation via signal frequency demodulation portions, etc.) a second set of one or more second acoustic audio signals (e.g. including one or more low frequency acoustic audio signals, including one or more high frequency acoustic audio signals, including one or more full spectrum acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, via one or more acoustic ultrasonic signals configured to be demodulated through nonlinear atmospheric interaction to at least in part generate one or more acoustic audio signals, via one or more acoustic ultrasonic signals configured to be demodulated through nonlinear human tissue interaction to at least in part produce one or more acoustic audio signals, etc.) at a second location (e.g. within a confines of a room, within an arm's length, within a three-foot radius, etc. e.g. including one or more perimeter arrays, including one or more polar arrays, including one or more orthographic arrays etc.).

In one or more implementations, as shown in FIG. 68, operation o12 includes an operation o1201 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including steering one or more acoustic ultrasonic signals according to at least in part thermal imaging of one or more target listeners. Origination of an illustratively derived projecting thermal imaging component group can be accomplished through skilled in the art design choice selection of one or more of the above depicted components from one or more of the above depicted subsystems shown in FIG. 25. Components from the projecting thermal imaging component group can be used in implementing execution of the one or more projecting thermal imaging instructions i1201 of FIG. 42, can be used in performance of the projecting thermal imaging electrical circuitry arrangement e1201 of FIG. 35, and/or can be used in otherwise fulfillment of the operation o1201. An exemplary non-transitory signal bearing medium version of the information storage subsystem s200 is depicted in FIG. 42 as bearing the one or more projecting thermal imaging instructions i1201 that when executed will direct performance of the operation o1201. Furthermore, the projecting thermal imaging electrical circuitry arrangement ("elec circ arrange") e1201, when activated, will perform the operation o1201. Also, the projecting thermal imaging module m1201, when executed and/or activated, will direct performance of and/or perform the operation o1201. For instance, in one or more exemplary implementations, the one or more projecting thermal imaging instructions i1201, when executed, direct performance of the operation o1201 in the illustrative depiction as follows, and/or the projecting thermal imaging electrical circuitry arrangement e1201, when activated, performs the operation o1201 in the illustrative depiction as follows, and/or the projecting thermal imaging module m1201, when executed and/or activated, directs performance of and/or performs the operation o1201 in the illustrative depiction as follows, and/or the operation o1201 is otherwise carried out in the illustrative depiction as follows: the electronically projecting (e.g. via one or more multiple emitter array portions, etc.) said two or more acoustic ultrasonic signals (e.g. via one or more acoustic ultrasonic signals including signals having one or more frequencies above 200 kHz, etc.) from said two or more portable electronic device emitters (e.g. including one or more perimeter arrays, etc.) of said portable electronic device (e.g. including one or more 3G mobile components, etc.) to produce (e.g. including at least in part demodulation by signal down conversion, etc.) a first set of one or more acoustic audio signals (e.g. including one or more low frequency acoustic audio signals, etc.) from a first set of said two or more acoustic ultrasonic signals (e.g. including containing beginning portions, etc.) at a first location (e.g. exclusive to one or more designated ears, etc.) and to produce (e.g. including at least in part demodulation by signal down conversion, etc.) a second set of one or more second acoustic audio signals (e.g. including one or more low frequency acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. within a confines of a room, etc. e.g. including one or more perimeter arrays, etc. e.g. etc. e.g. etc.) including steering one or more acoustic ultrasonic signals according to at least in part thermal imaging of one or more target listeners (e.g. including infrared sensing from a tablet to determine ear position of a target listener to steer ultrasonic beam portions through phase control, etc.).

In one or more implementations, as shown in FIG. 68, operation o12 includes an operation o1202 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including steering one or more acoustic ultrasonic signals according to at least in part visual imaging of one or more target listeners. Origination of an illustratively derived projecting visual imaging component group can be accomplished through skilled in the art design choice selection of one or more of the above depicted components from one or more of the above depicted subsystems shown in FIG. 25. Components from the projecting visual imaging component group can be used in implementing execution of the one or more projecting visual imaging instructions i1202 of FIG. 42, can be used in performance of the projecting visual imaging electrical circuitry arrangement e1202 of FIG. 35, and/or can be used in otherwise fulfillment of the operation o1202. An exemplary non-transitory signal bearing medium version of the information storage subsystem s200 is depicted in FIG. 42 as bearing the one or more projecting visual imaging instructions i1202 that when executed will direct performance of the operation o1202. Furthermore, the projecting visual imaging electrical circuitry arrangement ("elec circ arrange") e1202, when activated, will perform the operation o1202. Also, the projecting visual imaging module m1202, when executed and/or activated, will direct performance of and/or perform the operation o1202. For instance, in one or more exemplary implementations, the one or more projecting visual imaging instructions i1202, when executed, direct performance of the operation o1202 in the illustrative depiction as follows, and/or the projecting visual imaging electrical circuitry arrangement e1202, when activated, performs the operation o1202 in the illustrative depiction as follows, and/or the projecting visual imaging module m1202, when executed and/or activated, directs performance of and/or performs the operation o1202 in the illustrative depiction as follows, and/or the operation o1202 is otherwise carried out in the illustrative depiction as follows: the electronically projecting (e.g. through one or more device perimeter embedded transducer portions, etc.) said two or more acoustic ultrasonic signals (e.g. via one or more acoustic ultrasonic signals including signals having one or more frequencies above 180 kHz, etc.) from said two or more portable electronic device emitters (e.g. including one or more polar arrays, etc.) of said portable electronic device (e.g. including one or more cellular components, etc.) to produce (e.g. including at least in part demodulation through signal amplitude demodulation, etc.) a first set of one or more acoustic audio signals (e.g. including one or more high frequency acoustic audio signals, etc.) from a first set of said two or more acoustic ultrasonic signals (e.g. including containing middle portions, etc.) at a first location (e.g. exclusive to one or more identified persons, etc.) and to produce (e.g. including at least in part demodulation through signal amplitude demodulation, etc.) a second set of one or more second acoustic audio signals (e.g. including one or more high frequency acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. within an arm's length, etc. e.g. including one or more polar arrays, etc. e.g. etc. e.g. etc.) including steering one or more acoustic ultrasonic signals according to at least in part visual imaging of one or more target listeners (e.g. including camera based visual recognition from a laptop to determine target listener location to steer one or more ultrasonic beams through phase array control, etc.).

In one or more implementations, as shown in FIG. 68, operation o12 includes an operation o1203 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including steering one or more acoustic ultrasonic signals according to at least in part acoustic imaging of one or more target listeners. Origination of an illustratively derived projecting acoustic imaging component group can be accomplished through skilled in the art design choice selection of one or more of the above depicted components from one or more of the above depicted subsystems shown in FIG. 25. Components from the projecting acoustic imaging component group can be used in implementing execution of the one or more projecting acoustic imaging instructions i1203 of FIG. 42, can be used in performance of the projecting acoustic imaging electrical circuitry arrangement e1203 of FIG. 35, and/or can be used in otherwise fulfillment of the operation o1203. An exemplary non-transitory signal bearing medium version of the information storage subsystem s200 is depicted in FIG. 42 as bearing the one or more projecting acoustic imaging instructions i1203 that when executed will direct performance of the operation o1203. Furthermore, the projecting acoustic imaging electrical circuitry arrangement ("elec circ arrange") e1203, when activated, will perform the operation o1203. Also, the projecting acoustic imaging module m1203, when executed and/or activated, will direct performance of and/or perform the operation o1203. For instance, in one or more exemplary implementations, the one or more projecting acoustic imaging instructions i1203, when executed, direct performance of the operation o1203 in the illustrative depiction as follows, and/or the projecting acoustic imaging electrical circuitry arrangement e1203, when activated, performs the operation o1203 in the illustrative depiction as follows, and/or the projecting acoustic imaging module m1203, when executed and/or activated, directs performance of and/or performs the operation o1203 in the illustrative depiction as follows, and/or the operation o1203 is otherwise carried out in the illustrative depiction as follows: the electronically projecting (e.g. using one or more device body embedded transducer portions, etc.) said two or more acoustic ultrasonic signals (e.g. via one or more acoustic ultrasonic signals including signals having one or more frequencies above 160 kHz, etc.) from said two or more portable electronic device emitters (e.g. including one or more orthographic arrays, etc.) of said portable electronic device (e.g. including one or more 4G components, etc.) to produce (e.g. including at least in part demodulation via signal frequency demodulation portions, etc.) a first set of one or more acoustic audio signals (e.g. including one or more full spectrum acoustic audio signals, etc.) from a first set of said two or more acoustic ultrasonic signals (e.g. including containing end portions, etc.) at a first location (e.g. exclusive to one or more predetermined ears, etc.) and to produce (e.g. including at least in part demodulation via signal frequency demodulation portions, etc.) a second set of one or more second acoustic audio signals (e.g. including one or more full spectrum acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. within a three-foot radius, etc. e.g. including one or more orthographic arrays, etc. e.g. etc. e.g. etc.) including steering one or more acoustic ultrasonic signals according to at least in part acoustic imaging of one or more target listeners (e.g. including acoustic imaging from a smart phone to determine target listener location to steer one or more ultrasonic beams through phase array control, etc.).

Figure 69:
FIG. 69 is a high-level flowchart including exemplary implementations of operation o12 of FIG. 53.

In one or more implementations, as shown in FIG. 69, operation o12 includes an operation o1204 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting according sensed acoustic environment adjacent one or more target listeners. Origination of an illustratively derived projecting sensed acoustic component group can be accomplished through skilled in the art design choice selection of one or more of the above depicted components from one or more of the above depicted subsystems shown in FIG. 25. Components from the projecting sensed acoustic component group can be used in implementing execution of the one or more projecting sensed acoustic instructions i1204 of FIG. 42, can be used in performance of the projecting sensed acoustic electrical circuitry arrangement e1204 of FIG. 35, and/or can be used in otherwise fulfillment of the operation o1204. An exemplary non-transitory signal bearing medium version of the information storage subsystem s200 is depicted in FIG. 42 as bearing the one or more projecting sensed acoustic instructions i1204 that when executed will direct performance of the operation o1204. Furthermore, the projecting sensed acoustic electrical circuitry arrangement ("elec circ arrange") e1204, when activated, will perform the operation o1204. Also, the projecting sensed acoustic module m1204, when executed and/or activated, will direct performance of and/or perform the operation o1204. For instance, in one or more exemplary implementations, the one or more projecting sensed acoustic instructions i1204, when executed, direct performance of the operation o1204 in the illustrative depiction as follows, and/or the projecting sensed acoustic electrical circuitry arrangement e1204, when activated, performs the operation o1204 in the illustrative depiction as follows, and/or the projecting sensed acoustic module m1204, when executed and/or activated, directs performance of and/or performs the operation o1204 in the illustrative depiction as follows, and/or the operation o1204 is otherwise carried out in the illustrative depiction as follows: the electronically projecting (e.g. from one or more keyboard embedded transducer portions, etc.) said two or more acoustic ultrasonic signals (e.g. via one or more acoustic ultrasonic signals including signals having one or more frequencies above 140 kHz, etc.) from said two or more portable electronic device emitters (e.g. including one or more three-dimensional arrays, etc.) of said portable electronic device (e.g. including one or more WiFi components, etc.) to produce (e.g. including at least in part demodulation with signal phase demodulation portions, etc.) a first set of one or more acoustic audio signals (e.g. including one or more partial spectrum acoustic audio signals, etc.) from a first set of said two or more acoustic ultrasonic signals (e.g. including containing some portions, etc.) at a first location (e.g. exclusive to one or more desired groups of people, etc.) and to produce (e.g. including at least in part demodulation with signal phase demodulation portions, etc.) a second set of one or more second acoustic audio signals (e.g. including one or more partial spectrum acoustic audio signals, etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. within a distance from a portable device to a person, etc. e.g. including one or more three-dimensional arrays, etc. e.g. etc. e.g. etc.) including outputting according sensed acoustic environment adjacent one or more target listeners (e.g. including sensing quality of down-converting audio at a target listener through use of a sensitive audio microphone of a tablet, etc.).

In one or more implementations, as shown in FIG. 69, operation o12 includes an operation o1205 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting acoustic ultrasonic signal components according to sensed presence of others adjacent to one or more targeted listeners. Origination of an illustratively derived projecting adjacent component group can be accomplished through skilled in the art design choice selection of one or more of the above depicted components from one or more of the above depicted subsystems shown in FIG. 25. Components from the projecting adjacent component group can be used in implementing execution of the one or more projecting adjacent instructions i1205 of FIG. 42, can be used in performance of the projecting adjacent electrical circuitry arrangement e1205 of FIG. 35, and/or can be used in otherwise fulfillment of the operation o1205. An exemplary non-transitory signal bearing medium version of the information storage subsystem s200 is depicted in FIG. 42 as bearing the one or more projecting adjacent instructions i1205 that when executed will direct performance of the operation o1205. Furthermore, the projecting adjacent electrical circuitry arrangement ("elec circ arrange") e1205, when activated, will perform the operation o1205. Also, the projecting adjacent module m1205, when executed and/or activated, will direct performance of and/or perform the operation o1205. For instance, in one or more exemplary implementations, the one or more projecting adjacent instructions i1205, when executed, direct performance of the operation o1205 in the illustrative depiction as follows, and/or the projecting adjacent electrical circuitry arrangement e1205, when activated, performs the operation o1205 in the illustrative depiction as follows, and/or the projecting adjacent module m1205, when executed and/or activated, directs performance of and/or performs the operation o1205 in the illustrative depiction as follows, and/or the operation o1205 is otherwise carried out in the illustrative depiction as follows: the electronically projecting (e.g. by one or more monitor embedded transducer portions, etc.) said two or more acoustic ultrasonic signals (e.g. via one or more acoustic ultrasonic signals including signals having one or more frequencies above 120 kHz, etc.) from said two or more portable electronic device emitters (e.g. including one or more scattered arrangements, etc.) of said portable electronic device (e.g. including one or more infrared components, etc.) to produce (e.g. including at least in part demodulation using signal rectification, etc.) a first set of one or more acoustic audio signals (e.g. including one or more low amplitude acoustic audio signals, etc.) from a first set of said two or more acoustic ultrasonic signals (e.g. including containing all portions, etc.) at a first location (e.g. exclusive to one or more chosen audio receivers, etc.) and to produce (e.g. including at least in part demodulation using signal rectification, etc.) a second set of one or more second acoustic audio signals (e.g. including one or more low amplitude acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. within a distance from a display screen to a person, etc. e.g. including one or more scattered arrangements, etc. e.g. etc. e.g. etc.) including outputting acoustic ultrasonic signal components according to sensed presence of others adjacent to one or more targeted listeners (e.g. including using ultrasonic imaging of a vicinity of target listener to determine if others without security clearances are near the target listener, etc.).

In one or more implementations, as shown in FIG. 69, operation o12 includes an operation o1206 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting to compensate for Doppler frequency shifting duet to movement of said portable electronic device. Origination of an illustratively derived projecting Doppler frequency component group can be accomplished through skilled in the art design choice selection of one or more of the above depicted components from one or more of the above depicted subsystems shown in FIG. 25. Components from the projecting Doppler frequency component group can be used in implementing execution of the one or more projecting Doppler frequency instructions i1206 of FIG. 42, can be used in performance of the projecting Doppler frequency electrical circuitry arrangement e1206 of FIG. 35, and/or can be used in otherwise fulfillment of the operation o1206. An exemplary non-transitory signal bearing medium version of the information storage subsystem s200 is depicted in FIG. 42 as bearing the one or more projecting Doppler frequency instructions i1206 that when executed will direct performance of the operation o1206. Furthermore, the projecting Doppler frequency electrical circuitry arrangement ("elec circ arrange") e1206, when activated, will perform the operation o1206. Also, the projecting Doppler frequency module m1206, when executed and/or activated, will direct performance of and/or perform the operation o1206. For instance, in one or more exemplary implementations, the one or more projecting Doppler frequency instructions i1206, when executed, direct performance of the operation o1206 in the illustrative depiction as follows, and/or the projecting Doppler frequency electrical circuitry arrangement e1206, when activated, performs the operation o1206 in the illustrative depiction as follows, and/or the projecting Doppler frequency module m1206, when executed and/or activated, directs performance of and/or performs the operation o1206 in the illustrative depiction as follows, and/or the operation o1206 is otherwise carried out in the illustrative depiction as follows: the electronically projecting (e.g. via one or more dispersed transducer portions, etc.) said two or more acoustic ultrasonic signals (e.g. via one or more acoustic ultrasonic signals including signals having one or more frequencies above 100 kHz, etc.) from said two or more portable electronic device emitters (e.g. including one or more staggered arrays, etc.) of said portable electronic device (e.g. including one or more personal digital assistant components, etc.) to produce (e.g. including at least in part demodulation by signal filtering, etc.) a first set of one or more acoustic audio signals (e.g. including one or more high amplitude acoustic audio signals, etc.) from a first set of said two or more acoustic ultrasonic signals (e.g. including containing measure portions, etc.) at a first location (e.g. exclusive to one or more selected microphones, etc.) and to produce (e.g. including at least in part demodulation by signal filtering, etc.) a second set of one or more second acoustic audio signals (e.g. including one or more high amplitude acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. within a distance from a portable device to an ear, etc. e.g. including one or more staggered arrays, etc. e.g. etc. e.g. etc.) including outputting to compensate for Doppler frequency shifting duet to movement of said portable electronic device (e.g. including frequency shifting audio components to account for quick arm movements having a smart watch attached thereto, etc.).

In one or more implementations, as shown in FIG. 70, operation o12 includes an operation o1207 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including embedding one or more digitally coded acoustic audio signals in one or more acoustic ultrasonic signals. Origination of an illustratively derived projecting digitally coded component group can be accomplished through skilled in the art design choice selection of one or more of the above depicted components from one or more of the above depicted subsystems shown in FIG. 25. Components from the projecting digitally coded component group can be used in implementing execution of the one or more projecting digitally coded instructions i1207 of FIG. 42, can be used in performance of the projecting digitally coded electrical circuitry arrangement e1207 of FIG. 35, and/or can be used in otherwise fulfillment of the operation o1207. An exemplary non-transitory signal bearing medium version of the information storage subsystem s200 is depicted in FIG. 42 as bearing the one or more projecting digitally coded instructions i1207 that when executed will direct performance of the operation o1207. Furthermore, the projecting digitally coded electrical circuitry arrangement ("elec circ arrange") e1207, when activated, will perform the operation o1207. Also, the projecting digitally coded module m1207, when executed and/or activated, will direct performance of and/or perform the operation o1207. For instance, in one or more exemplary implementations, the one or more projecting digitally coded instructions i1207, when executed, direct performance of the operation o1207 in the illustrative depiction as follows, and/or the projecting digitally coded electrical circuitry arrangement e1207, when activated, performs the operation o1207 in the illustrative depiction as follows, and/or the projecting digitally coded module m1207, when executed and/or activated, directs performance of and/or performs the operation o1207 in the illustrative depiction as follows, and/or the operation o1207 is otherwise carried out in the illustrative depiction as follows: the electronically projecting (e.g. through one or more emitter array portions, etc.) said two or more acoustic ultrasonic signals (e.g. via one or more acoustic ultrasonic signals including signals having one or more frequencies above 80 kHz, etc.) from said two or more portable electronic device emitters (e.g. including one or more linear arrangements, etc.) of said portable electronic device (e.g. including one or more smart phone components, etc.) to produce (e.g. including at least in part demodulation through signal intelligence recovery, etc.) a first set of one or more acoustic audio signals (e.g. including one or more high frequency acoustic audio signals etc.) from a first set of said two or more acoustic ultrasonic signals (e.g. including containing phrase portions, etc.) at a first location (e.g. exclusive to one or more designated surfaces, etc.) and to produce (e.g. including at least in part demodulation through signal intelligence recovery, etc.) a second set of one or more second acoustic audio signals (e.g. including one or more high frequency acoustic audio signals etc.) from of a second set of said two or more acoustic ultrasonic signals (e.g. via one or more acoustic ultrasonic signals including signals having one or more frequencies above 60 kHz, etc.) at a second location (e.g. within a distance from a display screen to an ear, etc. e.g. including one or more linear arrangements, etc. e.g. etc. e.g. etc.) including embedding one or more digitally coded acoustic audio signals in one or more acoustic ultrasonic signals (e.g. including digitally coded acoustic signals to sense level of quality of acoustic audio signals down-converted from an ultrasonic carrier signal, etc.).

In one or more implementations, as shown in FIG. 70, operation o12 includes an operation o1208 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting one or more acoustic ultrasonic signals for ranging one or more target listeners. Origination of an illustratively derived projecting ranging component group can be accomplished through skilled in the art design choice selection of one or more of the above depicted components from one or more of the above depicted subsystems shown in FIG. 25. Components from the projecting ranging component group can be used in implementing execution of the one or more projecting ranging instructions i1208 of FIG. 42, can be used in performance of the projecting ranging electrical circuitry arrangement e1208 of FIG. 35, and/or can be used in otherwise fulfillment of the operation o1208. An exemplary non-transitory signal bearing medium version of the information storage subsystem s200 is depicted in FIG. 42 as bearing the one or more projecting ranging instructions i1208 that when executed will direct performance of the operation o1208. Furthermore, the projecting ranging electrical circuitry arrangement ("elec circ arrange") e1208, when activated, will perform the operation o1208. Also, the projecting ranging module m1208, when executed and/or activated, will direct performance of and/or perform the operation o1208. For instance, in one or more exemplary implementations, the one or more projecting ranging instructions i1208, when executed, direct performance of the operation o1208 in the illustrative depiction as follows, and/or the projecting ranging electrical circuitry arrangement e1208, when activated, performs the operation o1208 in the illustrative depiction as follows, and/or the projecting ranging module m1208, when executed and/or activated, directs performance of and/or performs the operation o1208 in the illustrative depiction as follows, and/or the operation o1208 is otherwise carried out in the illustrative depiction as follows: the electronically projecting (e.g. using one or more deposition transducer portions, etc.) said two or more acoustic ultrasonic signals (e.g. via one or more acoustic ultrasonic signals including signals having one or more frequencies above 60 kHz etc.) from said two or more portable electronic device emitters (e.g. including one or more parabolic arrangements, etc.) of said portable electronic device (e.g. including one or more cell phone components, etc.) to produce (e.g. including demodulation via mutual interference therewith multiple acoustic ultrasonic signals configured to be demodulated through to at least in part result in one or more acoustic audio signals, etc.) a first set of one or more acoustic audio signals (e.g. including one or more lecture information containing acoustic audio signals, etc.) from a first set of said two or more acoustic ultrasonic signals (e.g. including containing chapter portions, etc.) at a first location (e.g. exclusive to one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more lecture information containing acoustic audio signals, etc.) from of a second set of said two or more acoustic ultrasonic signals (e.g. via one or more acoustic ultrasonic signals including signals having one or more frequencies above 80 kHz, etc.) at a second location (e.g. within a distance from a portable device to a center of a group, etc. e.g. including one or more parabolic arrangements, etc. e.g. etc. e.g. etc.) including outputting one or more acoustic ultrasonic signals for ranging one or more target listeners (e.g. including using portions of ultrasonic signals sent from a tablet computer to a target listener to determine positioning of the target listener relative to the tablet computer, etc.).

In one or more implementations, as shown in FIG. 70, operation o12 includes an operation o1209 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting acoustic ultrasonic signal amplitude based on visual tracking of one or more target listeners. Origination of an illustratively derived projecting visual tracking component group can be accomplished through skilled in the art design choice selection of one or more of the above depicted components from one or more of the above depicted subsystems shown in FIG. 25. Components from the projecting visual tracking component group can be used in implementing execution of the one or more projecting visual tracking instructions i1209 of FIG. 42, can be used in performance of the projecting visual tracking electrical circuitry arrangement e1209 of FIG. 35, and/or can be used in otherwise fulfillment of the operation o1209. An exemplary non-transitory signal bearing medium version of the information storage subsystem s200 is depicted in FIG. 42 as bearing the one or more projecting visual tracking instructions i1209 that when executed will direct performance of the operation o1209. Furthermore, the projecting visual tracking electrical circuitry arrangement ("elec circ arrange") e1209, when activated, will perform the operation o1209. Also, the projecting visual tracking module m1209, when executed and/or activated, will direct performance of and/or perform the operation o1209. For instance, in one or more exemplary implementations, the one or more projecting visual tracking instructions i1209, when executed, direct performance of the operation o1209 in the illustrative depiction as follows, and/or the projecting visual tracking electrical circuitry arrangement e1209, when activated, performs the operation o1209 in the illustrative depiction as follows, and/or the projecting visual tracking module m1209, when executed and/or activated, directs performance of and/or performs the operation o1209 in the illustrative depiction as follows, and/or the operation o1209 is otherwise carried out in the illustrative depiction as follows: the electronically projecting (e.g. from one or more polyvinylidene fluoride film transducer portions, etc.) said two or more acoustic ultrasonic signals (e.g. via one or more acoustic ultrasonic signals configured to be demodulated through nonlinear interaction with one or more solids to at least in part generate one or more acoustic audio signals, etc.) from said two or more portable electronic device emitters (e.g. including one or more hyperbolic arrangements, etc.) of said portable electronic device (e.g. including one or more laptop components, etc.) to produce (e.g. including demodulation using one or more acoustic ultrasonic signals configured to be demodulated through nonlinear atmospheric interaction to at least in part generate one or more acoustic audio signals, etc.) a first set of one or more acoustic audio signals (e.g. including one or more foreign language speech information containing acoustic audio signals, etc.) from a first set of said two or more acoustic ultrasonic signals (e.g. including containing sectional portions, etc.) at a first location (e.g. exclusive to one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more foreign language speech information containing acoustic audio signals, etc.) from of a second set of said two or more acoustic ultrasonic signals (e.g. via one or more acoustic ultrasonic signals including signals having one or more frequencies above 100 kHz, etc.) at a second location (e.g. within a distance from a display screen to a center of a group, etc. e.g. including one or more hyperbolic arrangements, etc. e.g. etc. e.g. etc.) including adjusting acoustic ultrasonic signal amplitude based on visual tracking of one or more target listeners (e.g. including adjustment of amplitude of ultrasonic signals transmitted from a laptop based upon visual recognition of one or more target listeners by algorithms being run on the laptop, etc.).

In one or more implementations, as shown in FIG. 71, operation o12 includes an operation o1210 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting acoustic ultrasonic signal amplitude based on thermal tracking of one or more target listeners. Origination of an illustratively derived projecting thermal tracking component group can be accomplished through skilled in the art design choice selection of one or more of the above depicted components from one or more of the above depicted subsystems shown in FIG. 25. Components from the projecting thermal tracking component group can be used in implementing execution of the one or more projecting thermal tracking instructions i1210 of FIG. 42, can be used in performance of the projecting thermal tracking electrical circuitry arrangement e1210 of FIG. 35, and/or can be used in otherwise fulfillment of the operation o1210. An exemplary non-transitory signal bearing medium version of the information storage subsystem s200 is depicted in FIG. 42 as bearing the one or more projecting thermal tracking instructions i1210 that when executed will direct performance of the operation o1210. Furthermore, the projecting thermal tracking electrical circuitry arrangement ("elec circ arrange") e1210, when activated, will perform the operation o1210. Also, the projecting thermal tracking module m1210, when executed and/or activated, will direct performance of and/or perform the operation o1210. For instance, in one or more exemplary implementations, the one or more projecting thermal tracking instructions i1210, when executed, direct performance of the operation o1210 in the illustrative depiction as follows, and/or the projecting thermal tracking electrical circuitry arrangement e1210, when activated, performs the operation o1210 in the illustrative depiction as follows, and/or the projecting thermal tracking module m1210, when executed and/or activated, directs performance of and/or performs the operation o1210 in the illustrative depiction as follows, and/or the operation o1210 is otherwise carried out in the illustrative depiction as follows: the electronically projecting (e.g. by one or more electro-thermo-mechanical film transducer portions, etc.) said two or more acoustic ultrasonic signals (e.g. via one or more acoustic ultrasonic signals configured to be demodulated through nonlinear apparel interaction to at least in part produce one or more acoustic audio signals, etc.) from said two or more portable electronic device emitters (e.g. including one or more enclosed arrangements, etc.) of said portable electronic device (e.g. including one or more tablet computer components, etc.) to produce (e.g. including demodulation with one or more acoustic ultrasonic signals configured to be demodulated through nonlinear human tissue interaction to at least in part produce one or more acoustic audio signals, etc.) a first set of one or more acoustic audio signals (e.g. including one or more classical music selection information containing acoustic audio signals, etc.) from a first set of said two or more acoustic ultrasonic signals (e.g. including containing whole portions, etc.) at a first location (e.g. exclusive to one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more classical music selection information containing acoustic audio signals, etc.) from of a second set of said two or more acoustic ultrasonic signals (e.g. via one or more acoustic ultrasonic signals including signals having one or more frequencies above 120 kHz, etc.) at a second location (e.g. within a distance from a transmitter to a receiver, etc. e.g. including one or more enclosed arrangements, etc. e.g. etc. e.g. etc.) including adjusting acoustic ultrasonic signal amplitude based on thermal tracking of one or more target listeners (e.g. including adjustment of amplitude of ultrasonic signals transmitted from a laptop based upon infrared recognition of one or more target listeners by algorithms being run on the laptop, etc.).

In one or more implementations, as shown in FIG. 71, operation o12 includes an operation o1211 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting location of greatest intensity of down converted acoustic audio signals based on visual tracking of one or more target listeners. Origination of an illustratively derived projecting greatest intensity component group can be accomplished through skilled in the art design choice selection of one or more of the above depicted components from one or more of the above depicted subsystems shown in FIG. 25. Components from the projecting greatest intensity component group can be used in implementing execution of the one or more projecting greatest intensity instructions i1211 of FIG. 42, can be used in performance of the projecting greatest intensity electrical circuitry arrangement e1211 of FIG. 35, and/or can be used in otherwise fulfillment of the operation o1211. An exemplary non-transitory signal bearing medium version of the information storage subsystem s200 is depicted in FIG. 42 as bearing the one or more projecting greatest intensity instructions i1211 that when executed will direct performance of the operation o1211. Furthermore, the projecting greatest intensity electrical circuitry arrangement ("elec circ arrange") e1211, when activated, will perform the operation o1211. Also, the projecting greatest intensity module m1211, when executed and/or activated, will direct performance of and/or perform the operation o1211. For instance, in one or more exemplary implementations, the one or more projecting greatest intensity instructions i1211, when executed, direct performance of the operation o1211 in the illustrative depiction as follows, and/or the projecting greatest intensity electrical circuitry arrangement e1211, when activated, performs the operation o1211 in the illustrative depiction as follows, and/or the projecting greatest intensity module m1211, when executed and/or activated, directs performance of and/or performs the operation o1211 in the illustrative depiction as follows, and/or the operation o1211 is otherwise carried out in the illustrative depiction as follows: the electronically projecting (e.g. via one or more electrostrictive transducer portions, etc.) said two or more acoustic ultrasonic signals (e.g. via one or more acoustic ultrasonic signals configured to be demodulated through nonlinear polymeric interaction to at least in part result in one or more acoustic audio signals, etc.) from said two or more portable electronic device emitters (e.g. including one or more transducer arrangements, etc.) of said portable electronic device (e.g. including one or more mp3 player components, etc.) to produce (e.g. including demodulation by one or more acoustic ultrasonic signals configured to be demodulated through nonlinear polymeric interaction to at least in part result in one or more acoustic audio signals, etc.) a first set of one or more acoustic audio signals (e.g. including one or more instructional lesson material information containing acoustic audio signals, etc.) from a first set of said two or more acoustic ultrasonic signals (e.g. including containing partial portions, etc.) at a first location (e.g. exclusive to one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more instructional lesson material information containing acoustic audio signals, etc.) from of a second set of said two or more acoustic ultrasonic signals (e.g. via one or more acoustic ultrasonic signals including signals having one or more frequencies above 140 kHz, etc.) at a second location (e.g. within a distance from a first seat back to a second seat back, etc. e.g. including one or more transducer arrangements, etc. e.g. etc. e.g. etc.) including adjusting location of greatest intensity of down converted acoustic audio signals based on visual tracking of one or more target listeners (e.g. including adjustment of location of intensity of ultrasonic signals transmitted from a tablet computer based upon visual recognition of one or more target listeners by algorithms being run on the tablet, etc.).

In one or more implementations, as shown in FIG. 71, operation o12 includes an operation o1212 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including adjusting location of greatest intensity of down converted acoustic audio signals based on thermal tracking of one or more target listeners. Origination of an illustratively derived projecting thermal tracking component group can be accomplished through skilled in the art design choice selection of one or more of the above depicted components from one or more of the above depicted subsystems shown in FIG. 25. Components from the projecting thermal tracking component group can be used in implementing execution of the one or more projecting thermal tracking instructions i1212 of FIG. 42, can be used in performance of the projecting thermal tracking electrical circuitry arrangement e1212 of FIG. 35, and/or can be used in otherwise fulfillment of the operation o1212. An exemplary non-transitory signal bearing medium version of the information storage subsystem s200 is depicted in FIG. 42 as bearing the one or more projecting thermal tracking instructions i1212 that when executed will direct performance of the operation o1212. Furthermore, the projecting thermal tracking electrical circuitry arrangement ("elec circ arrange") e1212, when activated, will perform the operation o1212. Also, the projecting thermal tracking module m1212, when executed and/or activated, will direct performance of and/or perform the operation o1212. For instance, in one or more exemplary implementations, the one or more projecting thermal tracking instructions i1212, when executed, direct performance of the operation o1212 in the illustrative depiction as follows, and/or the projecting thermal tracking electrical circuitry arrangement e1212, when activated, performs the operation o1212 in the illustrative depiction as follows, and/or the projecting thermal tracking module m1212, when executed and/or activated, directs performance of and/or performs the operation o1212 in the illustrative depiction as follows, and/or the operation o1212 is otherwise carried out in the illustrative depiction as follows: the electronically projecting (e.g. through one or more piezoelectric transducer portions, etc.) said two or more acoustic ultrasonic signals (e.g. via one or more acoustic ultrasonic signals configured to be demodulated through nonlinear human tissue interaction to at least in part produce one or more acoustic audio signals, etc.) from said two or more portable electronic device emitters (e.g. including one or more aperture arrangements, etc.) of said portable electronic device (e.g. including one or more mobile phone components, etc.) to produce (e.g. including demodulation through one or more acoustic ultrasonic signals configured to be demodulated through nonlinear apparel interaction to at least in part produce one or more acoustic audio signals, etc.) a first set of one or more acoustic audio signals (e.g. including one or more warning tone information containing acoustic audio signals, etc.) from a first set of said two or more acoustic ultrasonic signals (e.g. including containing transitionary portions, etc.) at a first location (e.g. exclusive to one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including one or more warning tone information containing acoustic audio signals, etc.) from of a second set of said two or more acoustic ultrasonic signals (e.g. via one or more acoustic ultrasonic signals including signals having one or more frequencies above 160 kHz, etc.) at a second location (e.g. within a distance from a seat back to a tray table, etc. e.g. including one or more aperture arrangements, etc. e.g. etc. e.g. etc.) including adjusting location of greatest intensity of down converted acoustic audio signals based on thermal tracking of one or more target listeners (e.g. including adjustment of location of intensity of ultrasonic signals transmitted from a tablet computer based upon infrared tracking of one or more target listeners by algorithms being run on the tablet, etc.).

In one or more implementations, as shown in FIG. 72, operation o12 includes an operation o1213 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting acoustic ultrasonic signal amplitude based on two dimensional user interface user input. Origination of an illustratively derived projecting signal amplitude component group can be accomplished through skilled in the art design choice selection of one or more of the above depicted components from one or more of the above depicted subsystems shown in FIG. 25. Components from the projecting signal amplitude component group can be used in implementing execution of the one or more projecting signal amplitude instructions i1213 of FIG. 42, can be used in performance of the projecting signal amplitude electrical circuitry arrangement e1213 of FIG. 35, and/or can be used in otherwise fulfillment of the operation o1213. An exemplary non-transitory signal bearing medium version of the information storage subsystem s200 is depicted in FIG. 42 as bearing the one or more projecting signal amplitude instructions i1213 that when executed will direct performance of the operation o1213. Furthermore, the projecting signal amplitude electrical circuitry arrangement ("elec circ arrange") e1213, when activated, will perform the operation o1213. Also, the projecting signal amplitude module m1213, when executed and/or activated, will direct performance of and/or perform the operation o1213. For instance, in one or more exemplary implementations, the one or more projecting signal amplitude instructions i1213, when executed, direct performance of the operation o1213 in the illustrative depiction as follows, and/or the projecting signal amplitude electrical circuitry arrangement e1213, when activated, performs the operation o1213 in the illustrative depiction as follows, and/or the projecting signal amplitude module m1213, when executed and/or activated, directs performance of and/or performs the operation o1213 in the illustrative depiction as follows, and/or the operation o1213 is otherwise carried out in the illustrative depiction as follows: the electronically projecting (e.g. using one or more electrostatic transducer portions, etc.) said two or more acoustic ultrasonic signals (e.g. via one or more acoustic ultrasonic signals configured to be demodulated through nonlinear atmospheric interaction to at least in part generate one or more acoustic audio signals, etc.) from said two or more portable electronic device emitters (e.g. including one or more transmitter arrangements, etc.) of said portable electronic device (e.g. including one or more two-way radio components, etc.) to produce (e.g. including demodulation by one or more acoustic ultrasonic signals configured to be demodulated through nonlinear interaction with one or more solids to at least in part generate one or more acoustic audio signals, etc.) a first set of one or more acoustic audio signals (e.g. including one or more white noise information containing acoustic audio signals, etc.) from a first set of said two or more acoustic ultrasonic signals (e.g. including containing temporary portions, etc.) at a first location (e.g. exclusive to one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including one or more white noise information containing acoustic audio signals, etc.) from of a second set of said two or more acoustic ultrasonic signals (e.g. via one or more acoustic ultrasonic signals including signals having one or more frequencies above 180 kHz, etc.) at a second location (e.g. within a distance of an aisle way, etc. e.g. including one or more transmitter arrangements, etc. e.g. etc. e.g. etc.) including outputting acoustic ultrasonic signal amplitude based on two dimensional user interface user input (e.g. including adjustment of amplitude of ultrasonic signals transmitted from a laptop based upon track pad input to the laptop, etc.).

In one or more implementations, as shown in FIG. 72, operation o12 includes an operation o1214 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting acoustic ultrasonic signal target location based on two dimensional user interface user input. Origination of an illustratively derived projecting target location component group can be accomplished through skilled in the art design choice selection of one or more of the above depicted components from one or more of the above depicted subsystems shown in FIG. 25. Components from the projecting target location component group can be used in implementing execution of the one or more projecting target location instructions i1214 of FIG. 42, can be used in performance of the projecting target location electrical circuitry arrangement e1214 of FIG. 35, and/or can be used in otherwise fulfillment of the operation o1214. An exemplary non-transitory signal bearing medium version of the information storage subsystem s200 is depicted in FIG. 42 as bearing the one or more projecting target location instructions i1214 that when executed will direct performance of the operation o1214. Furthermore, the projecting target location electrical circuitry arrangement ("elec circ arrange") e1214, when activated, will perform the operation o1214. Also, the projecting target location module m1214, when executed and/or activated, will direct performance of and/or perform the operation o1214. For instance, in one or more exemplary implementations, the one or more projecting target location instructions i1214, when executed, direct performance of the operation o1214 in the illustrative depiction as follows, and/or the projecting target location electrical circuitry arrangement e1214, when activated, performs the operation o1214 in the illustrative depiction as follows, and/or the projecting target location module m1214, when executed and/or activated, directs performance of and/or performs the operation o1214 in the illustrative depiction as follows, and/or the operation o1214 is otherwise carried out in the illustrative depiction as follows: the electronically projecting (e.g. from one or more ultrasonic transducer portions, etc.) said two or more acoustic ultrasonic signals (e.g. via multiple acoustic ultrasonic signals configured to be demodulated through mutual interference therewith to at least in part result in one or more acoustic audio signals, etc.) from said two or more portable electronic device emitters (e.g. including one or more air-coupled transducer arrangements, etc.) of said portable electronic device (e.g. including one or more security network components, etc.) to produce (e.g. including at least in part demodulation by signal down conversion, etc.) a first set of one or more acoustic audio signals (e.g. including varying pitch information containing acoustic audio signals, etc.) from a first set of said two or more acoustic ultrasonic signals (e.g. including containing steady state portions, etc.) at a first location (e.g. inclusive to one or more designated ears, etc.) and to produce (e.g. including at least in part demodulation by signal down conversion, etc.) a second set of one or more second acoustic audio signals (e.g. including varying pitch information containing acoustic audio signals, etc.) from of a second set of said two or more acoustic ultrasonic signals (e.g. via one or more acoustic ultrasonic signals including signals having one or more frequencies above 200 kHz, etc.) at a second location (e.g. within a distance from a desk to a chair, etc. e.g. including one or more air-coupled transducer arrangements, etc. e.g. etc. e.g. etc.) including outputting acoustic ultrasonic signal target location based on two dimensional user interface user input (e.g. including adjustment of target location of ultrasonic signals transmitted from a laptop based upon track pad input to the laptop, etc.).

In one or more implementations, as shown in FIG. 72, operation o12 includes an operation o1215 for the electronically projecting said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting based on audio microphone sensing of acoustic audio signals down converted at one or more target locations. Origination of an illustratively derived projecting audio microphone component group can be accomplished through skilled in the art design choice selection of one or more of the above depicted components from one or more of the above depicted subsystems shown in FIG. 25. Components from the projecting audio microphone component group can be used in implementing execution of the one or more projecting audio microphone instructions i1215 of FIG. 42, can be used in performance of the projecting audio microphone electrical circuitry arrangement e1215 of FIG. 35, and/or can be used in otherwise fulfillment of the operation o1215. An exemplary non-transitory signal bearing medium version of the information storage subsystem s200 is depicted in FIG. 42 as bearing the one or more projecting audio microphone instructions i1215 that when executed will direct performance of the operation o1215. Furthermore, the projecting audio microphone electrical circuitry arrangement ("elec circ arrange") e1215, when activated, will perform the operation o1215. Also, the projecting audio microphone module m1215, when executed and/or activated, will direct performance of and/or perform the operation o1215. For instance, in one or more exemplary implementations, the one or more projecting audio microphone instructions i1215, when executed, direct performance of the operation o1215 in the illustrative depiction as follows, and/or the projecting audio microphone electrical circuitry arrangement e1215, when activated, performs the operation o1215 in the illustrative depiction as follows, and/or the projecting audio microphone module m1215, when executed and/or activated, directs performance of and/or performs the operation o1215 in the illustrative depiction as follows, and/or the operation o1215 is otherwise carried out in the illustrative depiction as follows: the electronically projecting (e.g. by one or more membrane speaker portions, etc.) said two or more acoustic ultrasonic signals (e.g. via one or more acoustic ultrasonic signals including signals having one or more frequencies above 200 kHz etc.) from said two or more portable electronic device emitters (e.g. including one or more thin-film membrane arrangements, etc.) of said portable electronic device (e.g. including one or more netbook components, etc.) to produce (e.g. including at least in part demodulation through signal amplitude demodulation, etc.) a first set of one or more acoustic audio signals (e.g. including one or more note sequence information containing acoustic audio signals, etc.) from a first set of said two or more acoustic ultrasonic signals (e.g. including containing integrated portions, etc.) at a first location (e.g. inclusive to one or more identified persons, etc.) and to produce (e.g. including at least in part demodulation through signal amplitude demodulation, etc.) a second set of one or more second acoustic audio signals (e.g. including one or more note sequence information containing acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. within a distance from a dashboard to a headrest etc. e.g. including one or more thin-film membrane arrangements, etc. e.g. etc. e.g. etc.) including outputting based on audio microphone sensing of acoustic audio signals down converted at one or more target locations (e.g. including adjustment of audio signal amplitude to be down-converted from ultrasonic signals transmitted from a laptop based upon sensing of the down converted audio signals by audio microphone portions located on the laptop, etc.).

In one or more implementations, as shown in FIG. 73, operation o12 includes an operation o1216 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting based on ultrasonic microphone sensing of acoustic ultrasonic signals down converted at one or more target locations. Origination of an illustratively derived projecting ultrasonic microphone component group can be accomplished through skilled in the art design choice selection of one or more of the above depicted components from one or more of the above depicted subsystems shown in FIG. 25. Components from the projecting ultrasonic microphone component group can be used in implementing execution of the one or more projecting ultrasonic microphone instructions i1216 of FIG. 42, can be used in performance of the projecting ultrasonic microphone electrical circuitry arrangement e1216 of FIG. 35, and/or can be used in otherwise fulfillment of the operation o1216. An exemplary non-transitory signal bearing medium version of the information storage subsystem s200 is depicted in FIG. 42 as bearing the one or more projecting ultrasonic microphone instructions i1216 that when executed will direct performance of the operation o1216. Furthermore, the projecting ultrasonic microphone electrical circuitry arrangement ("elec circ arrange") e1216, when activated, will perform the operation o1216. Also, the projecting ultrasonic microphone module m1216, when executed and/or activated, will direct performance of and/or perform the operation o1216. For instance, in one or more exemplary implementations, the one or more projecting ultrasonic microphone instructions i1216, when executed, direct performance of the operation o1216 in the illustrative depiction as follows, and/or the projecting ultrasonic microphone electrical circuitry arrangement e1216, when activated, performs the operation o1216 in the illustrative depiction as follows, and/or the projecting ultrasonic microphone module m1216, when executed and/or activated, directs performance of and/or performs the operation o1216 in the illustrative depiction as follows, and/or the operation o1216 is otherwise carried out in the illustrative depiction as follows: the electronically projecting (e.g. via one or more transducer array portions, etc.) said two or more acoustic ultrasonic signals (e.g. via multiple acoustic ultrasonic signals configured to be demodulated through mutual interference therewith to at least in part result in one or more acoustic audio signals, etc.) from said two or more portable electronic device emitters (e.g. including one or more resonant surface arrangements, etc.) of said portable electronic device (e.g. including one or more ultrabook components, etc.) to produce (e.g. including at least in part demodulation via signal frequency demodulation portions, etc.) a first set of one or more acoustic audio signals (e.g. including one or more two-way conversation information containing acoustic audio signals, etc.) from a first set of said two or more acoustic ultrasonic signals (e.g. including containing disparate portions, etc.) at a first location (e.g. inclusive to one or more predetermined ears, etc.) and to produce (e.g. including at least in part demodulation via signal frequency demodulation portions, etc.) a second set of one or more second acoustic audio signals (e.g. including one or more two-way conversation information containing acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. less than confines of a room, etc. e.g. including one or more resonant surface arrangements, etc. e.g. etc. e.g. etc.) including outputting based on ultrasonic microphone sensing of acoustic ultrasonic signals down converted at one or more target locations (e.g. including adjustment of ultrasonic signal amplitude transmitted from a tablet computer based upon sensing of the ultrasonic signals by ultrasonic microphone portions located on the tablet, etc.).

In one or more implementations, as shown in FIG. 73, operation o12 includes an operation o1217 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting based on sensing of acoustic digital signals received from one or more target locations. Origination of an illustratively derived projecting acoustic digital component group can be accomplished through skilled in the art design choice selection of one or more of the above depicted components from one or more of the above depicted subsystems shown in FIG. 25. Components from the projecting acoustic digital component group can be used in implementing execution of the one or more projecting acoustic digital instructions i1217 of FIG. 42, can be used in performance of the projecting acoustic digital electrical circuitry arrangement e1217 of FIG. 35, and/or can be used in otherwise fulfillment of the operation o1217. An exemplary non-transitory signal bearing medium version of the information storage subsystem s200 is depicted in FIG. 42 as bearing the one or more projecting acoustic digital instructions i1217 that when executed will direct performance of the operation o1217. Furthermore, the projecting acoustic digital electrical circuitry arrangement ("elec circ arrange") e1217, when activated, will perform the operation o1217. Also, the projecting acoustic digital module m1217, when executed and/or activated, will direct performance of and/or perform the operation o1217. For instance, in one or more exemplary implementations, the one or more projecting acoustic digital instructions i1217, when executed, direct performance of the operation o1217 in the illustrative depiction as follows, and/or the projecting acoustic digital electrical circuitry arrangement e1217, when activated, performs the operation o1217 in the illustrative depiction as follows, and/or the projecting acoustic digital module m1217, when executed and/or activated, directs performance of and/or performs the operation o1217 in the illustrative depiction as follows, and/or the operation o1217 is otherwise carried out in the illustrative depiction as follows: the electronically projecting (e.g. through one or more transducer membrane portions, etc.) said two or more acoustic ultrasonic signals (e.g. via one or more acoustic ultrasonic signals configured to be demodulated through nonlinear atmospheric interaction to at least in part generate one or more acoustic audio signals, etc.) from said two or more portable electronic device emitters (e.g. including one or more transmitter arrangements, etc.) of said portable electronic device (e.g. including one or more flip-phone components, etc.) to produce (e.g. including at least in part demodulation with signal phase demodulation portions, etc.) a first set of one or more acoustic audio signals (e.g. including one or more confidential information containing acoustic audio signals, etc.) from a first set of said two or more acoustic ultrasonic signals (e.g. via multiple acoustic ultrasonic signals configured to be demodulated through mutual interference therewith to at least in part result in one or more acoustic audio signals, etc.) at a first location (e.g. inclusive to one or more desired groups of people, etc.) and to produce (e.g. including at least in part demodulation with signal phase demodulation portions, etc.) a second set of one or more second acoustic audio signals (e.g. including one or more confidential information containing acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. less than an arm's length, etc. e.g. including one or more transmitter arrangements, etc. e.g. etc. e.g. etc.) including outputting based on sensing of acoustic digital signals received from one or more target locations (e.g. including adjustment of audio signal quality to be down-converted from ultrasonic signals transmitted from a laptop based upon sensing of audio digital signals as part of the down converted audio signals by audio microphone portions located on the laptop, etc.).

In one or more implementations, as shown in FIG. 73, operation o12 includes an operation o1218 for the electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting acoustic ultrasonic signals to be down converted into acoustic anti-noise signals to at least in part cancel acoustic noise signals sensed at one or more target locations. Origination of an illustratively derived projecting acoustic noise component group can be accomplished through skilled in the art design choice selection of one or more of the above depicted components from one or more of the above depicted subsystems shown in FIG. 25. Components from the projecting acoustic noise component group can be used in implementing execution of the one or more projecting acoustic noise instructions i1218 of FIG. 42, can be used in performance of the projecting acoustic noise electrical circuitry arrangement e1218 of FIG. 35, and/or can be used in otherwise fulfillment of the operation o1218. An exemplary non-transitory signal bearing medium version of the information storage subsystem s200 is depicted in FIG. 42 as bearing the one or more projecting acoustic noise instructions i1218 that when executed will direct performance of the operation o1218. Furthermore, the projecting acoustic noise electrical circuitry arrangement ("elec circ arrange") e1218, when activated, will perform the operation o1218. Also, the projecting acoustic noise module m1218, when executed and/or activated, will direct performance of and/or perform the operation o1218. For instance, in one or more exemplary implementations, the one or more projecting acoustic noise instructions i1218, when executed, direct performance of the operation o1218 in the illustrative depiction as follows, and/or the projecting acoustic noise electrical circuitry arrangement e1218, when activated, performs the operation o1218 in the illustrative depiction as follows, and/or the projecting acoustic noise module m1218, when executed and/or activated, directs performance of and/or performs the operation o1218 in the illustrative depiction as follows, and/or the operation o1218 is otherwise carried out in the illustrative depiction as follows: the electronically projecting (e.g. using one or more transmitter portions, etc.) said two or more acoustic ultrasonic signals (e.g. via one or more acoustic ultrasonic signals configured to be demodulated through nonlinear human tissue interaction to at least in part produce one or more acoustic audio signals, etc.) from said two or more portable electronic device emitters (e.g. including one or more transducer membrane arrangements, etc.) of said portable electronic device (e.g. including one or more portable computer components, etc.) to produce (e.g. including at least in part demodulation using signal rectification, etc.) a first set of one or more acoustic audio signals (e.g. including one or more eavesdropping information containing acoustic audio signals, etc.) from a first set of said two or more acoustic ultrasonic signals (e.g. via one or more acoustic ultrasonic signals configured to be demodulated through nonlinear atmospheric interaction to at least in part generate one or more acoustic audio signals, etc.) at a first location (e.g. inclusive to one or more chosen audio receivers, etc.) and to produce (e.g. including at least in part demodulation using signal rectification, etc.) a second set of one or more second acoustic audio signals (e.g. including one or more eavesdropping information containing acoustic audio signals, etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. less than a three-foot radius, etc. e.g. including one or more transducer membrane arrangements, etc. e.g. etc. e.g. etc.) including outputting acoustic ultrasonic signals to be down converted into acoustic anti-noise signals to at least in part cancel acoustic noise signals sensed at one or more target locations (e.g. including adjustment of anti-noise audio signal amplitude to be down-converted from ultrasonic signals transmitted from a laptop based upon sensing of the noise audio signals by audio microphone portions located on the laptop, etc.).

In one or more implementations, as shown in FIG. 74, operation o12 includes an operation o1219 for the electronically projecting the said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more ultrasonic signals having frequencies with a range of between 60 to 200 kHz. Origination of an illustratively derived projecting ultrasonic signals component group can be accomplished through skilled in the art design choice selection of one or more of the above depicted components from one or more of the above depicted subsystems shown in FIG. 25. Components from the projecting ultrasonic signals component group can be used in implementing execution of the one or more projecting ultrasonic signals instructions i1219 of FIG. 42, can be used in performance of the projecting ultrasonic signals electrical circuitry arrangement e1219 of FIG. 35, and/or can be used in otherwise fulfillment of the operation o1219. An exemplary non-transitory signal bearing medium version of the information storage subsystem s200 is depicted in FIG. 42 as bearing the one or more projecting ultrasonic signals instructions i1219 that when executed will direct performance of the operation o1219. Furthermore, the projecting ultrasonic signals electrical circuitry arrangement ("elec circ arrange") e1219, when activated, will perform the operation o1219. Also, the projecting ultrasonic signals module m1219, when executed and/or activated, will direct performance of and/or perform the operation o1219. For instance, in one or more exemplary implementations, the one or more projecting ultrasonic signals instructions i1219, when executed, direct performance of the operation o1219 in the illustrative depiction as follows, and/or the projecting ultrasonic signals electrical circuitry arrangement e1219, when activated, performs the operation o1219 in the illustrative depiction as follows, and/or the projecting ultrasonic signals module m1219, when executed and/or activated, directs performance of and/or performs the operation o1219 in the illustrative depiction as follows, and/or the operation o1219 is otherwise carried out in the illustrative depiction as follows: the electronically projecting (e.g. from one or more signal processor portions, etc.) the said two or more acoustic ultrasonic signals (e.g. via one or more acoustic ultrasonic signals configured to be demodulated through nonlinear polymeric interaction to at least in part result in one or more acoustic audio signals, etc.) from said two or more portable electronic device emitters (e.g. including one or more transducer array arrangements, etc.) of said portable electronic device (e.g. including one or more boombox components, etc.) to produce (e.g. including at least in part demodulation by signal filtering, etc.) a first set of one or more acoustic audio signals (e.g. including one or more pre-recorded information containing acoustic audio signals, etc.) from a first set of said two or more acoustic ultrasonic signals (e.g. via one or more acoustic ultrasonic signals configured to be demodulated through nonlinear human tissue interaction to at least in part produce one or more acoustic audio signals, etc.) at a first location (e.g. inclusive to one or more selected microphones, etc.) and to produce (e.g. including at least in part demodulation by signal filtering, etc.) a second set of one or more second acoustic audio signals (e.g. including one or more pre-recorded information containing acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. less than a distance from a portable device to a person, etc. e.g. including one or more transducer array arrangements, etc. e.g. etc. e.g. etc.) including one or more ultrasonic signals having frequencies with a range of between 60 to 200 kHz (e.g. including an acoustic ultrasonic carrier signal including frequency of 150 kHz, etc.).

In one or more implementations, as shown in FIG. 74, operation o12 includes an operation o1220 for electronically projecting the said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including vectoring of two or more beams of acoustic ultrasonic signals to down convert to one or more acoustic audio signals. Origination of an illustratively derived projecting vectoring component group can be accomplished through skilled in the art design choice selection of one or more of the above depicted components from one or more of the above depicted subsystems shown in FIG. 25. Components from the projecting vectoring component group can be used in implementing execution of the one or more projecting vectoring instructions i1220 of FIG. 43, can be used in performance of the projecting vectoring electrical circuitry arrangement e1220 of FIG. 36, and/or can be used in otherwise fulfillment of the operation o1220. An exemplary non-transitory signal bearing medium version of the information storage subsystem s200 is depicted in FIG. 43 as bearing the one or more projecting vectoring instructions i1220 that when executed will direct performance of the operation o1220. Furthermore, the projecting vectoring electrical circuitry arrangement ("elec circ arrange") e1220, when activated, will perform the operation o1220. Also, the projecting vectoring module m1220, when executed and/or activated, will direct performance of and/or perform the operation o1220. For instance, in one or more exemplary implementations, the one or more projecting vectoring instructions i1220, when executed, direct performance of the operation o1220 in the illustrative depiction as follows, and/or the projecting vectoring electrical circuitry arrangement e1220, when activated, performs the operation o1220 in the illustrative depiction as follows, and/or the projecting vectoring module m1220, when executed and/or activated, directs performance of and/or performs the operation o1220 in the illustrative depiction as follows, and/or the operation o1220 is otherwise carried out in the illustrative depiction as follows: electronically projecting (e.g. by one or more resonant surface portions, etc.) the said two or more acoustic ultrasonic signals (e.g. via one or more acoustic ultrasonic signals configured to be demodulated through nonlinear apparel interaction to at least in part produce one or more acoustic audio signals, etc.) from said two or more portable electronic device emitters (e.g. including one or more membrane speaker arrangements, etc.) of said portable electronic device (e.g. including one or more digital audio output components, etc.) to produce (e.g. including at least in part demodulation through signal intelligence recovery, etc.) a first set of one or more acoustic audio signals (e.g. including one or more processor generated information containing acoustic audio signals, etc.) from a first set of said two or more acoustic ultrasonic signals (e.g. via one or more acoustic ultrasonic signals configured to be demodulated through nonlinear polymeric interaction to at least in part result in one or more acoustic audio signals, etc.) at a first location (e.g. inclusive to one or more designated surfaces, etc.) and to produce (e.g. including at least in part demodulation through signal intelligence recovery, etc.) a second set of one or more second acoustic audio signals (e.g. including one or more processor generated information containing acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. less than a distance from a display screen to a person, etc. e.g. including one or more membrane speaker arrangements, etc. e.g. etc. e.g. etc.) including vectoring of two or more beams of acoustic ultrasonic signals to down convert to one or more audio signals (e.g. including transmitting two ultrasonic beams having carrier frequencies of 180 kHz that interact nonlinearly in a vicinity of a target listener to down-convert acoustic audio signals being produced by a media show being played on the laptop transmitting the ultrasonic beams, etc.).

In one or more implementations, as shown in FIG. 74, operation o12 includes an operation o1221 for electronically projecting the said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting one or more acoustic ultrasonic signals to produce one or more acoustic audio signals through non-linear atmospheric interaction. Origination of an illustratively derived projecting atmospheric interaction component group can be accomplished through skilled in the art design choice selection of one or more of the above depicted components from one or more of the above depicted subsystems shown in FIG. 25. Components from the projecting atmospheric interaction component group can be used in implementing execution of the one or more projecting atmospheric interaction instructions i1221 of FIG. 43, can be used in performance of the projecting atmospheric interaction electrical circuitry arrangement e1221 of FIG. 36, and/or can be used in otherwise fulfillment of the operation o1221. An exemplary non-transitory signal bearing medium version of the information storage subsystem s200 is depicted in FIG. 43 as bearing the one or more projecting atmospheric interaction instructions i1221 that when executed will direct performance of the operation o1221. Furthermore, the projecting atmospheric interaction electrical circuitry arrangement ("elec circ arrange") e1221, when activated, will perform the operation o1221. Also, the projecting atmospheric interaction module m1221, when executed and/or activated, will direct performance of and/or perform the operation o1221. For instance, in one or more exemplary implementations, the one or more projecting atmospheric interaction instructions i1221, when executed, direct performance of the operation o1221 in the illustrative depiction as follows, and/or the projecting atmospheric interaction electrical circuitry arrangement e1221, when activated, performs the operation o1221 in the illustrative depiction as follows, and/or the projecting atmospheric interaction module m1221, when executed and/or activated, directs performance of and/or performs the operation o1221 in the illustrative depiction as follows, and/or the operation o1221 is otherwise carried out in the illustrative depiction as follows: electronically projecting (e.g. via one or more thin-film membrane portions, etc.) the said two or more acoustic ultrasonic signals (e.g. via one or more acoustic ultrasonic signals configured to be demodulated through nonlinear interaction with one or more solids to at least in part generate one or more acoustic audio signals, etc.) from said two or more portable electronic device emitters (e.g. including one or more ultrasonic transducer arrangements, etc.) of said portable electronic device (e.g. including one or more CD player components, etc.) to produce (e.g. including demodulation via mutual interference therewith multiple acoustic ultrasonic signals configured to be demodulated through to at least in part result in one or more acoustic audio signals, etc.) a first set of one or more acoustic audio signals (e.g. including one or more internet based information containing acoustic audio signals, etc.) from a first set of said two or more acoustic ultrasonic signals (e.g. via one or more acoustic ultrasonic signals configured to be demodulated through nonlinear apparel interaction to at least in part produce one or more acoustic audio signals, etc.) at a first location (e.g. inclusive to one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more internet based information containing acoustic audio signals, etc.) from of a second set of said two or more acoustic ultrasonic signals (e.g. via one or more acoustic ultrasonic signals including signals having one or more frequencies above 60 kHz, etc.) at a second location (e.g. less than a distance from a portable device to an ear, etc. e.g. including one or more ultrasonic transducer arrangements, etc. e.g. etc. e.g. etc.) including outputting one or more acoustic ultrasonic signals to produce one or more acoustic audio signals through non-linear atmospheric interaction (e.g. including transmitting an ultrasonic beam having carrier frequency of 120 kHz that interacts nonlinearly with air in a vicinity of a target listener to down-convert acoustic audio signals being produced by a mp3 file being played on a tablet computer transmitting the ultrasonic beam, etc.).

In one or more implementations, as shown in FIG. 75, operation o12 includes an operation o1222 for electronically projecting the said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including outputting one or more acoustic ultrasonic signals to produce one or more acoustic audio signals through non-linear human tissue interaction. Origination of an illustratively derived projecting human tissue component group can be accomplished through skilled in the art design choice selection of one or more of the above depicted components from one or more of the above depicted subsystems shown in FIG. 25. Components from the projecting human tissue component group can be used in implementing execution of the one or more projecting human tissue instructions i1222 of FIG. 43, can be used in performance of the projecting human tissue electrical circuitry arrangement e1222 of FIG. 36, and/or can be used in otherwise fulfillment of the operation o1222. An exemplary non-transitory signal bearing medium version of the information storage subsystem s200 is depicted in FIG. 43 as bearing the one or more projecting human tissue instructions i1222 that when executed will direct performance of the operation o1222. Furthermore, the projecting human tissue electrical circuitry arrangement ("elec circ arrange") e1222, when activated, will perform the operation o1222. Also, the projecting human tissue module m1222, when executed and/or activated, will direct performance of and/or perform the operation o1222. For instance, in one or more exemplary implementations, the one or more projecting human tissue instructions i1222, when executed, direct performance of the operation o1222 in the illustrative depiction as follows, and/or the projecting human tissue electrical circuitry arrangement e1222, when activated, performs the operation o1222 in the illustrative depiction as follows, and/or the projecting human tissue module m1222, when executed and/or activated, directs performance of and/or performs the operation o1222 in the illustrative depiction as follows, and/or the operation o1222 is otherwise carried out in the illustrative depiction as follows: electronically projecting (e.g. through one or more air-coupled transducer portions, etc.) the said two or more acoustic ultrasonic signals (e.g. via one or more acoustic ultrasonic signals including signals having one or more frequencies above 60 kHz, etc.) from said two or more portable electronic device emitters (e.g. including one or more electrostatic transducer arrangements, etc.) of said portable electronic device (e.g. including one or more digital music player components, etc.) to produce (e.g. including demodulation using one or more acoustic ultrasonic signals configured to be demodulated through nonlinear atmospheric interaction to at least in part generate one or more acoustic audio signals, etc.) a first set of one or more acoustic audio signals (e.g. including one or more digital audio information containing acoustic audio signals, etc.) from a first set of said two or more acoustic ultrasonic signals (e.g. via one or more acoustic ultrasonic signals configured to be demodulated through nonlinear interaction with one or more solids to at least in part generate one or more acoustic audio signals, etc.) at a first location (e.g. inclusive to one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more digital audio information containing acoustic audio signals, etc.) from of a second set of said two or more acoustic ultrasonic signals (e.g. via one or more acoustic ultrasonic signals including signals having one or more frequencies above 80 kHz, etc.) at a second location (e.g. less than a distance from a display screen to an ear, etc. e.g. including one or more electrostatic transducer arrangements, etc. e.g. etc. e.g. etc.) including outputting one or more acoustic ultrasonic signals to produce one or more acoustic audio signals through non-linear human tissue interaction (e.g. including transmitting an ultrasonic beam having carrier frequency of 160 kHz that interacts nonlinearly with human tissue of a target listener to down-convert acoustic audio signals being produced by a video file being played on a smart phone transmitting the ultrasonic beam, etc.).

In one or more implementations, as shown in FIG. 75, operation o12 includes an operation o1223 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via vectoring of two or more beams of acoustic ultrasonic signals interfering at one or more target locations. Origination of an illustratively derived projecting signals interfering component group can be accomplished through skilled in the art design choice selection of one or more of the above depicted components from one or more of the above depicted subsystems shown in FIG. 25. Components from the projecting signals interfering component group can be used in implementing execution of the one or more projecting signals interfering instructions i1223 of FIG. 43, can be used in performance of the projecting signals interfering electrical circuitry arrangement e1223 of FIG. 36, and/or can be used in otherwise fulfillment of the operation o1223. An exemplary non-transitory signal bearing medium version of the information storage subsystem s200 is depicted in FIG. 43 as bearing the one or more projecting signals interfering instructions i1223 that when executed will direct performance of the operation o1223. Furthermore, the projecting signals interfering electrical circuitry arrangement ("elec circ arrange") e1223, when activated, will perform the operation o1223. Also, the projecting signals interfering module m1223, when executed and/or activated, will direct performance of and/or perform the operation o1223. For instance, in one or more exemplary implementations, the one or more projecting signals interfering instructions i1223, when executed, direct performance of the operation o1223 in the illustrative depiction as follows, and/or the projecting signals interfering electrical circuitry arrangement e1223, when activated, performs the operation o1223 in the illustrative depiction as follows, and/or the projecting signals interfering module m1223, when executed and/or activated, directs performance of and/or performs the operation o1223 in the illustrative depiction as follows, and/or the operation o1223 is otherwise carried out in the illustrative depiction as follows: electronically projecting (e.g. using one or more transmitter portions, etc.) said two or more acoustic ultrasonic signals (e.g. via one or more acoustic ultrasonic signals including signals having one or more frequencies above 80 kHz, etc.) from said two or more portable electronic device emitters (e.g. including one or more piezoelectric transducer arrangements, etc.) of said portable electronic device (e.g. including one or more handheld radio components, etc.) the to produce (e.g. including demodulation with one or more acoustic ultrasonic signals configured to be demodulated through nonlinear human tissue interaction to at least in part produce one or more acoustic audio signals, etc.) a first set of one or more acoustic audio signals (e.g. including one or more analog audio information containing acoustic audio signals, etc.) from a first set of said two or more acoustic ultrasonic signals (e.g. via one or more acoustic ultrasonic signals including signals having one or more frequencies above 60 kHz, etc.) at a first location (e.g. inclusive to one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more analog audio information containing acoustic audio signals, etc.) from of a second set of said two or more acoustic ultrasonic signals (e.g. via one or more acoustic ultrasonic signals including signals having one or more frequencies above 100 kHz, etc.) at a second location (e.g. less than a distance from a portable device to a center of a group, etc. e.g. including one or more piezoelectric transducer arrangements, etc. e.g. etc. e.g. etc.) via vectoring of two or more beams of acoustic ultrasonic signals interfering at one or more target locations (e.g. including transmitting two ultrasonic beams having carrier frequencies of 200 kHz that interact nonlinearly with each other in a vicinity of a target listener to down-convert acoustic audio signals being produced by an internet broadcast being played on a tablet computer transmitting the ultrasonic beams, etc.).

In one or more implementations, as shown in FIG. 75, operation o12 includes an operation o1224 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via one or more arrays of transducers to focus one or more beams of acoustic ultrasonic signals at one or more target locations. Origination of illustratively derived projecting transducers to focus component group can be accomplished through skilled in the art design choice selection of one or more of the above depicted components from one or more of the above depicted subsystems shown in FIG. 25. Components from the projecting transducers to focus component group can be used in implementing execution of the one or more projecting transducers to focus instructions i1224 of FIG. 43, can be used in performance of the projecting transducers to focus electrical circuitry arrangement e1224 of FIG. 36, and/or can be used in otherwise fulfillment of the operation o1224. An exemplary non-transitory signal bearing medium version of the information storage subsystem s200 is depicted in FIG. 43 as bearing the one or more projecting transducers to focus instructions i1224 that when executed will direct performance of the operation o1224. Furthermore, the projecting transducers to focus electrical circuitry arrangement ("elec circ arrange") e1224, when activated, will perform the operation o1224. Also, the projecting transducers to focus module m1224, when executed and/or activated, will direct performance of and/or perform the operation o1224. For instance, in one or more exemplary implementations, the one or more projecting transducers to focus instructions i1224, when executed, direct performance of the operation o1224 in the illustrative depiction as follows, and/or the projecting transducers to focus electrical circuitry arrangement e1224, when activated, performs the operation o1224 in the illustrative depiction as follows, and/or the projecting transducers to focus module m1224, when executed and/or activated, directs performance of and/or performs the operation o1224 in the illustrative depiction as follows, and/or the operation o1224 is otherwise carried out in the illustrative depiction as follows: electronically projecting (e.g. from one or more aperture portions, etc.) said two or more acoustic ultrasonic signals (e.g. via one or more acoustic ultrasonic signals including signals having one or more frequencies above 100 kHz, etc.) from said two or more portable electronic device emitters (e.g. including one or more electrostrictive transducer arrangements, etc.) of said portable electronic device (e.g. including one or more spread spectrum components, etc.) the to produce (e.g. including demodulation by one or more acoustic ultrasonic signals configured to be demodulated through nonlinear polymeric interaction to at least in part result in one or more acoustic audio signals, etc.) a first set of one or more acoustic audio signals (e.g. including one or more high frequency audio information containing acoustic audio signals, etc.) from a first set of said two or more acoustic ultrasonic signals (e.g. via one or more acoustic ultrasonic signals including signals having one or more frequencies above 80 kHz, etc.) at a first location (e.g. inclusive to one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more high frequency audio information containing acoustic audio signals, etc.) from of a second set of said two or more acoustic ultrasonic signals (e.g. via one or more acoustic ultrasonic signals including signals having one or more frequencies above 120 kHz, etc.) at a second location (e.g. less than a distance from a display screen to a center of a group, etc. e.g. including one or more electrostrictive transducer arrangements, etc. e.g. etc. e.g. etc.) via one or more arrays of transducers to focus one or more beams of acoustic ultrasonic signals at one or more target locations (e.g. including an array of transducers on a laptop having a focal point for a beam of acoustic ultrasonic signals of carrier frequency of 120 kHz in a vicinity of an ear of a target listener to be down converted into acoustic audio signals being played on the laptop, etc.).

In one or more implementations, as shown in FIG. 76, operation o12 includes an operation o1225 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via interference of two or more acoustic ultrasonic signals to produce one or more acoustic audio signals. Origination of an illustratively derived projecting interference component group can be accomplished through skilled in the art design choice selection of one or more of the above depicted components from one or more of the above depicted subsystems shown in FIG. 25. Components from the projecting interference component group can be used in implementing execution of the one or more projecting interference instructions i1225 of FIG. 43, can be used in performance of the projecting interference electrical circuitry arrangement e1225 of FIG. 36, and/or can be used in otherwise fulfillment of the operation o1225. An exemplary non-transitory signal bearing medium version of the information storage subsystem s200 is depicted in FIG. 43 as bearing the one or more projecting interference instructions i1225 that when executed will direct performance of the operation o1225. Furthermore, the projecting interference electrical circuitry arrangement ("elec circ arrange") e1225, when activated, will perform the operation o1225. Also, the projecting interference module m1225, when executed and/or activated, will direct performance of and/or perform the operation o1225. For instance, in one or more exemplary implementations, the one or more projecting Interference instructions i1225, when executed, direct performance of the operation o1225 in the illustrative depiction as follows, and/or the projecting interference electrical circuitry arrangement e1225, when activated, performs the operation o1225 in the illustrative depiction as follows, and/or the projecting interference module m1225, when executed and/or activated, directs performance of and/or performs the operation o1225 in the illustrative depiction as follows, and/or the operation o1225 is otherwise carried out in the illustrative depiction as follows: electronically projecting (e.g. by one or more transducer portions, etc.) said two or more acoustic ultrasonic signals (e.g. via one or more acoustic ultrasonic signals including signals having one or more frequencies above 120 kHz, etc.) from said two or more portable electronic device emitters (e.g. including one or more electro-thermo-mechanical film transducer arrangements, etc.) of said portable electronic device (e.g. including one or more wireless components, etc.) the to produce (e.g. including demodulation through one or more acoustic ultrasonic signals configured to be demodulated through nonlinear apparel interaction to at least in part produce one or more acoustic audio signals, etc.) a first set of one or more acoustic audio signals (e.g. including one or more low frequency audio information containing acoustic audio signals, etc.) from a first set of said two or more acoustic ultrasonic signals (e.g. via one or more acoustic ultrasonic signals including signals having one or more frequencies above 100 kHz, etc.) at a first location (e.g. inclusive to one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including one or more low frequency audio information containing acoustic audio signals, etc.) from of a second set of said two or more acoustic ultrasonic signals (e.g. via one or more acoustic ultrasonic signals including signals having one or more frequencies above 140 kHz, etc.) at a second location (e.g. less than a distance from a transmitter to a receiver, etc. e.g. including one or more electro-thermo-mechanical film transducer arrangements, etc. e.g. etc. e.g. etc.) via interference of two or more acoustic ultrasonic signals to produce one or more acoustic audio signals (e.g. including transmitting two ultrasonic beams having carrier frequencies of 60 kHz that interact nonlinearly with each other in a vicinity of a target listener to down-convert acoustic audio signals being produced by a media player on a notebook computer transmitting the ultrasonic beams, etc.).

In one or more implementations, as shown in FIG. 76, operation o12 includes an operation o1226 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear atmospheric interaction of one or more acoustic ultrasonic signals. Origination of an illustratively derived projecting nonlinear atmospheric component group can be accomplished through skilled in the art design choice selection of one or more of the above depicted components from one or more of the above depicted subsystems shown in FIG. 25. Components from the projecting nonlinear atmospheric component group can be used in implementing execution of the one or more projecting nonlinear atmospheric instructions i1226 of FIG. 43, can be used in performance of the projecting nonlinear atmospheric electrical circuitry arrangement e1226 of FIG. 36, and/or can be used in otherwise fulfillment of the operation o1226. An exemplary non-transitory signal bearing medium version of the information storage subsystem s200 is depicted in FIG. 43 as bearing the one or more projecting nonlinear atmospheric instructions i1226 that when executed will direct performance of the operation o1226. Furthermore, the projecting nonlinear atmospheric electrical circuitry arrangement ("elec circ arrange") e1226, when activated, will perform the operation o1226. Also, the projecting nonlinear atmospheric module m1226, when executed and/or activated, will direct performance of and/or perform the operation o1226. For instance, in one or more exemplary implementations, the one or more projecting nonlinear atmospheric instructions i1226, when executed, direct performance of the operation o1226 in the illustrative depiction as follows, and/or the projecting nonlinear atmospheric electrical circuitry arrangement e1226, when activated, performs the operation o1226 in the illustrative depiction as follows, and/or the projecting nonlinear atmospheric module m1226, when executed and/or activated, directs performance of and/or performs the operation o1226 in the illustrative depiction as follows, and/or the operation o1226 is otherwise carried out in the illustrative depiction as follows: electronically projecting (e.g. via one or more speaker portions, etc.) said two or more acoustic ultrasonic signals (e.g. via one or more acoustic ultrasonic signals including signals having one or more frequencies above 140 kHz, etc.) from said two or more portable electronic device emitters (e.g. including one or more polyvinylidene fluoride film transducer arrangements, etc.) of said portable electronic device (e.g. including one or more frequency division multiplexing components, etc.) the to produce (e.g. including demodulation by one or more acoustic ultrasonic signals configured to be demodulated through nonlinear interaction with one or more solids to at least in part generate one or more acoustic audio signals, etc.) a first set of one or more acoustic audio signals (e.g. including lecture formatted information, etc.) from a first set of said two or more acoustic ultrasonic signals (e.g. via one or more acoustic ultrasonic signals including signals having one or more frequencies above 120 kHz, etc.) at a first location (e.g. inclusive to one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including one or more low frequency acoustic audio signals, etc.) from of a second set of said two or more acoustic ultrasonic signals (e.g. via one or more acoustic ultrasonic signals including signals having one or more frequencies above 160 kHz, etc.) at a second location (e.g. less than a distance from a first seat back to a second seat back, etc. e.g. including one or more polyvinylidene fluoride film transducer arrangements, etc. e.g. etc. e.g. etc.) via nonlinear atmospheric interaction of one or more acoustic ultrasonic signals (e.g. including transmitting an acoustic ultrasonic signal having carrier frequency of 80 kHz that interacts nonlinearly with air in a vicinity of a target listener to down-convert acoustic audio signals being produced by an audio player of a smart phone transmitting the acoustic ultrasonic signal, etc.).

In one or more implementations, as shown in FIG. 76, operation o12 includes an operation o1227 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear human tissue interaction of one or more acoustic ultrasonic signals. Origination of an illustratively derived projecting nonlinear tissue component group can be accomplished through skilled in the art design choice selection of one or more of the above depicted components from one or more of the above depicted subsystems shown in FIG. 25. Components from the projecting nonlinear tissue component group can be used in implementing execution of the one or more projecting nonlinear tissue instructions i1227 of FIG. 43, can be used in performance of the projecting nonlinear tissue electrical circuitry arrangement e1227 of FIG. 36, and/or can be used in otherwise fulfillment of the operation o1227. An exemplary non-transitory signal bearing medium version of the information storage subsystem s200 is depicted in FIG. 43 as bearing the one or more projecting nonlinear tissue instructions i1227 that when executed will direct performance of the operation o1227. Furthermore, the projecting nonlinear tissue electrical circuitry arrangement ("elec circ arrange") e1227, when activated, will perform the operation o1227. Also, the projecting nonlinear tissue module m1227, when executed and/or activated, will direct performance of and/or perform the operation o1227. For instance, in one or more exemplary implementations, the one or more projecting nonlinear tissue instructions i1227, when executed, direct performance of the operation o1227 in the illustrative depiction as follows, and/or the projecting nonlinear tissue electrical circuitry arrangement e1227, when activated, performs the operation o1227 in the illustrative depiction as follows, and/or the projecting nonlinear tissue module m1227, when executed and/or activated, directs performance of and/or performs the operation o1227 in the illustrative depiction as follows, and/or the operation o1227 is otherwise carried out in the illustrative depiction as follows: electronically projecting (e.g. through one or more cable interface portions, etc.) said two or more acoustic ultrasonic signals (e.g. via one or more acoustic ultrasonic signals including signals having one or more frequencies above 160 kHz, etc.) from said two or more portable electronic device emitters (e.g. including one or more deposition transducer arrangements, etc.) of said portable electronic device (e.g. including one or more time division multiplexing components, etc.) the to produce (e.g. including at least in part demodulation by signal down conversion, etc.) a first set of one or more acoustic audio signals (e.g. including foreign language speech information, etc.) from a first set of said two or more acoustic ultrasonic signals (e.g. via one or more acoustic ultrasonic signals including signals having one or more frequencies above 140 kHz, etc.) at a first location (e.g. exclusive to within a vicinity of one or more designated ears, etc.) and to produce (e.g. including at least in part demodulation by signal down conversion, etc.) a second set of one or more second acoustic audio signals (e.g. including one or more high frequency acoustic audio signals, etc.) from of a second set of said two or more acoustic ultrasonic signals (e.g. via one or more acoustic ultrasonic signals including signals having one or more frequencies above 180 kHz, etc.) at a second location (e.g. less than a distance from a seat back to a tray table, etc. e.g. including one or more deposition transducer arrangements, etc. e.g. etc. e.g. etc.) via nonlinear human tissue interaction of one or more acoustic ultrasonic signals (e.g. including transmitting an acoustic ultrasonic signal having carrier frequency of 130 kHz that interacts nonlinearly with human tissue of a target listener to down-convert acoustic audio signals being produced by a CD player being operated by a business laptop transmitting the acoustic ultrasonic signal, etc.).

In one or more implementations, as shown in FIG. 77, operation o12 includes an operation o1228 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear non-tissue solid interaction of one or more acoustic ultrasonic signals. Origination of an illustratively derived projecting nonlinear non-tissue component group can be accomplished through skilled in the art design choice selection of one or more of the above depicted components from one or more of the above depicted subsystems shown in FIG. 25. Components from the projecting nonlinear non-tissue component group can be used in implementing execution of the one or more projecting nonlinear non-tissue instructions i1228 of FIG. 43, can be used in performance of the projecting nonlinear non-tissue electrical circuitry arrangement e1228 of FIG. 36, and/or can be used in otherwise fulfillment of the operation o1228. An exemplary non-transitory signal bearing medium version of the information storage subsystem s200 is depicted in FIG. 43 as bearing the one or more projecting nonlinear non-tissue instructions i1228 that when executed will direct performance of the operation o1228. Furthermore, the projecting nonlinear non-tissue electrical circuitry arrangement ("elec circ arrange") e1228, when activated, will perform the operation o1228. Also, the projecting nonlinear non-tissue module m1228, when executed and/or activated, will direct performance of and/or perform the operation o1228. For instance, in one or more exemplary implementations, the one or more projecting nonlinear non-tissue instructions i1228, when executed, direct performance of the operation o1228 in the illustrative depiction as follows, and/or the projecting nonlinear non-tissue electrical circuitry arrangement e1228, when activated, performs the operation o1228 in the illustrative depiction as follows, and/or the projecting nonlinear non-tissue module m1228, when executed and/or activated, directs performance of and/or performs the operation o1228 in the illustrative depiction as follows, and/or the operation o1228 is otherwise carried out in the illustrative depiction as follows: electronically projecting (e.g. via one or more transducer array portions, etc.) said two or more acoustic ultrasonic signals (e.g. via one or more acoustic ultrasonic signals including signals having one or more frequencies above 180 kHz, etc.) from said two or more portable electronic device emitters (e.g. including one or more emitter array arrangements, etc.) of said portable electronic device (e.g. including one or more clamshell phone components, etc.) the to produce (e.g. including at least in part demodulation through signal amplitude demodulation, etc.) a first set of one or more acoustic audio signals (e.g. including classical music selection information, etc.) from a first set of said two or more acoustic ultrasonic signals (e.g. via one or more acoustic ultrasonic signals including signals having one or more frequencies above 160 kHz, etc.) at a first location (e.g. exclusive to within a vicinity of one or more identified persons, etc.) and to produce (e.g. including at least in part demodulation through signal amplitude demodulation, etc.) a second set of one or more second acoustic audio signals (e.g. including one or more full spectrum acoustic audio signals, etc.) from of a second set of said two or more acoustic ultrasonic signals (e.g. via one or more acoustic ultrasonic signals including signals having one or more frequencies above 200 kHz, etc.) at a second location (e.g. less than a distance of an aisle way, etc. e.g. including one or more emitter array arrangements, etc. e.g. etc. e.g. etc.) via nonlinear non-tissue solid interaction of one or more acoustic ultrasonic signals (e.g. including transmitting an acoustic ultrasonic signal having carrier frequency of 60 kHz that interacts nonlinearly with non-tissue solid near a target listener to down-convert acoustic audio signals stored in memory of a two-way radio transmitting the acoustic ultrasonic signal, etc.).

In one or more implementations, as shown in FIG. 77, operation o12 includes an operation o1229 for electronically projecting said two or more acoustic ultrasonic signals from said two or more portable electronic device emitters of said portable electronic device the to produce a first set of one or more acoustic audio signals from a first set of said two or more acoustic ultrasonic signals at a first location and to produce a second set of one or more second acoustic audio signals from of a second set of said two or more acoustic ultrasonic signals at a second location via nonlinear personal ornament interaction of one or more acoustic ultrasonic signals. Origination of an illustratively derived projecting nonlinear personal component group can be accomplished through skilled in the art design choice selection of one or more of the above depicted components from one or more of the above depicted subsystems shown in FIG. 25. Components from the projecting nonlinear personal component group can be used in implementing execution of the one or more projecting nonlinear personal instructions i1229 of FIG. 43, can be used in performance of the projecting nonlinear personal electrical circuitry arrangement e1229 of FIG. 36, and/or can be used in otherwise fulfillment of the operation o1229. An exemplary non-transitory signal bearing medium version of the information storage subsystem s200 is depicted in FIG. 43 as bearing the one or more projecting nonlinear personal instructions i1229 that when executed will direct performance of the operation o1229. Furthermore, the projecting nonlinear personal electrical circuitry arrangement ("elec circ arrange") e1229, when activated, will perform the operation o1229. Also, the projecting nonlinear personal module m1229, when executed and/or activated, will direct performance of and/or perform the operation o1229. For instance, in one or more exemplary implementations, the one or more projecting nonlinear personal instructions i1229, when executed, direct performance of the operation o1229 in the illustrative depiction as follows, and/or the projecting nonlinear personal electrical circuitry arrangement e1229, when activated, performs the operation o1229 in the illustrative depiction as follows, and/or the projecting nonlinear personal module m1229, when executed and/or activated, directs performance of and/or performs the operation o1229 in the illustrative depiction as follows, and/or the operation o1229 is otherwise carried out in the illustrative depiction as follows: electronically projecting (e.g. by one or more membrane speaker portions, etc.) said two or more acoustic ultrasonic signals (e.g. via one or more acoustic ultrasonic signals including signals having one or more frequencies above 200 kHz, etc.) from said two or more portable electronic device emitters (e.g. including one or more dispersed transducer arrangements, etc.) of said portable electronic device (e.g. including one or more media player components, etc.) the to produce (e.g. including at least in part demodulation via signal frequency demodulation portions, etc.) a first set of one or more acoustic audio signals (e.g. including instructional lesson material information, etc.) from a first set of said two or more acoustic ultrasonic signals (e.g. via one or more acoustic ultrasonic signals including signals having one or more frequencies above 180 kHz, etc.) at a first location (e.g. exclusive to within a vicinity of one or more predetermined ears, etc.) and to produce (e.g. including at least in part demodulation via signal frequency demodulation portions, etc.) a second set of one or more second acoustic audio signals (e.g. including one or more partial spectrum acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. less than a distance from a desk to a chair, etc. e.g. including one or more dispersed transducer arrangements, etc. e.g. etc. e.g. etc.) via nonlinear personal ornament interaction of one or more acoustic ultrasonic signals (e.g. including transmitting an acoustic ultrasonic signal having carrier frequency of 110 kHz that interacts nonlinearly with an ear ring of a target listener to down-convert acoustic audio signals being produced by an mp3 player transmitting the acoustic ultrasonic signal, etc.).

In one or more implementations, as shown in FIG. 77, operation o12 includes an operation o1230 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more audio signals tailored to frequency response information for one or more ears of a target human listener. Origination of illustratively derived projecting ears of a target component group can be accomplished through skilled in the art design choice selection of one or more of the above depicted components from one or more of the above depicted subsystems shown in FIG. 25. Components from the projecting ears of a target component group can be used in implementing execution of the one or more projecting ears of a target instructions i1230 of FIG. 43, can be used in performance of the projecting ears of a target electrical circuitry arrangement e1230 of FIG. 36, and/or can be used in otherwise fulfillment of the operation o1230. An exemplary non-transitory signal bearing medium version of the information storage subsystem s200 is depicted in FIG. 43 as bearing the one or more projecting ears of a target instructions i1230 that when executed will direct performance of the operation o1230. Furthermore, the projecting ears of a target electrical circuitry arrangement ("elec circ arrange") e1230, when activated, will perform the operation o1230. Also, the projecting ears of a target module m1230, when executed and/or activated, will direct performance of and/or perform the operation o1230. For instance, in one or more exemplary implementations, the one or more projecting ears of a target instructions i1230, when executed, direct performance of the operation o1230 in the illustrative depiction as follows, and/or the projecting ears of a target electrical circuitry arrangement e1230, when activated, performs the operation o1230 in the illustrative depiction as follows, and/or the projecting ears of a target module m1230, when executed and/or activated, directs performance of and/or performs the operation o1230 in the illustrative depiction as follows, and/or the operation o1230 is otherwise carried out in the illustrative depiction as follows: electronically projecting (e.g. from one or more ultrasonic transducer portions, etc.) said two or more acoustic ultrasonic signals (e.g. via multiple acoustic ultrasonic signals configured to be demodulated through mutual interference therewith to at least in part result in one or more acoustic audio signals, etc.) from said two or more portable electronic device emitters (e.g. including one or more monitor embedded transducer arrangements, etc.) of said portable electronic device (e.g. including one or more 3G mobile components, etc.) to produce (e.g. including at least in part demodulation with signal phase demodulation portions, etc.) the a first set of one or more acoustic audio signals (e.g. including warning tone information, etc.) from a first set of said two or more acoustic ultrasonic signals (e.g. via one or more acoustic ultrasonic signals including signals having one or more frequencies above 200 kH, etc.) at a first location (e.g. exclusive to within a vicinity of one or more desired groups of people, etc.) and to produce (e.g. including at least in part demodulation with signal phase demodulation portions, etc.) a second set of one or more second acoustic audio signals (e.g. including one or more low amplitude acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. less than a distance from a dashboard to a headrest, etc. e.g. including one or more monitor embedded transducer arrangements, etc. e.g. etc. e.g. etc.) including one or more audio signals tailored to frequency response information for one or more ears of a target human listener (e.g. including acoustic audio signals tailored each for right and left ears of a target listener to account for loss of hearing by the target listener in calibrated frequency ranges, etc.).

In one or more implementations, as shown in FIG. 78, operation o12 includes an operation o1231 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals containing one or more digitally coded identifiers. Origination of an illustratively derived projecting digitally coded component group can be accomplished through skilled in the art design choice selection of one or more of the above depicted components from one or more of the above depicted subsystems shown in FIG. 25. Components from the projecting digitally coded component group can be used in implementing execution of the one or more projecting digitally coded instructions i1231 of FIG. 43, can be used in performance of the projecting digitally coded electrical circuitry arrangement e1231 of FIG. 36, and/or can be used in otherwise fulfillment of the operation o1231. An exemplary non-transitory signal bearing medium version of the information storage subsystem s200 is depicted in FIG. 43 as bearing the one or more projecting digitally coded instructions i1231 that when executed will direct performance of the operation o1231. Furthermore, the projecting digitally coded electrical circuitry arrangement ("elec circ arrange") e1231, when activated, will perform the operation o1231. Also, the projecting digitally coded module m1231, when executed and/or activated, will direct performance of and/or perform the operation o1231. For instance, in one or more exemplary implementations, the one or more projecting digitally coded instructions i1231, when executed, direct performance of the operation o1231 in the illustrative depiction as follows, and/or the projecting digitally coded electrical circuitry arrangement e1231, when activated, performs the operation o1231 in the illustrative depiction as follows, and/or the projecting digitally coded module m1231, when executed and/or activated, directs performance of and/or performs the operation o1231 in the illustrative depiction as follows, and/or the operation o1231 is otherwise carried out in the illustrative depiction as follows: electronically projecting (e.g. using one or more electrostatic transducer portions, etc.) said two or more acoustic ultrasonic signals (e.g. via one or more acoustic ultrasonic signals configured to be demodulated through nonlinear atmospheric interaction to at least in part generate one or more acoustic audio signals, etc.) from said two or more portable electronic device emitters (e.g. including one or more keyboard embedded transducer arrangements etc.) of said portable electronic device (e.g. including one or more cellular components, etc.) to produce (e.g. including at least in part demodulation using signal rectification, etc.) the a first set of one or more acoustic audio signals (e.g. including white noise information, etc.) from a first set of said two or more acoustic ultrasonic signals (e.g. including containing beginning portions, etc.) at a first location (e.g. exclusive to within a vicinity of one or more chosen audio receivers, etc.) and to produce (e.g. including at least in part demodulation using signal rectification, etc.) a second set of one or more second acoustic audio signals (e.g. including one or more high amplitude acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. more than confines of a room, etc. e.g. including one or more keyboard embedded transducer arrangements etc. e.g. etc. e.g. etc.) including one or more acoustic audio signals containing one or more digitally coded identifiers (e.g. including digitally coded identifiers placed in the acoustic audio signals to be used for quality control of down-converted audio signals in a vicinity near a target listener, etc.).

In one or more implementations, as shown in FIG. 78, operation o12 includes an operation o1232 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals tailored according to a sensed acoustic environment. Origination of an illustratively derived projecting signals tailored component group can be accomplished through skilled in the art design choice selection of one or more of the above depicted components from one or more of the above depicted subsystems shown in FIG. 25. Components from the projecting signals tailored component group can be used in implementing execution of the one or more projecting signals tailored instructions i1232 of FIG. 43, can be used in performance of the projecting signals tailored electrical circuitry arrangement e1232 of FIG. 36, and/or can be used in otherwise fulfillment of the operation o1232. An exemplary non-transitory signal bearing medium version of the information storage subsystem s200 is depicted in FIG. 43 as bearing the one or more projecting signals tailored instructions i1232 that when executed will direct performance of the operation o1232. Furthermore, the projecting signals tailored electrical circuitry arrangement ("elec circ arrange") e1232, when activated, will perform the operation o1232. Also, the projecting signals tailored module m1232, when executed and/or activated, will direct performance of and/or perform the operation o1232. For instance, in one or more exemplary implementations, the one or more projecting signals tailored instructions i1232, when executed, direct performance of the operation o1232 in the illustrative depiction as follows, and/or the projecting signals tailored electrical circuitry arrangement e1232, when activated, performs the operation o1232 in the illustrative depiction as follows, and/or the projecting signals tailored module m1232, when executed and/or activated, directs performance of and/or performs the operation o1232 in the illustrative depiction as follows, and/or the operation o1232 is otherwise carried out in the illustrative depiction as follows: electronically projecting (e.g. through one or more piezoelectric transducer portions, etc.) said two or more acoustic ultrasonic signals (e.g. via one or more acoustic ultrasonic signals configured to be demodulated through nonlinear human tissue interaction to at least in part produce one or more acoustic audio signals, etc.) from said two or more portable electronic device emitters (e.g. including one or more device body embedded transducer arrangements, etc.) of said portable electronic device (e.g. including one or more 4G components, etc.) to produce (e.g. including at least in part demodulation by signal filtering, etc.) the a first set of one or more acoustic audio signals (e.g. including varying pitch information, etc.) from a first set of said two or more acoustic ultrasonic signals (e.g. including containing middle portions, etc.) at a first location (e.g. exclusive to within a vicinity of one or more selected microphones, etc.) and to produce (e.g. including at least in part demodulation by signal filtering, etc.) a second set of one or more second acoustic audio signals (e.g. including one or more high frequency acoustic audio signals etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. more than an arm's length, etc. e.g. including one or more device body embedded transducer arrangements, etc. e.g. etc. e.g. etc.) including one or more acoustic audio signals tailored according to a sensed acoustic environment (e.g. including frequency mixing of acoustic audio signals modulating acoustic ultrasonic signals based upon sensed frequency response of down converted acoustic audio signals near a target listener, etc.).

In one or more implementations, as shown in FIG. 78, operation o12 includes an operation o1233 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals tailored according to feedback sensing by portable electronic device. Origination of an illustratively derived projecting feedback sensing component group can be accomplished through skilled in the art design choice selection of one or more of the above depicted components from one or more of the above depicted subsystems shown in FIG. 25. Components from the projecting feedback sensing component group can be used in implementing execution of the one or more projecting feedback sensing instructions i1233 of FIG. 43, can be used in performance of the projecting feedback sensing electrical circuitry arrangement e1233 of FIG. 36, and/or can be used in otherwise fulfillment of the operation o1233. An exemplary non-transitory signal bearing medium version of the information storage subsystem s200 is depicted in FIG. 43 as bearing the one or more projecting feedback sensing instructions i1233 that when executed will direct performance of the operation o1233. Furthermore, the projecting feedback sensing electrical circuitry arrangement ("elec circ arrange") e1233, when activated, will perform the operation o1233. Also, the projecting feedback sensing module m1233, when executed and/or activated, will direct performance of and/or perform the operation o1233. For instance, in one or more exemplary implementations, the one or more projecting feedback sensing instructions i1233, when executed, direct performance of the operation o1233 in the illustrative depiction as follows, and/or the projecting feedback sensing electrical circuitry arrangement e1233, when activated, performs the operation o1233 in the illustrative depiction as follows, and/or the projecting feedback sensing module m1233, when executed and/or activated, directs performance of and/or performs the operation o1233 in the illustrative depiction as follows, and/or the operation o1233 is otherwise carried out in the illustrative depiction as follows: electronically projecting (e.g. via one or more electrostrictive transducer portions, etc.) said two or more acoustic ultrasonic signals (e.g. via one or more acoustic ultrasonic signals configured to be demodulated through nonlinear polymeric interaction to at least in part result in one or more acoustic audio signals, etc.) from said two or more portable electronic device emitters (e.g. including one or more device perimeter embedded transducer arrangements, etc.) of said portable electronic device (e.g. including one or more WiFi components, etc.) to produce (e.g. including at least in part demodulation through signal intelligence recovery, etc.) the a first set of one or more acoustic audio signals (e.g. including note sequence information, etc.) from a first set of said two or more acoustic ultrasonic signals (e.g. including containing end portions, etc.) at a first location (e.g. exclusive to within a vicinity of one or more designated surfaces, etc.) and to produce (e.g. including at least in part demodulation through signal intelligence recovery, etc.) a second set of one or more second acoustic audio signals (e.g. including one or more lecture information containing acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. more than a three-foot radius, etc. e.g. including one or more device perimeter embedded transducer arrangements, etc. e.g. etc. e.g. etc.) including one or more acoustic audio signals tailored according to feedback sensing by portable electronic device (e.g. including amplitude adjustment of various frequency bands of acoustic audio signals modulating acoustic ultrasonic signals based upon verbal feedback inputted into a tablet computer by a target listener based upon perceived reception of down converted audio by the target listener, etc.).

In one or more implementations, as shown in FIG. 79, operation o12 includes an operation o1234 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more binaural acoustic audio signals. Origination of an illustratively derived projecting binaural acoustic component group can be accomplished through skilled in the art design choice selection of one or more of the above depicted components from one or more of the above depicted subsystems shown in FIG. 25. Components from the projecting binaural acoustic component group can be used in implementing execution of the one or more projecting binaural acoustic instructions i1234 of FIG. 43, can be used in performance of the projecting binaural acoustic electrical circuitry arrangement e1234 of FIG. 36, and/or can be used in otherwise fulfillment of the operation o1234. An exemplary non-transitory signal bearing medium version of the information storage subsystem s200 is depicted in FIG. 43 as bearing the one or more projecting binaural acoustic instructions i1234 that when executed will direct performance of the operation o1234.

Furthermore, the projecting binaural acoustic electrical circuitry arrangement ("elec circ arrange") e1234, when activated, will perform the operation o1234. Also, the projecting binaural acoustic module m1234, when executed and/or activated, will direct performance of and/or perform the operation o1234. For instance, in one or more exemplary implementations, the one or more projecting binaural acoustic instructions i1234, when executed, direct performance of the operation o1234 in the illustrative depiction as follows, and/or the projecting binaural acoustic electrical circuitry arrangement e1234, when activated, performs the operation o1234 in the illustrative depiction as follows, and/or the projecting binaural acoustic module m1234, when executed and/or activated, directs performance of and/or performs the operation o1234 in the illustrative depiction as follows, and/or the operation o1234 is otherwise carried out in the illustrative depiction as follows: electronically projecting (e.g. by one or more electro-thermo-mechanical film transducer portions, etc.) said two or more acoustic ultrasonic signals (e.g. via one or more acoustic ultrasonic signals configured to be demodulated through nonlinear apparel interaction to at least in part produce one or more acoustic audio signals, etc.) from said two or more portable electronic device emitters (e.g. including one or more multiple emitter array arrangements, etc.) of said portable electronic device (e.g. including one or more infrared components, etc.) to produce (e.g. including demodulation via mutual interference therewith multiple acoustic ultrasonic signals configured to be demodulated through to at least in part result in one or more acoustic audio signals, etc.) the a first set of one or more acoustic audio signals (e.g. including two-way conversation information, etc.) from a first set of said two or more acoustic ultrasonic signals (e.g. including containing some portions, etc.) at a first location (e.g. exclusive to within a vicinity of one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more foreign language speech information containing acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. more than a distance from a portable device to a person, etc. e.g. including one or more multiple emitter array arrangements, etc. e.g. etc. e.g. etc.) including one or more binaural acoustic audio signals (e.g. including transmitting independently modulated acoustic ultrasonic signals to be separately down converted at each individual ear of a target listener, etc.).

In one or more implementations, as shown in FIG. 79, operation o12 includes an operation o1235 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more stereophonic acoustic audio signals. Origination of an illustratively derived projecting stereophonic acoustic component group can be accomplished through skilled in the art design choice selection of one or more of the above depicted components from one or more of the above depicted subsystems shown in FIG. 25. Components from the projecting stereophonic acoustic component group can be used in implementing execution of the one or more projecting stereophonic acoustic instructions i1235 of FIG. 43, can be used in performance of the projecting stereophonic acoustic electrical circuitry arrangement e1235 of FIG. 36, and/or can be used in otherwise fulfillment of the operation o1235. An exemplary non-transitory signal bearing medium version of the information storage subsystem s200 is depicted in FIG. 43 as bearing the one or more projecting stereophonic acoustic instructions i1235 that when executed will direct performance of the operation o1235. Furthermore, the projecting stereophonic acoustic electrical circuitry arrangement ("elec circ arrange") e1235, when activated, will perform the operation o1235. Also, the projecting stereophonic acoustic module m1235, when executed and/or activated, will direct performance of and/or perform the operation o1235. For instance, in one or more exemplary implementations, the one or more projecting stereophonic acoustic instructions i1235, when executed, direct performance of the operation o1235 in the illustrative depiction as follows, and/or the projecting stereophonic acoustic electrical circuitry arrangement e1235, when activated, performs the operation o1235 in the illustrative depiction as follows, and/or the projecting stereophonic acoustic module m1235, when executed and/or activated, directs performance of and/or performs the operation o1235 in the illustrative depiction as follows, and/or the operation o1235 is otherwise carried out in the illustrative depiction as follows: electronically projecting (e.g. from one or more polyvinylidene fluoride film transducer portions, etc.) said two or more acoustic ultrasonic signals (e.g. via one or more acoustic ultrasonic signals configured to be demodulated through nonlinear interaction with one or more solids to at least in part generate one or more acoustic audio signals, etc.) from said two or more portable electronic device emitters (e.g. including one or more perimeter arrays, etc.) of said portable electronic device (e.g. including one or more personal digital assistant components, etc.) to produce (e.g. including demodulation using one or more acoustic ultrasonic signals configured to be demodulated through nonlinear atmospheric interaction to at least in part generate one or more acoustic audio signals, etc.) the a first set of one or more acoustic audio signals (e.g. including confidential information, etc.) from a first set of said two or more acoustic ultrasonic signals (e.g. including containing all portions, etc.) at a first location (e.g. exclusive to within a vicinity of one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more classical music selection information containing acoustic audio signals, etc.) from of a second set of said two or more acoustic ultrasonic signals (e.g. via one or more acoustic ultrasonic signals including signals having one or more frequencies above 60 kHz, etc.) at a second location (e.g. more than a distance from a display screen to a person, etc. e.g. including one or more perimeter arrays, etc. e.g. etc. e.g. etc.) including one or more stereophonic acoustic audio signals (e.g. including transmitting independently modulated acoustic ultrasonic signals to be down converted with stereophonic separation at the ears of a target listener, etc.).

In one or more implementations, as shown in FIG. 79, operation o12 includes an operation o1236 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more monophonic acoustic audio signals directed to a location of one ear of a target listener. Origination of an illustratively derived projecting monophonic acoustic component group can be accomplished through skilled in the art design choice selection of one or more of the above depicted components from one or more of the above depicted subsystems shown in FIG. 25. Components from the projecting monophonic acoustic component group can be used in implementing execution of the one or more projecting monophonic acoustic instructions i1236 of FIG. 43, can be used in performance of the projecting monophonic acoustic electrical circuitry arrangement e1236 of FIG. 36, and/or can be used in otherwise fulfillment of the operation o1236. An exemplary non-transitory signal bearing medium version of the information storage subsystem s200 is depicted in FIG. 43 as bearing the one or more projecting monophonic acoustic instructions i1236 that when executed will direct performance of the operation o1236. Furthermore, the projecting monophonic acoustic electrical circuitry arrangement ("elec circ arrange") e1236, when activated, will perform the operation o1236. Also, the projecting monophonic acoustic module m1236, when executed and/or activated, will direct performance of and/or perform the operation o1236. For instance, in one or more exemplary implementations, the one or more projecting monophonic acoustic instructions i1236, when executed, direct performance of the operation o1236 in the illustrative depiction as follows, and/or the projecting monophonic acoustic electrical circuitry arrangement e1236, when activated, performs the operation o1236 in the illustrative depiction as follows, and/or the projecting monophonic acoustic module m1236, when executed and/or activated, directs performance of and/or performs the operation o1236 in the illustrative depiction as follows, and/or the operation o1236 is otherwise carried out in the illustrative depiction as follows: electronically projecting (e.g. using one or more deposition transducer portions, etc.) said two or more acoustic ultrasonic signals (e.g. via one or more acoustic ultrasonic signals including signals having one or more frequencies above 60 kHz, etc.) from said two or more portable electronic device emitters (e.g. including one or more polar arrays, etc.) of said portable electronic device (e.g. including one or more smart phone components, etc.) to produce (e.g. including demodulation with one or more acoustic ultrasonic signals configured to be demodulated through nonlinear human tissue interaction to at least in part produce one or more acoustic audio signals, etc.) the a first set of one or more acoustic audio signals (e.g. including eavesdropping information, etc.) from a first set of said two or more acoustic ultrasonic signals (e.g. including containing measure portions, etc.) at a first location (e.g. exclusive to within a vicinity of one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more instructional lesson material information containing acoustic audio signals, etc.) from of a second set of said two or more acoustic ultrasonic signals (e.g. via one or more acoustic ultrasonic signals including signals having one or more frequencies above 80 kHz, etc.) at a second location (e.g. more than a distance from a portable device to an ear, etc. e.g. including one or more polar arrays, etc. e.g. etc. e.g. etc.) including one or more monophonic acoustic audio signals directed to a location of one ear of a target listener (e.g. including transmitting modulated acoustic ultrasonic signals to be down converted monophonically at an ear of a target listener, etc.).

In one or more implementations, as shown in FIG. 80, operation o12 includes an operation o1237 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from a second set of said two or more acoustic ultrasonic signals at a second location including one or more acoustic audio signals containing out-of-phase cancellation of background sound in a vicinity of a target listener. Origination of an illustratively derived projecting phase cancellation component group can be accomplished through skilled in the art design choice selection of one or more of the above depicted components from one or more of the above depicted subsystems shown in FIG. 25. Components from the projecting phase cancellation component group can be used in implementing execution of the one or more projecting phase cancellation instructions i1237 of FIG. 43, can be used in performance of the projecting phase cancellation electrical circuitry arrangement e1237 of FIG. 36, and/or can be used in otherwise fulfillment of the operation o1237. An exemplary non-transitory signal bearing medium version of the information storage subsystem s200 is depicted in FIG. 43 as bearing the one or more projecting phase cancellation instructions i1237 that when executed will direct performance of the operation o1237. Furthermore, the projecting phase cancellation electrical circuitry arrangement ("elec circ arrange") e1237, when activated, will perform the operation o1237. Also, the projecting phase cancellation module m1237, when executed and/or activated, will direct performance of and/or perform the operation o1237. For instance, in one or more exemplary implementations, the one or more projecting phase cancellation instructions i1237, when executed, direct performance of the operation o1237 in the illustrative depiction as follows, and/or the projecting phase cancellation electrical circuitry arrangement e1237, when activated, performs the operation o1237 in the illustrative depiction as follows, and/or the projecting phase cancellation module m1237, when executed and/or activated, directs performance of and/or performs the operation o1237 in the illustrative depiction as follows, and/or the operation o1237 is otherwise carried out in the illustrative depiction as follows: electronically projecting (e.g. through one or more emitter array portions, etc.) said two or more acoustic ultrasonic signals (e.g. via one or more acoustic ultrasonic signals including signals having one or more frequencies above 80 kHz, etc.) from said two or more portable electronic device emitters (e.g. including one or more orthographic arrays, etc.) of said portable electronic device (e.g. including one or more cell phone components, etc.) to produce (e.g. including demodulation by one or more acoustic ultrasonic signals configured to be demodulated through nonlinear polymeric interaction to at least in part result in one or more acoustic audio signals, etc.)

the a first set of one or more acoustic audio signals (e.g. including pre-recorded information, etc.) from a first set of said two or more acoustic ultrasonic signals (e.g. including containing phrase portions, etc.) at a first location (e.g. exclusive to within a vicinity of one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more warning tone information containing acoustic audio signals, etc.) from of a second set of said two or more acoustic ultrasonic signals (e.g. via one or more acoustic ultrasonic signals including signals having one or more frequencies above 100 kHz, etc.) at a second location (e.g. more than a distance from a display screen to an ear, etc. e.g. including one or more orthographic arrays, etc. e.g. etc. e.g. etc.) including one or more acoustic audio signals containing out-of-phase cancellation of background sound in a vicinity of a target listener (e.g. including transmitting modulated acoustic ultrasonic signals to be down converted with anti-noise cancellation of undesirable audio sensed by a notebook computer transmitting the acoustic ultrasonic signals, etc.).

In one or more implementations, as shown in FIG. 80, operation o12 includes an operation o1238 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals containing phase-shifting of an original speech of a target listener in near real-time to the original speech being uttered. Origination of an illustratively derived projecting phase-shifting component group can be accomplished through skilled in the art design choice selection of one or more of the above depicted components from one or more of the above depicted subsystems shown in FIG. 25. Components from the projecting phase-shifting component group can be used in implementing execution of the one or more projecting phase-shifting instructions i1238 of FIG. 43, can be used in performance of the projecting phase-shifting electrical circuitry arrangement e1238 of FIG. 36, and/or can be used in otherwise fulfillment of the operation o1238. An exemplary non-transitory signal bearing medium version of the information storage subsystem s200 is depicted in FIG. 43 as bearing the one or more projecting phase-shifting instructions i1238 that when executed will direct performance of the operation o1238. Furthermore, the projecting phase-shifting electrical circuitry arrangement ("elec circ arrange") e1238, when activated, will perform the operation o1238. Also, the projecting phase-shifting module m1238, when executed and/or activated, will direct performance of and/or perform the operation o1238. For instance, in one or more exemplary implementations, the one or more projecting phase-shifting instructions i1238, when executed, direct performance of the operation o1238 in the illustrative depiction as follows, and/or the projecting phase-shifting electrical circuitry arrangement e1238, when activated, performs the operation o1238 in the illustrative depiction as follows, and/or the projecting phase-shifting module m1238, when executed and/or activated, directs performance of and/or performs the operation o1238 in the illustrative depiction as follows, and/or the operation o1238 is otherwise carried out in the illustrative depiction as follows: electronically projecting (e.g. via one or more dispersed transducer portions, etc.) said two or more acoustic ultrasonic signals (e.g. via one or more acoustic ultrasonic signals including signals having one or more frequencies above 100 kHz, etc.) from said two or more portable electronic device emitters (e.g. including one or more three-dimensional arrays, etc.) of said portable electronic device (e.g. including one or more laptop components, etc.) to produce (e.g. including demodulation through one or more acoustic ultrasonic signals configured to be demodulated through nonlinear apparel interaction to at least in part produce one or more acoustic audio signals, etc.) the a first set of one or more acoustic audio signals (e.g. including processor generated information, etc.) from a first set of said two or more acoustic ultrasonic signals (e.g. including containing chapter portions, etc.) at a first location (e.g. exclusive to within a vicinity of one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including one or more white noise information containing acoustic audio signals, etc.) from of a second set of said two or more acoustic ultrasonic signals (e.g. via one or more acoustic ultrasonic signals including signals having one or more frequencies above 120 kHz, etc.) at a second location (e.g. more than a distance from a portable device to a center of a group, etc. e.g. including one or more three-dimensional arrays, etc. e.g. etc. e.g. etc.) including one or more acoustic audio signals containing phase-shifting of an original speech of a target listener in near real-time to the original speech being uttered (e.g. including transmitting modulated acoustic ultrasonic signals to be down converted with phase-shifted speech of speech sensed by a tablet transmitting the acoustic ultrasonic signals, etc.).

In one or more implementations, as shown in FIG. 80, operation o12 includes an operation o1239 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including one or more acoustic audio signals being emitted at greater than 150 decibels. Origination of an illustratively derived projecting emitted greater component group can be accomplished through skilled in the art design choice selection of one or more of the above depicted components from one or more of the above depicted subsystems shown in FIG. 25. Components from the projecting emitted greater component group can be used in implementing execution of the one or more projecting emitted greater instructions i1239 of FIG. 43, can be used in performance of the projecting emitted greater electrical circuitry arrangement e1239 of FIG. 36, and/or can be used in otherwise fulfillment of the operation o1239. An exemplary non-transitory signal bearing medium version of the information storage subsystem s200 is depicted in FIG. 43 as bearing the one or more projecting emitted greater instructions i1239 that when executed will direct performance of the operation o1239. Furthermore, the projecting emitted greater electrical circuitry arrangement ("elec circ arrange") e1239, when activated, will perform the operation o1239. Also, the projecting emitted greater module m1239, when executed and/or activated, will direct performance of and/or perform the operation o1239. For instance, in one or more exemplary implementations, the one or more projecting emitted greater instructions i1239, when executed, direct performance of the operation o1239 in the illustrative depiction as follows, and/or the projecting emitted greater electrical circuitry arrangement e1239, when activated, performs the operation o1239 in the illustrative depiction as follows, and/or the projecting emitted greater module m1239, when executed and/or activated, directs performance of and/or performs the operation o1239 in the illustrative depiction as follows, and/or the operation o1239 is otherwise carried out in the illustrative depiction as follows: electronically projecting (e.g. by one or more monitor embedded transducer portions, etc.) said two or more acoustic ultrasonic signals (e.g. via one or more acoustic ultrasonic signals including signals having one or more frequencies above 120 kHz, etc.) from said two or more portable electronic device emitters (e.g. including one or more scattered arrangements, etc.) of said portable electronic device (e.g. including one or more tablet computer components, etc.) to produce (e.g. including demodulation by one or more acoustic ultrasonic signals configured to be demodulated through nonlinear interaction with one or more solids to at least in part generate one or more acoustic audio signals, etc.) the a first set of one or more acoustic audio signals (e.g. including internet based information, etc.) from a first set of said two or more acoustic ultrasonic signals (e.g. including containing sectional portions, etc.) at a first location (e.g. exclusive to within a vicinity of one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including varying pitch information containing acoustic audio signals, etc.) from of a second set of said two or more acoustic ultrasonic signals (e.g. via one or more acoustic ultrasonic signals including signals having one or more frequencies above 140 kHz, etc.) at a second location (e.g. more than a distance from a display screen to a center of a group, etc. e.g. including one or more scattered arrangements, etc. e.g. etc. e.g. etc.) including one or more acoustic audio signals being emitted at greater than 150 decibels (e.g. including transmitting modulated acoustic ultrasonic signals to be down converted into an acoustic alarm signal by a security system to be heard at a target location away from an intrusion location, etc.).

In one or more implementations, as shown in FIG. 81, operation o12 includes an operation o1240 for electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including audio output information designated to be transmitted to a first location of a first user without being transmitted to a second location of a second user. Origination of an illustratively derived projecting information designated component group can be accomplished through skilled in the art design choice selection of one or more of the above depicted components from one or more of the above depicted subsystems shown in FIG. 25. Components from the projecting information designated component group can be used in implementing execution of the one or more projecting information designated instructions i1240 of FIG. 44, can be used in performance of the projecting information designated electrical circuitry arrangement e1240 of FIG. 37, and/or can be used in otherwise fulfillment of the operation o1240. An exemplary non-transitory signal bearing medium version of the information storage subsystem s200 is depicted in FIG. 44 as bearing the one or more projecting information designated instructions i1240 that when executed will direct performance of the operation o1240. Furthermore, the projecting information designated electrical circuitry arrangement ("elec circ arrange") e1240, when activated, will perform the operation o1240. Also, the projecting information designated module m1240, when executed and/or activated, will direct performance of and/or perform the operation o1240. For instance, in one or more exemplary implementations, the one or more projecting information designated instructions i1240, when executed, direct performance of the operation o1240 in the illustrative depiction as follows, and/or the projecting information designated electrical circuitry arrangement e1240, when activated, performs the operation o1240 in the illustrative depiction as follows, and/or the projecting information designated module m1240, when executed and/or activated, directs performance of and/or performs the operation o1240 in the illustrative depiction as follows, and/or the operation o1240 is otherwise carried out in the illustrative depiction as follows: electronically projecting (e.g. from one or more keyboard embedded transducer portions, etc.) said two or more acoustic ultrasonic signals (e.g. via one or more acoustic ultrasonic signals including signals having one or more frequencies above 140 kHz, etc.) from said two or more portable electronic device emitters (e.g. including one or more staggered arrays, etc.) of said portable electronic device (e.g. including one or more mp3 player components, etc.) to produce (e.g. including at least in part demodulation by signal down conversion, etc.) a first set of one or more acoustic audio signals (e.g. including digital audio information, etc.) the from a first set of said two or more acoustic ultrasonic signals (e.g. including containing whole portions, etc.) at a first location (e.g. inclusive to within a vicinity of one or more designated ears, etc.) and to produce (e.g. including at least in part demodulation by signal down conversion, etc.) a second set of one or more second acoustic audio signals (e.g. including one or more note sequence information containing acoustic audio signals, etc.) from of a second set of said two or more acoustic ultrasonic signals (e.g. via one or more acoustic ultrasonic signals including signals having one or more frequencies above 160 kHz, etc.) at a second location (e.g. more than a distance from a transmitter to a receiver, etc. e.g. including one or more staggered arrays, etc. e.g. etc. e.g. etc.) including audio output information designated to be transmitted to a first location of a first user without being transmitted to a second location of a second user (e.g. including transmitting to the first user sitting in a chair adjacent the second user, etc.).

In one or more implementations, as shown in FIG. 81, operation o12 includes an operation o1241 for electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including audio output information containing an entire amount of said audio output information. Origination of an illustratively derived projecting information containing component group can be accomplished through skilled in the art design choice selection of one or more of the above depicted components from one or more of the above depicted subsystems shown in FIG. 25. Components from the projecting information containing component group can be used in implementing execution of the one or more projecting information containing instructions i1241 of FIG. 44, can be used in performance of the projecting information containing electrical circuitry arrangement e1241 of FIG. 37, and/or can be used in otherwise fulfillment of the operation o1241. An exemplary non-transitory signal bearing medium version of the information storage subsystem s200 is depicted in FIG. 44 as bearing the one or more projecting information containing instructions i1241 that when executed will direct performance of the operation o1241. Furthermore, the projecting information containing electrical circuitry arrangement ("elec circ arrange") e1241, when activated, will perform the operation o1241. Also, the projecting information containing module m1241, when executed and/or activated, will direct performance of and/or perform the operation o1241. For instance, in one or more exemplary implementations, the one or more projecting information containing instructions i1241, when executed, direct performance of the operation o1241 in the illustrative depiction as follows, and/or the projecting information containing electrical circuitry arrangement e1241, when activated, performs the operation o1241 in the illustrative depiction as follows, and/or the projecting information containing module m1241, when executed and/or activated, directs performance of and/or performs the operation o1241 in the illustrative depiction as follows, and/or the operation o1241 is otherwise carried out in the illustrative depiction as follows: electronically projecting (e.g. using one or more device body embedded transducer portions etc.) said two or more acoustic ultrasonic signals (e.g. via one or more acoustic ultrasonic signals including signals having one or more frequencies above 160 kHz, etc.) from said two or more portable electronic device emitters (e.g. including one or more linear arrangements, etc.) of said portable electronic device (e.g. including one or more mobile phone components, etc.) to produce (e.g. including at least in part demodulation through signal amplitude demodulation, etc.) a first set of one or more acoustic audio signals (e.g. including analog audio information, etc.) the from a first set of said two or more acoustic ultrasonic signals (e.g. including containing partial portions, etc.) at a first location (e.g. inclusive to within a vicinity of one or more identified persons, etc.) and to produce (e.g. including at least in part demodulation through signal amplitude demodulation, etc.) a second set of one or more second acoustic audio signals (e.g. including one or more two-way conversation information containing acoustic audio signals, etc.) from of a second set of said two or more acoustic ultrasonic signals (e.g. via one or more acoustic ultrasonic signals including signals having one or more frequencies above 180 kHz, etc.) at a second location (e.g. more than a distance from a first seat back to a second seat back, etc. e.g. including one or more linear arrangements, etc. e.g. etc. e.g. etc.) including audio output information containing an entire amount of said audio output information (e.g. including the audio output information including the entire text of an audio book, etc.).

In one or more implementations, as shown in FIG. 81, operation o12 includes an operation o1242 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information that is psychologically influential. Origination of an illustratively derived projecting psychologically influential component group can be accomplished through skilled in the art design choice selection of one or more of the above depicted components from one or more of the above depicted subsystems shown in FIG. 25. Components from the projecting psychologically influential component group can be used in implementing execution of the one or more projecting psychologically influential instructions i1242 of FIG. 44, can be used in performance of the projecting psychologically influential electrical circuitry arrangement e1242 of FIG. 37, and/or can be used in otherwise fulfillment of the operation o1242. An exemplary non-transitory signal bearing medium version of the information storage subsystem s200 is depicted in FIG. 44 as bearing the one or more projecting psychologically influential instructions i1242 that when executed will direct performance of the operation o1242. Furthermore, the projecting psychologically influential electrical circuitry arrangement ("elec circ arrange") e1242, when activated, will perform the operation o1242. Also, the projecting psychologically influential module m1242, when executed and/or activated, will direct performance of and/or perform the operation o1242. For instance, in one or more exemplary implementations, the one or more projecting psychologically influential instructions i1242, when executed, direct performance of the operation o1242 in the illustrative depiction as follows, and/or the projecting psychologically influential electrical circuitry arrangement e1242, when activated, performs the operation o1242 in the illustrative depiction as follows, and/or the projecting psychologically influential module m1242, when executed and/or activated, directs performance of and/or performs the operation o1242 in the illustrative depiction as follows, and/or the operation o1242 is otherwise carried out in the illustrative depiction as follows: electronically projecting (e.g. through one or more device perimeter embedded transducer portions, etc.) said two or more acoustic ultrasonic signals (e.g. via one or more acoustic ultrasonic signals including signals having one or more frequencies above 180 kHz, etc.) from said two or more portable electronic device emitters (e.g. including one or more parabolic arrangements, etc.) of said portable electronic device (e.g. including one or more two-way radio components, etc.) to produce (e.g. including at least in part demodulation via signal frequency demodulation portions, etc.) the a first set of one or more acoustic audio signals (e.g. including high frequency audio information, etc.) from a first set of said two or more acoustic ultrasonic signals (e.g. including containing transitionary portions, etc.) at a first location (e.g. inclusive to within a vicinity of one or more predetermined ears, etc.) and to produce (e.g. including at least in part demodulation via signal frequency demodulation portions, etc.) a second set of one or more second acoustic audio signals (e.g. including one or more confidential information containing acoustic audio signals, etc.) from of a second set of said two or more acoustic ultrasonic signals (e.g. via one or more acoustic ultrasonic signals including signals having one or more frequencies above 200 kH, etc.) at a second location (e.g. more than a distance from a seat back to a tray table, etc. e.g. including one or more parabolic arrangements, etc. e.g. etc. e.g. etc.) including audio output information that is psychologically influential (e.g. including audio output from a human relations motivational information, etc.).

In one or more implementations, as shown in FIG. 82, operation o12 includes an operation o1243 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information containing verbal oratory. Origination of an illustratively derived projecting verbal oratory component group can be accomplished through skilled in the art design choice selection of one or more of the above depicted components from one or more of the above depicted subsystems shown in FIG. 25. Components from the projecting verbal oratory component group can be used in implementing execution of the one or more projecting verbal oratory instructions i1243 of FIG. 44, can be used in performance of the projecting verbal oratory electrical circuitry arrangement e1243 of FIG. 37, and/or can be used in otherwise fulfillment of the operation o1243. An exemplary non-transitory signal bearing medium version of the information storage subsystem s200 is depicted in FIG. 44 as bearing the one or more projecting verbal oratory instructions i1243 that when executed will direct performance of the operation o1243. Furthermore, the projecting verbal oratory electrical circuitry arrangement ("elec circ arrange") e1243, when activated, will perform the operation o1243. Also, the projecting verbal oratory module m1243, when executed and/or activated, will direct performance of and/or perform the operation o1243. For instance, in one or more exemplary implementations, the one or more projecting verbal oratory instructions i1243, when executed, direct performance of the operation o1243 in the illustrative depiction as follows, and/or the projecting verbal oratory electrical circuitry arrangement e1243, when activated, performs the operation o1243 in the illustrative depiction as follows, and/or the projecting verbal oratory module m1243, when executed and/or activated, directs performance of and/or performs the operation o1243 in the illustrative depiction as follows, and/or the operation o1243 is otherwise carried out in the illustrative depiction as follows: electronically projecting (e.g. via one or more multiple emitter array portions etc.) said two or more acoustic ultrasonic signals (e.g. via one or more acoustic ultrasonic signals including signals having one or more frequencies above 200 kHz, etc.) from said two or more portable electronic device emitters (e.g. including one or more hyperbolic arrangements, etc.) of said portable electronic device (e.g. including one or more security network components, etc.) to produce (e.g. including at least in part demodulation with signal phase demodulation portions, etc.) the a first set of one or more acoustic audio signals (e.g. including low frequency audio information, etc.) from a first set of said two or more acoustic ultrasonic signals (e.g. including containing temporary portions, etc.) at a first location (e.g. inclusive to within a vicinity of one or more desired groups of people, etc.) and to produce (e.g. including at least in part demodulation with signal phase demodulation portions, etc.) a second set of one or more second acoustic audio signals (e.g. including one or more eavesdropping information containing acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. more than a distance of an aisle way, etc. e.g. including one or more hyperbolic arrangements, etc. e.g. etc. e.g. etc.) including audio output information containing verbal oratory (e.g. including audio output from political campaign speeches, etc.).

In one or more implementations, as shown in FIG. 82, operation o12 includes an operation o1244 for electronically projecting said two or more acoustic ultrasonic signals from said two or more portable electronic device emitters of said portable electronic device to produce the a first set of one or more acoustic audio signals from a first set of said two or more acoustic ultrasonic signals at a first location and to produce a second set of one or more second acoustic audio signals from of a second set of said two or more acoustic ultrasonic signals at a second location including audio output information containing one or more music selections. Origination of an illustratively derived projecting music selections component group can be accomplished through skilled in the art design choice selection of one or more of the above depicted components from one or more of the above depicted subsystems shown in FIG. 25. Components from the projecting music selections component group can be used in implementing execution of the one or more projecting music selections instructions i1244 of FIG. 44, can be used in performance of the projecting music selections electrical circuitry arrangement e1244 of FIG. 37, and/or can be used in otherwise fulfillment of the operation o1244. An exemplary non-transitory signal bearing medium version of the information storage subsystem s200 is depicted in FIG. 44 as bearing the one or more projecting music selections instructions i1244 that when executed will direct performance of the operation o1244. Furthermore, the projecting music selections electrical circuitry arrangement ("elec circ arrange") e1244, when activated, will perform the operation o1244. Also, the projecting music selections module m1244, when executed and/or activated, will direct performance of and/or perform the operation o1244. For instance, in one or more exemplary implementations, the one or more projecting music selections instructions i1244, when executed, direct performance of the operation o1244 in the illustrative depiction as follows, and/or the projecting music selections electrical circuitry arrangement e1244, when activated, performs the operation o1244 in the illustrative depiction as follows, and/or the projecting music selections module m1244, when executed and/or activated, directs performance of and/or performs the operation o1244 in the illustrative depiction as follows, and/or the operation o1244 is otherwise carried out in the illustrative depiction as follows: electronically projecting (e.g. through one or more cable interface portions etc.) said two or more acoustic ultrasonic signals (e.g. via multiple acoustic ultrasonic signals configured to be demodulated through mutual interference therewith to at least in part result in one or more acoustic audio signals, etc.) from said two or more portable electronic device emitters (e.g. including one or more enclosed arrangements, etc.) of said portable electronic device (e.g. including one or more netbook components, etc.) to produce (e.g. including at least in part demodulation using signal rectification, etc.) the a first set of one or more acoustic audio signals (e.g. including one or more low frequency acoustic audio signals, etc.) from a first set of said two or more acoustic ultrasonic signals (e.g. including containing steady state portions, etc.) at a first location (e.g. inclusive to within a vicinity of one or more chosen audio receivers, etc.) and to produce (e.g. including at least in part demodulation using signal rectification, etc.) a second set of one or more second acoustic audio signals (e.g. including one or more pre-recorded information containing acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. more than a distance from a desk to a chair, etc. e.g. including one or more enclosed arrangements, etc. e.g. etc. e.g. etc.) including audio output information containing one or more music selections (e.g. including audio output of a musical concert, etc.).

In one or more implementations, as shown in FIG. 82, operation o12 includes an operation o1245 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location away from a first listener and a second location toward a second listener. Origination of an illustratively derived projecting location away component group can be accomplished through skilled in the art design choice selection of one or more of the above depicted components from one or more of the above depicted subsystems shown in FIG. 25. Components from the projecting location away component group can be used in implementing execution of the one or more projecting location away instructions i1245 of FIG. 44, can be used in performance of the projecting location away electrical circuitry arrangement e1245 of FIG. 37, and/or can be used in otherwise fulfillment of the operation o1245. An exemplary non-transitory signal bearing medium version of the information storage subsystem s200 is depicted in FIG. 44 as bearing the one or more projecting location away instructions i1245 that when executed will direct performance of the operation o1245. Furthermore, the projecting location away electrical circuitry arrangement ("elec circ arrange") e1245, when activated, will perform the operation o1245. Also, the projecting location away module m1245, when executed and/or activated, will direct performance of and/or perform the operation o1245. For instance, in one or more exemplary implementations, the one or more projecting location away instructions i1245, when executed, direct performance of the operation o1245 in the illustrative depiction as follows, and/or the projecting location away electrical circuitry arrangement e1245, when activated, performs the operation o1245 in the illustrative depiction as follows, and/or the projecting location away module m1245, when executed and/or activated, directs performance of and/or performs the operation o1245 in the illustrative depiction as follows, and/or the operation o1245 is otherwise carried out in the illustrative depiction as follows: electronically projecting (e.g. via one or more speaker portions, etc.) said two or more acoustic ultrasonic signals (e.g. via one or more acoustic ultrasonic signals configured to be demodulated through nonlinear atmospheric interaction to at least in part generate one or more acoustic audio signals, etc.) from said two or more portable electronic device emitters (e.g. including one or more transducer arrangements, etc.) of said portable electronic device (e.g. including one or more ultrabook components, etc.) to produce (e.g. including at least in part demodulation by signal filtering, etc.) a first set of one or more acoustic audio signals (e.g. including one or more high frequency acoustic audio signals, etc.) from a first set of said two or more acoustic ultrasonic signals (e.g. including containing integrated portions, etc.) the at a first location (e.g. inclusive to within a vicinity of one or more selected microphones, etc.) and to produce (e.g. including at least in part demodulation by signal filtering, etc.) a second set of one or more second acoustic audio signals (e.g. including one or more processor generated information containing acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. more than a distance from a dashboard to a headrest, etc. e.g. including one or more transducer arrangements, etc. e.g. etc. e.g. etc.) including a first location away from a first listener and a second location toward a second listener (e.g. where the first listener does not have a security clearance and is standing next to a second listener that has a security clearance, etc.).

In one or more implementations, as shown in FIG. 83, operation o12 includes an operation o1246 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location in a vicinity of one or more ears of a target listener. Origination of an illustratively derived projecting vicinity ears component group can be accomplished through skilled in the art design choice selection of one or more of the above depicted components from one or more of the above depicted subsystems shown in FIG. 25. Components from the projecting vicinity ears component group can be used in implementing execution of the one or more projecting vicinity ears instructions i1246 of FIG. 44, can be used in performance of the projecting vicinity ears electrical circuitry arrangement e1246 of FIG. 37, and/or can be used in otherwise fulfillment of the operation o1246. An exemplary non-transitory signal bearing medium version of the information storage subsystem s200 is depicted in FIG. 44 as bearing the one or more projecting vicinity ears instructions i1246 that when executed will direct performance of the operation o1246. Furthermore, the projecting vicinity ears electrical circuitry arrangement ("elec circ arrange") e1246, when activated, will perform the operation o1246. Also, the projecting vicinity ears module m1246, when executed and/or activated, will direct performance of and/or perform the operation o1246. For instance, in one or more exemplary implementations, the one or more projecting vicinity ears instructions i1246, when executed, direct performance of the operation o1246 in the illustrative depiction as follows, and/or the projecting vicinity ears electrical circuitry arrangement e1246, when activated, performs the operation o1246 in the illustrative depiction as follows, and/or the projecting vicinity ears module m1246, when executed and/or activated, directs performance of and/or performs the operation o1246 in the illustrative depiction as follows, and/or the operation o1246 is otherwise carried out in the illustrative depiction as follows: electronically projecting (e.g. by one or more transducer portions, etc.) said two or more acoustic ultrasonic signals (e.g. via one or more acoustic ultrasonic signals configured to be demodulated through nonlinear human tissue interaction to at least in part produce one or more acoustic audio signals, etc.) from said two or more portable electronic device emitters (e.g. including one or more aperture arrangements, etc.) of said portable electronic device (e.g. including one or more flip-phone components, etc.) to produce (e.g. including at least in part demodulation through signal intelligence recovery, etc.) a first set of one or more acoustic audio signals (e.g. including one or more full spectrum acoustic audio signals, etc.) from a first set of said two or more acoustic ultrasonic signals (e.g. including containing disparate portions, etc.) the at a first location (e.g. inclusive to within a vicinity of one or more designated surfaces, etc.) and to produce (e.g. including at least in part demodulation through signal intelligence recovery, etc.) a second set of one or more second acoustic audio signals (e.g. including one or more internet based information containing acoustic audio signals, etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. within a confines of a room, etc. e.g. including one or more aperture arrangements, etc. e.g. etc. e.g. etc.) including a first location in a vicinity of one or more ears of a target listener (e.g. where the first location is near one ear of a target listener, etc.).

In one or more implementations, as shown in FIG. 83, operation o12 includes an operation o1247 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location in a vicinity of a first individual. Origination of an illustratively derived projecting vicinity individual component group can be accomplished through skilled in the art design choice selection of one or more of the above depicted components from one or more of the above depicted subsystems shown in FIG. 25. Components from the projecting vicinity individual component group can be used in implementing execution of the one or more projecting vicinity individual instructions i1247 of FIG. 44, can be used in performance of the projecting vicinity individual electrical circuitry arrangement e1247 of FIG. 37, and/or can be used in otherwise fulfillment of the operation o1247. An exemplary non-transitory signal bearing medium version of the information storage subsystem s200 is depicted in FIG. 44 as bearing the one or more projecting vicinity individual instructions i1247 that when executed will direct performance of the operation o1247. Furthermore, the projecting vicinity individual electrical circuitry arrangement ("elec circ arrange") e1247, when activated, will perform the operation o1247. Also, the projecting vicinity individual module m1247, when executed and/or activated, will direct performance of and/or perform the operation o1247. For instance, in one or more exemplary implementations, the one or more projecting vicinity individual instructions i1247, when executed, direct performance of the operation o1247 in the illustrative depiction as follows, and/or the projecting vicinity individual electrical circuitry arrangement e1247, when activated, performs the operation o1247 in the illustrative depiction as follows, and/or the projecting vicinity individual module m1247, when executed and/or activated, directs performance of and/or performs the operation o1247 in the illustrative depiction as follows, and/or the operation o1247 is otherwise carried out in the illustrative depiction as follows: electronically projecting (e.g. from one or more aperture portions, etc.) said two or more acoustic ultrasonic signals (e.g. via one or more acoustic ultrasonic signals configured to be demodulated through nonlinear polymeric interaction to at least in part result in one or more acoustic audio signals, etc.) from said two or more portable electronic device emitters (e.g. including one or more transmitter arrangements, etc.) of said portable electronic device (e.g. including one or more portable computer components, etc.) to produce (e.g. including demodulation via mutual interference therewith multiple acoustic ultrasonic signals configured to be demodulated through to at least in part result in one or more acoustic audio signals, etc.) a first set of one or more acoustic audio signals (e.g. including one or more partial spectrum acoustic audio signals, etc.) from a first set of said two or more acoustic ultrasonic signals (e.g. via multiple acoustic ultrasonic signals configured to be demodulated through mutual interference therewith to at least in part result in one or more acoustic audio signals, etc.) the at a first location (e.g. inclusive to within a vicinity of one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more digital audio information containing acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. within an arm's length, etc. e.g. including one or more transmitter arrangements, etc. e.g. etc. e.g. etc.) including a first location in a vicinity of a first individual (e.g. where the first location is a desk area of a first individual, etc.).

In one or more implementations, as shown in FIG. 83, operation o12 includes an operation o1248 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location near one or more first individuals but not a second location near one or more second individuals. Origination of an illustratively derived projecting near individuals component group can be accomplished through skilled in the art design choice selection of one or more of the above depicted components from one or more of the above depicted subsystems shown in FIG. 25. Components from the projecting near individuals component group can be used in implementing execution of the one or more projecting near individuals instructions i1248 of FIG. 44, can be used in performance of the projecting near individuals electrical circuitry arrangement e1248 of FIG. 37, and/or can be used in otherwise fulfillment of the operation o1248. An exemplary non-transitory signal bearing medium version of the information storage subsystem s200 is depicted in FIG. 44 as bearing the one or more projecting near individuals instructions i1248 that when executed will direct performance of the operation o1248. Furthermore, the projecting near individuals electrical circuitry arrangement ("elec circ arrange") e1248, when activated, will perform the operation o1248. Also, the projecting near individuals module m1248, when executed and/or activated, will direct performance of and/or perform the operation o1248. For instance, in one or more exemplary implementations, the one or more projecting near individuals instructions i1248, when executed, direct performance of the operation o1248 in the illustrative depiction as follows, and/or the projecting near individuals electrical circuitry arrangement e1248, when activated, performs the operation o1248 in the illustrative depiction as follows, and/or the projecting near individuals module m1248, when executed and/or activated, directs performance of and/or performs the operation o1248 in the illustrative depiction as follows, and/or the operation o1248 is otherwise carried out in the illustrative depiction as follows: electronically projecting (e.g. using one or more transmitter portions, etc.) said two or more acoustic ultrasonic signals (e.g. via one or more acoustic ultrasonic signals configured to be demodulated through nonlinear apparel interaction to at least in part produce one or more acoustic audio signals, etc.) from said two or more portable electronic device emitters (e.g. including one or more air-coupled transducer arrangements, etc.) of said portable electronic device (e.g. including one or more boombox components, etc.) to produce (e.g. including demodulation using one or more acoustic ultrasonic signals configured to be demodulated through nonlinear atmospheric interaction to at least in part generate one or more acoustic audio signals, etc.) a first set of one or more acoustic audio signals (e.g. including one or more low amplitude acoustic audio signals, etc.) from a first set of said two or more acoustic ultrasonic signals (e.g. via one or more acoustic ultrasonic signals configured to be demodulated through nonlinear atmospheric interaction to at least in part generate one or more acoustic audio signals, etc.) the at a first location (e.g. inclusive to within a vicinity of one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more analog audio information containing acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. within a three-foot radius, etc. e.g. including one or more air-coupled transducer arrangements, etc. e.g. etc. e.g. etc.) including a first location near one or more first individuals but not a second location near one or more second individuals (e.g. where the first and second locations are adjacent seats, etc.).

In one or more implementations, as shown in FIG. 84, operation o12 includes an operation o1249 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location near a passive receiver such as an ear ring. Origination of an illustratively derived projecting passive receiver component group can be accomplished through skilled in the art design choice selection of one or more of the above depicted components from one or more of the above depicted subsystems shown in FIG. 25. Components from the projecting passive receiver component group can be used in implementing execution of the one or more projecting passive receiver instructions i1249 of FIG. 44, can be used in performance of the projecting passive receiver electrical circuitry arrangement e1249 of FIG. 37, and/or can be used in otherwise fulfillment of the operation o1249. An exemplary non-transitory signal bearing medium version of the information storage subsystem s200 is depicted in FIG. 44 as bearing the one or more projecting passive receiver instructions i1249 that when executed will direct performance of the operation o1249. Furthermore, the projecting passive receiver electrical circuitry arrangement ("elec circ arrange") e1249, when activated, will perform the operation o1249. Also, the projecting passive receiver module m1249, when executed and/or activated, will direct performance of and/or perform the operation o1249. For instance, in one or more exemplary implementations, the one or more projecting passive receiver instructions i1249, when executed, direct performance of the operation o1249 in the illustrative depiction as follows, and/or the projecting passive receiver electrical circuitry arrangement e1249, when activated, performs the operation o1249 in the illustrative depiction as follows, and/or the projecting passive receiver module m1249, when executed and/or activated, directs performance of and/or performs the operation o1249 in the illustrative depiction as follows, and/or the operation o1249 is otherwise carried out in the illustrative depiction as follows: electronically projecting (e.g. through one or more air-coupled transducer portions, etc.) said two or more acoustic ultrasonic signals (e.g. via one or more acoustic ultrasonic signals configured to be demodulated through nonlinear interaction with one or more solids to at least in part generate one or more acoustic audio signals, etc.) from said two or more portable electronic device emitters (e.g. including one or more thin-film membrane arrangements, etc.) of said portable electronic device (e.g. including one or more digital audio output components, etc.) to produce (e.g. including demodulation with one or more acoustic ultrasonic signals configured to be demodulated through nonlinear human tissue interaction to at least in part produce one or more acoustic audio signals, etc.) a first set of one or more acoustic audio signals (e.g. including one or more high amplitude acoustic audio signals, etc.) from a first set of said two or more acoustic ultrasonic signals (e.g. via one or more acoustic ultrasonic signals configured to be demodulated through nonlinear human tissue interaction to at least in part produce one or more acoustic audio signals, etc.) the at a first location (e.g. inclusive to within a vicinity of one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more high frequency audio information containing acoustic audio signals, etc.) from of a second set of said two or more acoustic ultrasonic signals (e.g. via one or more acoustic ultrasonic signals including signals having one or more frequencies above 60 kHz, etc.) at a second location (e.g. within a distance from a portable device to a person, etc. e.g. including one or more thin-film membrane arrangements, etc. e.g. etc. e.g. etc.) including a first location near a passive receiver such as an ear ring (e.g. where the ear ring is being worn by a target user, etc.).

In one or more implementations, as shown in FIG. 84, operation o12 includes an operation o1250 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location receiving said one or more acoustic ultrasonic signals from said portable electronic device being affixed to a moving member. Origination of an illustratively derived projecting moving member component group can be accomplished through skilled in the art design choice selection of one or more of the above depicted components from one or more of the above depicted subsystems shown in FIG. 25. Components from the projecting moving member component group can be used in implementing execution of the one or more projecting moving member instructions i1250 of FIG. 44, can be used in performance of the projecting moving member electrical circuitry arrangement e1250 of FIG. 37, and/or can be used in otherwise fulfillment of the operation o1250. An exemplary non-transitory signal bearing medium version of the information storage subsystem s200 is depicted in FIG. 44 as bearing the one or more projecting moving member instructions i1250 that when executed will direct performance of the operation o1250. Furthermore, the projecting moving member electrical circuitry arrangement ("elec circ arrange") e1250, when activated, will perform the operation o1250. Also, the projecting moving member module m1250, when executed and/or activated, will direct performance of and/or perform the operation o1250. For instance, in one or more exemplary implementations, the one or more projecting moving member instructions i1250, when executed, direct performance of the operation o1250 in the illustrative depiction as follows, and/or the projecting moving member electrical circuitry arrangement e1250, when activated, performs the operation o1250 in the illustrative depiction as follows, and/or the projecting moving member module m1250, when executed and/or activated, directs performance of and/or performs the operation o1250 in the illustrative depiction as follows, and/or the operation o1250 is otherwise carried out in the illustrative depiction as follows: electronically projecting (e.g. via one or more thin-film membrane portions, etc.) said two or more acoustic ultrasonic signals (e.g. via one or more acoustic ultrasonic signals including signals having one or more frequencies above 60 kHz, etc.) from said two or more portable electronic device emitters (e.g. including one or more resonant surface arrangements, etc.) of said portable electronic device (e.g. including one or more CD player components, etc.) to produce (e.g. including demodulation by one or more acoustic ultrasonic signals configured to be demodulated through nonlinear polymeric interaction to at least in part result in one or more acoustic audio signals, etc.) a first set of one or more acoustic audio signals (e.g. including one or more high frequency acoustic audio signals etc.) from a first set of said two or more acoustic ultrasonic signals (e.g. via one or more acoustic ultrasonic signals configured to be demodulated through nonlinear polymeric interaction to at least in part result in one or more acoustic audio signals, etc.) the at a first location (e.g. inclusive to within a vicinity of one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more low frequency audio information containing acoustic audio signals, etc.) from of a second set of said two or more acoustic ultrasonic signals (e.g. via one or more acoustic ultrasonic signals including signals having one or more frequencies above 80 kHz, etc.) at a second location (e.g. within a distance from a display screen to a person, etc. e.g. including one or more resonant surface arrangements, etc. e.g. etc. e.g. etc.) including a first location receiving said one or more acoustic ultrasonic signals from said portable electronic device being affixed to a moving member (e.g. etc.).

In one or more implementations, as shown in FIG. 84, operation o12 includes an operation o1251 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location identified through sensor data as being a vicinity of a target listener's head. Origination of an illustratively derived projecting listener's head component group can be accomplished through skilled in the art design choice selection of one or more of the above depicted components from one or more of the above depicted subsystems shown in FIG. 25. Components from the projecting listener's head component group can be used in implementing execution of the one or more projecting listener's head instructions i1251 of FIG. 44, can be used in performance of the projecting listener's head electrical circuitry arrangement e1251 of FIG. 37, and/or can be used in otherwise fulfillment of the operation o1251. An exemplary non-transitory signal bearing medium version of the information storage subsystem s200 is depicted in FIG. 44 as bearing the one or more projecting listener's head instructions i1251 that when executed will direct performance of the operation o1251. Furthermore, the projecting listener's head electrical circuitry arrangement ("elec circ arrange") e1251, when activated, will perform the operation o1251. Also, the projecting listener's head module m1251, when executed and/or activated, will direct performance of and/or perform the operation o1251. For instance, in one or more exemplary implementations, the one or more projecting listener's head instructions i1251, when executed, direct performance of the operation o1251 in the illustrative depiction as follows, and/or the projecting listener's head electrical circuitry arrangement e1251, when activated, performs the operation o1251 in the illustrative depiction as follows, and/or the projecting listener's head module m1251, when executed and/or activated, directs performance of and/or performs the operation o1251 in the illustrative depiction as follows, and/or the operation o1251 is otherwise carried out in the illustrative depiction as follows: electronically projecting (e.g. by one or more resonant surface portions, etc.) said two or more acoustic ultrasonic signals (e.g. via one or more acoustic ultrasonic signals including signals having one or more frequencies above 80 kHz, etc.) from said two or more portable electronic device emitters (e.g. including one or more transmitter arrangements, etc.) of said portable electronic device (e.g. including one or more digital music player components, etc.) to produce (e.g. including demodulation through one or more acoustic ultrasonic signals configured to be demodulated through nonlinear apparel interaction to at least in part produce one or more acoustic audio signals, etc.) a first set of one or more acoustic audio signals (e.g. including one or more lecture information containing acoustic audio signals, etc.) from a first set of said two or more acoustic ultrasonic signals (e.g. via one or more acoustic ultrasonic signals configured to be demodulated through nonlinear apparel interaction to at least in part produce one or more acoustic audio signals, etc.) the at a first location (e.g. inclusive to within a vicinity of one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including one or more low frequency acoustic audio signals, etc.) from of a second set of said two or more acoustic ultrasonic signals (e.g. via one or more acoustic ultrasonic signals including signals having one or more frequencies above 100 kHz, etc.) at a second location (e.g. within a distance from a portable device to an ear, etc. e.g. including one or more transmitter arrangements, etc. e.g. etc. e.g. etc.) including a first location identified through sensor data as being a vicinity of a target listener's head (e.g. where sensor data is visual imagery of a target listener's face, etc.).

Figure 85:
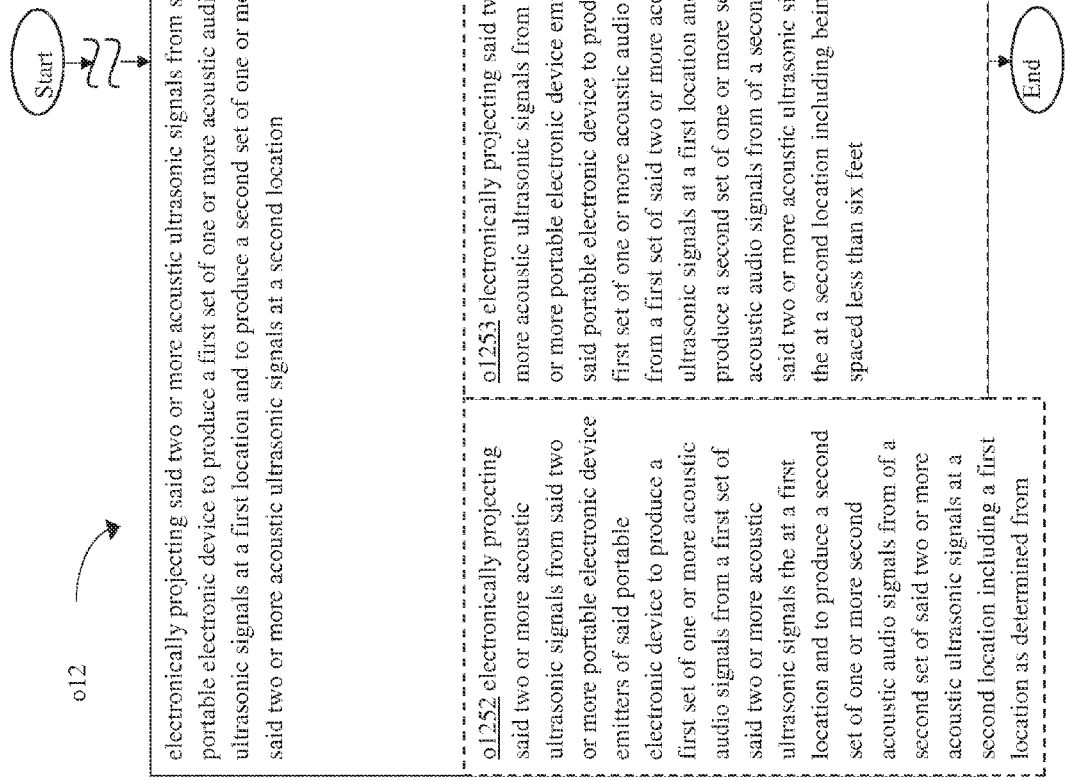
FIG. 85 is a high-level flowchart including exemplary implementations of operation o12 of FIG. 53.

In one or more implementations, as shown in FIG. 85, operation o12 includes an operation o1252 for electronically projecting said two or more acoustic ultrasonic signals from said two or more portable electronic device emitters of said portable electronic device to produce a first set of one or more acoustic audio signals from a first set of said two or more acoustic ultrasonic signals the at a first location and to produce a second set of one or more second acoustic audio signals from of a second set of said two or more acoustic ultrasonic signals at a second location including a first location as determined from sensed accelerometer data of said portable electronic device. Origination of an illustratively derived projecting sensed accelerometer component group can be accomplished through skilled in the art design choice selection of one or more of the above depicted components from one or more of the above depicted subsystems shown in FIG. 25. Components from the projecting sensed accelerometer component group can be used in implementing execution of the one or more projecting sensed accelerometer instructions i1252 of FIG. 44, can be used in performance of the projecting sensed accelerometer electrical circuitry arrangement e1252 of FIG. 37, and/or can be used in otherwise fulfillment of the operation o1252. An exemplary non-transitory signal bearing medium version of the information storage subsystem s200 is depicted in FIG. 44 as bearing the one or more projecting sensed accelerometer instructions i1252 that when executed will direct performance of the operation o1252. Furthermore, the projecting sensed accelerometer electrical circuitry arrangement ("elec circ arrange") e1252, when activated, will perform the operation o1252. Also, the projecting sensed accelerometer module m1252, when executed and/or activated, will direct performance of and/or perform the operation o1252. For instance, in one or more exemplary implementations, the one or more projecting sensed accelerometer instructions i1252, when executed, direct performance of the operation o1252 in the illustrative depiction as follows, and/or the projecting sensed accelerometer electrical circuitry arrangement e1252, when activated, performs the operation o1252 in the illustrative depiction as follows, and/or the projecting sensed accelerometer module m1252, when executed and/or activated, directs performance of and/or performs the operation o1252 in the illustrative depiction as follows, and/or the operation o1252 is otherwise carried out in the illustrative depiction as follows: electronically projecting (e.g. from one or more signal processor portions, etc.) said two or more acoustic ultrasonic signals (e.g. via one or more acoustic ultrasonic signals including signals having one or more frequencies above 100 kHz, etc.) from said two or more portable electronic device emitters (e.g. including one or more transducer membrane arrangements, etc.) of said portable electronic device (e.g. including one or more handheld radio components, etc.) to produce (e.g. including demodulation by one or more acoustic ultrasonic signals configured to be demodulated through nonlinear interaction with one or more solids to at least in part generate one or more acoustic audio signals, etc.) a first set of one or more acoustic audio signals (e.g. including one or more foreign language speech information containing acoustic audio signals, etc.) from a first set of said two or more acoustic ultrasonic signals (e.g. via one or more acoustic ultrasonic signals configured to be demodulated through nonlinear interaction with one or more solids to at least in part generate one or more acoustic audio signals, etc.) the at a first location (e.g. inclusive to within a vicinity of one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including one or more high frequency acoustic audio signals, etc.) from of a second set of said two or more acoustic ultrasonic signals (e.g. via one or more acoustic ultrasonic signals including signals having one or more frequencies above 120 kHz, etc.) at a second location (e.g. within a distance from a display screen to an ear, etc. e.g. including one or more transducer membrane arrangements, etc. e.g. etc. e.g. etc.) including a first location as determined from sensed accelerometer data of said portable electronic device (e.g. where the accelerometer is located on a smart watch worn on a wrist of a moving arm, etc.).

In one or more implementations, as shown in FIG. 85, operation o12 includes an operation o1253 for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals the at a second location including being spaced less than six feet. Origination of an illustratively derived projecting six feet component group can be accomplished through skilled in the art design choice selection of one or more of the above depicted components from one or more of the above depicted subsystems shown in FIG. 25. Components from the projecting six feet component group can be used in implementing execution of the one or more projecting six feet instructions i1253 of FIG. 44, can be used in performance of the projecting six feet electrical circuitry arrangement e1253 of FIG. 37, and/or can be used in otherwise fulfillment of the operation o1253. An exemplary non-transitory signal bearing medium version of the information storage subsystem s200 is depicted in FIG. 44 as bearing the one or more projecting six feet instructions i1253 that when executed will direct performance of the operation o1253. Furthermore, the projecting six feet electrical circuitry arrangement ("elec circ arrange") e1253, when activated, will perform the operation o1253. Also, the projecting six feet module m1253, when executed and/or activated, will direct performance of and/or perform the operation o1253. For instance, in one or more exemplary implementations, the one or more projecting six feet instructions i1253, when executed, direct performance of the operation o1253 in the illustrative depiction as follows, and/or the projecting six feet electrical circuitry arrangement e1253, when activated, performs the operation o1253 in the illustrative depiction as follows, and/or the projecting six feet module m1253, when executed and/or activated, directs performance of and/or performs the operation o1253 in the illustrative depiction as follows, and/or the operation o1253 is otherwise carried out in the illustrative depiction as follows: electronically projecting (e.g. using one or more transmitter portions, etc.) said two or more acoustic ultrasonic signals (e.g. via one or more acoustic ultrasonic signals including signals having one or more frequencies above 120 kHz, etc.) from said two or more portable electronic device emitters (e.g. including one or more transducer array arrangements, etc.) of said portable electronic device (e.g. including one or more spread spectrum components, etc.) to produce (e.g. including at least in part demodulation by signal down conversion, etc.) a first set of one or more acoustic audio signals (e.g. including one or more classical music selection information containing acoustic audio signals, etc.) from a first set of said two or more acoustic ultrasonic signals (e.g. via one or more acoustic ultrasonic signals including signals having one or more frequencies above 60 kHz, etc.) at a first location (e.g. exclusive to one or more designated ears, etc.) and to produce (e.g. including at least in part demodulation by signal down conversion, etc.) a second set of one or more second acoustic audio signals (e.g. including one or more full spectrum acoustic audio signals, etc.) from of a second set of said two or more acoustic ultrasonic signals (e.g. via one or more acoustic ultrasonic signals including signals having one or more frequencies above 140 kHz, etc.) the at a second location (e.g. within a distance from a portable device to a center of a group, etc. e.g. including one or more transducer array arrangements, etc. e.g. etc. e.g. etc.) including being spaced less than six feet (e.g. where spacing depending upon seating arrangements, etc.).

In one or more implementations, as shown in FIG. 85, operation o12 includes an operation o1254 for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals the at a second location including being spaced less than twelve feet. Origination of an illustratively derived projecting twelve feet component group can be accomplished through skilled in the art design choice selection of one or more of the above depicted components from one or more of the above depicted subsystems shown in FIG. 25. Components from the projecting twelve feet component group can be used in implementing execution of the one or more projecting twelve feet instructions i1254 of FIG. 44, can be used in performance of the projecting twelve feet electrical circuitry arrangement e1254 of FIG. 37, and/or can be used in otherwise fulfillment of the operation o1254. An exemplary non-transitory signal bearing medium version of the information storage subsystem s200 is depicted in FIG. 44 as bearing the one or more projecting twelve feet instructions i1254 that when executed will direct performance of the operation o1254. Furthermore, the projecting twelve feet electrical circuitry arrangement ("elec circ arrange") e1254, when activated, will perform the operation o1254. Also, the projecting twelve feet module m1254, when executed and/or activated, will direct performance of and/or perform the operation o1254. For instance, in one or more exemplary implementations, the one or more projecting twelve feet instructions i1254, when executed, direct performance of the operation o1254 in the illustrative depiction as follows, and/or the projecting twelve feet electrical circuitry arrangement e1254, when activated, performs the operation o1254 in the illustrative depiction as follows, and/or the projecting twelve feet module m1254, when executed and/or activated, directs performance of and/or performs the operation o1254 in the illustrative depiction as follows, and/or the operation o1254 is otherwise carried out in the illustrative depiction as follows: electronically projecting (e.g. through one or more transducer membrane portions etc.) said two or more acoustic ultrasonic signals (e.g. via one or more acoustic ultrasonic signals including signals having one or more frequencies above 140 kHz, etc.) from said two or more portable electronic device emitters (e.g. including one or more membrane speaker arrangements, etc.) of said portable electronic device (e.g. including one or more wireless components, etc.) to produce (e.g. including at least in part demodulation through signal amplitude demodulation, etc.) a first set of one or more acoustic audio signals (e.g. including one or more instructional lesson material information containing acoustic audio signals, etc.) from a first set of said two or more acoustic ultrasonic signals (e.g. via one or more acoustic ultrasonic signals including signals having one or more frequencies above 80 kHz, etc.) at a first location (e.g. exclusive to one or more identified persons, etc.) and to produce (e.g. including at least in part demodulation through signal amplitude demodulation, etc.) a second set of one or more second acoustic audio signals (e.g. including one or more partial spectrum acoustic audio signals, etc.) from of a second set of said two or more acoustic ultrasonic signals (e.g. via one or more acoustic ultrasonic signals including signals having one or more frequencies above 160 kHz, etc.) the at a second location (e.g. within a distance from a display screen to a center of a group, etc. e.g. including one or more membrane speaker arrangements, etc. e.g. etc. e.g. etc.) including being spaced less than twelve feet (e.g. where spacing is based upon dimensions of conference furniture, etc.).

In one or more implementations, as shown in FIG. 86, operation o12 includes an operation o1255 for electronically projecting said two or more acoustic ultrasonic signals from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals the at a second location including being spaced less than three feet. Origination of an illustratively derived projecting three feet component group can be accomplished through skilled in the art design choice selection of one or more of the above depicted components from one or more of the above depicted subsystems shown in FIG. 25. Components from the projecting three feet component group can be used in implementing execution of the one or more projecting three feet instructions i1255 of FIG. 44, can be used in performance of the projecting three feet electrical circuitry arrangement e1255 of FIG. 37, and/or can be used in otherwise fulfillment of the operation o1255. An exemplary non-transitory signal bearing medium version of the information storage subsystem s200 is depicted in FIG. 44 as bearing the one or more projecting three feet instructions i1255 that when executed will direct performance of the operation o1255. Furthermore, the projecting three feet electrical circuitry arrangement ("elec circ arrange") e1255, when activated, will perform the operation o1255. Also, the projecting three feet module m1255, when executed and/or activated, will direct performance of and/or perform the operation o1255. For instance, in one or more exemplary implementations, the one or more projecting three feet instructions i1255, when executed, direct performance of the operation o1255 in the illustrative depiction as follows, and/or the projecting three feet electrical circuitry arrangement e1255, when activated, performs the operation o1255 in the illustrative depiction as follows, and/or the projecting three feet module m1255, when executed and/or activated, directs performance of and/or performs the operation o1255 in the illustrative depiction as follows, and/or the operation o1255 is otherwise carried out in the illustrative depiction as follows: electronically projecting (e.g. via one or more transducer array portions, etc.) said two or more acoustic ultrasonic signals (e.g. via one or more acoustic ultrasonic signals including signals having one or more frequencies above 160 kHz, etc.) from said two or more portable electronic device emitters (e.g. including one or more ultrasonic transducer arrangements, etc.) of said portable electronic device (e.g. including one or more frequency division multiplexing components, etc.) to produce (e.g. including at least in part demodulation via signal frequency demodulation portions, etc.) a first set of one or more acoustic audio signals (e.g. including one or more warning tone information containing acoustic audio signals, etc.) from a first set of said two or more acoustic ultrasonic signals (e.g. via one or more acoustic ultrasonic signals including signals having one or more frequencies above 100 kHz, etc.) at a first location (e.g. exclusive to one or more predetermined ears, etc.) and to produce (e.g. including at least in part demodulation via signal frequency demodulation portions, etc.) a second set of one or more second acoustic audio signals (e.g. including one or more low amplitude acoustic audio signals, etc.) from of a second set of said two or more acoustic ultrasonic signals (e.g. via one or more acoustic ultrasonic signals including signals having one or more frequencies above 180 kHz, etc.) the at a second location (e.g. within a distance from a transmitter to a receiver, etc. e.g. including one or more ultrasonic transducer arrangements, etc. e.g. etc. e.g. etc.) including being spaced less than three feet (e.g. where spacing is based upon use of the portable device as a tablet computer, etc.).

In one or more implementations, as shown in FIG. 86, operation o12 includes an operation o1256 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a tablet portable electronic device. Origination of an illustratively derived projecting emitter arrangements component group can be accomplished through skilled in the art design choice selection of one or more of the above depicted components from one or more of the above depicted subsystems shown in FIG. 25. Components from the projecting emitter arrangements component group can be used in implementing execution of the one or more projecting emitter arrangements instructions i1256 of FIG. 44, can be used in performance of the projecting emitter arrangements electrical circuitry arrangement e1256 of FIG. 37, and/or can be used in otherwise fulfillment of the operation o1256. An exemplary non-transitory signal bearing medium version of the information storage subsystem s200 is depicted in FIG. 44 as bearing the one or more projecting emitter arrangements instructions i1256 that when executed will direct performance of the operation o1256. Furthermore, the projecting emitter arrangements electrical circuitry arrangement ("elec circ arrange") e1256, when activated, will perform the operation o1256. Also, the projecting emitter arrangements module m1256, when executed and/or activated, will direct performance of and/or perform the operation o1256. For instance, in one or more exemplary implementations, the one or more projecting emitter arrangements instructions i1256, when executed, direct performance of the operation o1256 in the illustrative depiction as follows, and/or the projecting emitter arrangements electrical circuitry arrangement e1256, when activated, performs the operation o1256 in the illustrative depiction as follows, and/or the projecting emitter arrangements module m1256, when executed and/or activated, directs performance of and/or performs the operation o1256 in the illustrative depiction as follows, and/or the operation o1256 is otherwise carried out in the illustrative depiction as follows: electronically projecting (e.g. by one or more membrane speaker portions, etc.) said two or more acoustic ultrasonic signals (e.g. via one or more acoustic ultrasonic signals including signals having one or more frequencies above 180 kHz, etc.) from said two or more portable electronic device emitters (e.g. including one or more electrostatic transducer arrangements, etc.) the of said portable electronic device (e.g. including one or more time division multiplexing components, etc.) to produce (e.g. including at least in part demodulation with signal phase demodulation portions, etc.) a first set of one or more acoustic audio signals (e.g. including one or more white noise information containing acoustic audio signals, etc.) from a first set of said two or more acoustic ultrasonic signals (e.g. via one or more acoustic ultrasonic signals including signals having one or more frequencies above 120 kHz, etc.) at a first location (e.g. exclusive to one or more desired groups of people, etc.) and to produce (e.g. including at least in part demodulation with signal phase demodulation portions, etc.) a second set of one or more second acoustic audio signals (e.g. including one or more high amplitude acoustic audio signals, etc.) from of a second set of said two or more acoustic ultrasonic signals (e.g. via one or more acoustic ultrasonic signals including signals having one or more frequencies above 200 kHz, etc.) at a second location (e.g. within a distance from a first seat back to a second seat back, etc. e.g. including one or more electrostatic transducer arrangements, etc. e.g. etc. e.g. etc.) as a tablet portable electronic device (e.g. where a tablet is used as a laptop replacement, etc.).

In one or more implementations, as shown in FIG. 86, operation o12 includes an operation o1257 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a handheld mobile portable electronic device. Origination of an illustratively derived projecting handheld mobile component group can be accomplished through skilled in the art design choice selection of one or more of the above depicted components from one or more of the above depicted subsystems shown in FIG. 25. Components from the projecting handheld mobile component group can be used in implementing execution of the one or more projecting handheld mobile instructions i1257 of FIG. 44, can be used in performance of the projecting handheld mobile electrical circuitry arrangement e1257 of FIG. 37, and/or can be used in otherwise fulfillment of the operation o1257. An exemplary non-transitory signal bearing medium version of the information storage subsystem s200 is depicted in FIG. 44 as bearing the one or more projecting handheld mobile instructions i1257 that when executed will direct performance of the operation o1257. Furthermore, the projecting handheld mobile electrical circuitry arrangement ("elec circ arrange") e1257, when activated, will perform the operation o1257. Also, the projecting handheld mobile module m1257, when executed and/or activated, will direct performance of and/or perform the operation o1257. For instance, in one or more exemplary implementations, the one or more projecting handheld mobile instructions i1257, when executed, direct performance of the operation o1257 in the illustrative depiction as follows, and/or the projecting handheld mobile electrical circuitry arrangement e1257, when activated, performs the operation o1257 in the illustrative depiction as follows, and/or the projecting handheld mobile module m1257, when executed and/or activated, directs performance of and/or performs the operation o1257 in the illustrative depiction as follows, and/or the operation o1257 is otherwise carried out in the illustrative depiction as follows: electronically projecting (e.g. from one or more ultrasonic transducer portions, etc.) said two or more acoustic ultrasonic signals (e.g. via one or more acoustic ultrasonic signals including signals having one or more frequencies above 200 kHz, etc.) from said two or more portable electronic device emitters (e.g. including one or more piezoelectric transducer arrangements, etc.) the of said portable electronic device (e.g. including one or more clamshell phone components, etc.) to produce (e.g. including at least in part demodulation using signal rectification, etc.) a first set of one or more acoustic audio signals (e.g. including varying pitch information containing acoustic audio signals, etc.) from a first set of said two or more acoustic ultrasonic signals (e.g. via one or more acoustic ultrasonic signals including signals having one or more frequencies above 140 kHz, etc.) at a first location (e.g. exclusive to one or more chosen audio receivers, etc.) and to produce (e.g. including at least in part demodulation using signal rectification, etc.) a second set of one or more second acoustic audio signals (e.g. including one or more high frequency acoustic audio signals etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. within a distance from a seat back to a tray table, etc. e.g. including one or more piezoelectric transducer arrangements, etc. e.g. etc. e.g. etc.) as a handheld mobile portable electronic device (e.g. where a mobile device is used as a smart phone and tablet combination, etc.).

In one or more implementations, as shown in FIG. 87, operation o12 includes an operation o1258 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a cell phone portable electronic device. Origination of an illustratively derived projecting cell phone component group can be accomplished through skilled in the art design choice selection of one or more of the above depicted components from one or more of the above depicted subsystems shown in FIG. 25. Components from the projecting cell phone component group can be used in implementing execution of the one or more projecting cell phone instructions i1258 of FIG. 44, can be used in performance of the projecting cell phone electrical circuitry arrangement e1258 of FIG. 37, and/or can be used in otherwise fulfillment of the operation o1258. An exemplary non-transitory signal bearing medium version of the information storage subsystem s200 is depicted in FIG. 44 as bearing the one or more projecting cell phone instructions i1258 that when executed will direct performance of the operation o1258. Furthermore, the projecting cell phone electrical circuitry arrangement ("elec circ arrange") e1258, when activated, will perform the operation o1258. Also, the projecting cell phone module m1258, when executed and/or activated, will direct performance of and/or perform the operation o1258. For instance, in one or more exemplary implementations, the one or more projecting cell phone instructions i1258, when executed, direct performance of the operation o1258 in the illustrative depiction as follows, and/or the projecting cell phone electrical circuitry arrangement e1258, when activated, performs the operation o1258 in the illustrative depiction as follows, and/or the projecting cell phone module m1258, when executed and/or activated, directs performance of and/or performs the operation o1258 in the illustrative depiction as follows, and/or the operation o1258 is otherwise carried out in the illustrative depiction as follows: electronically projecting (e.g. using one or more electrostatic transducer portions, etc.) said two or more acoustic ultrasonic signals (e.g. via multiple acoustic ultrasonic signals configured to be demodulated through mutual interference therewith to at least in part result in one or more acoustic audio signals, etc.) from said two or more portable electronic device emitters (e.g. including one or more electrostrictive transducer arrangements, etc.) the of said portable electronic device (e.g. including one or more media player components, etc.) to produce (e.g. including at least in part demodulation by signal filtering, etc.) a first set of one or more acoustic audio signals (e.g. including one or more note sequence information containing acoustic audio signals, etc.) from a first set of said two or more acoustic ultrasonic signals (e.g. via one or more acoustic ultrasonic signals including signals having one or more frequencies above 160 kHz, etc.) at a first location (e.g. exclusive to one or more selected microphones, etc.) and to produce (e.g. including at least in part demodulation by signal filtering, etc.) a second set of one or more second acoustic audio signals (e.g. including one or more lecture information containing acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. within a distance of an aisle way, etc. e.g. including one or more electrostrictive transducer arrangements, etc. e.g. etc. e.g. etc.) as a cell phone portable electronic device (e.g. where a cell phone includes smart phone features, etc.).

In one or more implementations, as shown in FIG. 87, operation o12 includes an operation o1259 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a laptop computer portable electronic device. Origination of an illustratively derived projecting laptop computer component group can be accomplished through skilled in the art design choice selection of one or more of the above depicted components from one or more of the above depicted subsystems shown in FIG. 25. Components from the projecting laptop computer component group can be used in implementing execution of the one or more projecting laptop computer instructions i1259 of FIG. 44, can be used in performance of the projecting laptop computer electrical circuitry arrangement e1259 of FIG. 37, and/or can be used in otherwise fulfillment of the operation o1259. An exemplary non-transitory signal bearing medium version of the information storage subsystem s200 is depicted in FIG. 44 as bearing the one or more projecting laptop computer instructions i1259 that when executed will direct performance of the operation o1259. Furthermore, the projecting laptop computer electrical circuitry arrangement ("elec circ arrange") e1259, when activated, will perform the operation o1259. Also, the projecting laptop computer module m1259, when executed and/or activated, will direct performance of and/or perform the operation o1259. For instance, in one or more exemplary implementations, the one or more projecting laptop computer instructions i1259, when executed, direct performance of the operation o1259 in the illustrative depiction as follows, and/or the projecting laptop computer electrical circuitry arrangement e1259, when activated, performs the operation o1259 in the illustrative depiction as follows, and/or the projecting laptop computer module m1259, when executed and/or activated, directs performance of and/or performs the operation o1259 in the illustrative depiction as follows, and/or the operation o1259 is otherwise carried out in the illustrative depiction as follows: electronically projecting (e.g. through one or more piezoelectric transducer portions, etc.) said two or more acoustic ultrasonic signals (e.g. via one or more acoustic ultrasonic signals configured to be demodulated through nonlinear atmospheric interaction to at least in part generate one or more acoustic audio signals, etc.) from said two or more portable electronic device emitters (e.g. including one or more electro-thermo-mechanical film transducer arrangements, etc.) the of said portable electronic device (e.g. including one or more 3G mobile components, etc.) to produce (e.g. including at least in part demodulation through signal intelligence recovery, etc.) a first set of one or more acoustic audio signals (e.g. including one or more two-way conversation information containing acoustic audio signals, etc.) from a first set of said two or more acoustic ultrasonic signals (e.g. via one or more acoustic ultrasonic signals including signals having one or more frequencies above 180 kHz, etc.) at a first location (e.g. exclusive to one or more designated surfaces, etc.) and to produce (e.g. including at least in part demodulation through signal intelligence recovery, etc.) a second set of one or more second acoustic audio signals (e.g. including one or more foreign language speech information containing acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. within a distance from a desk to a chair, etc. e.g. including one or more electro-thermo-mechanical film transducer arrangements, etc. e.g. etc. e.g. etc.) as a laptop computer portable electronic device (e.g. where a laptop is used as a business desktop computer replacement, etc.).

In one or more implementations, as shown in FIG. 87, operation o12 includes an operation o1260 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a personal data assistant (PDA) portable electronic device. Origination of an illustratively derived projecting PDA component group can be accomplished through skilled in the art design choice selection of one or more of the above depicted components from one or more of the above depicted subsystems shown in FIG. 25. Components from the projecting PDA component group can be used in implementing execution of the one or more projecting PDA instructions i1260 of FIG. 45, can be used in performance of the projecting PDA electrical circuitry arrangement e1260 of FIG. 38, and/or can be used in otherwise fulfillment of the operation o1260. An exemplary non-transitory signal bearing medium version of the information storage subsystem s200 is depicted in FIG. 45 as bearing the one or more projecting PDA instructions i1260 that when executed will direct performance of the operation o1260. Furthermore, the projecting PDA electrical circuitry arrangement ("elec circ arrange") e1260, when activated, will perform the operation o1260. Also, the projecting PDA module m1260, when executed and/or activated, will direct performance of and/or perform the operation o1260. For instance, in one or more exemplary implementations, the one or more projecting PDA instructions i1260, when executed, direct performance of the operation o1260 in the illustrative depiction as follows, and/or the projecting PDA electrical circuitry arrangement e1260, when activated, performs the operation o1260 in the illustrative depiction as follows, and/or the projecting PDA module m1260, when executed and/or activated, directs performance of and/or performs the operation o1260 in the illustrative depiction as follows, and/or the operation o1260 is otherwise carried out in the illustrative depiction as follows: electronically projecting (e.g. via one or more electrostrictive transducer portions, etc.) said two or more acoustic ultrasonic signals (e.g. via one or more acoustic ultrasonic signals configured to be demodulated through nonlinear human tissue interaction to at least in part produce one or more acoustic audio signals, etc.) from said two or more portable electronic device emitters (e.g. including one or more polyvinylidene fluoride film transducer arrangements, etc.) the of said portable electronic device (e.g. including one or more cellular components, etc.) to produce (e.g. including demodulation via mutual interference therewith multiple acoustic ultrasonic signals configured to be demodulated through to at least in part result in one or more acoustic audio signals, etc.) a first set of one or more acoustic audio signals (e.g. including one or more confidential information containing acoustic audio signals, etc.) from a first set of said two or more acoustic ultrasonic signals (e.g. via one or more acoustic ultrasonic signals including signals having one or more frequencies above 200 kH, etc.) at a first location (e.g. exclusive to one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more classical music selection information containing acoustic audio signals, etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. within a distance from a dashboard to a headrest etc. e.g. including one or more polyvinylidene fluoride film transducer arrangements, etc. e.g. etc. e.g. etc.) as a personal data assistant (PDA) portable electronic device (e.g. where a personal data assistant includes smart phone and tablet features, etc.).

In one or more implementations, as shown in FIG. 88, operation o12 includes an operation o1261 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a smart phone portable electronic device. Origination of an illustratively derived projecting smart phone component group can be accomplished through skilled in the art design choice selection of one or more of the above depicted components from one or more of the above depicted subsystems shown in FIG. 25. Components from the projecting smart phone component group can be used in implementing execution of the one or more projecting smart phone instructions i1261 of FIG. 45, can be used in performance of the projecting smart phone electrical circuitry arrangement e1261 of FIG. 38, and/or can be used in otherwise fulfillment of the operation o1261. An exemplary non-transitory signal bearing medium version of the information storage subsystem s200 is depicted in FIG. 45 as bearing the one or more projecting smart phone instructions i1261 that when executed will direct performance of the operation o1261. Furthermore, the projecting smart phone electrical circuitry arrangement ("elec circ arrange") e1261, when activated, will perform the operation o1261. Also, the projecting smart phone module m1261, when executed and/or activated, will direct performance of and/or perform the operation o1261. For instance, in one or more exemplary implementations, the one or more projecting smart phone instructions i1261, when executed, direct performance of the operation o1261 in the illustrative depiction as follows, and/or the projecting smart phone electrical circuitry arrangement e1261, when activated, performs the operation o1261 in the illustrative depiction as follows, and/or the projecting smart phone module m1261, when executed and/or activated, directs performance of and/or performs the operation o1261 in the illustrative depiction as follows, and/or the operation o1261 is otherwise carried out in the illustrative depiction as follows: electronically projecting (e.g. etc.) said two or more acoustic ultrasonic signals (e.g. via one or more acoustic ultrasonic signals configured to be demodulated through nonlinear polymeric interaction to at least in part result in one or more acoustic audio signals, etc.) from said two or more portable electronic device emitters (e.g. including one or more deposition transducer arrangements, etc.) the of said portable electronic device (e.g. including one or more 4G components, etc.) to produce (e.g. including demodulation using one or more acoustic ultrasonic signals configured to be demodulated through nonlinear atmospheric interaction to at least in part generate one or more acoustic audio signals, etc.) a first set of one or more acoustic audio signals (e.g. including one or more eavesdropping information containing acoustic audio signals, etc.) from a first set of said two or more acoustic ultrasonic signals (e.g. including containing beginning portions, etc.) at a first location (e.g. exclusive to one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more instructional lesson material information containing acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. less than confines of a room, etc. e.g. including one or more deposition transducer arrangements, etc. e.g. etc. e.g. etc.) as a smart phone portable electronic device (e.g. where a smart phone includes tablet features, etc.).

In one or more implementations, as shown in FIG. 88, operation o12 includes an operation o1262 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a security personnel device portable electronic device. Origination of an illustratively derived projecting security personnel component group can be accomplished through skilled in the art design choice selection of one or more of the above depicted components from one or more of the above depicted subsystems shown in FIG. 25. Components from the projecting security personnel component group can be used in implementing execution of the one or more projecting security personnel instructions i1262 of FIG. 45, can be used in performance of the projecting security personnel electrical circuitry arrangement e1262 of FIG. 38, and/or can be used in otherwise fulfillment of the operation o1262. An exemplary non-transitory signal bearing medium version of the information storage subsystem s200 is depicted in FIG. 45 as bearing the one or more projecting security personnel instructions i1262 that when executed will direct performance of the operation o1262. Furthermore, the projecting security personnel electrical circuitry arrangement ("elec circ arrange") e1262, when activated, will perform the operation o1262. Also, the projecting security personnel module m1262, when executed and/or activated, will direct performance of and/or perform the operation o1262. For instance, in one or more exemplary implementations, the one or more projecting security personnel instructions i1262, when executed, direct performance of the operation o1262 in the illustrative depiction as follows, and/or the projecting security personnel electrical circuitry arrangement e1262, when activated, performs the operation o1262 in the illustrative depiction as follows, and/or the projecting security personnel module m1262, when executed and/or activated, directs performance of and/or performs the operation o1262 in the illustrative depiction as follows, and/or the operation o1262 is otherwise carried out in the illustrative depiction as follows: electronically projecting (e.g. from one or more polyvinylidene fluoride film transducer portions, etc.) said two or more acoustic ultrasonic signals (e.g. via one or more acoustic ultrasonic signals configured to be demodulated through nonlinear apparel interaction to at least in part produce one or more acoustic audio signals, etc.) from said two or more portable electronic device emitters (e.g. including one or more emitter array arrangements, etc.) the of said portable electronic device (e.g. including one or more WiFi components, etc.) to produce (e.g. including demodulation with one or more acoustic ultrasonic signals configured to be demodulated through nonlinear human tissue interaction to at least in part produce one or more acoustic audio signals, etc.) a first set of one or more acoustic audio signals (e.g. including one or more pre-recorded information containing acoustic audio signals, etc.) from a first set of said two or more acoustic ultrasonic signals (e.g. including containing middle portions, etc.) at a first location (e.g. exclusive to one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more warning tone information containing acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. less than an arm's length, etc. e.g. including one or more emitter array arrangements, etc. e.g. etc. e.g. etc.) as a security personnel device portable electronic device (e.g. including security personnel walkie-talkies, etc.).

In one or more implementations, as shown in FIG. 88, operation o12 includes an operation o1263 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a sports equipment portable electronic device. Origination of an illustratively derived projecting sports equipment component group can be accomplished through skilled in the art design choice selection of one or more of the above depicted components from one or more of the above depicted subsystems shown in FIG. 25. Components from the projecting sports equipment component group can be used in implementing execution of the one or more projecting sports equipment instructions i1263 of FIG. 45, can be used in performance of the projecting sports equipment electrical circuitry arrangement e1263 of FIG. 38, and/or can be used in otherwise fulfillment of the operation o1263. An exemplary non-transitory signal bearing medium version of the information storage subsystem s200 is depicted in FIG. 45 as bearing the one or more projecting sports equipment instructions i1263 that when executed will direct performance of the operation o1263. Furthermore, the projecting sports equipment electrical circuitry arrangement ("elec circ arrange") e1263, when activated, will perform the operation o1263. Also, the projecting sports equipment module m1263, when executed and/or activated, will direct performance of and/or perform the operation o1263. For instance, in one or more exemplary implementations, the one or more projecting sports equipment instructions i1263, when executed, direct performance of the operation o1263 in the illustrative depiction as follows, and/or the projecting sports equipment electrical circuitry arrangement e1263, when activated, performs the operation o1263 in the illustrative depiction as follows, and/or the projecting sports equipment module m1263, when executed and/or activated, directs performance of and/or performs the operation o1263 in the illustrative depiction as follows, and/or the operation o1263 is otherwise carried out in the illustrative depiction as follows: electronically projecting (e.g. using one or more deposition transducer portions, etc.) said two or more acoustic ultrasonic signals (e.g. via one or more acoustic ultrasonic signals configured to be demodulated through nonlinear interaction with one or more solids to at least in part generate one or more acoustic audio signals, etc.) from said two or more portable electronic device emitters (e.g. including one or more dispersed transducer arrangements, etc.) the of said portable electronic device (e.g. including one or more infrared components, etc.) to produce (e.g. including demodulation by one or more acoustic ultrasonic signals configured to be demodulated through nonlinear polymeric interaction to at least in part result in one or more acoustic audio signals, etc.) a first set of one or more acoustic audio signals (e.g. including one or more processor generated information containing acoustic audio signals, etc.) from a first set of said two or more acoustic ultrasonic signals (e.g. including containing end portions, etc.) at a first location (e.g. exclusive to one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more white noise information containing acoustic audio signals, etc.) from of a second set of said two or more acoustic ultrasonic signals (e.g. via one or more acoustic ultrasonic signals including signals having one or more frequencies above 60 kHz, etc.) at a second location (e.g. less than a three-foot radius, etc. e.g. including one or more dispersed transducer arrangements, etc. e.g. etc. e.g. etc.) as a sports equipment portable electronic device (e.g. incorporated into a sports helmet such as for football or baseball, etc.).

In one or more implementations, as shown in FIG. 89, operation o12 includes an operation o1264 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a wearable media portable electronic device. Origination of an illustratively derived projecting wearable media component group can be accomplished through skilled in the art design choice selection of one or more of the above depicted components from one or more of the above depicted subsystems shown in FIG. 25. Components from the projecting wearable media component group can be used in implementing execution of the one or more projecting wearable media instructions i1264 of FIG. 45, can be used in performance of the projecting wearable media electrical circuitry arrangement e1264 of FIG. 38, and/or can be used in otherwise fulfillment of the operation o1264. An exemplary non-transitory signal bearing medium version of the information storage subsystem s200 is depicted in FIG. 45 as bearing the one or more projecting wearable media instructions i1264 that when executed will direct performance of the operation o1264. Furthermore, the projecting wearable media electrical circuitry arrangement ("elec circ arrange") e1264, when activated, will perform the operation o1264. Also, the projecting wearable media module m1264, when executed and/or activated, will direct performance of and/or perform the operation o1264. For instance, in one or more exemplary implementations, the one or more projecting wearable media instructions i1264, when executed, direct performance of the operation o1264 in the illustrative depiction as follows, and/or the projecting wearable media electrical circuitry arrangement e1264, when activated, performs the operation o1264 in the illustrative depiction as follows, and/or the projecting wearable media module m1264, when executed and/or activated, directs performance of and/or performs the operation o1264 in the illustrative depiction as follows, and/or the operation o1264 is otherwise carried out in the illustrative depiction as follows: electronically projecting (e.g. through one or more emitter array portions, etc.) said two or more acoustic ultrasonic signals (e.g. via one or more acoustic ultrasonic signals including signals having one or more frequencies above 60 kHz, etc.) from said two or more portable electronic device emitters (e.g. including one or more monitor embedded transducer arrangements, etc.) the of said portable electronic device (e.g. including one or more personal digital assistant components, etc.) to produce (e.g. including demodulation through one or more acoustic ultrasonic signals configured to be demodulated through nonlinear apparel interaction to at least in part produce one or more acoustic audio signals, etc.) a first set of one or more acoustic audio signals (e.g. including one or more internet based information containing acoustic audio signals, etc.) from a first set of said two or more acoustic ultrasonic signals (e.g. including containing some portions, etc.) at a first location (e.g. exclusive to one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including varying pitch information containing acoustic audio signals, etc.) from of a second set of said two or more acoustic ultrasonic signals (e.g. via one or more acoustic ultrasonic signals including signals having one or more frequencies above 80 kHz, etc.) at a second location (e.g. less than a distance from a portable device to a person, etc. e.g. including one or more monitor embedded transducer arrangements, etc. e.g. etc. e.g. etc.) as a wearable media portable electronic device (e.g. where a smart coat has tablet features, etc.).

In one or more implementations, as shown in FIG. 89, operation o12 includes an operation o1265 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a wristwatch portable electronic device. Origination of an illustratively derived projecting wristwatch component group can be accomplished through skilled in the art design choice selection of one or more of the above depicted components from one or more of the above depicted subsystems shown in FIG. 25. Components from the projecting wristwatch component group can be used in implementing execution of the one or more projecting wristwatch instructions i1265 of FIG. 45, can be used in performance of the projecting wristwatch electrical circuitry arrangement e1265 of FIG. 38, and/or can be used in otherwise fulfillment of the operation o1265. An exemplary non-transitory signal bearing medium version of the information storage subsystem s200 is depicted in FIG. 45 as bearing the one or more projecting wristwatch instructions i1265 that when executed will direct performance of the operation o1265. Furthermore, the projecting wristwatch electrical circuitry arrangement ("elec circ arrange") e1265, when activated, will perform the operation o1265. Also, the projecting wristwatch module m1265, when executed and/or activated, will direct performance of and/or perform the operation o1265. For instance, in one or more exemplary implementations, the one or more projecting wristwatch instructions i1265, when executed, direct performance of the operation o1265 in the illustrative depiction as follows, and/or the projecting wristwatch electrical circuitry arrangement e1265, when activated, performs the operation o1265 in the illustrative depiction as follows, and/or the projecting wristwatch module m1265, when executed and/or activated, directs performance of and/or performs the operation o1265 in the illustrative depiction as follows, and/or the operation o1265 is otherwise carried out in the illustrative depiction as follows: electronically projecting (e.g. via one or more dispersed transducer portions, etc.) said two or more acoustic ultrasonic signals (e.g. via one or more acoustic ultrasonic signals including signals having one or more frequencies above 80 kHz, etc.) from said two or more portable electronic device emitters (e.g. including one or more keyboard embedded transducer arrangements etc.) the of said portable electronic device (e.g. including one or more smart phone components, etc.) to produce (e.g. including demodulation by one or more acoustic ultrasonic signals configured to be demodulated through nonlinear interaction with one or more solids to at least in part generate one or more acoustic audio signals, etc.) a first set of one or more acoustic audio signals (e.g. including one or more digital audio information containing acoustic audio signals, etc.) from a first set of said two or more acoustic ultrasonic signals (e.g. including containing all portions, etc.) at a first location (e.g. exclusive to one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including one or more note sequence information containing acoustic audio signals, etc.) from of a second set of said two or more acoustic ultrasonic signals (e.g. via one or more acoustic ultrasonic signals including signals having one or more frequencies above 100 kHz, etc.) at a second location (e.g. less than a distance from a display screen to a person, etc. e.g. including one or more keyboard embedded transducer arrangements, etc. e.g. etc. e.g. etc.) as a wristwatch portable electronic device (e.g. where a smart watch has tablet features, etc.).

In one or more implementations, as shown in FIG. 89, operation o12 includes an operation o1266 for electronically projecting said two or more acoustic ultrasonic signals from said two or more portable electronic device emitters the of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location as a two-way radio portable electronic device. Origination of an illustratively derived projecting two-way radio component group can be accomplished through skilled in the art design choice selection of one or more of the above depicted components from one or more of the above depicted subsystems shown in FIG. 25. Components from the projecting two-way radio component group can be used in implementing execution of the one or more projecting two-way radio instructions i1266 of FIG. 45, can be used in performance of the projecting two-way radio electrical circuitry arrangement e1266 of FIG. 38, and/or can be used in otherwise fulfillment of the operation o1266. An exemplary non-transitory signal bearing medium version of the information storage subsystem s200 is depicted in FIG. 45 as bearing the one or more projecting two-way radio instructions i1266 that when executed will direct performance of the operation o1266. Furthermore, the projecting two-way radio electrical circuitry arrangement ("elec circ arrange") e1266, when activated, will perform the operation o1266. Also, the projecting two-way radio module m1266, when executed and/or activated, will direct performance of and/or perform the operation o1266. For instance, in one or more exemplary implementations, the one or more projecting two-way radio instructions i1266, when executed, direct performance of the operation o1266 in the illustrative depiction as follows, and/or the projecting two-way radio electrical circuitry arrangement e1266, when activated, performs the operation o1266 in the illustrative depiction as follows, and/or the projecting two-way radio module m1266, when executed and/or activated, directs performance of and/or performs the operation o1266 in the illustrative depiction as follows, and/or the operation o1266 is otherwise carried out in the illustrative depiction as follows: electronically projecting (e.g. by one or more monitor embedded transducer portions, etc.) said two or more acoustic ultrasonic signals (e.g. via one or more acoustic ultrasonic signals including signals having one or more frequencies above 100 kHz, etc.) from said two or more portable electronic device emitters (e.g. including one or more device body embedded transducer arrangements, etc.) the of said portable electronic device (e.g. including one or more cell phone components, etc.) to produce (e.g. including at least in part demodulation by signal down conversion, etc.) a first set of one or more acoustic audio signals (e.g. including one or more analog audio information containing acoustic audio signals, etc.) from a first set of said two or more acoustic ultrasonic signals (e.g. including containing measure portions, etc.) at a first location (e.g. inclusive to one or more designated ears, etc.) and to produce (e.g. including at least in part demodulation by signal down conversion, etc.) a second set of one or more second acoustic audio signals (e.g. including one or more two-way conversation information containing acoustic audio signals, etc.) from of a second set of said two or more acoustic ultrasonic signals (e.g. via one or more acoustic ultrasonic signals including signals having one or more frequencies above 120 kHz, etc.) at a second location (e.g. less than a distance from a portable device to an ear, etc. e.g. including one or more device body embedded transducer arrangements, etc. e.g. etc. e.g. etc.) as a two-way radio portable electronic device (e.g. where a walkie-talkie has smart phone features, etc.).

In one or more implementations, as shown in FIG. 90, operation o12 includes an operation o1267 for electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including determination of targeting area based in part on one or more frequencies of said one or more ultrasonic acoustic signals. Origination of an illustratively derived projecting targeting area component group can be accomplished through skilled in the art design choice selection of one or more of the above depicted components from one or more of the above depicted subsystems shown in FIG. 25. Components from the projecting targeting area component group can be used in implementing execution of the one or more projecting targeting area instructions i1267 of FIG. 45, can be used in performance of the projecting targeting area electrical circuitry arrangement e1267 of FIG. 38, and/or can be used in otherwise fulfillment of the operation o1267. An exemplary non-transitory signal bearing medium version of the information storage subsystem s200 is depicted in FIG. 45 as bearing the one or more projecting targeting area instructions i1267 that when executed will direct performance of the operation o1267. Furthermore, the projecting targeting area electrical circuitry arrangement ("elec circ arrange") e1267, when activated, will perform the operation o1267. Also, the projecting targeting area module m1267, when executed and/or activated, will direct performance of and/or perform the operation o1267. For instance, in one or more exemplary implementations, the one or more projecting targeting area instructions i1267, when executed, direct performance of the operation o1267 in the illustrative depiction as follows, and/or the projecting targeting area electrical circuitry arrangement e1267, when activated, performs the operation o1267 in the illustrative depiction as follows, and/or the projecting targeting area module m1267, when executed and/or activated, directs performance of and/or performs the operation o1267 in the illustrative depiction as follows, and/or the operation o1267 is otherwise carried out in the illustrative depiction as follows: electronically projecting (e.g. from one or more keyboard embedded transducer portions, etc.) said two or more acoustic ultrasonic signals (e.g. via one or more acoustic ultrasonic signals including signals having one or more frequencies above 120 kHz, etc.) from said two or more portable electronic device emitters (e.g. including one or more device perimeter embedded transducer arrangements, etc.) of said portable electronic device (e.g. including one or more laptop components, etc.) to produce (e.g. including at least in part demodulation through signal amplitude demodulation, etc.) a first set of one or more acoustic audio signals (e.g. including one or more high frequency audio information containing acoustic audio signals, etc.) the from a first set of said two or more acoustic ultrasonic signals (e.g. including containing phrase portions, etc.) at a first location (e.g. inclusive to one or more identified persons, etc.) and to produce (e.g. including at least in part demodulation through signal amplitude demodulation, etc.) a second set of one or more second acoustic audio signals (e.g. including one or more confidential information containing acoustic audio signals, etc.) from of a second set of said two or more acoustic ultrasonic signals (e.g. via one or more acoustic ultrasonic signals including signals having one or more frequencies above 140 kHz, etc.) at a second location (e.g. less than a distance from a display screen to an ear, etc. e.g. including one or more device perimeter embedded transducer arrangements, etc. e.g. etc. e.g. etc.) including determination of targeting area based in part on one or more frequencies of said one or more ultrasonic acoustic signals (e.g. where frequency determines wavelength to influence aperture dimensions and consequential targeting size, etc.).

In one or more implementations, as shown in FIG. 90, operation o12 includes an operation o1268 for electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including transducer placement based in part on one or more frequencies to be used for said one or more acoustic ultrasonic signals. Origination of an illustratively derived projecting transducer placement component group can be accomplished through skilled in the art design choice selection of one or more of the above depicted components from one or more of the above depicted subsystems shown in FIG. 25. Components from the projecting transducer placement component group can be used in implementing execution of the one or more projecting transducer placement instructions i1268 of FIG. 45, can be used in performance of the projecting transducer placement electrical circuitry arrangement e1268 of FIG. 38, and/or can be used in otherwise fulfillment of the operation o1268. An exemplary non-transitory signal bearing medium version of the information storage subsystem s200 is depicted in FIG. 45 as bearing the one or more projecting transducer placement instructions i1268 that when executed will direct performance of the operation o1268. Furthermore, the projecting transducer placement electrical circuitry arrangement ("elec circ arrange") e1268, when activated, will perform the operation o1268. Also, the projecting transducer placement module m1268, when executed and/or activated, will direct performance of and/or perform the operation o1268. For instance, in one or more exemplary implementations, the one or more projecting transducer placement instructions i1268, when executed, direct performance of the operation o1268 in the illustrative depiction as follows, and/or the projecting transducer placement electrical circuitry arrangement e1268, when activated, performs the operation o1268 in the illustrative depiction as follows, and/or the projecting transducer placement module m1268, when executed and/or activated, directs performance of and/or performs the operation o1268 in the illustrative depiction as follows, and/or the operation o1268 is otherwise carried out in the illustrative depiction as follows: electronically projecting (e.g. using one or more device body embedded transducer portions, etc.) said two or more acoustic ultrasonic signals (e.g. via one or more acoustic ultrasonic signals including signals having one or more frequencies above 140 kHz, etc.) from said two or more portable electronic device emitters (e.g. including one or more multiple emitter array arrangements, etc.) of said portable electronic device (e.g. including one or more tablet computer components, etc.) to produce (e.g. including at least in part demodulation via signal frequency demodulation portions, etc.) a first set of one or more acoustic audio signals (e.g. including one or more low frequency audio information containing acoustic audio signals, etc.) the from a first set of said two or more acoustic ultrasonic signals (e.g. including containing chapter portions, etc.) at a first location (e.g. inclusive to one or more predetermined ears, etc.) and to produce (e.g. including at least in part demodulation via signal frequency demodulation portions, etc.) a second set of one or more second acoustic audio signals (e.g. including one or more eavesdropping information containing acoustic audio signals, etc.) from of a second set of said two or more acoustic ultrasonic signals (e.g. via one or more acoustic ultrasonic signals including signals having one or more frequencies above 160 kHz, etc.) at a second location (e.g. less than a distance from a portable device to a center of a group, etc. e.g. including one or more multiple emitter array arrangements, etc. e.g. etc. e.g. etc.) including transducer placement based in part on one or more frequencies to be used for said one or more acoustic ultrasonic signals (e.g. where transducer size allows for placement along bezels of the portable device, etc.).

In one or more implementations, as shown in FIG. 90, operation o12 includes an operation o1269 for electronically projecting said two or more acoustic ultrasonic signals from said two or more portable electronic device emitters of said portable electronic device to produce a first set of one or more acoustic audio signals the from a first set of said two or more acoustic ultrasonic signals at a first location and to produce a second set of one or more second acoustic audio signals from of a second set of said two or more acoustic ultrasonic signals at a second location including amplitude to be used for said ultrasonic acoustic signals based on size of desired target area. Origination of an illustratively derived projecting amplitude size component group can be accomplished through skilled in the art design choice selection of one or more of the above depicted components from one or more of the above depicted subsystems shown in FIG. 25. Components from the projecting amplitude size component group can be used in implementing execution of the one or more projecting amplitude size instructions i1269 of FIG. 45, can be used in performance of the projecting amplitude size electrical circuitry arrangement e1269 of FIG. 38, and/or can be used in otherwise fulfillment of the operation o1269. An exemplary non-transitory signal bearing medium version of the information storage subsystem s200 is depicted in FIG. 45 as bearing the one or more projecting amplitude size instructions i1269 that when executed will direct performance of the operation o1269. Furthermore, the projecting amplitude size electrical circuitry arrangement ("elec circ arrange") e1269, when activated, will perform the operation o1269. Also, the projecting amplitude size module m1269, when executed and/or activated, will direct performance of and/or perform the operation o1269. For instance, in one or more exemplary implementations, the one or more projecting amplitude size instructions i1269, when executed, direct performance of the operation o1269 in the illustrative depiction as follows, and/or the projecting amplitude size electrical circuitry arrangement e1269, when activated, performs the operation o1269 in the illustrative depiction as follows, and/or the projecting amplitude size module m1269, when executed and/or activated, directs performance of and/or performs the operation o1269 in the illustrative depiction as follows, and/or the operation o1269 is otherwise carried out in the illustrative depiction as follows: electronically projecting (e.g. through one or more device perimeter embedded transducer portions, etc.) said two or more acoustic ultrasonic signals (e.g. via one or more acoustic ultrasonic signals including signals having one or more frequencies above 160 kHz, etc.) from said two or more portable electronic device emitters (e.g. including one or more perimeter arrays, etc.) of said portable electronic device (e.g. including one or more mp3 player components, etc.) to produce (e.g. including at least in part demodulation with signal phase demodulation portions, etc.) a first set of one or more acoustic audio signals (e.g. including lecture formatted information, etc.) the from a first set of said two or more acoustic ultrasonic signals (e.g. including containing sectional portions, etc.) at a first location (e.g. inclusive to one or more desired groups of people, etc.) and to produce (e.g. including at least in part demodulation with signal phase demodulation portions, etc.) a second set of one or more second acoustic audio signals (e.g. including one or more pre-recorded information containing acoustic audio signals, etc.) from of a second set of said two or more acoustic ultrasonic signals (e.g. via one or more acoustic ultrasonic signals including signals having one or more frequencies above 180 kHz, etc.) at a second location (e.g. less than a distance from a display screen to a center of a group, etc. e.g. including one or more perimeter arrays, etc. e.g. etc. e.g. etc.) including amplitude to be used for said ultrasonic acoustic signals based on size of desired target area (e.g. where target size of approximate ear size allows for low level amplitude for acoustic audio signals downconverted from acoustic ultrasonic signals, etc.).

In one or more implementations, as shown in FIG. 91, operation o12 includes an operation o1270 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially along vicinity of said portable electronic device. Origination of an illustratively derived projecting along vicinity component group can be accomplished through skilled in the art design choice selection of one or more of the above depicted components from one or more of the above depicted subsystems shown in FIG. 25. Components from the projecting along vicinity component group can be used in implementing execution of the one or more projecting along vicinity instructions i1270 of FIG. 45, can be used in performance of the projecting along vicinity electrical circuitry arrangement e1270 of FIG. 38, and/or can be used in otherwise fulfillment of the operation o1270. An exemplary non-transitory signal bearing medium version of the information storage subsystem s200 is depicted in FIG. 45 as bearing the one or more projecting along vicinity instructions i1270 that when executed will direct performance of the operation o1270. Furthermore, the projecting along vicinity electrical circuitry arrangement ("elec circ arrange") e1270, when activated, will perform the operation o1270. Also, the projecting along vicinity module m1270, when executed and/or activated, will direct performance of and/or perform the operation o1270. For instance, in one or more exemplary implementations, the one or more projecting along vicinity instructions i1270, when executed, direct performance of the operation o1270 in the illustrative depiction as follows, and/or the projecting along vicinity electrical circuitry arrangement e1270, when activated, performs the operation o1270 in the illustrative depiction as follows, and/or the projecting along vicinity module m1270, when executed and/or activated, directs performance of and/or performs the operation o1270 in the illustrative depiction as follows, and/or the operation o1270 is otherwise carried out in the illustrative depiction as follows: electronically projecting (e.g. via one or more multiple emitter array portions, etc.) said two or more acoustic ultrasonic signals (e.g. via one or more acoustic ultrasonic signals including signals having one or more frequencies above 180 kHz, etc.) the from said two or more portable electronic device emitters (e.g. including one or more polar arrays, etc.) of said portable electronic device (e.g. including one or more mobile phone components, etc.) to produce (e.g. including at least in part demodulation using signal rectification, etc.) a first set of one or more acoustic audio signals (e.g. including foreign language speech information, etc.) from a first set of said two or more acoustic ultrasonic signals (e.g. including containing whole portions, etc.) at a first location (e.g. inclusive to one or more chosen audio receivers, etc.) and to produce (e.g. including at least in part demodulation using signal rectification, etc.) a second set of one or more second acoustic audio signals (e.g. including one or more processor generated information containing acoustic audio signals, etc.) from of a second set of said two or more acoustic ultrasonic signals (e.g. via one or more acoustic ultrasonic signals including signals having one or more frequencies above 200 kHz, etc.) at a second location (e.g. less than a distance from a transmitter to a receiver, etc. e.g. including one or more polar arrays, etc. e.g. etc. e.g. etc.) including transducer placement at least partially along vicinity of said portable electronic device (e.g. including transducer placement interspaced between keyboard keys, etc.).

In one or more implementations, as shown in FIG. 91, operation o12 includes an operation o1271 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially in display screen of said portable electronic device. Origination of an illustratively derived projecting display screen component group can be accomplished through skilled in the art design choice selection of one or more of the above depicted components from one or more of the above depicted subsystems shown in FIG. 25. Components from the projecting display screen component group can be used in implementing execution of the one or more projecting display screen instructions i1271 of FIG. 45, can be used in performance of the projecting display screen electrical circuitry arrangement e1271 of FIG. 38, and/or can be used in otherwise fulfillment of the operation o1271. An exemplary non-transitory signal bearing medium version of the information storage subsystem s200 is depicted in FIG. 45 as bearing the one or more projecting display screen instructions i1271 that when executed will direct performance of the operation o1271. Furthermore, the projecting display screen electrical circuitry arrangement ("elec circ arrange") e1271, when activated, will perform the operation o1271. Also, the projecting display screen module m1271, when executed and/or activated, will direct performance of and/or perform the operation o1271. For instance, in one or more exemplary implementations, the one or more projecting display screen instructions i1271, when executed, direct performance of the operation o1271 in the illustrative depiction as follows, and/or the projecting display screen electrical circuitry arrangement e1271, when activated, performs the operation o1271 in the illustrative depiction as follows, and/or the projecting display screen module m1271, when executed and/or activated, directs performance of and/or performs the operation o1271 in the illustrative depiction as follows, and/or the operation o1271 is otherwise carried out in the illustrative depiction as follows: electronically projecting (e.g. through one or more cable interface portions, etc.) said two or more acoustic ultrasonic signals (e.g. via one or more acoustic ultrasonic signals including signals having one or more frequencies above 200 kHz, etc.) the from said two or more portable electronic device emitters (e.g. including one or more orthographic arrays, etc.) of said portable electronic device (e.g. including one or more two-way radio components, etc.) to produce (e.g. including at least in part demodulation by signal filtering, etc.) a first set of one or more acoustic audio signals (e.g. including classical music selection information, etc.) from a first set of said two or more acoustic ultrasonic signals (e.g. including containing partial portions, etc.) at a first location (e.g. inclusive to one or more selected microphones, etc.) and to produce (e.g. including at least in part demodulation by signal filtering, etc.) a second set of one or more second acoustic audio signals (e.g. including one or more internet based information containing acoustic audio signals, etc.) from of a second set of said two or more acoustic ultrasonic signals (e.g. via multiple acoustic ultrasonic signals configured to be demodulated through mutual interference therewith to at least in part result in one or more acoustic audio signals, etc.) at a second location (e.g. less than a distance from a first seat back to a second seat back, etc. e.g. including one or more orthographic arrays, etc. e.g. etc. e.g. etc.) including transducer placement at least partially in display screen of said portable electronic device (e.g. including transducer placement behind portions of thin displays, etc.).

In one or more implementations, as shown in FIG. 91, operation o12 includes an operation o1272 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement at least partially in keyboard area of said portable electronic device. Origination of an illustratively derived projecting keyboard area component group can be accomplished through skilled in the art design choice selection of one or more of the above depicted components from one or more of the above depicted subsystems shown in FIG. 25. Components from the projecting keyboard area component group can be used in implementing execution of the one or more projecting keyboard area instructions i1272 of FIG. 45, can be used in performance of the projecting keyboard area electrical circuitry arrangement e1272 of FIG. 38, and/or can be used in otherwise fulfillment of the operation o1272. An exemplary non-transitory signal bearing medium version of the information storage subsystem s200 is depicted in FIG. 45 as bearing the one or more projecting keyboard area instructions i1272 that when executed will direct performance of the operation o1272. Furthermore, the projecting keyboard area electrical circuitry arrangement ("elec circ arrange") e1272, when activated, will perform the operation o1272. Also, the projecting keyboard area module m1272, when executed and/or activated, will direct performance of and/or perform the operation o1272. For instance, in one or more exemplary implementations, the one or more projecting keyboard area instructions i1272, when executed, direct performance of the operation o1272 in the illustrative depiction as follows, and/or the projecting keyboard area electrical circuitry arrangement e1272, when activated, performs the operation o1272 in the illustrative depiction as follows, and/or the projecting keyboard area module m1272, when executed and/or activated, directs performance of and/or performs the operation o1272 in the illustrative depiction as follows, and/or the operation o1272 is otherwise carried out in the illustrative depiction as follows: electronically projecting (e.g. via one or more speaker portions, etc.) said two or more acoustic ultrasonic signals (e.g. via multiple acoustic ultrasonic signals configured to be demodulated through mutual interference therewith to at least in part result in one or more acoustic audio signals, etc.) the from said two or more portable electronic device emitters (e.g. including one or more three-dimensional arrays, etc.) of said portable electronic device (e.g. including one or more security network components, etc.) to produce (e.g. including at least in part demodulation through signal intelligence recovery, etc.) a first set of one or more acoustic audio signals (e.g. including instructional lesson material information, etc.) from a first set of said two or more acoustic ultrasonic signals (e.g. including containing transitionary portions, etc.) at a first location (e.g. inclusive to one or more designated surfaces, etc.) and to produce (e.g. including at least in part demodulation through signal intelligence recovery, etc.) a second set of one or more second acoustic audio signals (e.g. including one or more digital audio information containing acoustic audio signals, etc.) from of a second set of said two or more acoustic ultrasonic signals (e.g. via one or more acoustic ultrasonic signals configured to be demodulated through nonlinear atmospheric interaction to at least in part generate one or more acoustic audio signals, etc.) at a second location (e.g. less than a distance from a seat back to a tray table, etc. e.g. including one or more three-dimensional arrays, etc. e.g. etc. e.g. etc.) including transducer placement at least partially in keyboard area of said portable electronic device (e.g. including transducer placement along key spacing of keyboards, etc.).

In one or more implementations, as shown in FIG. 92, operation o12 includes an operation o1273 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducers having dimensional sizing of less than 10 millimeters. Origination of an illustratively derived projecting dimensional sizing component group can be accomplished through skilled in the art design choice selection of one or more of the above depicted components from one or more of the above depicted subsystems shown in FIG. 25. Components from the projecting dimensional sizing component group can be used in implementing execution of the one or more projecting dimensional sizing instructions i1273 of FIG. 45, can be used in performance of the projecting dimensional sizing electrical circuitry arrangement e1273 of FIG. 38, and/or can be used in otherwise fulfillment of the operation o1273. An exemplary non-transitory signal bearing medium version of the information storage subsystem s200 is depicted in FIG. 45 as bearing the one or more projecting dimensional sizing instructions i1273 that when executed will direct performance of the operation o1273. Furthermore, the projecting dimensional sizing electrical circuitry arrangement ("elec circ arrange") e1273, when activated, will perform the operation o1273. Also, the projecting dimensional sizing module m1273, when executed and/or activated, will direct performance of and/or perform the operation o1273. For instance, in one or more exemplary implementations, the one or more projecting dimensional sizing instructions i1273, when executed, direct performance of the operation o1273 in the illustrative depiction as follows, and/or the projecting dimensional sizing electrical circuitry arrangement e1273, when activated, performs the operation o1273 in the illustrative depiction as follows, and/or the projecting dimensional sizing module m1273, when executed and/or activated, directs performance of and/or performs the operation o1273 in the illustrative depiction as follows, and/or the operation o1273 is otherwise carried out in the illustrative depiction as follows: electronically projecting (e.g. by one or more transducer portions, etc.) said two or more acoustic ultrasonic signals (e.g. via one or more acoustic ultrasonic signals configured to be demodulated through nonlinear atmospheric interaction to at least in part generate one or more acoustic audio signals, etc.) the from said two or more portable electronic device emitters (e.g. including one or more scattered arrangements, etc.) of said portable electronic device (e.g. including one or more netbook components, etc.) to produce (e.g. including demodulation via mutual interference therewith multiple acoustic ultrasonic signals configured to be demodulated through to at least in part result in one or more acoustic audio signals, etc.) a first set of one or more acoustic audio signals (e.g. including warning tone information, etc.) from a first set of said two or more acoustic ultrasonic signals (e.g. including containing temporary portions, etc.) at a first location (e.g. inclusive to one or more identified objects, etc.) and to produce (e.g. including demodulation via mutual interference therewith multiple acoustic ultrasonic signals configured to be demodulated through to at least in part result in one or more acoustic audio signals, etc.) a second set of one or more second acoustic audio signals (e.g. including one or more analog audio information containing acoustic audio signals, etc.) from of a second set of said two or more acoustic ultrasonic signals (e.g. via one or more acoustic ultrasonic signals configured to be demodulated through nonlinear human tissue interaction to at least in part produce one or more acoustic audio signals, etc.) at a second location (e.g. less than a distance of an aisle way, etc. e.g. including one or more scattered arrangements, etc. e.g. etc. e.g. etc.) including transducers having dimensional sizing of less than 10 millimeters (e.g. including transducer sizing of approximately 1 mm, etc.).

In one or more implementations, as shown in FIG. 92, operation o12 includes an operation o1274 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducers having dimensional sizing of less than 30 wavelengths of the lowest frequency of said one or more acoustic ultrasonic signals. Origination of an illustratively derived projecting wavelengths of the lowest component group can be accomplished through skilled in the art design choice selection of one or more of the above depicted components from one or more of the above depicted subsystems shown in FIG. 25. Components from the projecting wavelengths of the lowest component group can be used in implementing execution of the one or more projecting wavelengths of the lowest instructions i1274 of FIG. 45, can be used in performance of the projecting wavelengths of the lowest electrical circuitry arrangement e1274 of FIG. 38, and/or can be used in otherwise fulfillment of the operation o1274. An exemplary non-transitory signal bearing medium version of the information storage subsystem s200 is depicted in FIG. 45 as bearing the one or more projecting wavelengths of the lowest instructions i1274 that when executed will direct performance of the operation o1274. Furthermore, the projecting wavelengths of the lowest electrical circuitry arrangement ("elec circ arrange") e1274, when activated, will perform the operation o1274. Also, the projecting wavelengths of the lowest module m1274, when executed and/or activated, will direct performance of and/or perform the operation o1274. For instance, in one or more exemplary implementations, the one or more projecting wavelengths of the lowest instructions i1274, when executed, direct performance of the operation o1274 in the illustrative depiction as follows, and/or the projecting wavelengths of the lowest electrical circuitry arrangement e1274, when activated, performs the operation o1274 in the illustrative depiction as follows, and/or the projecting wavelengths of the lowest module m1274, when executed and/or activated, directs performance of and/or performs the operation o1274 in the illustrative depiction as follows, and/or the operation o1274 is otherwise carried out in the illustrative depiction as follows: electronically projecting (e.g. from one or more aperture portions, etc.) said two or more acoustic ultrasonic signals (e.g. via one or more acoustic ultrasonic signals configured to be demodulated through nonlinear human tissue interaction to at least in part produce one or more acoustic audio signals, etc.) the from said two or more portable electronic device emitters (e.g. including one or more staggered arrays, etc.) of said portable electronic device (e.g. including one or more ultrabook components, etc.) to produce (e.g. including demodulation using one or more acoustic ultrasonic signals configured to be demodulated through nonlinear atmospheric interaction to at least in part generate one or more acoustic audio signals, etc.) a first set of one or more acoustic audio signals (e.g. including white noise information, etc.) from a first set of said two or more acoustic ultrasonic signals (e.g. including containing steady state portions, etc.) at a first location (e.g. inclusive to one or more predetermined locations, etc.) and to produce (e.g. including demodulation using one or more acoustic ultrasonic signals configured to be demodulated through nonlinear atmospheric interaction to at least in part generate one or more acoustic audio signals, etc.) a second set of one or more second acoustic audio signals (e.g. including one or more high frequency audio information containing acoustic audio signals, etc.) from of a second set of said two or more acoustic ultrasonic signals (e.g. via one or more acoustic ultrasonic signals configured to be demodulated through nonlinear polymeric interaction to at least in part result in one or more acoustic audio signals, etc.) at a second location (e.g. less than a distance from a desk to a chair, etc. e.g. including one or more staggered arrays, etc. e.g. etc. e.g. etc.) including transducers having dimensional sizing of less than 30 wavelengths of the lowest frequency of said one or more acoustic ultrasonic signals (e.g. including transducer sizing of less than 1 mm, etc.).

In one or more implementations, as shown in FIG. 92, operation o12 includes an operation o1275 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement in body of said portable electronic device. Origination of an illustratively derived projecting placement in body component group can be accomplished through skilled in the art design choice selection of one or more of the above depicted components from one or more of the above depicted subsystems shown in FIG. 25. Components from the projecting placement in body component group can be used in implementing execution of the one or more projecting placement in body instructions i1275 of FIG. 45, can be used in performance of the projecting placement in body electrical circuitry arrangement e1275 of FIG. 38, and/or can be used in otherwise fulfillment of the operation o1275. An exemplary non-transitory signal bearing medium version of the information storage subsystem s200 is depicted in FIG. 45 as bearing the one or more projecting placement in body instructions i1275 that when executed will direct performance of the operation o1275. Furthermore, the projecting placement in body electrical circuitry arrangement ("elec circ arrange") e1275, when activated, will perform the operation o1275. Also, the projecting placement in body module m1275, when executed and/or activated, will direct performance of and/or perform the operation o1275. For instance, in one or more exemplary implementations, the one or more projecting placement in body instructions i1275, when executed, direct performance of the operation o1275 in the illustrative depiction as follows, and/or the projecting placement in body electrical circuitry arrangement e1275, when activated, performs the operation o1275 in the illustrative depiction as follows, and/or the projecting placement in body module m1275, when executed and/or activated, directs performance of and/or performs the operation o1275 in the illustrative depiction as follows, and/or the operation o1275 is otherwise carried out in the illustrative depiction as follows: electronically projecting (e.g. using one or more transmitter portions, etc.) said two or more acoustic ultrasonic signals (e.g. via one or more acoustic ultrasonic signals configured to be demodulated through nonlinear polymeric interaction to at least in part result in one or more acoustic audio signals, etc.) the from said two or more portable electronic device emitters (e.g. including one or more linear arrangements, etc.) of said portable electronic device (e.g. including one or more flip-phone components, etc.) to produce (e.g. including demodulation with one or more acoustic ultrasonic signals configured to be demodulated through nonlinear human tissue interaction to at least in part produce one or more acoustic audio signals, etc.) a first set of one or more acoustic audio signals (e.g. including varying pitch information, etc.) from a first set of said two or more acoustic ultrasonic signals (e.g. including containing integrated portions, etc.) at a first location (e.g. inclusive to one or more desired environments, etc.) and to produce (e.g. including demodulation with one or more acoustic ultrasonic signals configured to be demodulated through nonlinear human tissue interaction to at least in part produce one or more acoustic audio signals, etc.) a second set of one or more second acoustic audio signals (e.g. including one or more low frequency audio information containing acoustic audio signals, etc.) from of a second set of said two or more acoustic ultrasonic signals (e.g. via one or more acoustic ultrasonic signals configured to be demodulated through nonlinear apparel interaction to at least in part produce one or more acoustic audio signals, etc.) at a second location (e.g. less than a distance from a dashboard to a headrest, etc. including one or more linear arrangements, etc. e.g. etc. e.g. etc.) including transducer placement in body of said portable electronic device (e.g. including transducer placement within the user interface of the portable electronic device, etc.).

Figure 93:
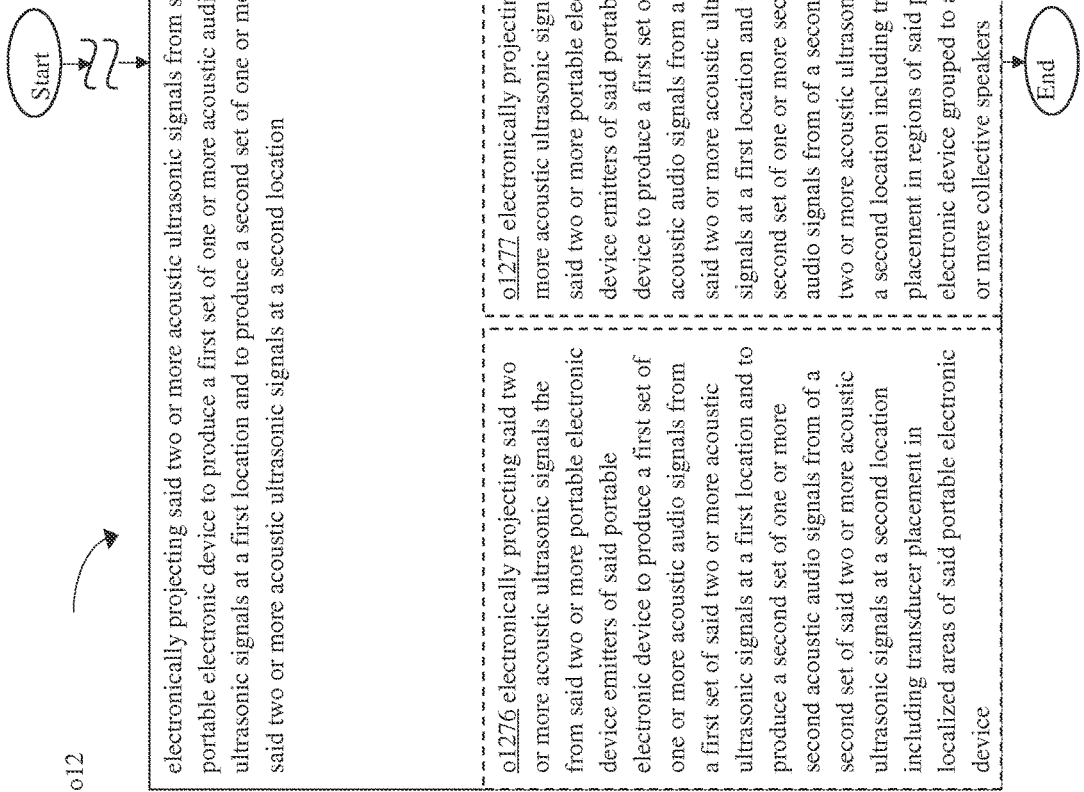
FIG. 93 is a high-level flowchart including exemplary implementations of operation o12 of FIG. 53.

In one or more implementations, as shown in FIG. 93, operation o12 includes an operation o1276 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement in localized areas of said portable electronic device. Origination of an illustratively derived projecting localized areas component group can be accomplished through skilled in the art design choice selection of one or more of the above depicted components from one or more of the above depicted subsystems shown in FIG. 25. Components from the projecting localized areas component group can be used in implementing execution of the one or more projecting localized areas instructions i1276 of FIG. 45, can be used in performance of the projecting localized areas electrical circuitry arrangement e1276 of FIG. 38, and/or can be used in otherwise fulfillment of the operation o1276. An exemplary non-transitory signal bearing medium version of the information storage subsystem s200 is depicted in FIG. 45 as bearing the one or more projecting localized areas instructions i1276 that when executed will direct performance of the operation o1276. Furthermore, the projecting localized areas electrical circuitry arrangement ("elec circ arrange") e1276, when activated, will perform the operation o1276. Also, the projecting localized areas module m1276, when executed and/or activated, will direct performance of and/or perform the operation o1276. For instance, in one or more exemplary implementations, the one or more projecting localized areas instructions i1276, when executed, direct performance of the operation o1276 in the illustrative depiction as follows, and/or the projecting localized areas electrical circuitry arrangement e1276, when activated, performs the operation o1276 in the illustrative depiction as follows, and/or the projecting localized areas module m1276, when executed and/or activated, directs performance of and/or performs the operation o1276 in the illustrative depiction as follows, and/or the operation o1276 is otherwise carried out in the illustrative depiction as follows: electronically projecting (e.g. through one or more air-coupled transducer portions etc.) said two or more acoustic ultrasonic signals (e.g. via one or more acoustic ultrasonic signals configured to be demodulated through nonlinear apparel interaction to at least in part produce one or more acoustic audio signals, etc.) the from said two or more portable electronic device emitters (e.g. including one or more parabolic arrangements, etc.) of said portable electronic device (e.g. including one or more portable computer components, etc.) to produce (e.g. including demodulation by one or more acoustic ultrasonic signals configured to be demodulated through nonlinear polymeric interaction to at least in part result in one or more acoustic audio signals, etc.) a first set of one or more acoustic audio signals (e.g. including note sequence information, etc.) from a first set of said two or more acoustic ultrasonic signals (e.g. including containing disparate portions, etc.) at a first location (e.g. inclusive to one or more chosen distances, etc.) and to produce (e.g. including demodulation by one or more acoustic ultrasonic signals configured to be demodulated through nonlinear polymeric interaction to at least in part result in one or more acoustic audio signals, etc.) a second set of one or more second acoustic audio signals (e.g. including one or more low frequency acoustic audio signals, etc.) from of a second set of said two or more acoustic ultrasonic signals (e.g. via one or more acoustic ultrasonic signals configured to be demodulated through nonlinear interaction with one or more solids to at least in part generate one or more acoustic audio signals, etc.) at a second location (e.g. more than confines of a room, etc. e.g. including one or more parabolic arrangements, etc. e.g. etc. e.g. etc.) including transducer placement in localized areas of said portable electronic device (e.g. including placement within speaker like shaped arrays of transducers, etc.).

In one or more implementations, as shown in FIG. 93, operation o12 includes an operation o1277 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement in regions of said portable electronic device grouped to appear as one or more collective speakers. Origination of an illustratively derived projecting collective speakers component group can be accomplished through skilled in the art design choice selection of one or more of the above depicted components from one or more of the above depicted subsystems shown in FIG. 25. Components from the projecting collective speakers component group can be used in implementing execution of the one or more projecting collective speakers instructions i1277 of FIG. 45, can be used in performance of the projecting collective speakers electrical circuitry arrangement e1277 of FIG. 38, and/or can be used in otherwise fulfillment of the operation o1277. An exemplary non-transitory signal bearing medium version of the information storage subsystem s200 is depicted in FIG. 45 as bearing the one or more projecting collective speakers instructions i1277 that when executed will direct performance of the operation o1277. Furthermore, the projecting collective speakers electrical circuitry arrangement ("elec circ arrange") e1277, when activated, will perform the operation o1277. Also, the projecting collective speakers module m1277, when executed and/or activated, will direct performance of and/or perform the operation o1277. For instance, in one or more exemplary implementations, the one or more projecting collective speakers instructions i1277, when executed, direct performance of the operation o1277 in the illustrative depiction as follows, and/or the projecting collective speakers electrical circuitry arrangement e1277, when activated, performs the operation o1277 in the illustrative depiction as follows, and/or the projecting collective speakers module m1277, when executed and/or activated, directs performance of and/or performs the operation o1277 in the illustrative depiction as follows, and/or the operation o1277 is otherwise carried out in the illustrative depiction as follows: electronically projecting (e.g. via one or more acoustic ultrasonic signals configured to be demodulated through nonlinear interaction with one or more solids to at least in part generate one or more acoustic audio signals, etc.) the from said two or more portable electronic device emitters (e.g. including one or more hyperbolic arrangements, etc.) of said portable electronic device (e.g. including one or more boombox components, etc.) to produce (e.g. including demodulation through one or more acoustic ultrasonic signals configured to be demodulated through nonlinear apparel interaction to at least in part produce one or more acoustic audio signals, etc.) a first set of one or more acoustic audio signals (e.g. including two-way conversation information, etc.) from a first set of said two or more acoustic ultrasonic signals (e.g. via multiple acoustic ultrasonic signals configured to be demodulated through mutual interference therewith to at least in part result in one or more acoustic audio signals, etc.) at a first location (e.g. inclusive to one or more selected ranges, etc.) and to produce (e.g. including demodulation through one or more acoustic ultrasonic signals configured to be demodulated through nonlinear apparel interaction to at least in part produce one or more acoustic audio signals, etc.) a second set of one or more second acoustic audio signals (e.g. including one or more high frequency acoustic audio signals, etc.) from of a second set of said two or more acoustic ultrasonic signals (e.g. via one or more acoustic ultrasonic signals including signals having one or more frequencies above 60 kHz, etc.) at a second location (e.g. more than an arm's length, etc. e.g. including one or more hyperbolic arrangements, etc. e.g. etc. e.g. etc.) including transducer placement in regions of said portable electronic device grouped to appear as one or more collective speakers (e.g. including placement within arrays of transducers, etc.).

In one or more implementations, as shown in FIG. 93, operation o12 includes an operation o1278 for electronically projecting said two or more acoustic ultrasonic signals the from said two or more portable electronic device emitters of said portable electronic device to produce a first set of one or more acoustic audio signals from a first set of said two or more acoustic ultrasonic signals at a first location and to produce a second set of one or more second acoustic audio signals from of a second set of said two or more acoustic ultrasonic signals at a second location including transducer placement of multiple individual transducer arrays. Origination of an illustratively derived projecting multiple arrays component group can be accomplished through skilled in the art design choice selection of one or more of the above depicted components from one or more of the above depicted subsystems shown in FIG. 25. Components from the projecting multiple arrays component group can be used in implementing execution of the one or more projecting multiple arrays instructions i1278 of FIG. 45, can be used in performance of the projecting multiple arrays electrical circuitry arrangement e1278 of FIG. 38, and/or can be used in otherwise fulfillment of the operation o1278. An exemplary non-transitory signal bearing medium version of the information storage subsystem s200 is depicted in FIG. 45 as bearing the one or more projecting multiple arrays instructions i1278 that when executed will direct performance of the operation o1278. Furthermore, the projecting multiple arrays electrical circuitry arrangement ("elec circ arrange") e1278, when activated, will perform the operation o1278. Also, the projecting multiple arrays module m1278, when executed and/or activated, will direct performance of and/or perform the operation o1278. For instance, in one or more exemplary implementations, the one or more projecting multiple arrays instructions i1278, when executed, direct performance of the operation o1278 in the illustrative depiction as follows, and/or the projecting multiple arrays electrical circuitry arrangement e1278, when activated, performs the operation o1278 in the illustrative depiction as follows, and/or the projecting multiple arrays module m1278, when executed and/or activated, directs performance of and/or performs the operation o1278 in the illustrative depiction as follows, and/or the operation o1278 is otherwise carried out in the illustrative depiction as follows: electronically projecting (e.g. by one or more resonant surface portions, etc.) said two or more acoustic ultrasonic signals (e.g. via one or more acoustic ultrasonic signals including signals having one or more frequencies above 60 kHz, etc.) the from said two or more portable electronic device emitters (e.g. including one or more enclosed arrangements, etc.) of said portable electronic device (e.g. including one or more digital audio output components, etc.) to produce (e.g. including demodulation by one or more acoustic ultrasonic signals configured to be demodulated through nonlinear interaction with one or more solids to at least in part generate one or more acoustic audio signals, etc.) a first set of one or more acoustic audio signals (e.g. including confidential information, etc.) from a first set of said two or more acoustic ultrasonic signals (e.g. via one or more acoustic ultrasonic signals configured to be demodulated through nonlinear atmospheric interaction to at least in part generate one or more acoustic audio signals, etc.) at a first location (e.g. inclusive to one or more designated directions, etc.) and to produce (e.g. including demodulation by one or more acoustic ultrasonic signals configured to be demodulated through nonlinear interaction with one or more solids to at least in part generate one or more acoustic audio signals, etc.) a second set of one or more second acoustic audio signals (e.g. including one or more full spectrum acoustic audio signals, etc.) from of a second set of said two or more acoustic ultrasonic signals (e.g. via one or more acoustic ultrasonic signals including signals having one or more frequencies above 80 kHz, etc.) at a second location (e.g. more than a three-foot radius, etc. e.g. including one or more enclosed arrangements, etc. e.g. etc. e.g. etc.) including transducer placement of multiple individual transducer arrays (e.g. including placement in arrays regarding down conversion interaction between ultrasonic beams from more than one array, etc.).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The one or more instructions discussed herein may be, for example, computer executable and/or logic-implemented instructions. In some implementations, signal-bearing medium as articles of manufacture may store the one or more instructions. In some implementations, the signal bearing medium may include a computer-readable medium. In some implementations, the signal-bearing medium may include a recordable medium. In some implementations, the signal-bearing medium may include a communication medium.

Those having skill in the art will recognize that the state of the art has progressed to the point where there is little distinction left between hardware and software implementations of aspects of systems; the use of hardware or software is generally (but not always, in that in certain contexts the choice between hardware an d software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture (limited to patentable subject matter under 35 USC 101). Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof (limited to patentable subject matter under 35 U.S.C. 101). In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure (limited to patentable subject matter under 35 USC 101). In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, (e.g., transmitter, receiver, transmission logic, reception logic, etc.), etc.).

Electro-Mechanical System Support

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

Electrical Circuitry Support

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Image Processing System Support

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Data Processing System Support

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Software as Patentable Subject Matter Support

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire"

(e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Mote System Support

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

Licensing System Support Language

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

Extraterritorial Use Language

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory.

Residual Incorporation Language

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

Not Limited to Implementations Described Language

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Not Limited to Human User Language

Although user XXX is shown/described herein as a single illustrated figure, those skilled in the art will appreciate that user XXX may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Plural Terms Language

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Operably-Coupled Language

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Active/Inactive Component Language

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Cloud Computing Standard Language

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scalable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

Use of Trademarks in Specification Language

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Caselaw-Driven Clarification Language

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A computationally-implemented method comprising: (a) electronically modulating one or more acoustic ultrasonic signals according to output information to be transmitted as one or more acoustic ultrasonic signals from one or more portable electronic device emitters of a portable electronic device; and (b) electronically projecting the one or more acoustic ultrasonic signals from the one or more portable electronic device emitters of the portable electronic device to produce one or more acoustic audio signals from the one or more acoustic ultrasonic signals at one or more target locations, the electronically projecting the one or more acoustic ultrasonic signals including at least adjusting one or more characteristics of one or more acoustic audio signals to be down converted from the one or more acoustic ultrasonic signals at the one or more target locations based at least in part on received input indicative of at least microphone sensing of one or more acoustic audio signals down converted at the one or more target locations, including at least: (1) electronically projecting one or more acoustic ultrasonic signals from an array of transducers, wherein at least a portion of the array of transducers are disposed at least one of at least partially within or at least partially behind a display screen of a portable electronic device; and (2) electronically projecting one or more acoustic ultrasonic signals at least in part by steering one or more acoustic ultrasonic signals to one or more target locations at least in part using acoustic imaging to identify the one or more target locations; including at least: (A) steering one or more acoustic ultrasonic signals to one or more target listeners and away from one or more third persons at least in part with phased array control according to detection of the one or more third persons at least in part with acoustic imaging; wherein at least one of the electronically modulating or the electronically projecting the one or more acoustic ultrasonic signals from the one or more portable electronic device emitters of the portable electronic device is performed at least in part with one or more processing devices.

2. A computationally-implemented system comprising:
   (a) circuitry for electronically modulating one or more acoustic ultrasonic signals according to output information to be transmitted as one or more acoustic ultrasonic signals from one or more portable electronic device emitters of a portable electronic device; and
   (b) circuitry for electronically projecting the one or more acoustic ultrasonic signals from the one or more portable electronic device emitters of the portable electronic device to produce one or more acoustic audio signals from the one or more acoustic ultrasonic signals at one or more target locations, the circuitry for electronically projecting the one or more acoustic ultrasonic signals configured to adjust one or more characteristics of one or more acoustic audio signals to be down converted from the one or more acoustic ultrasonic signals at the one or more target locations based at least in part on received input indicative of at least microphone sensing of one or more acoustic audio signals down converted at the one or more target locations, including at least:
      (1) circuitry for electronically projecting one or more acoustic ultrasonic signals from an array of transducers, at least a portion of the array of transducers being placed at least one of at least partially within or at least partially behind a display screen of a portable electronic device;
      (2) circuitry for electronically projecting one or more acoustic ultrasonic signals at least in part by steering one or more acoustic ultrasonic signals to one or more target locations at least in part using acoustic imaging to identify the one or more target locations; and
      (3) circuitry for adjusting projection of one or more acoustic ultrasonic signals to a target location based at least partly on accelerometer data regarding movement of the portable electronic device relative to the target location.

3. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
   circuitry for electronically modulating one or more acoustic ultrasonic signals according to received input indicative of at least microphone sensing of one or more acoustic audio reference signals at the one or more target locations.

4. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating one or more acoustic ultrasonic signals to be transmitted as one or more acoustic ultrasonic signals from one or more portable electronic device emitters integrated in an athletic sports helmet.

5. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating one or more acoustic ultrasonic signals to be transmitted as one or more acoustic ultrasonic signals from one or more portable electronic device emitters of one or more electronic wristwatch systems.

6. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating one or more acoustic ultrasonic signals to be transmitted as one or more acoustic ultrasonic signals via one or more steered beams of acoustic ultrasonic signals.

7. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating one or more acoustic ultrasonic signals modulated via one or more audio signals.

8. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating one or more acoustic ultrasonic signals to be transmitted as one or more acoustic ultrasonic signals from one or more portable electronic device emitters of a portable electronic device in accordance with relative position of the portable electronic device with one or more target listeners.

9. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating the one or more acoustic ultrasonic signals to be transmitted as one or more acoustic ultrasonic signals from one or more portable electronic device emitters of a portable electronic device being in a frequency range of between 60 to 200 kHz.

10. The computationally-implemented system of claim 2, wherein the circuitry for electronically modulating one or more acoustic ultrasonic signals according to output information to be transmitted as one or more acoustic ultrasonic signals from one or more portable electronic device emitters of a portable electronic device comprises:
circuitry for electronically modulating the one or more acoustic ultrasonic signals to be transmitted as one or more beams of acoustic ultrasonic signals outputted to interact non-linearly with human tissue to down convert to one or more acoustic audio signals.

11. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations further comprises:
circuitry for electronically projecting the one or more acoustic ultrasonic signals including steering one or more acoustic ultrasonic signals according to at least in part visual imaging of one or more target listeners.

12. The computationally-implemented system of claim 2, wherein the circuitry for electronically projecting one or more acoustic ultrasonic signals at least in part by steering one or more acoustic ultrasonic signals to one or more target locations at least in part using acoustic imaging to identify the one or more target locations comprises:
circuitry for steering one or more acoustic ultrasonic signals to one or more target locations at least in part with phased array control according to an identification of the one or more target locations at least in part with acoustic ultrasonic imaging of one or more target listeners.

13. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations further comprises:
circuitry for electronically projecting the one or more acoustic ultrasonic signals including adjusting acoustic ultrasonic signal amplitude based on thermal tracking of one or more target listeners.

14. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals for interference of the one or more acoustic ultrasonic signals to produce one or more acoustic audio signals.

15. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:

circuitry for electronically projecting the one or more acoustic ultrasonic signals for nonlinear non-tissue solid interaction of one or more acoustic ultrasonic signals.

16. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals including one or more acoustic audio signals tailored according to feedback sensing by portable electronic device.

17. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals including one or more stereophonic acoustic audio signals.

18. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals containing out-of-phase cancellation of background sound in a vicinity of a target listener.

19. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals containing phase-shifting of an original speech of a target listener in near real-time to the original speech being uttered.

20. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals including audio output information containing an entire amount of the audio output information.

21. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals including audio output information containing verbal oratory.

22. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals at a target location in a vicinity of one or more ears of a target listener.

23. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals at a target location in a vicinity of a first individual.

24. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals at a target location identified through sensor data as being a vicinity of a target listener's head.

25. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  circuitry for electronically projecting the one or more acoustic ultrasonic signals to produce one or more acoustic audio signals at a first location and a second location being spaced less than twelve feet.

26. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
  at least one of:
    circuitry for electronically projecting the one or more acoustic ultrasonic signals from a handheld mobile portable electronic device to produce one or more acoustic audio signals; or circuitry for electronically projecting the one or more acoustic ultrasonic signals from a cell phone portable electronic device to produce one or more acoustic audio signals at a location.

27. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a laptop computer portable electronic device to produce one or more acoustic audio signals.

28. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a personal data assistant (PDA) portable electronic device to produce one or more acoustic audio signals.

29. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a security personnel device portable electronic device to produce one or more acoustic audio signals.

30. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a wearable media portable electronic device to produce one or more acoustic audio signals.

31. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a wristwatch device to produce one or more acoustic audio signals.

32. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from a two-way radio portable electronic device to produce one or more acoustic audio signals.

33. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals to produce one or more acoustic audio signals to compensate for Doppler frequency shifting due to movement of said portable electronic device.

34. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting one or more acoustic ultrasonic signals to produce one or more acoustic audio signals at an ear-ring via interaction of the one or more acoustic ultrasonic signals with the ear ring.

35. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals to produce one or more acoustic ultrasonic signals near a passive receiver such as an ear ring.

36. The computationally-implemented system of claim 2, wherein the circuitry for electronically projecting one or more acoustic ultrasonic signals from an array of transducers, at least a portion of the array of transducers being placed at least one of at least partially within or at least partially behind a display screen of a portable electronic device comprises:
circuitry for electronically projecting one or more acoustic ultrasonic signals from an array of transducers, at least a portion of the array of transducers being placed at least one of at least partially within or at least partially behind a thin display screen of a smartphone.

37. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:
circuitry for electronically projecting the one or more acoustic ultrasonic signals from transducer placement at least partially in keyboard area of a portable electronic device.

38. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:

circuitry for electronically projecting the one or more acoustic ultrasonic signals from one or more transducers having dimensional sizing of less than 10 millimeters.

39. The computationally-implemented system of claim 2, wherein the circuitry for electronically projecting the one or more acoustic ultrasonic signals from the one or more portable electronic device emitters of the portable electronic device to produce one or more acoustic audio signals from the one or more acoustic ultrasonic signals at one or more target locations comprises:

circuitry for electronically projecting the one or more acoustic ultrasonic signals via one or more transducers having dimensional sizing of less than 30 wavelengths of the lowest frequency of the one or more acoustic ultrasonic signals.

40. The computationally-implemented system of claim 12, wherein said circuitry for steering one or more acoustic ultrasonic signals to one or more target locations at least in part with phased array control according to an identification of the one or more target locations at least in part with acoustic ultrasonic imaging of one or more target listeners comprises:

circuitry for steering one or more acoustic ultrasonic signals to one or more target listeners and away from one or more third persons at least in part with phased array control according to detection of the third persons at least in part with acoustic ultrasonic imaging.

41. The computationally-implemented system of claim 2, wherein said circuitry for electronically projecting the one or more acoustic ultrasonic signals from the one or more portable electronic device emitters of the portable electronic device to produce one or more acoustic audio signals from the one or more acoustic ultrasonic signals at one or more target locations, the circuitry for electronically projecting the one or more acoustic ultrasonic signals configured to adjust one or more characteristics of one or more acoustic audio signals to be down converted from the one or more acoustic ultrasonic signals at the one or more target locations based at least in part on received input indicative of at least microphone sensing of one or more acoustic audio signals down converted at the one or more target locations comprises:

circuitry for adjusting one or more characteristics of the one or more acoustic audio signals to be down converted from the one or more acoustic ultrasonic signals, the one or more characteristics including at least one of audio signal amplitude, audio signal quality, or anti-noise audio signal amplitude.

42. A computer program product comprising: at least one non-transitory medium bearing at least: (a) one or more instructions for electronically modulating one or more acoustic ultrasonic signals according to output information to be transmitted as one or more acoustic ultrasonic signals from one or more portable electronic device emitters of a portable electronic device; and (b) one or more instructions for electronically projecting the one or more acoustic ultrasonic signals from the one or more portable electronic device emitters of the portable electronic device to produce one or more acoustic audio signals from the one or more acoustic ultrasonic signals at one or more target locations, the one or more instructions for electronically projecting the one or more acoustic ultrasonic signals configured to adjust one or more characteristics of one or more acoustic audio signals to be down converted from the one or more acoustic ultrasonic signals at the one or more target locations based at least in part on received input indicative of at least microphone sensing of one or more acoustic audio signals down converted at the one or more target locations, including at least: (1) one or more instructions for electronically projecting one or more acoustic ultrasonic signals from an array of transducers, at least a portion of the array of transducers being placed at least one of at least partially within or at least partially behind a display screen of a portable electronic device, (2) one or more instructions for electronically projecting one or more acoustic ultrasonic signals at least in part by steering one or more acoustic ultrasonic signals to one or more target locations at least in part using acoustic imaging to identify the one or more target locations; and (3) one of more instructions for adjusting projection of one or more acoustic ultrasonic signals to a target location based at least partly on accelerometer data regarding movement of the portable electronic device relative to the target location.

* * * * *